US012502435B2

(12) United States Patent
Liu et al.

(10) Patent No.: US 12,502,435 B2
(45) Date of Patent: Dec. 23, 2025

(54) METASTATIC BRAIN TUMOR TARGETING PEPTIDES

(71) Applicant: H. Lee Moffitt Cancer Center and Research Institute, Inc., Tampa, FL (US)

(72) Inventors: James K. Liu, Lutz, FL (US); Daniel Abate-Daga, Tampa, FL (US); Cecilia Ramello, Tampa, FL (US)

(73) Assignee: H. Lee Moffitt Cancer Center and Research Institute, Inc., Tampa, FL (US)

( * ) Notice: Subject to any disclaimer, the term of this patent is extended or adjusted under 35 U.S.C. 154(b) by 1243 days.

(21) Appl. No.: 17/282,257

(22) PCT Filed: Oct. 17, 2019

(86) PCT No.: PCT/US2019/056712

§ 371 (c)(1),
(2) Date: Apr. 1, 2021

(87) PCT Pub. No.: WO2020/081794

PCT Pub. Date: Apr. 23, 2020

(65) Prior Publication Data

US 2023/0018705 A1 Jan. 19, 2023

Related U.S. Application Data

(60) Provisional application No. 62/755,434, filed on Nov. 3, 2018, provisional application No. 62/746,850, filed on Oct. 17, 2018.

(51) Int. Cl.

| | |
|---|---|
| ***A61K 47/64*** | (2017.01) |
| ***A61K 35/17*** | (2025.01) |
| ***A61K 39/00*** | (2006.01) |
| ***A61K 39/395*** | (2006.01) |
| ***A61K 47/65*** | (2017.01) |
| ***C07K 14/705*** | (2006.01) |
| ***C07K 14/725*** | (2006.01) |

(52) U.S. Cl.

CPC .............. *A61K 47/64* (2017.08); *A61K 35/17* (2013.01); *A61K 39/0011* (2013.01); *A61K 39/3955* (2013.01); *A61K 47/65* (2017.08); *C07K 14/7051* (2013.01); *A61K 2039/5156* (2013.01); *C07K 2319/02* (2013.01); *C07K 2319/03* (2013.01)

(58) Field of Classification Search

None

See application file for complete search history.

(56) References Cited

U.S. PATENT DOCUMENTS

| | | | |
|---|---|---|---|
| 4,186,183 | A | 1/1980 | Steck et al. |
| 4,217,344 | A | 8/1980 | Vanlerberghe et al. |
| 4,235,871 | A | 11/1980 | Papahadjopoulos et al. |
| 4,261,975 | A | 4/1981 | Fullerton et al. |
| 4,485,054 | A | 11/1984 | Mezei et al. |
| 4,501,728 | A | 2/1985 | Geho et al. |
| 4,774,085 | A | 9/1988 | Fidler |
| 4,837,028 | A | 6/1989 | Allen |
| 9,260,478 | B2 | 2/2016 | Hu et al. |
| 2007/0044171 | A1 | 2/2007 | Kovalic et al. |
| 2017/0233452 | A1 | 8/2017 | McIvor et al. |

FOREIGN PATENT DOCUMENTS

| | | | |
|---|---|---|---|
| WO | 91/17424 | | 11/1991 |
| WO | 2012/091564 | A2 | 7/2012 |
| WO | 2012/91564 | A2 | 7/2012 |
| WO | 2015/154029 | A1 | 10/2015 |

OTHER PUBLICATIONS

Wang, Chen-Yen, et al., "Highly Efficient DNA Delivery Mediated by pH-Sensitive Immunoliposomes," Biochemistry, vol. 28 (1989), pp. 9508-9814.

Deamer, D., et al., "Large Volume Liposomes by an Ether Vaporization Method," Biochimica et Biophysica Acta, vol. 443 (1976), pp. 626-634.

Fraley, Robert T., et al., "Entrapment of a bacterial plasmid in phospholipid vesicles: Potential for gene transfer," Proc. Natl. Acad. Sci., vol. 76, No. 7 (1979), pp. 3348-3352.

Hope, M.J., et al., "Production of large unilamellar vesicles by a rapid extrusion procedure. Characterization of size distribution, trapped volume and ability to maintain a membrane potential," Biochimica et Biophysica Acta, vol. 812 (1985), pp. 55-65.

Hope., M.J., et al., "Generation of Multilamellar and Unilamellar Phospholipid Vesicles," Chemistry and Physics of Lipds, vol. 40 (1986), pp. 89-107.

Dreamer, David W., et al., "Liposome Preparation: Methods and Mechanisms," Odyssey, Chapter 1 (1983).

Mayer, L.D., et al., "Vesicles of variable sizes produced by a rapid extrusion procedure," Biochim. Biophys. Acta, vol. 858 (1986), pp. 161-168.

Wang, Chen-Yen, et al., "pH-sensitive immunoliposomes mediate target-cell-specific delivery and controlled expression of a foreign gene in mouse," Proc. Natl. Acad. Sci., vol. 84 (1987), pp. 7851-7855.

(Continued)

*Primary Examiner* — Nicole Kinsey White

(74) *Attorney, Agent, or Firm* — Pabst Patent Group LLP

(57) ABSTRACT

Compositions and methods are disclosed for targeted treatment of lung cancer-derived metastatic brain tumors. In particular, tumor targeting agents comprising targeting peptides are disclosed that can target a payload, such as a therapeutic or diagnostic agent, to lung cancer-derived metastatic brain tumors. Chimeric antigen receptor (CAR) polypeptides are disclosed that can be used with adoptive cell transfer to target and kill lung cancer-derived metastatic brain tumors.

5 Claims, 18 Drawing Sheets

Specification includes a Sequence Listing.

(56) References Cited

OTHER PUBLICATIONS

Bangham, Alec D., "Liposomes: From Physics to Applications by D. D. Lasic," Biophysical Journal, vol. 67 (1994), pp. 1358-1362.

Szoka, Francis, Jr., "Comparative Properties and Methods of Preparation of Lipid Vesicles (Liposomes)," Ann. Rev. Biophys. Bioeng., vol. 9 (1980), pp. 467-508.

Wang, Yin, et al., "Peptide-drug conjugates as effective prodrug strategies for targeted delivery," Advanced Drug Delivery Reviews, vol. 110-111 (2017), pp. 112-126.

Peiris, Pubudu M., et al., "Treatment of Invasive Brain Tumors Using a Chain-like Nanopartice," Cancer Res., vol. 75, No. 7 (2015), pp. 1356-1365.

International Search Report issued for PCT/US2019/056712, mailed Feb. 25, 2020.

Opacak-Bernadrdi et al., Effects of cell penetrating Notch inhibitory peptide conjugated to elastin-like polypeptide on glioblastoma cells, J Drug Target, vol. 25, No. 6, p. 523-531, 2017.

UniProtKB/TrEMBL A0A2D3NFP0_PREIN, Mar. 28, 2018, [online]. [Retrieved on Jan. 17, 2020]. Retrieved from the Internet <URL: https://linkprotect.cudasvc.com/url?a=https%3a%2f%2fwww.uniprot.org%2funiprot%2fA0A2D3NFP0.txt%3fversion%3d2&c=E,1,XKD4SQtglBvEHAJKPGoG9jLXrOJ8X2k4A-gNzyy7xvtrTBsfkMKofZSkXAG_BA3s_W3qtc_pXcYO1zVbKDITRq7j6KPzm7RBLBU2iWp5hXp BsTa9zQiPjA,,&typo=0>; amino acids 52-63, 73.4% identity to Seq ID No. 1, 7 contiguous amino acids (57-63) corresponding amino.

Primary: Primary lung cancer
BM: Brain metastatic lung cancer
NT: Non-targeting 7-amino acids peptide
NM: Non-malignant brain cell

BRDT (LBM1) Lung Cancer Brain Metastases Binding

Primary: Primary lung cancer
BM: Brain metastatic lung cancer
NT: Non-targeting 7-amino acids peptide
NM: Non-malignant brain cell LBM2 Lung Cancer Brain Metastases Binding

METASTATIC BRAIN TUMOR TARGETING PEPTIDES

CROSS-REFERENCE TO RELATED APPLICATIONS

This application is a National Stage of International Application No. PCT/US2019/056712, filed Oct. 17, 2019, which claims benefit of U.S. Provisional Application No. 62/746,850, filed Oct. 17, 2018, and U.S. Provisional Application No. 62/755,434, filed Nov. 3, 2018, which are hereby incorporated herein by reference in their entireties.

STATEMENT REGARDING FEDERALLY SPONSORED RESEARCH OR DEVELOPMENT

This invention was made with Government Support under Grant No. CA193489 awarded by the National Institutes of Health. The Government has certain rights in the invention.

SEQUENCE LISTING

This application contains a sequence listing filed in electronic form as an ASCII.txt file entitled “320803-2290 Sequence Listing_ST25” created on Oct. 16, 2019.

The content of the sequence listing is incorporated herein in its entirety.

BACKGROUND

Brain metastases are the most common intracranial tumors in adults, with 150,000 to 170,000 cases annually in the United States as of 2004. Sources of cerebral metastasis may be cancers of the lung, breast, skin, colon, or kidney, with lung cancer being the most common. The therapeutic paradigms for these tumors include neurosurgical intervention, whole-brain and focused radiation modalities, chemotherapy, and immunotherapy.

SUMMARY

Compositions and methods are disclosed for targeted treatment of lung cancer-derived metastatic brain tumors. In particular, peptides were identified that selectively bind lung cancer-derived metastatic brain tumors. Therefore, tumor targeting agents are disclosed that comprise these targeting peptides, which can be used to target a payload, such as a therapeutic or diagnostic agent, to lung cancer-derived metastatic brain tumors. The disclosed tumor targeting agent can be used to deliver any payload to a lung cancer-derived metastatic brain tumor in a subject.

These peptides can also be used to construct chimeric antigen receptor (CAR) polypeptides for use in CAR-T cells that can be used to treat lung cancer-derived metastatic brain tumors. Therefore, disclosed herein are chimeric antigen receptor (CAR) polypeptides that can be used with adoptive cell transfer to target and kill lung cancer-derived metastatic brain tumors. The disclosed CAR polypeptides contain in an ectodomain a tumor targeting agent disclosed herein that can bind antigens on lung cancer-derived metastatic brain tumors. Also disclosed is an immune effector cell genetically modified to express the disclosed CAR polypeptide. Also disclosed is a method of providing an anti-tumor immunity in a subject with lung cancer-derived metastatic brain tumors that involves administering to the subject an effective amount of an immune effector cell genetically modified with a disclosed CAR.

The details of one or more embodiments of the invention are set forth in the accompanying drawings and the description below. Other features, objects, and advantages of the invention will be apparent from the description and drawings, and from the claims.

Graph demonstrate signal height at 3 hours with gradual decrease. NT=non targeting peptide (non specific peptide).

Figure 9:
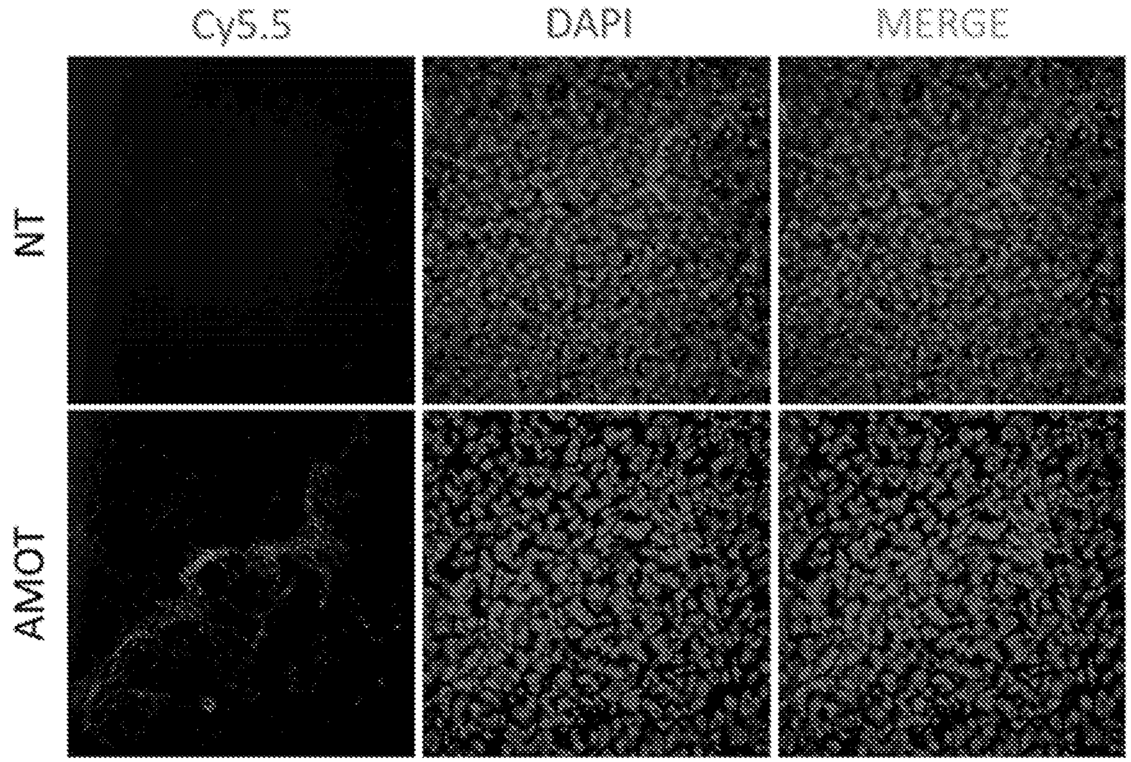

FIG. 9 shows binding of 400 uM peptide injected into the tail vein of mice with intracranial implanted lung cancer brain metastasis. Cy5.5 visualizes peptide binding.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biology, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

The term "linker" is art-recognized and refers to a molecule or group of molecules connecting two compounds, such as two polypeptides. The linker may be comprised of a single linking molecule or may comprise a linking molecule and a spacer molecule, intended to separate the linking molecule and a compound by a specific distance.

The term "specifically binds", as used herein, when referring to a polypeptide (including antibodies) or receptor, refers to a binding reaction which is determinative of the presence of the protein or polypeptide or receptor in a heterogeneous population of proteins and other biologics. Thus, under designated conditions (e.g. immunoassay conditions in the case of an antibody), a specified ligand or antibody "specifically binds" to its particular "target" (e.g. an antibody specifically binds to an endothelial antigen) when it does not bind in a significant amount to other proteins present in the sample or to other proteins to which the ligand or antibody may come in contact in an organism. Generally, a first molecule that "specifically binds" a second molecule has an affinity constant (Ka) greater than about $10^5$ $M^{-1}$ (e.g., $10^6$ $M^{-1}$, 107 $M^{-1}$, 108 $M^{-1}$, $10^9$ $M^{-1}$, 1010 $M^{-1}$, 1011 $M^{-1}$, and 1012 $M^{-1}$ or more) with that second molecule.

The term "specifically deliver" as used herein refers to the preferential association of a molecule with a cell or tissue bearing a particular target molecule or marker and not to cells or tissues lacking that target molecule. It is, of course, recognized that a certain degree of non-specific interaction may occur between a molecule and a non-target cell or tissue. Nevertheless, specific delivery, may be distinguished as mediated through specific recognition of the target molecule. Typically specific delivery results in a much stronger association between the delivered molecule and cells bearing the target molecule than between the delivered molecule and cells lacking the target molecule.

The term "subject" refers to any individual who is the target of administration or treatment. The subject can be a vertebrate, for example, a mammal. Thus, the subject can be a human or veterinary patient. The term "patient" refers to a subject under the treatment of a clinician, e.g., physician.

The term "therapeutically effective" refers to the amount of the composition used is of sufficient quantity to ameliorate one or more causes or symptoms of a disease or disorder. Such amelioration only requires a reduction or alteration, not necessarily elimination.

The term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

Compositions and methods are disclosed for targeted treatment of lung cancer-derived metastatic brain tumors. In particular, peptides were identified that selectively bind lung cancer-derived metastatic brain tumors.

In some embodiments, the tumor targeting peptide comprises one or more targeting peptides disclosed herein. For example, in some embodiments the targeting peptide comprises the amino acid sequence SYPSNALSLHKY (SEQ ID NO:1, LBM1), or a variant or a fragment having at least 10, 11, 12, 13, 14, or 15 contiguous amino acids and at least 65%, 70%, 75, 80%, 85%, 90%, 95%, or 100% sequence identity to SEQ ID NO:1.

In some embodiments the targeting peptide comprises the amino acid sequence TLGLRPVPVATT (SEQ ID NO:2, LBM2), or a variant or a fragment having at least 10, 11, 12, 13, 14, or 15 contiguous amino acids and at least 65%, 70%, 75, 80%, 85%, 90%, 95%, or 100% sequence identity to SEQ ID NO:2.

In some embodiments the targeting peptide comprises the amino acid sequence YDAIQRPTGQLS (SEQ ID NO:3, LBM3), or a variant or a fragment having at least 10, 11, 12, 13, 14, or 15 contiguous amino acids and at least 65%, 70%, 75, 80%, 85%, 90%, 95%, or 100% sequence identity to SEQ ID NO:3.

In some embodiments the targeting peptide comprises the amino acid sequence HSPTTSLTLSYK (SEQ ID NO:4, LBM4), or a variant or a fragment having at least 10, 11, 12, 13, 14, or 15 contiguous amino acids and at least 65%, 70%, 75, 80%, 85%, 90%, 95%, or 100% sequence identity to SEQ ID NO:4.

In some embodiments the targeting peptide comprises an amino acid sequence selected from the group consisting of ADSNHAYERDSV (SEQ ID NO:5), AESPLTNRGWNP (SEQ ID NO:6), AHPHSDKLVPPR (SEQ ID NO:7), AHSSFGFSHLAV (SEQ ID NO:8), AHVNSSERIHPY (SEQ ID NO:9), ANTELALANRKH (SEQ ID NO:10), APNVGDLTSLLG (SEQ ID NO: 11), AQSTTMSTSQRN (SEQ ID NO:12), ARSLEPAPSRHS (SEQ ID NO:13), ATPGSFQTIRAN (SEQ ID NO:14), AMNMRSLTYSDL (SEQ ID NO:15), APQTSDSTLTVM (SEQ ID NO:16), CVTPSNRDCSHS (SEQ ID NO:17), EALLKPYSFAYP (SEQ ID NO:18), EHVDMWNLVSAS (SEQ ID NO:19), EKYPPSSMDQRS (SEQ ID NO:20), ELVSSSDQRNKN (SEQ ID NO:21), FPKSVYPAMPRP (SEQ ID NO:22), FSPTQANTIHRW (SEQ ID NO:23), FTNPFGPYPTGR (SEQ ID NO:24), GKQTLHSFATHW (SEQ ID NO:25), GPWLGSNMRGAS (SEQ ID NO:26), GRDMPM-SALMRH (SEQ ID NO:27), GSAARTISPSLL (SEQ ID NO:28), GSMFYLPMPERG (SEQ ID NO:29), GTDIIH-PRVIFN (SEQ ID NO:30), GTASRTHSYYSL (SEQ ID NO:31), HNTPMLDSRGNN (SEQ ID NO:32), HPALSQHLGPVA (SEQ ID NO:33), HTPHPGGRSVPP (SEQ ID NO:34), HYKPHVSSLPLA (SEQ ID NO:35), IGSKSPLRLTMD (SEQ ID NO:36), KLTTDKVRTITL (SEQ ID NO:37), LIAGWDISSKR (SEQ ID NO:38), LPKVSVPRHPSV (SEQ ID NO:39), LTPHLGTHKSTT (SEQ ID NO:40), MKAHHSQLYPRH (SEQ ID NO:41), MNIAELRNSDLN (SEQ ID NO:42), NANHNPLNLKSA (SEQ ID NO:43), QFAKTSDPGSLT (SEQ ID NO:44), QIFNHSPNDPKK (SEQ ID NO:45), QYVPYLPPAIL (SEQ ID NO:46), NNTDHRQLTSTT (SEQ ID NO:47), NYLPHQSSSPSRG (SEQ ID NO:48), QYVPYLPPAIL (SEQ ID NO:49), RIPMPSYMNHM (SEQ ID NO:50), SDASGIPKRLAFP (SEQ ID NO:51), SDTTSKHLYTRL (SEQ ID NO:52), SGYSAEGGKPVL (SEQ ID NO:53), SGYSQGGKPVL (SEQ ID NO:54), SHGISSTPPGQA (SEQ ID NO:55), SLPLAIHNSRPN (SEQ ID NO:56), SLTDYVRKGPRI (SEQ ID NO:57), SNPSAHKDDSKR (SEQ ID NO:58), SRYMGPLDLLAP (SEQ ID NO:59), SRYMGPLDLLAP (SEQ ID NO:60), SSMPINSPATRQ (SEQ ID NO:61), SVDYSFSNRTDR (SEQ ID NO:62), SYHLSNTFRVQA (SEQ ID NO:63), TAVLAPQPWLNL (SEQ ID NO:64), TGSAKFLQRDTH (SEQ ID NO:65), TKPSWHWPMIR (SEQ ID NO:66), TPHGYQPMQGKT (SEQ ID NO:67), TQGSGFSSPILP (SEQ ID NO:68), TTDFFYKRTFFT (SEQ ID NO:69), TTRPNHVHLAKI (SEQ ID NO:70), VAQRHTLTSITV (SEQ ID NO:71), VDAKYGRHIPPV (SEQ ID NO:72), VPTQWTHRESHA (SEQ ID NO:73), WGVTKPIRTSTL (SEQ ID NO:74), WGVTKPIRTSTL (SEQ ID NO:75), WYPSNALSLHK (SEQ ID NO:76), YASQSALSHSAR (SEQ ID NO:77), and YVKSHTTTAVRQ (SEQ ID NO:78), or a variant or a fragment having at least 10, 11, 12, 13, 14, or 15 contiguous amino acids and at least 65%, 70%, 75, 80%, 85%, 90%, 95%, or 100% sequence identity to any one of SEQ ID NOs:5-78.

Tumor targeting agents are disclosed that comprise the disclosed targeting peptides, which can be used to target a payload, such as a therapeutic or diagnostic agent, to lung cancer-derived metastatic brain tumors.

In some embodiments, the molecule is defined by the formula:

$NH_3$-ACA-TTP-COOH, or $NH_3$-TTP-ACA-COOH, wherein "TTP" represents the tumor targeting peptide, wherein "ACA" represents the anti-cancer agent, and wherein "-" represents a bivalent linker.

In some embodiments, the tumor targeting agent comprises 1, 2, 3, 4, 5, 6, 7, 8, 9, or 10 targeting peptides disclosed herein, optionally separated by a linker. The targeting peptide can be a repeat of the same peptide, a mixture of different peptides, or a combination thereof. This oligomer can be linear or branched using compositions and methods known in the art. The tumor targeting agent can be comprised of natural or synthetic amino acids.

Suitable linkers for oligomeric peptides are known in the art. In some embodiments, the linker comprises the amino acid sequence GGGS (SEQ ID NO:79), GGGSGG (SEQ ID NO:80), GGGSGGGS (SEQ ID NO:81), GGGGSGGGGSGGGGS (SEQ ID NO:82), GGGGSGGGGSGGGGSGG (SEQ ID NO:83), or GGGGSGGGGSGGGGSGGGGS (SEQ ID NO:84), or GSTSGSGKPGSGEGSTKG (SEQ ID NO:164).

Therefore, in some embodiments, the targeting agent comprises the amino acid sequence: HSPTTSLTL-SYKGGGGSGGGGSGGGGSHSPTTSLTLSYK (LBM4-LBM4, SEQ ID NO:165). In some embodiments, the targeting agent comprises the amino acid sequence: SYPSNALSLHKYGGGGSGGGGSGGGGSSYPSNALSLHKY (LBM1-LBM1, SEQ ID NO:166). In some embodiments, the targeting agent comprises the amino acid sequence: TLGLRPVPVATTGGGGSGGGGSGGGG-STLGLRPVPVATT (LBM2-LBM2, SEQ ID NO:167).

In some embodiments, the targeting agent comprises the amino acid sequence: HSPTTSLTL-SYKGGGGSGGGGSGGGGSSYPSNALSLHKY (LBM4-LBM1, SEQ ID NO:168). In some embodiments, the targeting agent comprises the amino acid sequence: HSPTTSLTLSYKGGGGSGGGGSGGGGSTLGLRPVP-VATT (LBM4-LBM2, SEQ ID NO:169). In some embodiments, the targeting agent comprises the amino acid sequence:

SYPSNALSLHKYGGGGSGGGGSGGGGSHSPTTSLTL-SYK (LBM1-LBM4, SEQ ID NO:170). In some embodiments, the targeting agent comprises the amino acid sequence: TLGLRPVPVAT-TGGGGSGGGGSGGGGSHSPTTSLTLSYK (LBM2-LBM4, SEQ ID NO:171).

In some embodiments, the targeting agent comprises the amino acid sequence: SYPSNALSLHKYGGGGSGGGGSGGGGSTLGLRPVP-VATT (LBM1-LBM2, SEQ ID NO:172). In some embodiments, the targeting agent comprises the amino acid sequence: TLGLRPVPVAT-TGGGGSGGGGSGGGGSSYPSNALSLHKY (LBM2-LBM1, SEQ ID NO:173).

Therefore, in some embodiments, the targeting agent comprises the amino acid sequence: HSPTTSLTL-SYKGGGGSGGGGSGGGGSHSPTTSLTL-SYKGGGGSGGGGSGGGGSHSPT TSLTLSYK (LBM4-LBM4-LBM4, SEQ ID NO:174). In some embodiments, the targeting agent comprises the amino acid sequence: SYPSNALSLHKYGGGGSGGGGSGGGGSSYPSNALS LHKYGGGGSGGGGSGGGGSSYP SNALSLHKY (LBM1-LBM1-LBM1, SEQ ID NO:175). In some embodiments, the targeting agent comprises the amino acid sequence: TLGLRPVPVATTGGGGSGGGGSGGGG-STLGLRPVPVATTGGGGSGGGGSGGGGSTLGL RPVP-VATT (LBM2-LBM2-LBM2, SEQ ID NO:176).

Therefore, in some embodiments, the targeting agent comprises the amino acid sequence: HSPTTSLTL-SYKGGGGSGGGGSGGGGSSYPSNALSLHKYGGGGS GGGGSGGGGSTLGL RPVPVATT (LBM4-LBM1-LBM2, SEQ ID NO:177). In some embodiments, the targeting agent comprises the amino acid sequence: SYPSNALSLHKYGGGGSGGGGSGGGGTLGLRPVP-VATTGGGGSGGGGSGGGGSHSPTT SLTLSYK (LBM1-LBM2-LBM4, SEQ ID NO:178). In some embodiments, the targeting agent comprises the amino acid sequence: TLGLRPVPVAT-TGGGGSGGGGSGGGGSSYPSNALSLHKYGGGGSGG GGSGGGGSHSPT TSLTLSYK (LBM2-LBM1-LBM4, SEQ ID NO:179). In some embodiments, the targeting agent comprises the amino acid sequence: HSPTTSLTL-SYKGGGGSGGGGSGGGGSTLGLRPVPVAT-TGGGGSGGGGSGGGGSSYPS NALSLHKY (LBM2-LBM2-LBM1, SEQ ID NO:180).

The disclosed tumor targeting agent can be used to deliver any payload to a lung cancer-derived metastatic brain tumor in a subject. The payload can be a therapeutic or diagnostic agent. In some embodiments, the payload is an anti-cancer agent that can cause apoptosis or pyroptosis of the targeted tumor cell. In some embodiments, the anti-cancer agent is a small molecule drug. The anti-cancer agent can be a chemotherapy agent, such as drugs that stop DNA building block synthesis (e.g., methotrexate, fluorouracil, hydroxyurea, lurtotecan, mercaptopurine, pentostatin and pirarubicin), drugs that directly damage DNA (e.g., cisplatin, daunorubicin, doxorubicin, etoposide, teniposide, camptothecin, topotecan, irinotecan, rubitecan, belotecan), drugs that affect mitotic spindle synthesis or breakdown (e.g., vinblastine, vincristine, vinorelbine, vinflunine, vindesine, docetaxel, larotaxel, ortataxel, paclitaxel, tesetaxel, ixabepilone and epithilones), or drugs that disrupt angiogenesis (e.g., anti-VEGF antibody, angiostatin, endostatin, and tumstatin). Alternatively, the anti-cancer agent can be a radiotherapy agent (e.g., 90Y, 125I, 188Re, 111In DTPA, or 131I Sodium iodide).

Examples of anti-cancer drugs or antineoplastics to be attached to the tumor targeting peptides described herein include, but are not limited to, aclarubicin, altretamine, aminopterin, amrubicin, azacitidine, azathioprine, belotecan, busulfan, camptothecin, capecitabine, carboplatin, carmofur, carmustine, chlorambucil, cisplatin, cladribine, clofarabine, cyclophosphamide, cytarabine, daunorubicin, decitabine, doxorubicin, epirubicin, etoposide, floxuridine, fludarabine, 5-fluorouracil, fluorouracil, gemcitabine, idarubicin, ifosfamide, irinotecan, mechlorethamine, melphalan, mercaptopurine, methotrexate, mitoxantrone, nedaplatin, oxaliplatin, paclitaxel, pemetrexed, pentostatin, pirarubicin, pixantrone, procarbazine, pyrimethamine raltitrexed, rubitecan, satraplatin, streptozocin, thioguanine, triplatin tetranitrate, teniposide, topotecan, tegafur, trimethoprim, uramustine, valrubicin, vinblastine, vincristine, vindesine, vinflunine, vinorelbine, and zorubicin.

In come embodiments, the tumor targeting peptide is linked to a vehicle carrier, which is associated with the anti-cancer agent. In one example, the vehicle carrier encapsulates the anti-cancer agent. Vehicle carriers include, but are not limited to, micelle, liposome (e.g., cationic liposome), nanoparticle, microsphere, or biodegradable polymer. A tumor targeting peptide can be tethered to a vehicle carrier by a variety of linkages (e.g., a disulfide linkage, an acid labile linkage, a peptide-based linkage, an oxyamino linkage, or a hydrazine linkage). To improve the association between the peptide and the vehicle carrier, the peptide can be modified by a suitable polymer, such as PEG (peglyated). The detectable label or the anti-cancer agent can be encapsulated within the vehicle via, e.g., association with lipophilic molecules, which can aid in the delivery of the detectable label or the anti-cancer agent to the interior of the vehicle.

In some embodiments, a tumor targeting peptide described herein is linked to a liposome (as a vehicle carrier) that encapsulates one or more agents of interest (e.g., an anti-cancer agent). Liposome is a vesicle comprised of one or more concentrically ordered lipid bilayers, which encapsulate an aqueous phase. The aqueous phase typically contains an agent to be delivered to a target site such as a tumor site. Upon reaching the target site, the liposome fuses with the plasma membranes of local cells to release the agent into the cytosol. Alternatively, the liposome is endocytosed or otherwise taken in by the cells as the content of a transport vesicle (e.g., an endosome or phagosome). Once in the transport vesicle, the liposome either degrades or fuses with the membrane of the vesicle and releases its contents. Liposome membranes can be constructed so that they become destabilized when the nearby environment becomes acidic (see, e.g., PNAS 84:7851, 1987; Biochemistry 28:908, 1989). Thus, when liposomes enter a target cell, they become destabilized to release their encapsulated contents. This destabilization process is termed fusogenesis. Dioleoylphosphatidylethanolamine (DOPE) is commonly used to facilitate this process.

A variety of methods are available for preparing liposomes. See, e.g., Szoka et al., Ann. Rev. Biophys. Bioeng. 9:467 (1980), U.S. Pat. Nos. 4,186,183, 4,217,344, 4,235,871, 4,261,975, 4,485,054, 4,501,728, 4,774,085, 4,837,028, 4,235,871, 4,261,975, 4,485,054, 4,501,728, 4,774,085, 4,837,028, 4,946,787, PCT Publication No. WO 91/17424, Deamer & Bangham, Biochim. Biophys. Acta 443:629-634 (1976); Fraley, et al., PNAS 76:3348-3352 (1979); Hope et al., Biochim. Biophys. Acta 812:55-65 (1985); Mayer et al., Biochim. Biophys. Acta 858:161-168 (1986); Williams et al., PNAS 85:242-246 (1988); Liposomes (Ostro (ed.), 1983, Chapter 1); Hope et al., Chem. Phys. Lip. 40:89 (1986); Gregoriadis, Liposome Technology (1984) and Lasic, Liposomes: from Physics to Applications (1993)). Suitable methods include, for example, sonication, extrusion, high pressure/homogenization, microfluidization, detergent dialysis, calcium-induced fusion of small liposome vehicles and ether fusion methods, all of which are well known in the art.

In come embodiments, the tumor targeting peptide can be linked directly to an anti-cancer agent via methods known in the art to form a peptide-drug conjugate (PDC). In some embodiments, the tumor targeting peptide is linked to the anti-cancer agent by a linker. This linker can be designed to bear an enzyme-hydrolyzable unit (EHU) like a carboxylic ester or an amide bond, cleaved by esterases and amidases, respectively. The most commonly utilized linkers that bear a carboxylic ester bond, as the enzyme-hydrolyzable unit, are succinyl (derived from succinic acid) and glutaryl (derived from glutaric acid). Concerning the utilization of amide bond in the linker as the unit tethering the drug and the peptide, it can be tailored to be cleaved based on the targeted tissue and/or type of cancer where a specific protease is statistically upregulated (e.g. cathepsin B upregulated in various malignancies including lung, brain, prostate and breast). Another class of linkers is the stimuli-responsive/degradable linkers, designed to achieve an efficient release of the drug from the bioconjugate in the tumor microenvironment. Such linkers are rationally designed to be cleaved when they sense specific stimuli in the environment of cancerous cells (slightly acidic pH, enhanced levels of reducing agents and/or enzymes) or external stimuli (ultrasound, temperature, irradiation). Specifically, there are certain bonds like imine, oxime, hydrazone, orthoester, acetal, vinyl ether and polyketal that are known to undergo hydrolysis at acidic pH, while being extremely stable during blood circulation. Therefore, acid-labile bonds could be hydrolyzed in the slightly acidic microenvironment and/or in the acidic cellular compartments of cancer cells and consequently release the active drug. Additionally, disulfide linkers are often adopted in PDCs, since they are cleaved by reducing agents like cysteine and glutathione, present in high concentrations in malignant cells. Linkers bearing enzyme-hydrolyzable units (EHU) responsive to proteases are degradable peptide linkers that have attracted significant interest due to the specificity of certain enzymes and there has been a dramatic escalation over in the past years. The most representative examples in this field are the MMP-2/9 (matrix metalloproteinases) and cathepsin B peptide substrates. MMP-2/9 and cathepsin B are proteolytic enzymes present at elevated levels in cancer cells known to participate in human tumor invasion and metastasis. Another rapidly emerging category in PDC linkers that has gained much attention in the last years are the self-immolative or self-destructive spacers/linkers. This type of linkers/spacers offers the capability to release the active drug after simultaneous cascade reactions. Para-amino benzyl alcohol (PABC) is a representative example that can be connected in the amino group via an amide bond to an enzyme-hydrolyzable unit (EHU) and to a tumor-targeting element.

In some embodiments, the payload is a cytotoxic peptide. Cytotoxic peptides are known in the art, and are disclosed for example in U.S. Pat. Nos. 9,998,842, 9,260,478, WO2015/154029, and WO2012/091564, which are all hereby incorporated reference for the teaching of these peptides and their uses.

In some embodiments, the cytotoxic agent comprises a functional nucleic acid that is cytotoxic to cancer cells. For example, the functional nucleic acid can inhibit anti-apoptotic gene targets, e.g., anti-apoptotic Bcl-2 member proteins. The functional nucleic acid can also inhibit targets causing drug sensitization (e.g., PP2A and CDC25c). In some cases, the cytotoxic agent comprises a functional nucleic acid that promotes apoptotic gene targets, e.g., apoptotic Bcl-2 member proteins.

Also disclosed is a pharmaceutical composition comprising the tumor targeting peptide and payload disclosed herein in a pharmaceutically acceptable carrier. Also disclosed is a method for treating a lung cancer-derived metastatic brain tumor in a subject that involves administering to the subject a therapeutically effective amount of a disclosed pharmaceutical composition.

Also disclosed herein are chimeric antigen receptors (CAR) that can specifically recognize lung cancer-derived metastatic brain tumors. Also disclosed are immune effector cells, such as T cells or Natural Killer (NK) cells, that are engineered to express these CARs. Therefore, also disclosed are methods for providing an anti-tumor immunity in a subject with a lung cancer-derived metastatic brain tumor that involves adoptive transfer of the disclosed immune effector cells engineered to express the disclosed CARs.

The disclosed CAR is generally made up of three domains: an ectodomain, a transmembrane domain, and an endodomain. The ectodomain comprises the GSC-binding region and is responsible for antigen recognition. It also optionally contains a signal peptide (SP) so that the CAR can be glycosylated and anchored in the cell membrane of the immune effector cell. The transmembrane domain (TD), is as its name suggests, connects the ectodomain to the endodomain and resides within the cell membrane when expressed by a cell. The endodomain is the business end of the CAR that transmits an activation signal to the immune effector cell after antigen recognition. For example, the endodomain can contain an intracellular signaling domain (ISD) and optionally a co-stimulatory signaling region (CSR).

A "signaling domain (SD)" generally contains immunoreceptor tyrosine-based activation motifs (ITAMs) that activate a signaling cascade when the ITAM is phosphorylated. The term "co-stimulatory signaling region (CSR)" refers to intracellular signaling domains from costimulatory protein receptors, such as CD28, 41BB, and ICOS, that are able to enhance T-cell activation by T-cell receptors.

In some embodiments, the endodomain contains an SD or a CSR, but not both. In these embodiments, an immune effector cell containing the disclosed CAR is only activated if another CAR (or a T-cell receptor) containing the missing domain also binds its respective antigen.

In some embodiments, the CAR polypeptide contains an incomplete endodomain. For example, the CAR polypeptide can contain only an intracellular signaling domain or a co-stimulatory domain, but not both. In these embodiments, the immune effector cell is not activated unless it and a second CAR polypeptide (or endogenous T-cell receptor) that contains the missing domain both bind their respective antigens. Therefore, in some embodiments, the CAR polypeptide contains a CD3 zeta (CD3Q signaling domain but does not contain a costimulatory signaling region (CSR). In other embodiments, the CAR polypeptide contains the cytoplasmic domain of CD28, 4-1BB, or a combination thereof, but does not contain a CD3 zeta (CD3Q signaling domain (SD).

In some embodiments, the disclosed CAR is used in combination with a CAR that specifically binds another antigen. A dual CAR can be engineered such that one extracellular antigen binding domain is connected to the intracellular costimulatory domain and a second, distinct extracellular antigen binding domain is connected to the intracellular stimulatory domain.

In some embodiments, the disclosed CAR is defined by the formula:

SP-TTP-HG-TM-CSR-ISD; or

SP-TTP-HG-TM-ISD-CSR wherein "SP" represents a signal peptide,
wherein "TTP" represents a tumor targeting peptide,
wherein "HG" represents and optional hinge domain,
wherein "TM" represents a transmembrane domain,
wherein "CSR" represents a co-stimulatory signaling region,
wherein "ISD" represents an intracellular signaling domain, and
wherein "-" represents a bivalent linker.

As above, the tumor targeting agent can comprise 1, 2, 3, 4, 5, 6, 7, 8, 9, or 10 targeting peptides disclosed herein, optionally separated by a linker. The targeting peptide can be a repeat of the same peptide, a mixture of different peptides, or a combination thereof. This oligomer can be linear or branched using compositions and methods known in the art. The tumor targeting agent can be comprised of natural or synthetic amino acids.

Additional CAR constructs are described, for example, in Fresnak A D, et al. Engineered T cells: the promise and challenges of cancer immunotherapy. Nat Rev Cancer. 2016 Aug. 23; 16(9):566-81, which is incorporated by reference in its entirety for the teaching of these CAR models.

For example, the CAR can be a TRUCK, Universal CAR, Self-driving CAR, Armored CAR, Self-destruct CAR, Conditional CAR, Marked CAR, TenCAR, Dual CAR, or sCAR.

TRUCKs (T cells redirected for universal cytokine killing) co-express a chimeric antigen receptor (CAR) and an antitumor cytokine. Cytokine expression may be constitutive or induced by T cell activation. Targeted by CAR specificity, localized production of pro-inflammatory cytokines recruits endogenous immune cells to tumor sites and may potentiate an antitumor response.

Universal, allogeneic CAR T cells are engineered to no longer express endogenous T cell receptor (TCR) and/or major histocompatibility complex (MHC) molecules, thereby preventing graft-versus-host disease (GVHD) or rejection, respectively.

Self-driving CARs co-express a CAR and a chemokine receptor, which binds to a tumor ligand, thereby enhancing tumor homing.

CAR T cells engineered to be resistant to immunosuppression (Armored CARs) may be genetically modified to no longer express various immune checkpoint molecules (for example, cytotoxic T lymphocyte-associated antigen 4 (CTLA4) or programmed cell death protein 1 (PD1)), with an immune checkpoint switch receptor, or may be administered with a monoclonal antibody that blocks immune checkpoint signaling.

A self-destruct CAR may be designed using RNA delivered by electroporation to encode the CAR. Alternatively, inducible apoptosis of the T cell may be achieved based on ganciclovir binding to thymidine kinase in gene-modified lymphocytes or the more recently described system of activation of human caspase 9 by a small-molecule dimerizer.

A conditional CAR T cell is by default unresponsive, or switched 'off', until the addition of a small molecule to complete the circuit, enabling full transduction of both signal 1 and signal 2, thereby activating the CAR T cell. Alternatively, T cells may be engineered to express an adaptor-specific receptor with affinity for subsequently administered secondary antibodies directed at target antigen.

Marked CAR T cells express a CAR plus a tumor epitope to which an existing monoclonal antibody agent binds. In the setting of intolerable adverse effects, administration of the monoclonal antibody clears the CAR T cells and alleviates symptoms with no additional off-tumor effects.

A tandem CAR (TanCAR) T cell expresses a single CAR consisting of two linked single-chain variable fragments (scFvs) that have different affinities fused to intracellular co-stimulatory domain(s) and a CD3 domain. TanCAR T cell activation is achieved only when target cells co-express both targets.

A dual CAR T cell expresses two separate CARs with different ligand binding targets; one CAR includes only the CD3 domain and the other CAR includes only the co-stimulatory domain(s). Dual CAR T cell activation requires co-expression of both targets on the tumor.

A safety CAR (sCAR) consists of an extracellular domain fused to an intracellular inhibitory domain. sCAR T cells co-expressing a standard CAR become activated only when encountering target cells that possess the standard CAR target but lack the sCAR target.

The endodomain is the business end of the CAR that after antigen recognition transmits a signal to the immune effector cell, activating at least one of the normal effector functions of the immune effector cell. Effector function of a T cell, for example, may be cytolytic activity or helper activity including the secretion of cytokines. Therefore, the endodomain may comprise the "intracellular signaling domain" of a T cell receptor (TCR) and optional co-receptors. While usually the entire intracellular signaling domain can be employed, in many cases it is not necessary to use the entire chain. To the extent that a truncated portion of the intracellular signaling domain is used, such truncated portion may be used in place of the intact chain as long as it transduces the effector function signal.

Cytoplasmic signaling sequences that regulate primary activation of the TCR complex that act in a stimulatory manner may contain signaling motifs which are known as immunoreceptor tyrosine-based activation motifs (ITAMs). Examples of ITAM containing cytoplasmic signaling sequences include those derived from CD8, CD3ζ, CD3δ, CD3γ, CD3ε, CD32 (Fc gamma RIIa), DAP10, DAP12, CD79a, CD79b, FcγRIγ, FcγRIIIγ, FcεRIβ (FCERIB), and FcεRIγ (FCERIG).

In particular embodiments, the intracellular signaling domain is derived from CD3 zeta (CD3) (TCR zeta, GenBank accno. BAG36664.1). T-cell surface glycoprotein CD3 zeta (CD3) chain, also known as T-cell receptor T3 zeta chain or CD247 (Cluster of Differentiation 247), is a protein that in humans is encoded by the CD247 gene.

First-generation CARs typically had the intracellular domain from the CD3ζ chain, which is the primary transmitter of signals from endogenous TCRs. Second-generation CARs add intracellular signaling domains from various costimulatory protein receptors (e.g., CD28, 41BB, ICOS) to the endodomain of the CAR to provide additional signals to the T cell. Preclinical studies have indicated that the second generation of CAR designs improves the antitumor activity of T cells. More recent, third-generation CARs combine multiple signaling domains to further augment potency. T cells grafted with these CARs have demonstrated improved expansion, activation, persistence, and tumor-eradicating efficiency independent of costimulatory receptor/ligand interaction (Imai C, et al. Leukemia 2004 18:676-84; Maher J, et al. Nat Biotechnol 2002 20:70-5).

For example, the endodomain of the CAR can be designed to comprise the CD3ζ signaling domain by itself or combined with any other desired cytoplasmic domain(s) useful in the context of the CAR of the invention. For example, the cytoplasmic domain of the CAR can comprise a CD3ζ chain portion and a costimulatory signaling region. The costimulatory signaling region refers to a portion of the CAR comprising the intracellular domain of a costimulatory molecule. A costimulatory molecule is a cell surface molecule other than an antigen receptor or their ligands that is required for an efficient response of lymphocytes to an antigen. Examples of such molecules include CD27, CD28, 4-1BB (CD137), OX40, CD30, CD40, ICOS, lymphocyte function-associated antigen-1 (LFA-1), CD2, CD7, LIGHT, NKG2C, B7-H3, and a ligand that specifically binds with CD83, CD8, CD4, b2c, CD80, CD86, DAP10, DAP12, MyD88, BTNL3, and NKG2D. Thus, while the CAR is exemplified primarily with CD28 as the co-stimulatory signaling element, other costimulatory elements can be used alone or in combination with other co-stimulatory signaling elements.

In some embodiments, the CAR comprises a hinge sequence. A hinge sequence is a short sequence of amino acids that facilitates antibody flexibility (see, e.g., Woof et al., Nat. Rev. Immunol., 4(2): 89-99 (2004)). The hinge sequence may be positioned between the antigen recognition moiety (e.g., GSC-binding domain) and the transmembrane domain. The hinge sequence can be any suitable sequence derived or obtained from any suitable molecule. In some embodiments, for example, the hinge sequence is derived from a CD8a molecule or a CD28 molecule.

The transmembrane domain may be derived either from a natural or from a synthetic source. Where the source is natural, the domain may be derived from any membrane-bound or transmembrane protein. For example, the transmembrane region may be derived from (i.e. comprise at least the transmembrane region(s) of) the alpha, beta or zeta chain of the T-cell receptor, CD28, CD3 epsilon, CD45, CD4, CD5, CD8 (e.g., CD8 alpha, CD8 beta), CD9, CD16, CD22, CD33, CD37, CD64, CD80, CD86, CD134, CD137, or CD154, KIRDS2, OX40, CD2, CD27, LFA-1 (CD11a, CD18), ICOS (CD278), 4-1BB (CD137), GITR, CD40, BAFFR, HVEM (LIGHTR), SLAMF7, NKp80 (KLRF1), CD160, CD19, IL2R beta, IL2R gamma, IL7R a, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), SLAMF6 (NTB-A, Ly108), SLAM (SLAMF1, CD150, IPO-3), BLAME (SLAMF8), SELPLG (CD162), LTBR, and PAG/Cbp. Alternatively the transmembrane domain may be synthetic, in which case it will comprise predominantly hydrophobic residues such as leucine and valine. In some cases, a triplet of phenylalanine, tryptophan and valine will be found at each end of a synthetic transmembrane domain. A short oligo- or polypeptide linker, such as between 2 and 10 amino acids in length, may form the linkage between the transmembrane domain and the endoplasmic domain of the CAR.

In some embodiments, the CAR has more than one transmembrane domain, which can be a repeat of the same transmembrane domain, or can be different transmembrane domains.

In some embodiments, the CAR is a multi-chain CAR, as described in WO2015/039523, which is incorporated by reference for this teaching. A multi-chain CAR can comprise separate extracellular ligand binding and signaling domains in different transmembrane polypeptides. The signaling domains can be designed to assemble in juxtamembrane position, which forms flexible architecture closer to natural receptors, that confers optimal signal transduction. For example, the multi-chain CAR can comprise a part of an FCERI alpha chain and a part of an FCERI beta chain such that the FCERI chains spontaneously dimerize together to form a CAR.

Tables 1, 2, and 3 below provide some example combinations of tumor targeting peptide (TTP), co-stimulatory signaling regions, and intracellular signaling domain that can occur in the disclosed CARs.

TABLE 1

First Generation CARs

| | Signal Domain |
|---|---|
| TTP | CD8 |
| TTP | CD3ζ |
| TTP | CD3δ |
| TTP | CD3γ |
| TTP | CD3ε |
| TTP | FcγRI-γ |
| TTP | FcγRIII-γ |
| TTP | FcεRIβ |
| TTP | FcεRIγ |
| TTP | DAP10 |
| TTP | DAP12 |
| TTP | CD32 |
| TTP | CD79a |

TABLE 2

Second Generation CARs

| | Co-stimulatory Signal | Signal Domain |
|---|---|---|
| TTP | CD28 | CD8 |
| TTP | CD28 | CD3ζ |
| TTP | CD28 | CD3δ |
| TTP | CD28 | CD3γ |
| TTP | CD28 | CD3ε |
| TTP | CD28 | FcγRI-γ |
| TTP | CD28 | FcγRIII-γ |
| TTP | CD28 | FcεRIβ |
| TTP | CD28 | FcεRIγ |
| TTP | CD28 | DAP10 |
| TTP | CD28 | DAP12 |
| TTP | CD28 | CD32 |
| TTP | CD28 | CD79a |
| TTP | CD28 | CD79b |
| TTP | CD8 | CD8 |
| TTP | CD8 | CD3ζ |
| TTP | CD8 | CD3δ |
| TTP | CD8 | CD3γ |
| TTP | CD8 | CD3ε |
| TTP | CD8 | FcγRI-γ |
| TTP | CD8 | FcγRIII-γ |
| TTP | CD8 | FcεRIβ |
| TTP | CD8 | FcεRIγ |
| TTP | CD8 | DAP10 |
| TTP | CD8 | DAP12 |
| TTP | CD8 | CD32 |
| TTP | CD8 | CD79a |
| TTP | CD8 | CD79b |
| TTP | CD4 | CD8 |
| TTP | CD4 | CD3ζ |

TABLE 2-continued

Second Generation CARs

| | Co-stimulatory Signal | Signal Domain |
|---|---|---|
| TTP | CD4 | CD3δ |
| TTP | CD4 | CD3γ |
| TTP | CD4 | CD3ε |
| TTP | CD4 | FcγRI-γ |
| TTP | CD4 | FcγRIII-γ |
| TTP | CD4 | FcεRIβ |
| TTP | CD4 | FcεRIγ |
| TTP | CD4 | DAP10 |
| TTP | CD4 | DAP12 |
| TTP | CD4 | CD32 |
| TTP | CD4 | CD79a |
| TTP | CD4 | CD79b |
| TTP | b2c | CD8 |
| TTP | b2c | CD3ζ |
| TTP | b2c | CD3δ |
| TTP | b2c | CD3γ |
| TTP | b2c | CD3ε |
| TTP | b2c | FcγRI-γ |
| TTP | b2c | FcγRIII-γ |
| TTP | b2c | FcεRIβ |
| TTP | b2c | FcεRIγ |
| TTP | b2c | DAP10 |
| TTP | b2c | DAP12 |
| TTP | b2c | CD32 |
| TTP | b2c | CD79a |
| TTP | b2c | CD79b |
| TTP | CD137/41BB | CD8 |
| TTP | CD137/41BB | CD3ζ |
| TTP | CD137/41BB | CD3δ |
| TTP | CD137/41BB | CD3γ |
| TTP | CD137/41BB | CD3ε |
| TTP | CD137/41BB | FcγRI-γ |
| TTP | CD137/41BB | FcγRIII-γ |
| TTP | CD137/41BB | FcεRIβ |
| TTP | CD137/41BB | FcεRIγ |
| TTP | CD137/41BB | DAP10 |
| TTP | CD137/41BB | DAP12 |
| TTP | CD137/41BB | CD32 |
| TTP | CD137/41BB | CD79a |
| TTP | CD137/41BB | CD79b |
| TTP | ICOS | CD8 |
| TTP | ICOS | CD3ζ |
| TTP | ICOS | CD3δ |
| TTP | ICOS | CD3γ |
| TTP | ICOS | CD3ε |
| TTP | ICOS | FcγRI-γ |
| TTP | ICOS | FcγRIII-γ |
| TTP | ICOS | FcεRIβ |
| TTP | ICOS | FcεRIγ |
| TTP | ICOS | DAP10 |
| TTP | ICOS | DAP12 |
| TTP | ICOS | CD32 |
| TTP | ICOS | CD79a |
| TTP | ICOS | CD79b |
| TTP | CD27 | CD8 |
| TTP | CD27 | CD3ζ |
| TTP | CD27 | CD3δ |
| TTP | CD27 | CD3γ |
| TTP | CD27 | CD3ε |
| TTP | CD27 | FcγRI-γ |
| TTP | CD27 | FcγRIII-γ |
| TTP | CD27 | FcεRIβ |
| TTP | CD27 | FcεRIγ |
| TTP | CD27 | DAP10 |
| TTP | CD27 | DAP12 |
| TTP | CD27 | CD32 |
| TTP | CD27 | CD79a |
| TTP | CD27 | CD79b |
| TTP | CD28δ | CD8 |
| TTP | CD28δ | CD3ζ |
| TTP | CD28δ | CD3δ |
| TTP | CD28δ | CD3γ |
| TTP | CD28δ | CD3ε |
| TTP | CD28δ | FcγRI-γ |
| TTP | CD28δ | FcγRIII-γ |
| TTP | CD28δ | FcεRIβ |
| TTP | CD28δ | FcεRIγ |
| TTP | CD28δ | DAP10 |
| TTP | CD28δ | DAP12 |
| TTP | CD28δ | CD32 |
| TTP | CD28δ | CD79a |
| TTP | CD28δ | CD79b |
| TTP | CD80 | CD8 |
| TTP | CD80 | CD3ζ |
| TTP | CD80 | CD3δ |
| TTP | CD80 | CD3γ |
| TTP | CD80 | CD3ε |
| TTP | CD80 | FcγRI-γ |
| TTP | CD80 | FcγRIII-γ |
| TTP | CD80 | FcεRIβ |
| TTP | CD80 | FcεRIγ |
| TTP | CD80 | DAP10 |
| TTP | CD80 | DAP12 |
| TTP | CD80 | CD32 |
| TTP | CD80 | CD79a |
| TTP | CD80 | CD79b |
| TTP | CD86 | CD8 |
| TTP | CD86 | CD3ζ |
| TTP | CD86 | CD3δ |
| TTP | CD86 | CD3γ |
| TTP | CD86 | CD3ε |
| TTP | CD86 | FcγRI-γ |
| TTP | CD86 | FcγRIII-γ |
| TTP | CD86 | FcεRIβ |
| TTP | CD86 | FcεRIγ |
| TTP | CD86 | DAP10 |
| TTP | CD86 | DAP12 |
| TTP | CD86 | CD32 |
| TTP | CD86 | CD79a |
| TTP | CD86 | CD79b |
| TTP | OX40 | CD8 |
| TTP | OX40 | CD3ζ |
| TTP | OX40 | CD3δ |
| TTP | OX40 | CD3γ |
| TTP | OX40 | CD3ε |
| TTP | OX40 | FcγRI-γ |
| TTP | OX40 | FcγRIII-γ |
| TTP | OX40 | FcεRIβ |
| TTP | OX40 | FcεRIγ |
| TTP | OX40 | DAP10 |
| TTP | OX40 | DAP12 |
| TTP | OX40 | CD32 |
| TTP | OX40 | CD79a |
| TTP | OX40 | CD79b |
| TTP | DAP10 | CD8 |
| TTP | DAP10 | CD3ζ |
| TTP | DAP10 | CD3δ |
| TTP | DAP10 | CD3γ |
| TTP | DAP10 | CD3ε |
| TTP | DAP10 | FcγRI-γ |
| TTP | DAP10 | FcγRIII-γ |
| TTP | DAP10 | FcεRIβ |
| TTP | DAP10 | FcεRIγ |
| TTP | DAP10 | DAP10 |
| TTP | DAP10 | DAP12 |
| TTP | DAP10 | CD32 |
| TTP | DAP10 | CD79a |
| TTP | DAP10 | CD79b |
| TTP | DAP12 | CD8 |
| TTP | DAP12 | CD3ζ |
| TTP | DAP12 | CD3δ |
| TTP | DAP12 | CD3γ |
| TTP | DAP12 | CD3ε |
| TTP | DAP12 | FcγRI-γ |
| TTP | DAP12 | FcγRIII-γ |
| TTP | DAP12 | FcεRIβ |
| TTP | DAP12 | FcεRIγ |
| TTP | DAP12 | DAP10 |
| TTP | DAP12 | DAP12 |
| TTP | DAP12 | CD32 |

TABLE 2-continued

| Second Generation CARs | | |
|---|---|---|
| | Co-stimulatory Signal | Signal Domain |
| TTP | DAP12 | CD79a |
| TTP | DAP12 | CD79b |
| TTP | MyD88 | CD8 |
| TTP | MyD88 | CD3ζ |
| TTP | MyD88 | CD3δ |
| TTP | MyD88 | CD3γ |
| TTP | MyD88 | CD3ε |
| TTP | MyD88 | FcγRI-γ |
| TTP | MyD88 | FcγRIII-γ |
| TTP | MyD88 | FcεRIβ |
| TTP | MyD88 | FcεRIγ |
| TTP | MyD88 | DAP10 |
| TTP | MyD88 | DAP12 |
| TTP | MyD88 | CD32 |
| TTP | MyD88 | CD79a |
| TTP | MyD88 | CD79b |
| TTP | CD7 | CD8 |
| TTP | CD7 | CD3ζ |
| TTP | CD7 | CD3δ |
| TTP | CD7 | CD3γ |
| TTP | CD7 | CD3ε |
| TTP | CD7 | FcγRI-γ |
| TTP | CD7 | FcγRIII-γ |
| TTP | CD7 | FcεRIβ |
| TTP | CD7 | FcεRIγ |
| TTP | CD7 | DAP10 |
| TTP | CD7 | DAP12 |
| TTP | CD7 | CD32 |
| TTP | CD7 | CD79a |
| TTP | CD7 | CD79b |
| TTP | BTNL3 | CD8 |
| TTP | BTNL3 | CD3ζ |
| TTP | BTNL3 | CD3δ |
| TTP | BTNL3 | CD3γ |
| TTP | BTNL3 | CD3ε |
| TTP | BTNL3 | FcγRI-γ |
| TTP | BTNL3 | FcγRIII-γ |
| TTP | BTNL3 | FcεRIβ |
| TTP | BTNL3 | FcεRIγ |
| TTP | BTNL3 | DAP10 |
| TTP | BTNL3 | DAP12 |
| TTP | BTNL3 | CD32 |
| TTP | BTNL3 | CD79a |
| TTP | BTNL3 | CD79b |
| TTP | NKG2D | CD8 |
| TTP | NKG2D | CD3ζ |
| TTP | NKG2D | CD3δ |
| TTP | NKG2D | CD3γ |
| TTP | NKG2D | CD3ε |
| TTP | NKG2D | FcγRI-γ |
| TTP | NKG2D | FcγRIII-γ |
| TTP | NKG2D | FcεRIβ |
| TTP | NKG2D | FcεRIγ |
| TTP | NKG2D | DAP10 |
| TTP | NKG2D | DAP12 |
| TTP | NKG2D | CD32 |
| TTP | NKG2D | CD79a |
| TTP | NKG2D | CD79b |

TABLE 3

| Third Generation CARs | | | |
|---|---|---|---|
| | Co-stimulatory Signal | Co-stimulatory Signal | Signal Domain |
| TTP | CD28 | CD28 | CD8 |
| TTP | CD28 | CD28 | CD3ζ |
| TTP | CD28 | CD28 | CD3δ |
| TTP | CD28 | CD28 | CD3γ |
| TTP | CD28 | CD28 | CD3ε |
| TTP | CD28 | CD28 | FcγRI-γ |

TABLE 3-continued

| Third Generation CARs | | | |
|---|---|---|---|
| | Co-stimulatory Signal | Co-stimulatory Signal | Signal Domain |
| TTP | CD28 | CD28 | FcγRIII-γ |
| TTP | CD28 | CD28 | FcεRIβ |
| TTP | CD28 | CD28 | FcεRIγ |
| TTP | CD28 | CD28 | DAP10 |
| TTP | CD28 | CD28 | DAP12 |
| TTP | CD28 | CD28 | CD32 |
| TTP | CD28 | CD28 | CD79a |
| TTP | CD28 | CD28 | CD79b |
| TTP | CD28 | CD8 | CD8 |
| TTP | CD28 | CD8 | CD3ζ |
| TTP | CD28 | CD8 | CD3δ |
| TTP | CD28 | CD8 | CD3γ |
| TTP | CD28 | CD8 | CD3ε |
| TTP | CD28 | CD8 | FcγRI-γ |
| TTP | CD28 | CD8 | FcγRIII-γ |
| TTP | CD28 | CD8 | FcεRIβ |
| TTP | CD28 | CD8 | FcεRIγ |
| TTP | CD28 | CD8 | DAP10 |
| TTP | CD28 | CD8 | DAP12 |
| TTP | CD28 | CD8 | CD32 |
| TTP | CD28 | CD8 | CD79a |
| TTP | CD28 | CD8 | CD79b |
| TTP | CD28 | CD4 | CD8 |
| TTP | CD28 | CD4 | CD3ζ |
| TTP | CD28 | CD4 | CD3δ |
| TTP | CD28 | CD4 | CD3γ |
| TTP | CD28 | CD4 | CD3ε |
| TTP | CD28 | CD4 | FcγRI-γ |
| TTP | CD28 | CD4 | FcγRIII-γ |
| TTP | CD28 | CD4 | FcεRIβ |
| TTP | CD28 | CD4 | FcεRIγ |
| TTP | CD28 | CD4 | DAP10 |
| TTP | CD28 | CD4 | DAP12 |
| TTP | CD28 | CD4 | CD32 |
| TTP | CD28 | CD4 | CD79a |
| TTP | CD28 | CD4 | CD79b |
| TTP | CD28 | b2c | CD8 |
| TTP | CD28 | b2c | CD3ζ |
| TTP | CD28 | b2c | CD3δ |
| TTP | CD28 | b2c | CD3γ |
| TTP | CD28 | b2c | CD3ε |
| TTP | CD28 | b2c | FcγRI-γ |
| TTP | CD28 | b2c | FcγRIII-γ |
| TTP | CD28 | b2c | FcεRIβ |
| TTP | CD28 | b2c | FcεRIγ |
| TTP | CD28 | b2c | DAP10 |
| TTP | CD28 | b2c | DAP12 |
| TTP | CD28 | b2c | CD32 |
| TTP | CD28 | b2c | CD79a |
| TTP | CD28 | b2c | CD79b |
| TTP | CD28 | CD137/41BB | CD8 |
| TTP | CD28 | CD137/41BB | CD3ζ |
| TTP | CD28 | CD137/41BB | CD3δ |
| TTP | CD28 | CD137/41BB | CD3γ |
| TTP | CD28 | CD137/41BB | CD3ε |
| TTP | CD28 | CD137/41BB | FcγRI-γ |
| TTP | CD28 | CD137/41BB | FcγRIII-γ |
| TTP | CD28 | CD137/41BB | FcεRIβ |
| TTP | CD28 | CD137/41BB | FcεRIγ |
| TTP | CD28 | CD137/41BB | DAP10 |
| TTP | CD28 | CD137/41BB | DAP12 |
| TTP | CD28 | CD137/41BB | CD32 |
| TTP | CD28 | CD137/41BB | CD79a |
| TTP | CD28 | CD137/41BB | CD79b |
| TTP | CD28 | ICOS | CD8 |
| TTP | CD28 | ICOS | CD3ζ |
| TTP | CD28 | ICOS | CD3δ |
| TTP | CD28 | ICOS | CD3γ |
| TTP | CD28 | ICOS | CD3ε |
| TTP | CD28 | ICOS | FcγRI-γ |
| TTP | CD28 | ICOS | FcγRIII-γ |
| TTP | CD28 | ICOS | FcεRIβ |
| TTP | CD28 | ICOS | FcεRIγ |
| TTP | CD28 | ICOS | DAP10 |
| TTP | CD28 | ICOS | DAP12 |

TABLE 3-continued

Third Generation CARs

| | Co-stimulatory Signal | Co-stimulatory Signal | Signal Domain |
|---|---|---|---|
| TTP | CD28 | ICOS | CD32 |
| TTP | CD28 | ICOS | CD79a |
| TTP | CD28 | ICOS | CD79b |
| TTP | CD28 | CD27 | CD8 |
| TTP | CD28 | CD27 | CD3ζ |
| TTP | CD28 | CD27 | CD3δ |
| TTP | CD28 | CD27 | CD3γ |
| TTP | CD28 | CD27 | CD3ε |
| TTP | CD28 | CD27 | FcγRI-γ |
| TTP | CD28 | CD27 | FcγRIII-γ |
| TTP | CD28 | CD27 | FcεRIβ |
| TTP | CD28 | CD27 | FcεRIγ |
| TTP | CD28 | CD27 | DAP10 |
| TTP | CD28 | CD27 | DAP12 |
| TTP | CD28 | CD27 | CD32 |
| TTP | CD28 | CD27 | CD79a |
| TTP | CD28 | CD27 | CD79b |
| TTP | CD28 | CD28δ | CD8 |
| TTP | CD28 | CD28δ | CD3ζ |
| TTP | CD28 | CD28δ | CD3δ |
| TTP | CD28 | CD28δ | CD3γ |
| TTP | CD28 | CD28δ | CD3ε |
| TTP | CD28 | CD28δ | FcγRI-γ |
| TTP | CD28 | CD28δ | FcγRIII-γ |
| TTP | CD28 | CD28δ | FcεRIβ |
| TTP | CD28 | CD28δ | FcεRIγ |
| TTP | CD28 | CD28δ | DAP10 |
| TTP | CD28 | CD28δ | DAP12 |
| TTP | CD28 | CD28δ | CD32 |
| TTP | CD28 | CD28δ | CD79a |
| TTP | CD28 | CD28δ | CD79b |
| TTP | CD28 | CD80 | CD8 |
| TTP | CD28 | CD80 | CD3ζ |
| TTP | CD28 | CD80 | CD3δ |
| TTP | CD28 | CD80 | CD3γ |
| TTP | CD28 | CD80 | CD3ε |
| TTP | CD28 | CD80 | FcγRI-γ |
| TTP | CD28 | CD80 | FcγRIII-γ |
| TTP | CD28 | CD80 | FcεRIβ |
| TTP | CD28 | CD80 | FcεRIγ |
| TTP | CD28 | CD80 | DAP10 |
| TTP | CD28 | CD80 | DAP12 |
| TTP | CD28 | CD80 | CD32 |
| TTP | CD28 | CD80 | CD79a |
| TTP | CD28 | CD80 | CD79b |
| TTP | CD28 | CD86 | CD8 |
| TTP | CD28 | CD86 | CD3ζ |
| TTP | CD28 | CD86 | CD3δ |
| TTP | CD28 | CD86 | CD3γ |
| TTP | CD28 | CD86 | CD3ε |
| TTP | CD28 | CD86 | FcγRI-γ |
| TTP | CD28 | CD86 | FcγRIII-γ |
| TTP | CD28 | CD86 | FcεRIβ |
| TTP | CD28 | CD86 | FcεRIγ |
| TTP | CD28 | CD86 | DAP10 |
| TTP | CD28 | CD86 | DAP12 |
| TTP | CD28 | CD86 | CD32 |
| TTP | CD28 | CD86 | CD79a |
| TTP | CD28 | CD86 | CD79b |
| TTP | CD28 | OX40 | CD8 |
| TTP | CD28 | OX40 | CD3ζ |
| TTP | CD28 | OX40 | CD3δ |
| TTP | CD28 | OX40 | CD3γ |
| TTP | CD28 | OX40 | CD3ε |
| TTP | CD28 | OX40 | FcγRI-γ |
| TTP | CD28 | OX40 | FcγRIII-γ |
| TTP | CD28 | OX40 | FcεRIβ |
| TTP | CD28 | OX40 | FcεRIγ |
| TTP | CD28 | OX40 | DAP10 |
| TTP | CD28 | OX40 | DAP12 |
| TTP | CD28 | OX40 | CD32 |
| TTP | CD28 | OX40 | CD79a |
| TTP | CD28 | OX40 | CD79b |
| TTP | CD28 | DAP10 | CD8 |
| TTP | CD28 | DAP10 | CD3ζ |

TABLE 3-continued

Third Generation CARs

| | Co-stimulatory Signal | Co-stimulatory Signal | Signal Domain |
|---|---|---|---|
| TTP | CD28 | DAP10 | CD3δ |
| TTP | CD28 | DAP10 | CD3γ |
| TTP | CD28 | DAP10 | CD3ε |
| TTP | CD28 | DAP10 | FcγRI-γ |
| TTP | CD28 | DAP10 | FcγRIII-γ |
| TTP | CD28 | DAP10 | FcεRIβ |
| TTP | CD28 | DAP10 | FcεRIγ |
| TTP | CD28 | DAP10 | DAP10 |
| TTP | CD28 | DAP10 | DAP12 |
| TTP | CD28 | DAP10 | CD32 |
| TTP | CD28 | DAP10 | CD79a |
| TTP | CD28 | DAP10 | CD79b |
| TTP | CD28 | DAP12 | CD8 |
| TTP | CD28 | DAP12 | CD3ζ |
| TTP | CD28 | DAP12 | CD3δ |
| TTP | CD28 | DAP12 | CD3γ |
| TTP | CD28 | DAP12 | CD3ε |
| TTP | CD28 | DAP12 | FcγRI-γ |
| TTP | CD28 | DAP12 | FcγRIII-γ |
| TTP | CD28 | DAP12 | FcεRIβ |
| TTP | CD28 | DAP12 | FcεRIγ |
| TTP | CD28 | DAP12 | DAP10 |
| TTP | CD28 | DAP12 | DAP12 |
| TTP | CD28 | DAP12 | CD32 |
| TTP | CD28 | DAP12 | CD79a |
| TTP | CD28 | DAP12 | CD79b |
| TTP | CD28 | MyD88 | CD8 |
| TTP | CD28 | MyD88 | CD3ζ |
| TTP | CD28 | MyD88 | CD3δ |
| TTP | CD28 | MyD88 | CD3γ |
| TTP | CD28 | MyD88 | CD3ε |
| TTP | CD28 | MyD88 | FcγRI-γ |
| TTP | CD28 | MyD88 | FcγRIII-γ |
| TTP | CD28 | MyD88 | FcεRIβ |
| TTP | CD28 | MyD88 | FcεRIγ |
| TTP | CD28 | MyD88 | DAP10 |
| TTP | CD28 | MyD88 | DAP12 |
| TTP | CD28 | MyD88 | CD32 |
| TTP | CD28 | MyD88 | CD79a |
| TTP | CD28 | MyD88 | CD79b |
| TTP | CD28 | CD7 | CD8 |
| TTP | CD28 | CD7 | CD3ζ |
| TTP | CD28 | CD7 | CD3δ |
| TTP | CD28 | CD7 | CD3γ |
| TTP | CD28 | CD7 | CD3ε |
| TTP | CD28 | CD7 | FcγRI-γ |
| TTP | CD28 | CD7 | FcγRIII-γ |
| TTP | CD28 | CD7 | FcεRIβ |
| TTP | CD28 | CD7 | FcεRIγ |
| TTP | CD28 | CD7 | DAP10 |
| TTP | CD28 | CD7 | DAP12 |
| TTP | CD28 | CD7 | CD32 |
| TTP | CD28 | CD7 | CD79a |
| TTP | CD28 | CD7 | CD79b |
| TTP | CD28 | BTNL3 | CD8 |
| TTP | CD28 | BTNL3 | CD3ζ |
| TTP | CD28 | BTNL3 | CD3δ |
| TTP | CD28 | BTNL3 | CD3γ |
| TTP | CD28 | BTNL3 | CD3ε |
| TTP | CD28 | BTNL3 | FcγRI-γ |
| TTP | CD28 | BTNL3 | FcγRIII-γ |
| TTP | CD28 | BTNL3 | FcεRIβ |
| TTP | CD28 | BTNL3 | FcεRIγ |
| TTP | CD28 | BTNL3 | DAP10 |
| TTP | CD28 | BTNL3 | DAP12 |
| TTP | CD28 | BTNL3 | CD32 |
| TTP | CD28 | BTNL3 | CD79a |
| TTP | CD28 | BTNL3 | CD79b |
| TTP | CD28 | NKG2D | CD8 |
| TTP | CD28 | NKG2D | CD3ζ |
| TTP | CD28 | NKG2D | CD3δ |
| TTP | CD28 | NKG2D | CD3γ |
| TTP | CD28 | NKG2D | CD3ε |
| TTP | CD28 | NKG2D | FcγRI-γ |
| TTP | CD28 | NKG2D | FcγRIII-γ |

TABLE 3-continued

| Third Generation CARs | | | |
|---|---|---|---|
| | Co-stimulatory Signal | Co-stimulatory Signal | Signal Domain |
| TTP | CD28 | NKG2D | FcεRIβ |
| TTP | CD28 | NKG2D | FcεRIγ |
| TTP | CD28 | NKG2D | DAP10 |
| TTP | CD28 | NKG2D | DAP12 |
| TTP | CD28 | NKG2D | CD32 |
| TTP | CD28 | NKG2D | CD79a |
| TTP | CD28 | NKG2D | CD79b |
| TTP | CD8 | CD28 | CD8 |
| TTP | CD8 | CD28 | CD3ζ |
| TTP | CD8 | CD28 | CD3δ |
| TTP | CD8 | CD28 | CD3γ |
| TTP | CD8 | CD28 | CD3ε |
| TTP | CD8 | CD28 | FcγRI-γ |
| TTP | CD8 | CD28 | FcγRIII-γ |
| TTP | CD8 | CD28 | FcεRIβ |
| TTP | CD8 | CD28 | FcεRIγ |
| TTP | CD8 | CD28 | DAP10 |
| TTP | CD8 | CD28 | DAP12 |
| TTP | CD8 | CD28 | CD32 |
| TTP | CD8 | CD28 | CD79a |
| TTP | CD8 | CD28 | CD79b |
| TTP | CD8 | CD8 | CD8 |
| TTP | CD8 | CD8 | CD3ζ |
| TTP | CD8 | CD8 | CD3δ |
| TTP | CD8 | CD8 | CD3γ |
| TTP | CD8 | CD8 | CD3ε |
| TTP | CD8 | CD8 | FcγRI-γ |
| TTP | CD8 | CD8 | FcγRIII-γ |
| TTP | CD8 | CD8 | FcεRIβ |
| TTP | CD8 | CD8 | FcεRIγ |
| TTP | CD8 | CD8 | DAP10 |
| TTP | CD8 | CD8 | DAP12 |
| TTP | CD8 | CD8 | CD32 |
| TTP | CD8 | CD8 | CD79a |
| TTP | CD8 | CD8 | CD79b |
| TTP | CD8 | CD4 | CD8 |
| TTP | CD8 | CD4 | CD3ζ |
| TTP | CD8 | CD4 | CD3δ |
| TTP | CD8 | CD4 | CD3γ |
| TTP | CD8 | CD4 | CD3ε |
| TTP | CD8 | CD4 | FcγRI-γ |
| TTP | CD8 | CD4 | FcγRIII-γ |
| TTP | CD8 | CD4 | FcεRIβ |
| TTP | CD8 | CD4 | FcεRIγ |
| TTP | CD8 | CD4 | DAP10 |
| TTP | CD8 | CD4 | DAP12 |
| TTP | CD8 | CD4 | CD32 |
| TTP | CD8 | CD4 | CD79a |
| TTP | CD8 | CD4 | CD79b |
| TTP | CD8 | b2c | CD8 |
| TTP | CD8 | b2c | CD3ζ |
| TTP | CD8 | b2c | CD3δ |
| TTP | CD8 | b2c | CD3γ |
| TTP | CD8 | b2c | CD3ε |
| TTP | CD8 | b2c | FcγRI-γ |
| TTP | CD8 | b2c | FcγRIII-γ |
| TTP | CD8 | b2c | FcεRIβ |
| TTP | CD8 | b2c | FcεRIγ |
| TTP | CD8 | b2c | DAP10 |
| TTP | CD8 | b2c | DAP12 |
| TTP | CD8 | b2c | CD32 |
| TTP | CD8 | b2c | CD79a |
| TTP | CD8 | b2c | CD79b |
| TTP | CD8 | CD137/41BB | CD8 |
| TTP | CD8 | CD137/41BB | CD3ζ |
| TTP | CD8 | CD137/41BB | CD3δ |
| TTP | CD8 | CD137/41BB | CD3γ |
| TTP | CD8 | CD137/41BB | CD3ε |
| TTP | CD8 | CD137/41BB | FcγRI-γ |
| TTP | CD8 | CD137/41BB | FcγRIII-γ |
| TTP | CD8 | CD137/41BB | FcεRIβ |
| TTP | CD8 | CD137/41BB | FcεRIγ |
| TTP | CD8 | CD137/41BB | DAP10 |
| TTP | CD8 | CD137/41BB | DAP12 |
| TTP | CD8 | CD137/41BB | CD32 |

TABLE 3-continued

| Third Generation CARs | | | |
|---|---|---|---|
| | Co-stimulatory Signal | Co-stimulatory Signal | Signal Domain |
| TTP | CD8 | CD137/41BB | CD79a |
| TTP | CD8 | CD137/41BB | CD79b |
| TTP | CD8 | ICOS | CD8 |
| TTP | CD8 | ICOS | CD3ζ |
| TTP | CD8 | ICOS | CD3δ |
| TTP | CD8 | ICOS | CD3γ |
| TTP | CD8 | ICOS | CD3ε |
| TTP | CD8 | ICOS | FcγRI-γ |
| TTP | CD8 | ICOS | FcγRIII-γ |
| TTP | CD8 | ICOS | FcεRIβ |
| TTP | CD8 | ICOS | FcεRIγ |
| TTP | CD8 | ICOS | DAP10 |
| TTP | CD8 | ICOS | DAP12 |
| TTP | CD8 | ICOS | CD32 |
| TTP | CD8 | ICOS | CD79a |
| TTP | CD8 | ICOS | CD79b |
| TTP | CD8 | CD27 | CD8 |
| TTP | CD8 | CD27 | CD3ζ |
| TTP | CD8 | CD27 | CD3δ |
| TTP | CD8 | CD27 | CD3γ |
| TTP | CD8 | CD27 | CD3ε |
| TTP | CD8 | CD27 | FcγRI-γ |
| TTP | CD8 | CD27 | FcγRIII-γ |
| TTP | CD8 | CD27 | FcεRIβ |
| TTP | CD8 | CD27 | FcεRIγ |
| TTP | CD8 | CD27 | DAP10 |
| TTP | CD8 | CD27 | DAP12 |
| TTP | CD8 | CD27 | CD32 |
| TTP | CD8 | CD27 | CD79a |
| TTP | CD8 | CD27 | CD79b |
| TTP | CD8 | CD28δ | CD8 |
| TTP | CD8 | CD28δ | CD3ζ |
| TTP | CD8 | CD28δ | CD3δ |
| TTP | CD8 | CD28δ | CD3γ |
| TTP | CD8 | CD28δ | CD3ε |
| TTP | CD8 | CD28δ | FcγRI-γ |
| TTP | CD8 | CD28δ | FcγRIII-γ |
| TTP | CD8 | CD28δ | FcεRIβ |
| TTP | CD8 | CD28δ | FcεRIγ |
| TTP | CD8 | CD28δ | DAP10 |
| TTP | CD8 | CD28δ | DAP12 |
| TTP | CD8 | CD28δ | CD32 |
| TTP | CD8 | CD28δ | CD79a |
| TTP | CD8 | CD28δ | CD79b |
| TTP | CD8 | CD80 | CD8 |
| TTP | CD8 | CD80 | CD3ζ |
| TTP | CD8 | CD80 | CD3δ |
| TTP | CD8 | CD80 | CD3γ |
| TTP | CD8 | CD80 | CD3ε |
| TTP | CD8 | CD80 | FcγRI-γ |
| TTP | CD8 | CD80 | FcγRIII-γ |
| TTP | CD8 | CD80 | FcεRIβ |
| TTP | CD8 | CD80 | FcεRIγ |
| TTP | CD8 | CD80 | DAP10 |
| TTP | CD8 | CD80 | DAP12 |
| TTP | CD8 | CD80 | CD32 |
| TTP | CD8 | CD80 | CD79a |
| TTP | CD8 | CD80 | CD79b |
| TTP | CD8 | CD86 | CD8 |
| TTP | CD8 | CD86 | CD3ζ |
| TTP | CD8 | CD86 | CD3δ |
| TTP | CD8 | CD86 | CD3γ |
| TTP | CD8 | CD86 | CD3ε |
| TTP | CD8 | CD86 | FcγRI-γ |
| TTP | CD8 | CD86 | FcγRIII-γ |
| TTP | CD8 | CD86 | FcεRIβ |
| TTP | CD8 | CD86 | FcεRIγ |
| TTP | CD8 | CD86 | DAP10 |
| TTP | CD8 | CD86 | DAP12 |
| TTP | CD8 | CD86 | CD32 |
| TTP | CD8 | CD86 | CD79a |
| TTP | CD8 | CD86 | CD79b |
| TTP | CD8 | OX40 | CD8 |
| TTP | CD8 | OX40 | CD3ζ |
| TTP | CD8 | OX40 | CD3δ |

TABLE 3-continued

Third Generation CARs

| | Co-stimulatory Signal | Co-stimulatory Signal | Signal Domain |
|---|---|---|---|
| TTP | CD8 | OX40 | CD3γ |
| TTP | CD8 | OX40 | CD3ε |
| TTP | CD8 | OX40 | FcγRI-γ |
| TTP | CD8 | OX40 | FcγRIII-γ |
| TTP | CD8 | OX40 | FcεRIβ |
| TTP | CD8 | OX40 | FcεRIγ |
| TTP | CD8 | OX40 | DAP10 |
| TTP | CD8 | OX40 | DAP12 |
| TTP | CD8 | OX40 | CD32 |
| TTP | CD8 | OX40 | CD79a |
| TTP | CD8 | OX40 | CD79b |
| TTP | CD8 | DAP10 | CD8 |
| TTP | CD8 | DAP10 | CD3ζ |
| TTP | CD8 | DAP10 | CD3δ |
| TTP | CD8 | DAP10 | CD3γ |
| TTP | CD8 | DAP10 | CD3ε |
| TTP | CD8 | DAP10 | FcγRI-γ |
| TTP | CD8 | DAP10 | FcγRIII-γ |
| TTP | CD8 | DAP10 | FcεRIβ |
| TTP | CD8 | DAP10 | FcεRIγ |
| TTP | CD8 | DAP10 | DAP10 |
| TTP | CD8 | DAP10 | DAP12 |
| TTP | CD8 | DAP10 | CD32 |
| TTP | CD8 | DAP10 | CD79a |
| TTP | CD8 | DAP10 | CD79b |
| TTP | CD8 | DAP12 | CD8 |
| TTP | CD8 | DAP12 | CD3ζ |
| TTP | CD8 | DAP12 | CD3δ |
| TTP | CD8 | DAP12 | CD3γ |
| TTP | CD8 | DAP12 | CD3ε |
| TTP | CD8 | DAP12 | FcγRI-γ |
| TTP | CD8 | DAP12 | FcγRIII-γ |
| TTP | CD8 | DAP12 | FcεRIβ |
| TTP | CD8 | DAP12 | FcεRIγ |
| TTP | CD8 | DAP12 | DAP10 |
| TTP | CD8 | DAP12 | DAP12 |
| TTP | CD8 | DAP12 | CD32 |
| TTP | CD8 | DAP12 | CD79a |
| TTP | CD8 | DAP12 | CD79b |
| TTP | CD8 | MyD88 | CD8 |
| TTP | CD8 | MyD88 | CD3ζ |
| TTP | CD8 | MyD88 | CD3δ |
| TTP | CD8 | MyD88 | CD3γ |
| TTP | CD8 | MyD88 | CD3ε |
| TTP | CD8 | MyD88 | FcγRI-γ |
| TTP | CD8 | MyD88 | FcγRIII-γ |
| TTP | CD8 | MyD88 | FcεRIβ |
| TTP | CD8 | MyD88 | FcεRIγ |
| TTP | CD8 | MyD88 | DAP10 |
| TTP | CD8 | MyD88 | DAP12 |
| TTP | CD8 | MyD88 | CD32 |
| TTP | CD8 | MyD88 | CD79a |
| TTP | CD8 | MyD88 | CD79b |
| TTP | CD8 | CD7 | CD8 |
| TTP | CD8 | CD7 | CD3ζ |
| TTP | CD8 | CD7 | CD3δ |
| TTP | CD8 | CD7 | CD3γ |
| TTP | CD8 | CD7 | CD3ε |
| TTP | CD8 | CD7 | FcγRI-γ |
| TTP | CD8 | CD7 | FcγRIII-γ |
| TTP | CD8 | CD7 | FcεRIβ |
| TTP | CD8 | CD7 | FcεRIγ |
| TTP | CD8 | CD7 | DAP10 |
| TTP | CD8 | CD7 | DAP12 |
| TTP | CD8 | CD7 | CD32 |
| TTP | CD8 | CD7 | CD79a |
| TTP | CD8 | CD7 | CD79b |
| TTP | CD8 | BTNL3 | CD8 |
| TTP | CD8 | BTNL3 | CD3ζ |
| TTP | CD8 | BTNL3 | CD3δ |
| TTP | CD8 | BTNL3 | CD3γ |
| TTP | CD8 | BTNL3 | CD3ε |
| TTP | CD8 | BTNL3 | FcγRI-γ |
| TTP | CD8 | BTNL3 | FcγRIII-γ |
| TTP | CD8 | BTNL3 | FcεRIβ |

TABLE 3-continued

Third Generation CARs

| | Co-stimulatory Signal | Co-stimulatory Signal | Signal Domain |
|---|---|---|---|
| TTP | CD8 | BTNL3 | FcεRIγ |
| TTP | CD8 | BTNL3 | DAP10 |
| TTP | CD8 | BTNL3 | DAP12 |
| TTP | CD8 | BTNL3 | CD32 |
| TTP | CD8 | BTNL3 | CD79a |
| TTP | CD8 | BTNL3 | CD79b |
| TTP | CD8 | NKG2D | CD8 |
| TTP | CD8 | NKG2D | CD3ζ |
| TTP | CD8 | NKG2D | CD3δ |
| TTP | CD8 | NKG2D | CD3γ |
| TTP | CD8 | NKG2D | CD3ε |
| TTP | CD8 | NKG2D | FcγRI-γ |
| TTP | CD8 | NKG2D | FcγRIII-γ |
| TTP | CD8 | NKG2D | FcεRIβ |
| TTP | CD8 | NKG2D | FcεRIγ |
| TTP | CD8 | NKG2D | DAP10 |
| TTP | CD8 | NKG2D | DAP12 |
| TTP | CD8 | NKG2D | CD32 |
| TTP | CD8 | NKG2D | CD79a |
| TTP | CD8 | NKG2D | CD79b |
| TTP | CD4 | CD28 | CD8 |
| TTP | CD4 | CD28 | CD3ζ |
| TTP | CD4 | CD28 | CD3δ |
| TTP | CD4 | CD28 | CD3γ |
| TTP | CD4 | CD28 | CD3ε |
| TTP | CD4 | CD28 | FcγRI-γ |
| TTP | CD4 | CD28 | FcγRIII-γ |
| TTP | CD4 | CD28 | FcεRIβ |
| TTP | CD4 | CD28 | FcεRIγ |
| TTP | CD4 | CD28 | DAP10 |
| TTP | CD4 | CD28 | DAP12 |
| TTP | CD4 | CD28 | CD32 |
| TTP | CD4 | CD28 | CD79a |
| TTP | CD4 | CD28 | CD79b |
| TTP | CD4 | CD8 | CD8 |
| TTP | CD4 | CD8 | CD3ζ |
| TTP | CD4 | CD8 | CD3δ |
| TTP | CD4 | CD8 | CD3γ |
| TTP | CD4 | CD8 | CD3ε |
| TTP | CD4 | CD8 | FcγRI-γ |
| TTP | CD4 | CD8 | FcγRIII-γ |
| TTP | CD4 | CD8 | FcεRIβ |
| TTP | CD4 | CD8 | FcεRIγ |
| TTP | CD4 | CD8 | DAP10 |
| TTP | CD4 | CD8 | DAP12 |
| TTP | CD4 | CD8 | CD32 |
| TTP | CD4 | CD8 | CD79a |
| TTP | CD4 | CD8 | CD79b |
| TTP | CD4 | CD4 | CD8 |
| TTP | CD4 | CD4 | CD3ζ |
| TTP | CD4 | CD4 | CD3δ |
| TTP | CD4 | CD4 | CD3γ |
| TTP | CD4 | CD4 | CD3ε |
| TTP | CD4 | CD4 | FcγRI-γ |
| TTP | CD4 | CD4 | FcγRIII-γ |
| TTP | CD4 | CD4 | FcεRIβ |
| TTP | CD4 | CD4 | FcεRIγ |
| TTP | CD4 | CD4 | DAP10 |
| TTP | CD4 | CD4 | DAP12 |
| TTP | CD4 | CD4 | CD32 |
| TTP | CD4 | CD4 | CD79a |
| TTP | CD4 | CD4 | CD79b |
| TTP | CD4 | b2c | CD8 |
| TTP | CD4 | b2c | CD3ζ |
| TTP | CD4 | b2c | CD3δ |
| TTP | CD4 | b2c | CD3γ |
| TTP | CD4 | b2c | CD3ε |
| TTP | CD4 | b2c | FcγRI-γ |
| TTP | CD4 | b2c | FcγRIII-γ |
| TTP | CD4 | b2c | FcεRIβ |
| TTP | CD4 | b2c | FcεRIγ |
| TTP | CD4 | b2c | DAP10 |
| TTP | CD4 | b2c | DAP12 |
| TTP | CD4 | b2c | CD32 |
| TTP | CD4 | b2c | CD79a |

TABLE 3-continued

| Third Generation CARs | | | |
|---|---|---|---|
| | Co-stimulatory Signal | Co-stimulatory Signal | Signal Domain |
| TTP | CD4 | b2c | CD79b |
| TTP | CD4 | CD137/41BB | CD8 |
| TTP | CD4 | CD137/41BB | CD3ζ |
| TTP | CD4 | CD137/41BB | CD3δ |
| TTP | CD4 | CD137/41BB | CD3γ |
| TTP | CD4 | CD137/41BB | CD3ε |
| TTP | CD4 | CD137/41BB | FcγRI-γ |
| TTP | CD4 | CD137/41BB | FcγRIII-γ |
| TTP | CD4 | CD137/41BB | FcεRIβ |
| TTP | CD4 | CD137/41BB | FcεRIγ |
| TTP | CD4 | CD137/41BB | DAP10 |
| TTP | CD4 | CD137/41BB | DAP12 |
| TTP | CD4 | CD137/41BB | CD32 |
| TTP | CD4 | CD137/41BB | CD79a |
| TTP | CD4 | CD137/41BB | CD79b |
| TTP | CD4 | ICOS | CD8 |
| TTP | CD4 | ICOS | CD3ζ |
| TTP | CD4 | ICOS | CD3δ |
| TTP | CD4 | ICOS | CD3γ |
| TTP | CD4 | ICOS | CD3ε |
| TTP | CD4 | ICOS | FcγRI-γ |
| TTP | CD4 | ICOS | FcγRIII-γ |
| TTP | CD4 | ICOS | FcεRIβ |
| TTP | CD4 | ICOS | FcεRIγ |
| TTP | CD4 | ICOS | DAP10 |
| TTP | CD4 | ICOS | DAP12 |
| TTP | CD4 | ICOS | CD32 |
| TTP | CD4 | ICOS | CD79a |
| TTP | CD4 | ICOS | CD79b |
| TTP | CD4 | CD27 | CD8 |
| TTP | CD4 | CD27 | CD3ζ |
| TTP | CD4 | CD27 | CD3δ |
| TTP | CD4 | CD27 | CD3γ |
| TTP | CD4 | CD27 | CD3ε |
| TTP | CD4 | CD27 | FcγRI-γ |
| TTP | CD4 | CD27 | FcγRIII-γ |
| TTP | CD4 | CD27 | FcεRIβ |
| TTP | CD4 | CD27 | FcεRIγ |
| TTP | CD4 | CD27 | DAP10 |
| TTP | CD4 | CD27 | DAP12 |
| TTP | CD4 | CD27 | CD32 |
| TTP | CD4 | CD27 | CD79a |
| TTP | CD4 | CD27 | CD79b |
| TTP | CD4 | CD28δ | CD8 |
| TTP | CD4 | CD28δ | CD3ζ |
| TTP | CD4 | CD28δ | CD3δ |
| TTP | CD4 | CD28δ | CD3γ |
| TTP | CD4 | CD28δ | CD3ε |
| TTP | CD4 | CD28δ | FcγRI-γ |
| TTP | CD4 | CD28δ | FcγRIII-γ |
| TTP | CD4 | CD28δ | FcεRIβ |
| TTP | CD4 | CD28δ | FcεRIγ |
| TTP | CD4 | CD28δ | DAP10 |
| TTP | CD4 | CD28δ | DAP12 |
| TTP | CD4 | CD28δ | CD32 |
| TTP | CD4 | CD28δ | CD79a |
| TTP | CD4 | CD28δ | CD79b |
| TTP | CD4 | CD80 | CD8 |
| TTP | CD4 | CD80 | CD3ζ |
| TTP | CD4 | CD80 | CD3δ |
| TTP | CD4 | CD80 | CD3γ |
| TTP | CD4 | CD80 | CD3ε |
| TTP | CD4 | CD80 | FcγRI-γ |
| TTP | CD4 | CD80 | FcγRIII-γ |
| TTP | CD4 | CD80 | FcεRIβ |
| TTP | CD4 | CD80 | FcεRIγ |
| TTP | CD4 | CD80 | DAP10 |
| TTP | CD4 | CD80 | DAP12 |
| TTP | CD4 | CD80 | CD32 |
| TTP | CD4 | CD80 | CD79a |
| TTP | CD4 | CD80 | CD79b |
| TTP | CD4 | CD86 | CD8 |
| TTP | CD4 | CD86 | CD3ζ |
| TTP | CD4 | CD86 | CD3δ |
| TTP | CD4 | CD86 | CD3γ |

TABLE 3-continued

| Third Generation CARs | | | |
|---|---|---|---|
| | Co-stimulatory Signal | Co-stimulatory Signal | Signal Domain |
| TTP | CD4 | CD86 | CD3ε |
| TTP | CD4 | CD86 | FcγRI-γ |
| TTP | CD4 | CD86 | FcγRIII-γ |
| TTP | CD4 | CD86 | FcεRIβ |
| TTP | CD4 | CD86 | FcεRIγ |
| TTP | CD4 | CD86 | DAP10 |
| TTP | CD4 | CD86 | DAP12 |
| TTP | CD4 | CD86 | CD32 |
| TTP | CD4 | CD86 | CD79a |
| TTP | CD4 | CD86 | CD79b |
| TTP | CD4 | OX40 | CD8 |
| TTP | CD4 | OX40 | CD3ζ |
| TTP | CD4 | OX40 | CD3δ |
| TTP | CD4 | OX40 | CD3γ |
| TTP | CD4 | OX40 | CD3ε |
| TTP | CD4 | OX40 | FcγRI-γ |
| TTP | CD4 | OX40 | FcγRIII-γ |
| TTP | CD4 | OX40 | FcεRIβ |
| TTP | CD4 | OX40 | FcεRIγ |
| TTP | CD4 | OX40 | DAP10 |
| TTP | CD4 | OX40 | DAP12 |
| TTP | CD4 | OX40 | CD32 |
| TTP | CD4 | OX40 | CD79a |
| TTP | CD4 | OX40 | CD79b |
| TTP | CD4 | DAP10 | CD8 |
| TTP | CD4 | DAP10 | CD3ζ |
| TTP | CD4 | DAP10 | CD3δ |
| TTP | CD4 | DAP10 | CD3γ |
| TTP | CD4 | DAP10 | CD3ε |
| TTP | CD4 | DAP10 | FcγRI-γ |
| TTP | CD4 | DAP10 | FcγRIII-γ |
| TTP | CD4 | DAP10 | FcεRIβ |
| TTP | CD4 | DAP10 | FcεRIγ |
| TTP | CD4 | DAP10 | DAP10 |
| TTP | CD4 | DAP10 | DAP12 |
| TTP | CD4 | DAP10 | CD32 |
| TTP | CD4 | DAP10 | CD79a |
| TTP | CD4 | DAP10 | CD79b |
| TTP | CD4 | DAP12 | CD8 |
| TTP | CD4 | DAP12 | CD3ζ |
| TTP | CD4 | DAP12 | CD3δ |
| TTP | CD4 | DAP12 | CD3γ |
| TTP | CD4 | DAP12 | CD3ε |
| TTP | CD4 | DAP12 | FcγRI-γ |
| TTP | CD4 | DAP12 | FcγRIII-γ |
| TTP | CD4 | DAP12 | FcεRIβ |
| TTP | CD4 | DAP12 | FcεRIγ |
| TTP | CD4 | DAP12 | DAP10 |
| TTP | CD4 | DAP12 | DAP12 |
| TTP | CD4 | DAP12 | CD32 |
| TTP | CD4 | DAP12 | CD79a |
| TTP | CD4 | DAP12 | CD79b |
| TTP | CD4 | MyD88 | CD8 |
| TTP | CD4 | MyD88 | CD3ζ |
| TTP | CD4 | MyD88 | CD3δ |
| TTP | CD4 | MyD88 | CD3γ |
| TTP | CD4 | MyD88 | CD3ε |
| TTP | CD4 | MyD88 | FcγRI-γ |
| TTP | CD4 | MyD88 | FcγRIII-γ |
| TTP | CD4 | MyD88 | FcεRIβ |
| TTP | CD4 | MyD88 | FcεRIγ |
| TTP | CD4 | MyD88 | DAP10 |
| TTP | CD4 | MyD88 | DAP12 |
| TTP | CD4 | MyD88 | CD32 |
| TTP | CD4 | MyD88 | CD79a |
| TTP | CD4 | MyD88 | CD79b |
| TTP | CD4 | CD7 | CD8 |
| TTP | CD4 | CD7 | CD3ζ |
| TTP | CD4 | CD7 | CD3δ |
| TTP | CD4 | CD7 | CD3γ |
| TTP | CD4 | CD7 | CD3ε |
| TTP | CD4 | CD7 | FcγRI-γ |
| TTP | CD4 | CD7 | FcγRIII-γ |
| TTP | CD4 | CD7 | FcεRIβ |
| TTP | CD4 | CD7 | FcεRIγ |

TABLE 3-continued

| Third Generation CARs | | | |
|---|---|---|---|
| | Co-stimulatory Signal | Co-stimulatory Signal | Signal Domain |
| TTP | CD4 | CD7 | DAP10 |
| TTP | CD4 | CD7 | DAP12 |
| TTP | CD4 | CD7 | CD32 |
| TTP | CD4 | CD7 | CD79a |
| TTP | CD4 | CD7 | CD79b |
| TTP | CD4 | BTNL3 | CD8 |
| TTP | CD4 | BTNL3 | CD3ζ |
| TTP | CD4 | BTNL3 | CD3δ |
| TTP | CD4 | BTNL3 | CD3γ |
| TTP | CD4 | BTNL3 | CD3ε |
| TTP | CD4 | BTNL3 | FcγRI-γ |
| TTP | CD4 | BTNL3 | FcγRIII-γ |
| TTP | CD4 | BTNL3 | FcεRIβ |
| TTP | CD4 | BTNL3 | FcεRIγ |
| TTP | CD4 | BTNL3 | DAP10 |
| TTP | CD4 | BTNL3 | DAP12 |
| TTP | CD4 | BTNL3 | CD32 |
| TTP | CD4 | BTNL3 | CD79a |
| TTP | CD4 | BTNL3 | CD79b |
| TTP | CD4 | NKG2D | CD8 |
| TTP | CD4 | NKG2D | CD3ζ |
| TTP | CD4 | NKG2D | CD3δ |
| TTP | CD4 | NKG2D | CD3γ |
| TTP | CD4 | NKG2D | CD3ε |
| TTP | CD4 | NKG2D | FcγRI-γ |
| TTP | CD4 | NKG2D | FcγRIII-γ |
| TTP | CD4 | NKG2D | FcεRIβ |
| TTP | CD4 | NKG2D | FcεRIγ |
| TTP | CD4 | NKG2D | DAP10 |
| TTP | CD4 | NKG2D | DAP12 |
| TTP | CD4 | NKG2D | CD32 |
| TTP | CD4 | NKG2D | CD79a |
| TTP | CD4 | NKG2D | CD79b |
| TTP | b2c | CD28 | CD8 |
| TTP | b2c | CD28 | CD3ζ |
| TTP | b2c | CD28 | CD3δ |
| TTP | b2c | CD28 | CD3γ |
| TTP | b2c | CD28 | CD3ε |
| TTP | b2c | CD28 | FcγRI-γ |
| TTP | b2c | CD28 | FcγRIII-γ |
| TTP | b2c | CD28 | FcεRIβ |
| TTP | b2c | CD28 | FcεRIγ |
| TTP | b2c | CD28 | DAP10 |
| TTP | b2c | CD28 | DAP12 |
| TTP | b2c | CD28 | CD32 |
| TTP | b2c | CD28 | CD79a |
| TTP | b2c | CD28 | CD79b |
| TTP | b2c | CD8 | CD8 |
| TTP | b2c | CD8 | CD3ζ |
| TTP | b2c | CD8 | CD3δ |
| TTP | b2c | CD8 | CD3γ |
| TTP | b2c | CD8 | CD3ε |
| TTP | b2c | CD8 | FcγRI-γ |
| TTP | b2c | CD8 | FcγRIII-γ |
| TTP | b2c | CD8 | FcεRIβ |
| TTP | b2c | CD8 | FcεRIγ |
| TTP | b2c | CD8 | DAP10 |
| TTP | b2c | CD8 | DAP12 |
| TTP | b2c | CD8 | CD32 |
| TTP | b2c | CD8 | CD79a |
| TTP | b2c | CD8 | CD79b |
| TTP | b2c | CD4 | CD8 |
| TTP | b2c | CD4 | CD3ζ |
| TTP | b2c | CD4 | CD3δ |
| TTP | b2c | CD4 | CD3γ |
| TTP | b2c | CD4 | CD3ε |
| TTP | b2c | CD4 | FcγRI-γ |
| TTP | b2c | CD4 | FcγRIII-γ |
| TTP | b2c | CD4 | FcεRIβ |
| TTP | b2c | CD4 | FcεRIγ |
| TTP | b2c | CD4 | DAP10 |
| TTP | b2c | CD4 | DAP12 |
| TTP | b2c | CD4 | CD32 |
| TTP | b2c | CD4 | CD79a |
| TTP | b2c | CD4 | CD79b |

TABLE 3-continued

| Third Generation CARs | | | |
|---|---|---|---|
| | Co-stimulatory Signal | Co-stimulatory Signal | Signal Domain |
| TTP | b2c | b2c | CD8 |
| TTP | b2c | b2c | CD3ζ |
| TTP | b2c | b2c | CD3δ |
| TTP | b2c | b2c | CD3γ |
| TTP | b2c | b2c | CD3ε |
| TTP | b2c | b2c | FcγRI-γ |
| TTP | b2c | b2c | FcγRIII-γ |
| TTP | b2c | b2c | FcεRIβ |
| TTP | b2c | b2c | FcεRIγ |
| TTP | b2c | b2c | DAP10 |
| TTP | b2c | b2c | DAP12 |
| TTP | b2c | b2c | CD32 |
| TTP | b2c | b2c | CD79a |
| TTP | b2c | b2c | CD79b |
| TTP | b2c | CD137/41BB | CD8 |
| TTP | b2c | CD137/41BB | CD3ζ |
| TTP | b2c | CD137/41BB | CD3δ |
| TTP | b2c | CD137/41BB | CD3γ |
| TTP | b2c | CD137/41BB | CD3ε |
| TTP | b2c | CD137/41BB | FcγRI-γ |
| TTP | b2c | CD137/41BB | FcγRIII-γ |
| TTP | b2c | CD137/41BB | FcεRIβ |
| TTP | b2c | CD137/41BB | FcεRIγ |
| TTP | b2c | CD137/41BB | DAP10 |
| TTP | b2c | CD137/41BB | DAP12 |
| TTP | b2c | CD137/41BB | CD32 |
| TTP | b2c | CD137/41BB | CD79a |
| TTP | b2c | CD137/41BB | CD79b |
| TTP | b2c | ICOS | CD8 |
| TTP | b2c | ICOS | CD3ζ |
| TTP | b2c | ICOS | CD3δ |
| TTP | b2c | ICOS | CD3γ |
| TTP | b2c | ICOS | CD3ε |
| TTP | b2c | ICOS | FcγRI-γ |
| TTP | b2c | ICOS | FcγRIII-γ |
| TTP | b2c | ICOS | FcεRIβ |
| TTP | b2c | ICOS | FcεRIγ |
| TTP | b2c | ICOS | DAP10 |
| TTP | b2c | ICOS | DAP12 |
| TTP | b2c | ICOS | CD32 |
| TTP | b2c | ICOS | CD79a |
| TTP | b2c | ICOS | CD79b |
| TTP | b2c | CD27 | CD8 |
| TTP | b2c | CD27 | CD3ζ |
| TTP | b2c | CD27 | CD3δ |
| TTP | b2c | CD27 | CD3γ |
| TTP | b2c | CD27 | CD3ε |
| TTP | b2c | CD27 | FcγRI-γ |
| TTP | b2c | CD27 | FcγRIII-γ |
| TTP | b2c | CD27 | FcεRIβ |
| TTP | b2c | CD27 | FcεRIγ |
| TTP | b2c | CD27 | DAP10 |
| TTP | b2c | CD27 | DAP12 |
| TTP | b2c | CD27 | CD32 |
| TTP | b2c | CD27 | CD79a |
| TTP | b2c | CD27 | CD79b |
| TTP | b2c | CD28δ | CD8 |
| TTP | b2c | CD28δ | CD3ζ |
| TTP | b2c | CD28δ | CD3δ |
| TTP | b2c | CD28δ | CD3γ |
| TTP | b2c | CD28δ | CD3ε |
| TTP | b2c | CD28δ | FcγRI-γ |
| TTP | b2c | CD28δ | FcγRIII-γ |
| TTP | b2c | CD28δ | FcεRIβ |
| TTP | b2c | CD28δ | FcεRIγ |
| TTP | b2c | CD28δ | DAP10 |
| TTP | b2c | CD28δ | DAP12 |
| TTP | b2c | CD28δ | CD32 |
| TTP | b2c | CD28δ | CD79a |
| TTP | b2c | CD28δ | CD79b |
| TTP | b2c | CD80 | CD8 |
| TTP | b2c | CD80 | CD3ζ |
| TTP | b2c | CD80 | CD3δ |
| TTP | b2c | CD80 | CD3γ |
| TTP | b2c | CD80 | CD3ε |

TABLE 3-continued

| Third Generation CARs | | | |
|---|---|---|---|
| | Co-stimulatory Signal | Co-stimulatory Signal | Signal Domain |
| TTP | b2c | CD80 | FcγRI-γ |
| TTP | b2c | CD80 | FcγRIII-γ |
| TTP | b2c | CD80 | FcεRIβ |
| TTP | b2c | CD80 | FcεRIγ |
| TTP | b2c | CD80 | DAP10 |
| TTP | b2c | CD80 | DAP12 |
| TTP | b2c | CD80 | CD32 |
| TTP | b2c | CD80 | CD79a |
| TTP | b2c | CD80 | CD79b |
| TTP | b2c | CD86 | CD8 |
| TTP | b2c | CD86 | CD3ζ |
| TTP | b2c | CD86 | CD3δ |
| TTP | b2c | CD86 | CD3γ |
| TTP | b2c | CD86 | CD3ε |
| TTP | b2c | CD86 | FcγRI-γ |
| TTP | b2c | CD86 | FcγRIII-γ |
| TTP | b2c | CD86 | FcεRIβ |
| TTP | b2c | CD86 | FcεRIγ |
| TTP | b2c | CD86 | DAP10 |
| TTP | b2c | CD86 | DAP12 |
| TTP | b2c | CD86 | CD32 |
| TTP | b2c | CD86 | CD79a |
| TTP | b2c | CD86 | CD79b |
| TTP | b2c | OX40 | CD8 |
| TTP | b2c | OX40 | CD3ζ |
| TTP | b2c | OX40 | CD3δ |
| TTP | b2c | OX40 | CD3γ |
| TTP | b2c | OX40 | CD3ε |
| TTP | b2c | OX40 | FcγRI-γ |
| TTP | b2c | OX40 | FcγRIII-γ |
| TTP | b2c | OX40 | FcεRIβ |
| TTP | b2c | OX40 | FcεRIγ |
| TTP | b2c | OX40 | DAP10 |
| TTP | b2c | OX40 | DAP12 |
| TTP | b2c | OX40 | CD32 |
| TTP | b2c | OX40 | CD79a |
| TTP | b2c | OX40 | CD79b |
| TTP | b2c | DAP10 | CD8 |
| TTP | b2c | DAP10 | CD3ζ |
| TTP | b2c | DAP10 | CD3δ |
| TTP | b2c | DAP10 | CD3γ |
| TTP | b2c | DAP10 | CD3ε |
| TTP | b2c | DAP10 | FcγRI-γ |
| TTP | b2c | DAP10 | FcγRIII-γ |
| TTP | b2c | DAP10 | FcεRIβ |
| TTP | b2c | DAP10 | FcεRIγ |
| TTP | b2c | DAP10 | DAP10 |
| TTP | b2c | DAP10 | DAP12 |
| TTP | b2c | DAP10 | CD32 |
| TTP | b2c | DAP10 | CD79a |
| TTP | b2c | DAP10 | CD79b |
| TTP | b2c | DAP12 | CD8 |
| TTP | b2c | DAP12 | CD3ζ |
| TTP | b2c | DAP12 | CD3δ |
| TTP | b2c | DAP12 | CD3γ |
| TTP | b2c | DAP12 | CD3ε |
| TTP | b2c | DAP12 | FcγRI-γ |
| TTP | b2c | DAP12 | FcγRIII-γ |
| TTP | b2c | DAP12 | FcεRIβ |
| TTP | b2c | DAP12 | FcεRIγ |
| TTP | b2c | DAP12 | DAP10 |
| TTP | b2c | DAP12 | DAP12 |
| TTP | b2c | DAP12 | CD32 |
| TTP | b2c | DAP12 | CD79a |
| TTP | b2c | DAP12 | CD79b |
| TTP | b2c | MyD88 | CD8 |
| TTP | b2c | MyD88 | CD3ζ |
| TTP | b2c | MyD88 | CD3δ |
| TTP | b2c | MyD88 | CD3γ |
| TTP | b2c | MyD88 | CD3ε |
| TTP | b2c | MyD88 | FcγRI-γ |
| TTP | b2c | MyD88 | FcγRIII-γ |
| TTP | b2c | MyD88 | FcεRIβ |
| TTP | b2c | MyD88 | FcεRIγ |
| TTP | b2c | MyD88 | DAP10 |

TABLE 3-continued

| Third Generation CARs | | | |
|---|---|---|---|
| | Co-stimulatory Signal | Co-stimulatory Signal | Signal Domain |
| TTP | b2c | MyD88 | DAP12 |
| TTP | b2c | MyD88 | CD32 |
| TTP | b2c | MyD88 | CD79a |
| TTP | b2c | MyD88 | CD79b |
| TTP | b2c | CD7 | CD8 |
| TTP | b2c | CD7 | CD3ζ |
| TTP | b2c | CD7 | CD3δ |
| TTP | b2c | CD7 | CD3γ |
| TTP | b2c | CD7 | CD3ε |
| TTP | b2c | CD7 | FcγRI-γ |
| TTP | b2c | CD7 | FcγRIII-γ |
| TTP | b2c | CD7 | FcεRIβ |
| TTP | b2c | CD7 | FcεRIγ |
| TTP | b2c | CD7 | DAP10 |
| TTP | b2c | CD7 | DAP12 |
| TTP | b2c | CD7 | CD32 |
| TTP | b2c | CD7 | CD79a |
| TTP | b2c | CD7 | CD79b |
| TTP | b2c | BTNL3 | CD8 |
| TTP | b2c | BTNL3 | CD3ζ |
| TTP | b2c | BTNL3 | CD3δ |
| TTP | b2c | BTNL3 | CD3γ |
| TTP | b2c | BTNL3 | CD3ε |
| TTP | b2c | BTNL3 | FcγRI-γ |
| TTP | b2c | BTNL3 | FcγRIII-γ |
| TTP | b2c | BTNL3 | FcεRIβ |
| TTP | b2c | BTNL3 | FcεRIγ |
| TTP | b2c | BTNL3 | DAP10 |
| TTP | b2c | BTNL3 | DAP12 |
| TTP | b2c | BTNL3 | CD32 |
| TTP | b2c | BTNL3 | CD79a |
| TTP | b2c | BTNL3 | CD79b |
| TTP | b2c | NKG2D | CD8 |
| TTP | b2c | NKG2D | CD3ζ |
| TTP | b2c | NKG2D | CD3δ |
| TTP | b2c | NKG2D | CD3γ |
| TTP | b2c | NKG2D | CD3ε |
| TTP | b2c | NKG2D | FcγRI-γ |
| TTP | b2c | NKG2D | FcγRIII-γ |
| TTP | b2c | NKG2D | FcεRIβ |
| TTP | b2c | NKG2D | FcεRIγ |
| TTP | b2c | NKG2D | DAP10 |
| TTP | b2c | NKG2D | DAP12 |
| TTP | b2c | NKG2D | CD32 |
| TTP | b2c | NKG2D | CD79a |
| TTP | b2c | NKG2D | CD79b |
| TTP | CD137/41BB | CD28 | CD8 |
| TTP | CD137/41BB | CD28 | CD3ζ |
| TTP | CD137/41BB | CD28 | CD3δ |
| TTP | CD137/41BB | CD28 | CD3γ |
| TTP | CD137/41BB | CD28 | CD3ε |
| TTP | CD137/41BB | CD28 | FcγRI-γ |
| TTP | CD137/41BB | CD28 | FcγRIII-γ |
| TTP | CD137/41BB | CD28 | FcεRIβ |
| TTP | CD137/41BB | CD28 | FcεRIγ |
| TTP | CD137/41BB | CD28 | DAP10 |
| TTP | CD137/41BB | CD28 | DAP12 |
| TTP | CD137/41BB | CD28 | CD32 |
| TTP | CD137/41BB | CD28 | CD79a |
| TTP | CD137/41BB | CD28 | CD79b |
| TTP | CD137/41BB | CD8 | CD8 |
| TTP | CD137/41BB | CD8 | CD3ζ |
| TTP | CD137/41BB | CD8 | CD3δ |
| TTP | CD137/41BB | CD8 | CD3γ |
| TTP | CD137/41BB | CD8 | CD3ε |
| TTP | CD137/41BB | CD8 | FcγRI-γ |
| TTP | CD137/41BB | CD8 | FcγRIII-γ |
| TTP | CD137/41BB | CD8 | FcεRIβ |
| TTP | CD137/41BB | CD8 | FcεRIγ |
| TTP | CD137/41BB | CD8 | DAP10 |
| TTP | CD137/41BB | CD8 | DAP12 |
| TTP | CD137/41BB | CD8 | CD32 |
| TTP | CD137/41BB | CD8 | CD79a |
| TTP | CD137/41BB | CD8 | CD79b |
| TTP | CD137/41BB | CD4 | CD8 |

TABLE 3-continued

| Third Generation CARs | | | |
|---|---|---|---|
| | Co-stimulatory Signal | Co-stimulatory Signal | Signal Domain |
| TTP | CD137/41BB | CD4 | CD3ζ |
| TTP | CD137/41BB | CD4 | CD3δ |
| TTP | CD137/41BB | CD4 | CD3γ |
| TTP | CD137/41BB | CD4 | CD3ε |
| TTP | CD137/41BB | CD4 | FcγRI-γ |
| TTP | CD137/41BB | CD4 | FcγRIII-γ |
| TTP | CD137/41BB | CD4 | FcεRIβ |
| TTP | CD137/41BB | CD4 | FcεRIγ |
| TTP | CD137/41BB | CD4 | DAP10 |
| TTP | CD137/41BB | CD4 | DAP12 |
| TTP | CD137/41BB | CD4 | CD32 |
| TTP | CD137/41BB | CD4 | CD79a |
| TTP | CD137/41BB | CD4 | CD79b |
| TTP | CD137/41BB | b2c | CD8 |
| TTP | CD137/41BB | b2c | CD3ζ |
| TTP | CD137/41BB | b2c | CD3δ |
| TTP | CD137/41BB | b2c | CD3γ |
| TTP | CD137/41BB | b2c | CD3ε |
| TTP | CD137/41BB | b2c | FcγRI-γ |
| TTP | CD137/41BB | b2c | FcγRIII-γ |
| TTP | CD137/41BB | b2c | FcεRIβ |
| TTP | CD137/41BB | b2c | FcεRIγ |
| TTP | CD137/41BB | b2c | DAP10 |
| TTP | CD137/41BB | b2c | DAP12 |
| TTP | CD137/41BB | b2c | CD32 |
| TTP | CD137/41BB | b2c | CD79a |
| TTP | CD137/41BB | b2c | CD79b |
| TTP | CD137/41BB | CD137/41BB | CD8 |
| TTP | CD137/41BB | CD137/41BB | CD3ζ |
| TTP | CD137/41BB | CD137/41BB | CD3δ |
| TTP | CD137/41BB | CD137/41BB | CD3γ |
| TTP | CD137/41BB | CD137/41BB | CD3ε |
| TTP | CD137/41BB | CD137/41BB | FcγRI-γ |
| TTP | CD137/41BB | CD137/41BB | FcγRIII-γ |
| TTP | CD137/41BB | CD137/41BB | FcεRIβ |
| TTP | CD137/41BB | CD137/41BB | FcεRIγ |
| TTP | CD137/41BB | CD137/41BB | DAP10 |
| TTP | CD137/41BB | CD137/41BB | DAP12 |
| TTP | CD137/41BB | CD137/41BB | CD32 |
| TTP | CD137/41BB | CD137/41BB | CD79a |
| TTP | CD137/41BB | CD137/41BB | CD79b |
| TTP | CD137/41BB | ICOS | CD8 |
| TTP | CD137/41BB | ICOS | CD3ζ |
| TTP | CD137/41BB | ICOS | CD3δ |
| TTP | CD137/41BB | ICOS | CD3γ |
| TTP | CD137/41BB | ICOS | CD3ε |
| TTP | CD137/41BB | ICOS | FcγRI-γ |
| TTP | CD137/41BB | ICOS | FcγRIII-γ |
| TTP | CD137/41BB | ICOS | FcεRIβ |
| TTP | CD137/41BB | ICOS | FcεRIγ |
| TTP | CD137/41BB | ICOS | DAP10 |
| TTP | CD137/41BB | ICOS | DAP12 |
| TTP | CD137/41BB | ICOS | CD32 |
| TTP | CD137/41BB | ICOS | CD79a |
| TTP | CD137/41BB | ICOS | CD79b |
| TTP | CD137/41BB | CD27 | CD8 |
| TTP | CD137/41BB | CD27 | CD3ζ |
| TTP | CD137/41BB | CD27 | CD3δ |
| TTP | CD137/41BB | CD27 | CD3γ |
| TTP | CD137/41BB | CD27 | CD3ε |
| TTP | CD137/41BB | CD27 | FcγRI-γ |
| TTP | CD137/41BB | CD27 | FcγRIII-γ |
| TTP | CD137/41BB | CD27 | FcεRIβ |
| TTP | CD137/41BB | CD27 | FcεRIγ |
| TTP | CD137/41BB | CD27 | DAP10 |
| TTP | CD137/41BB | CD27 | DAP12 |
| TTP | CD137/41BB | CD27 | CD32 |
| TTP | CD137/41BB | CD27 | CD79a |
| TTP | CD137/41BB | CD27 | CD79b |
| TTP | CD137/41BB | CD28δ | CD8 |
| TTP | CD137/41BB | CD28δ | CD3ζ |
| TTP | CD137/41BB | CD28δ | CD3δ |
| TTP | CD137/41BB | CD28δ | CD3γ |
| TTP | CD137/41BB | CD28δ | CD3ε |
| TTP | CD137/41BB | CD28δ | FcγRI-γ |

TABLE 3-continued

| Third Generation CARs | | | |
|---|---|---|---|
| | Co-stimulatory Signal | Co-stimulatory Signal | Signal Domain |
| TTP | CD137/41BB | CD28δ | FcγRIII-γ |
| TTP | CD137/41BB | CD28δ | FcεRIβ |
| TTP | CD137/41BB | CD28δ | FcεRIγ |
| TTP | CD137/41BB | CD28δ | DAP10 |
| TTP | CD137/41BB | CD28δ | DAP12 |
| TTP | CD137/41BB | CD28δ | CD32 |
| TTP | CD137/41BB | CD28δ | CD79a |
| TTP | CD137/41BB | CD28δ | CD79b |
| TTP | CD137/41BB | CD80 | CD8 |
| TTP | CD137/41BB | CD80 | CD3ζ |
| TTP | CD137/41BB | CD80 | CD3δ |
| TTP | CD137/41BB | CD80 | CD3γ |
| TTP | CD137/41BB | CD80 | CD3ε |
| TTP | CD137/41BB | CD80 | FcγRI-γ |
| TTP | CD137/41BB | CD80 | FcγRIII-γ |
| TTP | CD137/41BB | CD80 | FcεRIβ |
| TTP | CD137/41BB | CD80 | FcεRIγ |
| TTP | CD137/41BB | CD80 | DAP10 |
| TTP | CD137/41BB | CD80 | DAP12 |
| TTP | CD137/41BB | CD80 | CD32 |
| TTP | CD137/41BB | CD80 | CD79a |
| TTP | CD137/41BB | CD80 | CD79b |
| TTP | CD137/41BB | CD86 | CD8 |
| TTP | CD137/41BB | CD86 | CD3ζ |
| TTP | CD137/41BB | CD86 | CD3δ |
| TTP | CD137/41BB | CD86 | CD3γ |
| TTP | CD137/41BB | CD86 | CD3ε |
| TTP | CD137/41BB | CD86 | FcγRI-γ |
| TTP | CD137/41BB | CD86 | FcγRIII-γ |
| TTP | CD137/41BB | CD86 | FcεRIβ |
| TTP | CD137/41BB | CD86 | FcεRIγ |
| TTP | CD137/41BB | CD86 | DAP10 |
| TTP | CD137/41BB | CD86 | DAP12 |
| TTP | CD137/41BB | CD86 | CD32 |
| TTP | CD137/41BB | CD86 | CD79a |
| TTP | CD137/41BB | CD86 | CD79b |
| TTP | CD137/41BB | OX40 | CD8 |
| TTP | CD137/41BB | OX40 | CD3ζ |
| TTP | CD137/41BB | OX40 | CD3δ |
| TTP | CD137/41BB | OX40 | CD3γ |
| TTP | CD137/41BB | OX40 | CD3ε |
| TTP | CD137/41BB | OX40 | FcγRI-γ |
| TTP | CD137/41BB | OX40 | FcγRIII-γ |
| TTP | CD137/41BB | OX40 | FcεRIβ |
| TTP | CD137/41BB | OX40 | FcεRIγ |
| TTP | CD137/41BB | OX40 | DAP10 |
| TTP | CD137/41BB | OX40 | DAP12 |
| TTP | CD137/41BB | OX40 | CD32 |
| TTP | CD137/41BB | OX40 | CD79a |
| TTP | CD137/41BB | OX40 | CD79b |
| TTP | CD137/41BB | DAP10 | CD8 |
| TTP | CD137/41BB | DAP10 | CD3ζ |
| TTP | CD137/41BB | DAP10 | CD3δ |
| TTP | CD137/41BB | DAP10 | CD3γ |
| TTP | CD137/41BB | DAP10 | CD3ε |
| TTP | CD137/41BB | DAP10 | FcγRI-γ |
| TTP | CD137/41BB | DAP10 | FcγRIII-γ |
| TTP | CD137/41BB | DAP10 | FcεRIβ |
| TTP | CD137/41BB | DAP10 | FcεRIγ |
| TTP | CD137/41BB | DAP10 | DAP10 |
| TTP | CD137/41BB | DAP10 | DAP12 |
| TTP | CD137/41BB | DAP10 | CD32 |
| TTP | CD137/41BB | DAP10 | CD79a |
| TTP | CD137/41BB | DAP10 | CD79b |
| TTP | CD137/41BB | DAP12 | CD8 |
| TTP | CD137/41BB | DAP12 | CD3ζ |
| TTP | CD137/41BB | DAP12 | CD3δ |
| TTP | CD137/41BB | DAP12 | CD3γ |
| TTP | CD137/41BB | DAP12 | CD3ε |
| TTP | CD137/41BB | DAP12 | FcγRI-γ |
| TTP | CD137/41BB | DAP12 | FcγRIII-γ |
| TTP | CD137/41BB | DAP12 | FcεRIβ |
| TTP | CD137/41BB | DAP12 | FcεRIγ |
| TTP | CD137/41BB | DAP12 | DAP10 |
| TTP | CD137/41BB | DAP12 | DAP12 |

TABLE 3-continued

| Third Generation CARs | | | |
|---|---|---|---|
| | Co-stimulatory Signal | Co-stimulatory Signal | Signal Domain |
| TTP | CD137/41BB | DAP12 | CD32 |
| TTP | CD137/41BB | DAP12 | CD79a |
| TTP | CD137/41BB | DAP12 | CD79b |
| TTP | CD137/41BB | MyD88 | CD8 |
| TTP | CD137/41BB | MyD88 | CD3ζ |
| TTP | CD137/41BB | MyD88 | CD3δ |
| TTP | CD137/41BB | MyD88 | CD3γ |
| TTP | CD137/41BB | MyD88 | CD3ε |
| TTP | CD137/41BB | MyD88 | FcγRI-γ |
| TTP | CD137/41BB | MyD88 | FcγRIII-γ |
| TTP | CD137/41BB | MyD88 | FcεRIβ |
| TTP | CD137/41BB | MyD88 | FcεRIγ |
| TTP | CD137/41BB | MyD88 | DAP10 |
| TTP | CD137/41BB | MyD88 | DAP12 |
| TTP | CD137/41BB | MyD88 | CD32 |
| TTP | CD137/41BB | MyD88 | CD79a |
| TTP | CD137/41BB | MyD88 | CD79b |
| TTP | CD137/41BB | CD7 | CD8 |
| TTP | CD137/41BB | CD7 | CD3ζ |
| TTP | CD137/41BB | CD7 | CD3δ |
| TTP | CD137/41BB | CD7 | CD3γ |
| TTP | CD137/41BB | CD7 | CD3ε |
| TTP | CD137/41BB | CD7 | FcγRI-γ |
| TTP | CD137/41BB | CD7 | FcγRIII-γ |
| TTP | CD137/41BB | CD7 | FcεRIβ |
| TTP | CD137/41BB | CD7 | FcεRIγ |
| TTP | CD137/41BB | CD7 | DAP10 |
| TTP | CD137/41BB | CD7 | DAP12 |
| TTP | CD137/41BB | CD7 | CD32 |
| TTP | CD137/41BB | CD7 | CD79a |
| TTP | CD137/41BB | CD7 | CD79b |
| TTP | CD137/41BB | BTNL3 | CD8 |
| TTP | CD137/41BB | BTNL3 | CD3ζ |
| TTP | CD137/41BB | BTNL3 | CD3δ |
| TTP | CD137/41BB | BTNL3 | CD3γ |
| TTP | CD137/41BB | BTNL3 | CD3ε |
| TTP | CD137/41BB | BTNL3 | FcγRI-γ |
| TTP | CD137/41BB | BTNL3 | FcγRIII-γ |
| TTP | CD137/41BB | BTNL3 | FcεRIβ |
| TTP | CD137/41BB | BTNL3 | FcεRIγ |
| TTP | CD137/41BB | BTNL3 | DAP10 |
| TTP | CD137/41BB | BTNL3 | DAP12 |
| TTP | CD137/41BB | BTNL3 | CD32 |
| TTP | CD137/41BB | BTNL3 | CD79a |
| TTP | CD137/41BB | BTNL3 | CD79b |
| TTP | CD137/41BB | NKG2D | CD8 |
| TTP | CD137/41BB | NKG2D | CD3ζ |
| TTP | CD137/41BB | NKG2D | CD3δ |
| TTP | CD137/41BB | NKG2D | CD3γ |
| TTP | CD137/41BB | NKG2D | CD3ε |
| TTP | CD137/41BB | NKG2D | FcγRI-γ |
| TTP | CD137/41BB | NKG2D | FcγRIII-γ |
| TTP | CD137/41BB | NKG2D | FcεRIβ |
| TTP | CD137/41BB | NKG2D | FcεRIγ |
| TTP | CD137/41BB | NKG2D | DAP10 |
| TTP | CD137/41BB | NKG2D | DAP12 |
| TTP | CD137/41BB | NKG2D | CD32 |
| TTP | CD137/41BB | NKG2D | CD79a |
| TTP | CD137/41BB | NKG2D | CD79b |
| TTP | ICOS | CD28 | CD8 |
| TTP | ICOS | CD28 | CD3ζ |
| TTP | ICOS | CD28 | CD3δ |
| TTP | ICOS | CD28 | CD3γ |
| TTP | ICOS | CD28 | CD3ε |
| TTP | ICOS | CD28 | FcγRI-γ |
| TTP | ICOS | CD28 | FcγRIII-γ |
| TTP | ICOS | CD28 | FcεRIβ |
| TTP | ICOS | CD28 | FcεRIγ |
| TTP | ICOS | CD28 | DAP10 |
| TTP | ICOS | CD28 | DAP12 |
| TTP | ICOS | CD28 | CD32 |
| TTP | ICOS | CD28 | CD79a |
| TTP | ICOS | CD28 | CD79b |
| TTP | ICOS | CD8 | CD8 |
| TTP | ICOS | CD8 | CD3ζ |

TABLE 3-continued

| Third Generation CARs | | | |
|---|---|---|---|
| | Co-stimulatory Signal | Co-stimulatory Signal | Signal Domain |
| TTP | ICOS | CD8 | CD3δ |
| TTP | ICOS | CD8 | CD3γ |
| TTP | ICOS | CD8 | CD3ε |
| TTP | ICOS | CD8 | FcγRI-γ |
| TTP | ICOS | CD8 | FcγRIII-γ |
| TTP | ICOS | CD8 | FcεRIβ |
| TTP | ICOS | CD8 | FcεRIγ |
| TTP | ICOS | CD8 | DAP10 |
| TTP | ICOS | CD8 | DAP12 |
| TTP | ICOS | CD8 | CD32 |
| TTP | ICOS | CD8 | CD79a |
| TTP | ICOS | CD8 | CD79b |
| TTP | ICOS | CD4 | CD8 |
| TTP | ICOS | CD4 | CD3ζ |
| TTP | ICOS | CD4 | CD3δ |
| TTP | ICOS | CD4 | CD3γ |
| TTP | ICOS | CD4 | CD3ε |
| TTP | ICOS | CD4 | FcγRI-γ |
| TTP | ICOS | CD4 | FcγRIII-γ |
| TTP | ICOS | CD4 | FcεRIβ |
| TTP | ICOS | CD4 | FcεRIγ |
| TTP | ICOS | CD4 | DAP10 |
| TTP | ICOS | CD4 | DAP12 |
| TTP | ICOS | CD4 | CD32 |
| TTP | ICOS | CD4 | CD79a |
| TTP | ICOS | CD4 | CD79b |
| TTP | ICOS | b2c | CD8 |
| TTP | ICOS | b2c | CD3ζ |
| TTP | ICOS | b2c | CD3δ |
| TTP | ICOS | b2c | CD3γ |
| TTP | ICOS | b2c | CD3ε |
| TTP | ICOS | b2c | FcγRI-γ |
| TTP | ICOS | b2c | FcγRIII-γ |
| TTP | ICOS | b2c | FcεRIβ |
| TTP | ICOS | b2c | FcεRIγ |
| TTP | ICOS | b2c | DAP10 |
| TTP | ICOS | b2c | DAP12 |
| TTP | ICOS | b2c | CD32 |
| TTP | ICOS | b2c | CD79a |
| TTP | ICOS | b2c | CD79b |
| TTP | ICOS | CD137/41BB | CD8 |
| TTP | ICOS | CD137/41BB | CD3ζ |
| TTP | ICOS | CD137/41BB | CD3δ |
| TTP | ICOS | CD137/41BB | CD3γ |
| TTP | ICOS | CD137/41BB | CD3ε |
| TTP | ICOS | CD137/41BB | FcγRI-γ |
| TTP | ICOS | CD137/41BB | FcγRIII-γ |
| TTP | ICOS | CD137/41BB | FcεRIβ |
| TTP | ICOS | CD137/41BB | FcεRIγ |
| TTP | ICOS | CD137/41BB | DAP10 |
| TTP | ICOS | CD137/41BB | DAP12 |
| TTP | ICOS | CD137/41BB | CD32 |
| TTP | ICOS | CD137/41BB | CD79a |
| TTP | ICOS | CD137/41BB | CD79b |
| TTP | ICOS | ICOS | CD8 |
| TTP | ICOS | ICOS | CD3ζ |
| TTP | ICOS | ICOS | CD3δ |
| TTP | ICOS | ICOS | CD3γ |
| TTP | ICOS | ICOS | CD3ε |
| TTP | ICOS | ICOS | FcγRI-γ |
| TTP | ICOS | ICOS | FcγRIII-γ |
| TTP | ICOS | ICOS | FcεRIβ |
| TTP | ICOS | ICOS | FcεRIγ |
| TTP | ICOS | ICOS | DAP10 |
| TTP | ICOS | ICOS | DAP12 |
| TTP | ICOS | ICOS | CD32 |
| TTP | ICOS | ICOS | CD79a |
| TTP | ICOS | ICOS | CD79b |
| TTP | ICOS | CD27 | CD8 |
| TTP | ICOS | CD27 | CD3ζ |
| TTP | ICOS | CD27 | CD3δ |
| TTP | ICOS | CD27 | CD3γ |
| TTP | ICOS | CD27 | CD3ε |
| TTP | ICOS | CD27 | FcγRI-γ |
| TTP | ICOS | CD27 | FcγRIII-γ |

TABLE 3-continued

| Third Generation CARs | | | |
|---|---|---|---|
| | Co-stimulatory Signal | Co-stimulatory Signal | Signal Domain |
| TTP | ICOS | CD27 | FcεRIβ |
| TTP | ICOS | CD27 | FcεRIγ |
| TTP | ICOS | CD27 | DAP10 |
| TTP | ICOS | CD27 | DAP12 |
| TTP | ICOS | CD27 | CD32 |
| TTP | ICOS | CD27 | CD79a |
| TTP | ICOS | CD27 | CD79b |
| TTP | ICOS | CD28δ | CD8 |
| TTP | ICOS | CD28δ | CD3ζ |
| TTP | ICOS | CD28δ | CD3δ |
| TTP | ICOS | CD28δ | CD3γ |
| TTP | ICOS | CD28δ | CD3ε |
| TTP | ICOS | CD28δ | FcγRI-γ |
| TTP | ICOS | CD28δ | FcγRIII-γ |
| TTP | ICOS | CD28δ | FcεRIβ |
| TTP | ICOS | CD28δ | FcεRIγ |
| TTP | ICOS | CD28δ | DAP10 |
| TTP | ICOS | CD28δ | DAP12 |
| TTP | ICOS | CD28δ | CD32 |
| TTP | ICOS | CD28δ | CD79a |
| TTP | ICOS | CD28δ | CD79b |
| TTP | ICOS | CD80 | CD8 |
| TTP | ICOS | CD80 | CD3ζ |
| TTP | ICOS | CD80 | CD3δ |
| TTP | ICOS | CD80 | CD3γ |
| TTP | ICOS | CD80 | CD3ε |
| TTP | ICOS | CD80 | FcγRI-γ |
| TTP | ICOS | CD80 | FcγRIII-γ |
| TTP | ICOS | CD80 | FcεRIβ |
| TTP | ICOS | CD80 | FcεRIγ |
| TTP | ICOS | CD80 | DAP10 |
| TTP | ICOS | CD80 | DAP12 |
| TTP | ICOS | CD80 | CD32 |
| TTP | ICOS | CD80 | CD79a |
| TTP | ICOS | CD80 | CD79b |
| TTP | ICOS | CD86 | CD8 |
| TTP | ICOS | CD86 | CD3ζ |
| TTP | ICOS | CD86 | CD3δ |
| TTP | ICOS | CD86 | CD3γ |
| TTP | ICOS | CD86 | CD3ε |
| TTP | ICOS | CD86 | FcγRI-γ |
| TTP | ICOS | CD86 | FcγRIII-γ |
| TTP | ICOS | CD86 | FcεRIβ |
| TTP | ICOS | CD86 | FcεRIγ |
| TTP | ICOS | CD86 | DAP10 |
| TTP | ICOS | CD86 | DAP12 |
| TTP | ICOS | CD86 | CD32 |
| TTP | ICOS | CD86 | CD79a |
| TTP | ICOS | CD86 | CD79b |
| TTP | ICOS | OX40 | CD8 |
| TTP | ICOS | OX40 | CD3ζ |
| TTP | ICOS | OX40 | CD3δ |
| TTP | ICOS | OX40 | CD3γ |
| TTP | ICOS | OX40 | CD3ε |
| TTP | ICOS | OX40 | FcγRI-γ |
| TTP | ICOS | OX40 | FcγRIII-γ |
| TTP | ICOS | OX40 | FcεRIβ |
| TTP | ICOS | OX40 | FcεRIγ |
| TTP | ICOS | OX40 | DAP10 |
| TTP | ICOS | OX40 | DAP12 |
| TTP | ICOS | OX40 | CD32 |
| TTP | ICOS | OX40 | CD79a |
| TTP | ICOS | OX40 | CD79b |
| TTP | ICOS | DAP10 | CD8 |
| TTP | ICOS | DAP10 | CD3ζ |
| TTP | ICOS | DAP10 | CD3δ |
| TTP | ICOS | DAP10 | CD3γ |
| TTP | ICOS | DAP10 | CD3ε |
| TTP | ICOS | DAP10 | FcγRI-γ |
| TTP | ICOS | DAP10 | FcγRIII-γ |
| TTP | ICOS | DAP10 | FcεRIβ |
| TTP | ICOS | DAP10 | FcεRIγ |
| TTP | ICOS | DAP10 | DAP10 |
| TTP | ICOS | DAP10 | DAP12 |
| TTP | ICOS | DAP10 | CD32 |
| TTP | ICOS | DAP10 | CD79a |
| TTP | ICOS | DAP10 | CD79b |
| TTP | ICOS | DAP12 | CD8 |
| TTP | ICOS | DAP12 | CD3ζ |
| TTP | ICOS | DAP12 | CD3δ |
| TTP | ICOS | DAP12 | CD3γ |
| TTP | ICOS | DAP12 | CD3ε |
| TTP | ICOS | DAP12 | FcγRI-γ |
| TTP | ICOS | DAP12 | FcγRIII-γ |
| TTP | ICOS | DAP12 | FcεRIβ |
| TTP | ICOS | DAP12 | FcεRIγ |
| TTP | ICOS | DAP12 | DAP10 |
| TTP | ICOS | DAP12 | DAP12 |
| TTP | ICOS | DAP12 | CD32 |
| TTP | ICOS | DAP12 | CD79a |
| TTP | ICOS | DAP12 | CD79b |
| TTP | ICOS | MyD88 | CD8 |
| TTP | ICOS | MyD88 | CD3ζ |
| TTP | ICOS | MyD88 | CD3δ |
| TTP | ICOS | MyD88 | CD3γ |
| TTP | ICOS | MyD88 | CD3ε |
| TTP | ICOS | MyD88 | FcγRI-γ |
| TTP | ICOS | MyD88 | FcγRIII-γ |
| TTP | ICOS | MyD88 | FcεRIβ |
| TTP | ICOS | MyD88 | FcεRIγ |
| TTP | ICOS | MyD88 | DAP10 |
| TTP | ICOS | MyD88 | DAP12 |
| TTP | ICOS | MyD88 | CD32 |
| TTP | ICOS | MyD88 | CD79a |
| TTP | ICOS | MyD88 | CD79b |
| TTP | ICOS | CD7 | CD8 |
| TTP | ICOS | CD7 | CD3ζ |
| TTP | ICOS | CD7 | CD3δ |
| TTP | ICOS | CD7 | CD3γ |
| TTP | ICOS | CD7 | CD3ε |
| TTP | ICOS | CD7 | FcγRI-γ |
| TTP | ICOS | CD7 | FcγRIII-γ |
| TTP | ICOS | CD7 | FcεRIβ |
| TTP | ICOS | CD7 | FcεRIγ |
| TTP | ICOS | CD7 | DAP10 |
| TTP | ICOS | CD7 | DAP12 |
| TTP | ICOS | CD7 | CD32 |
| TTP | ICOS | CD7 | CD79a |
| TTP | ICOS | CD7 | CD79b |
| TTP | ICOS | BTNL3 | CD8 |
| TTP | ICOS | BTNL3 | CD3ζ |
| TTP | ICOS | BTNL3 | CD3δ |
| TTP | ICOS | BTNL3 | CD3γ |
| TTP | ICOS | BTNL3 | CD3ε |
| TTP | ICOS | BTNL3 | FcγRI-γ |
| TTP | ICOS | BTNL3 | FcγRIII-γ |
| TTP | ICOS | BTNL3 | FcεRIβ |
| TTP | ICOS | BTNL3 | FcεRIγ |
| TTP | ICOS | BTNL3 | DAP10 |
| TTP | ICOS | BTNL3 | DAP12 |
| TTP | ICOS | BTNL3 | CD32 |
| TTP | ICOS | BTNL3 | CD79a |
| TTP | ICOS | BTNL3 | CD79b |
| TTP | ICOS | NKG2D | CD8 |
| TTP | ICOS | NKG2D | CD3ζ |
| TTP | ICOS | NKG2D | CD3δ |
| TTP | ICOS | NKG2D | CD3γ |
| TTP | ICOS | NKG2D | CD3ε |
| TTP | ICOS | NKG2D | FcγRI-γ |
| TTP | ICOS | NKG2D | FcγRIII-γ |
| TTP | ICOS | NKG2D | FcεRIβ |
| TTP | ICOS | NKG2D | FcεRIγ |
| TTP | ICOS | NKG2D | DAP10 |
| TTP | ICOS | NKG2D | DAP12 |
| TTP | ICOS | NKG2D | CD32 |
| TTP | ICOS | NKG2D | CD79a |
| TTP | ICOS | NKG2D | CD79b |
| TTP | CD27 | CD28 | CD8 |
| TTP | CD27 | CD28 | CD3ζ |
| TTP | CD27 | CD28 | CD3δ |

TABLE 3-continued

Third Generation CARs

| | Co-stimulatory Signal | Co-stimulatory Signal | Signal Domain |
|---|---|---|---|
| TTP | CD27 | CD28 | CD3γ |
| TTP | CD27 | CD28 | CD3ε |
| TTP | CD27 | CD28 | FcγRI-γ |
| TTP | CD27 | CD28 | FcγRIII-γ |
| TTP | CD27 | CD28 | FcεRIβ |
| TTP | CD27 | CD28 | FcεRIγ |
| TTP | CD27 | CD28 | DAP10 |
| TTP | CD27 | CD28 | DAP12 |
| TTP | CD27 | CD28 | CD32 |
| TTP | CD27 | CD28 | CD79a |
| TTP | CD27 | CD28 | CD79b |
| TTP | CD27 | CD8 | CD8 |
| TTP | CD27 | CD8 | CD3ζ |
| TTP | CD27 | CD8 | CD3δ |
| TTP | CD27 | CD8 | CD3γ |
| TTP | CD27 | CD8 | CD3ε |
| TTP | CD27 | CD8 | FcγRI-γ |
| TTP | CD27 | CD8 | FcγRIII-γ |
| TTP | CD27 | CD8 | FcεRIβ |
| TTP | CD27 | CD8 | FcεRIγ |
| TTP | CD27 | CD8 | DAP10 |
| TTP | CD27 | CD8 | DAP12 |
| TTP | CD27 | CD8 | CD32 |
| TTP | CD27 | CD8 | CD79a |
| TTP | CD27 | CD8 | CD79b |
| TTP | CD27 | CD4 | CD8 |
| TTP | CD27 | CD4 | CD3ζ |
| TTP | CD27 | CD4 | CD3δ |
| TTP | CD27 | CD4 | CD3γ |
| TTP | CD27 | CD4 | CD3ε |
| TTP | CD27 | CD4 | FcγRI-γ |
| TTP | CD27 | CD4 | FcγRIII-γ |
| TTP | CD27 | CD4 | FcεRIβ |
| TTP | CD27 | CD4 | FcεRIγ |
| TTP | CD27 | CD4 | DAP10 |
| TTP | CD27 | CD4 | DAP12 |
| TTP | CD27 | CD4 | CD32 |
| TTP | CD27 | CD4 | CD79a |
| TTP | CD27 | CD4 | CD79b |
| TTP | CD27 | b2c | CD8 |
| TTP | CD27 | b2c | CD3ζ |
| TTP | CD27 | b2c | CD3δ |
| TTP | CD27 | b2c | CD3γ |
| TTP | CD27 | b2c | CD3ε |
| TTP | CD27 | b2c | FcγRI-γ |
| TTP | CD27 | b2c | FcγRIII-γ |
| TTP | CD27 | b2c | FcεRIβ |
| TTP | CD27 | b2c | FcεRIγ |
| TTP | CD27 | b2c | DAP10 |
| TTP | CD27 | b2c | DAP12 |
| TTP | CD27 | b2c | CD32 |
| TTP | CD27 | b2c | CD79a |
| TTP | CD27 | b2c | CD79b |
| TTP | CD27 | CD137/41BB | CD8 |
| TTP | CD27 | CD137/41BB | CD3ζ |
| TTP | CD27 | CD137/41BB | CD3δ |
| TTP | CD27 | CD137/41BB | CD3γ |
| TTP | CD27 | CD137/41BB | CD3ε |
| TTP | CD27 | CD137/41BB | FcγRI-γ |
| TTP | CD27 | CD137/41BB | FcγRIII-γ |
| TTP | CD27 | CD137/41BB | FcεRIβ |
| TTP | CD27 | CD137/41BB | FcεRIγ |
| TTP | CD27 | CD137/41BB | DAP10 |
| TTP | CD27 | CD137/41BB | DAP12 |
| TTP | CD27 | CD137/41BB | CD32 |
| TTP | CD27 | CD137/41BB | CD79a |
| TTP | CD27 | CD137/41BB | CD79b |
| TTP | CD27 | ICOS | CD8 |
| TTP | CD27 | ICOS | CD3ζ |
| TTP | CD27 | ICOS | CD3δ |
| TTP | CD27 | ICOS | CD3γ |
| TTP | CD27 | ICOS | CD3ε |
| TTP | CD27 | ICOS | FcγRI-γ |
| TTP | CD27 | ICOS | FcγRIII-y |
| TTP | CD27 | ICOS | FcεRIβ |

TABLE 3-continued

Third Generation CARs

| | Co-stimulatory Signal | Co-stimulatory Signal | Signal Domain |
|---|---|---|---|
| TTP | CD27 | ICOS | FcεRIγ |
| TTP | CD27 | ICOS | DAP10 |
| TTP | CD27 | ICOS | DAP12 |
| TTP | CD27 | ICOS | CD32 |
| TTP | CD27 | ICOS | CD79a |
| TTP | CD27 | ICOS | CD79b |
| TTP | CD27 | CD27 | CD8 |
| TTP | CD27 | CD27 | CD3ζ |
| TTP | CD27 | CD27 | CD3δ |
| TTP | CD27 | CD27 | CD3γ |
| TTP | CD27 | CD27 | CD3ε |
| TTP | CD27 | CD27 | FcγRI-γ |
| TTP | CD27 | CD27 | FcγRIII-γ |
| TTP | CD27 | CD27 | FcεRIβ |
| TTP | CD27 | CD27 | FcεRIγ |
| TTP | CD27 | CD27 | DAP10 |
| TTP | CD27 | CD27 | DAP12 |
| TTP | CD27 | CD27 | CD32 |
| TTP | CD27 | CD27 | CD79a |
| TTP | CD27 | CD27 | CD79b |
| TTP | CD27 | CD28δ | CD8 |
| TTP | CD27 | CD28δ | CD3ζ |
| TTP | CD27 | CD28δ | CD3δ |
| TTP | CD27 | CD28δ | CD3γ |
| TTP | CD27 | CD28δ | CD3ε |
| TTP | CD27 | CD28δ | FcγRI-γ |
| TTP | CD27 | CD28δ | FcγRIII-γ |
| TTP | CD27 | CD28δ | FcεRIβ |
| TTP | CD27 | CD28δ | FcεRIγ |
| TTP | CD27 | CD28δ | DAP10 |
| TTP | CD27 | CD28δ | DAP12 |
| TTP | CD27 | CD28δ | CD32 |
| TTP | CD27 | CD28δ | CD79a |
| TTP | CD27 | CD28δ | CD79b |
| TTP | CD27 | CD80 | CD8 |
| TTP | CD27 | CD80 | CD3ζ |
| TTP | CD27 | CD80 | CD3δ |
| TTP | CD27 | CD80 | CD3γ |
| TTP | CD27 | CD80 | CD3ε |
| TTP | CD27 | CD80 | FcγRI-γ |
| TTP | CD27 | CD80 | FcγRIII-γ |
| TTP | CD27 | CD80 | FcεRIβ |
| TTP | CD27 | CD80 | FcεRIγ |
| TTP | CD27 | CD80 | DAP10 |
| TTP | CD27 | CD80 | DAP12 |
| TTP | CD27 | CD80 | CD32 |
| TTP | CD27 | CD80 | CD79a |
| TTP | CD27 | CD80 | CD79b |
| TTP | CD27 | CD86 | CD8 |
| TTP | CD27 | CD86 | CD3ζ |
| TTP | CD27 | CD86 | CD3δ |
| TTP | CD27 | CD86 | CD3γ |
| TTP | CD27 | CD86 | CD3ε |
| TTP | CD27 | CD86 | FcγRI-γ |
| TTP | CD27 | CD86 | FcγRIII-γ |
| TTP | CD27 | CD86 | FcεRIβ |
| TTP | CD27 | CD86 | FcεRIγ |
| TTP | CD27 | CD86 | DAP10 |
| TTP | CD27 | CD86 | DAP12 |
| TTP | CD27 | CD86 | CD32 |
| TTP | CD27 | CD86 | CD79a |
| TTP | CD27 | CD86 | CD79b |
| TTP | CD27 | OX40 | CD8 |
| TTP | CD27 | OX40 | CD3ζ |
| TTP | CD27 | OX40 | CD3δ |
| TTP | CD27 | OX40 | CD3γ |
| TTP | CD27 | OX40 | CD3ε |
| TTP | CD27 | OX40 | FcγRI-γ |
| TTP | CD27 | OX40 | FcγRIII-γ |
| TTP | CD27 | OX40 | FcεRIβ |
| TTP | CD27 | OX40 | FcεRIγ |
| TTP | CD27 | OX40 | DAP10 |
| TTP | CD27 | OX40 | DAP12 |
| TTP | CD27 | OX40 | CD32 |
| TTP | CD27 | OX40 | CD79a |

TABLE 3-continued

Third Generation CARs

| | Co-stimulatory Signal | Co-stimulatory Signal | Signal Domain |
|---|---|---|---|
| TTP | CD27 | OX40 | CD79b |
| TTP | CD27 | DAP10 | CD8 |
| TTP | CD27 | DAP10 | CD3ζ |
| TTP | CD27 | DAP10 | CD3δ |
| TTP | CD27 | DAP10 | CD3γ |
| TTP | CD27 | DAP10 | CD3ε |
| TTP | CD27 | DAP10 | FcγRI-γ |
| TTP | CD27 | DAP10 | FcγRIII-γ |
| TTP | CD27 | DAP10 | FcεRIβ |
| TTP | CD27 | DAP10 | FcεRIγ |
| TTP | CD27 | DAP10 | DAP10 |
| TTP | CD27 | DAP10 | DAP12 |
| TTP | CD27 | DAP10 | CD32 |
| TTP | CD27 | DAP10 | CD79a |
| TTP | CD27 | DAP10 | CD79b |
| TTP | CD27 | DAP12 | CD8 |
| TTP | CD27 | DAP12 | CD3ζ |
| TTP | CD27 | DAP12 | CD3δ |
| TTP | CD27 | DAP12 | CD3γ |
| TTP | CD27 | DAP12 | CD3ε |
| TTP | CD27 | DAP12 | FcγRI-γ |
| TTP | CD27 | DAP12 | FcγRIII-γ |
| TTP | CD27 | DAP12 | FcεRIβ |
| TTP | CD27 | DAP12 | FcεRIγ |
| TTP | CD27 | DAP12 | DAP10 |
| TTP | CD27 | DAP12 | DAP12 |
| TTP | CD27 | DAP12 | CD32 |
| TTP | CD27 | DAP12 | CD79a |
| TTP | CD27 | DAP12 | CD79b |
| TTP | CD27 | MyD88 | CD8 |
| TTP | CD27 | MyD88 | CD3ζ |
| TTP | CD27 | MyD88 | CD3δ |
| TTP | CD27 | MyD88 | CD3γ |
| TTP | CD27 | MyD88 | CD3ε |
| TTP | CD27 | MyD88 | FcγRI-γ |
| TTP | CD27 | MyD88 | FcγRIII-γ |
| TTP | CD27 | MyD88 | FcεRIβ |
| TTP | CD27 | MyD88 | FcεRIγ |
| TTP | CD27 | MyD88 | DAP10 |
| TTP | CD27 | MyD88 | DAP12 |
| TTP | CD27 | MyD88 | CD32 |
| TTP | CD27 | MyD88 | CD79a |
| TTP | CD27 | MyD88 | CD79b |
| TTP | CD27 | CD7 | CD8 |
| TTP | CD27 | CD7 | CD3ζ |
| TTP | CD27 | CD7 | CD3δ |
| TTP | CD27 | CD7 | CD3γ |
| TTP | CD27 | CD7 | CD3ε |
| TTP | CD27 | CD7 | FcγRI-γ |
| TTP | CD27 | CD7 | FcγRIII-γ |
| TTP | CD27 | CD7 | FcεRIβ |
| TTP | CD27 | CD7 | FcεRIγ |
| TTP | CD27 | CD7 | DAP10 |
| TTP | CD27 | CD7 | DAP12 |
| TTP | CD27 | CD7 | CD32 |
| TTP | CD27 | CD7 | CD79a |
| TTP | CD27 | CD7 | CD79b |
| TTP | CD27 | BTNL3 | CD8 |
| TTP | CD27 | BTNL3 | CD3ζ |
| TTP | CD27 | BTNL3 | CD3δ |
| TTP | CD27 | BTNL3 | CD3γ |
| TTP | CD27 | BTNL3 | CD3ε |
| TTP | CD27 | BTNL3 | FcγRI-γ |
| TTP | CD27 | BTNL3 | FcγRIII-γ |
| TTP | CD27 | BTNL3 | FcεRIβ |
| TTP | CD27 | BTNL3 | FcεRIγ |
| TTP | CD27 | BTNL3 | DAP10 |
| TTP | CD27 | BTNL3 | DAP12 |
| TTP | CD27 | BTNL3 | CD32 |
| TTP | CD27 | BTNL3 | CD79a |
| TTP | CD27 | BTNL3 | CD79b |
| TTP | CD27 | NKG2D | CD8 |
| TTP | CD27 | NKG2D | CD3ζ |
| TTP | CD27 | NKG2D | CD3δ |
| TTP | CD27 | NKG2D | CD3γ |

TABLE 3-continued

Third Generation CARs

| | Co-stimulatory Signal | Co-stimulatory Signal | Signal Domain |
|---|---|---|---|
| TTP | CD27 | NKG2D | CD3ε |
| TTP | CD27 | NKG2D | FcγRI-γ |
| TTP | CD27 | NKG2D | FcγRIII-γ |
| TTP | CD27 | NKG2D | FcεRIβ |
| TTP | CD27 | NKG2D | FcεRIγ |
| TTP | CD27 | NKG2D | DAP10 |
| TTP | CD27 | NKG2D | DAP12 |
| TTP | CD27 | NKG2D | CD32 |
| TTP | CD27 | NKG2D | CD79a |
| TTP | CD27 | NKG2D | CD79b |
| TTP | CD28δ | CD28 | CD8 |
| TTP | CD28δ | CD28 | CD3ζ |
| TTP | CD28δ | CD28 | CD3δ |
| TTP | CD28δ | CD28 | CD3γ |
| TTP | CD28δ | CD28 | CD3ε |
| TTP | CD28δ | CD28 | FcγRI-γ |
| TTP | CD28δ | CD28 | FcγRIII-γ |
| TTP | CD28δ | CD28 | FcεRIβ |
| TTP | CD28δ | CD28 | FcεRIγ |
| TTP | CD28δ | CD28 | DAP10 |
| TTP | CD28δ | CD28 | DAP12 |
| TTP | CD28δ | CD28 | CD32 |
| TTP | CD28δ | CD28 | CD79a |
| TTP | CD28δ | CD28 | CD79b |
| TTP | CD28δ | CD8 | CD8 |
| TTP | CD28δ | CD8 | CD3ζ |
| TTP | CD28δ | CD8 | CD3δ |
| TTP | CD28δ | CD8 | CD3γ |
| TTP | CD28δ | CD8 | CD3ε |
| TTP | CD28δ | CD8 | FcγRI-γ |
| TTP | CD28δ | CD8 | FcγRIII-γ |
| TTP | CD28δ | CD8 | FcεRIβ |
| TTP | CD28δ | CD8 | FcεRIγ |
| TTP | CD28δ | CD8 | DAP10 |
| TTP | CD28δ | CD8 | DAP12 |
| TTP | CD28δ | CD8 | CD32 |
| TTP | CD28δ | CD8 | CD79a |
| TTP | CD28δ | CD8 | CD79b |
| TTP | CD28δ | CD4 | CD8 |
| TTP | CD28δ | CD4 | CD3ζ |
| TTP | CD28δ | CD4 | CD3δ |
| TTP | CD28δ | CD4 | CD3γ |
| TTP | CD28δ | CD4 | CD3ε |
| TTP | CD28δ | CD4 | FcγRI-γ |
| TTP | CD28δ | CD4 | FcγRIII-γ |
| TTP | CD28δ | CD4 | FcεRIβ |
| TTP | CD28δ | CD4 | FcεRIγ |
| TTP | CD28δ | CD4 | DAP10 |
| TTP | CD28δ | CD4 | DAP12 |
| TTP | CD28δ | CD4 | CD32 |
| TTP | CD28δ | CD4 | CD79a |
| TTP | CD28δ | CD4 | CD79b |
| TTP | CD28δ | b2c | CD8 |
| TTP | CD28δ | b2c | CD3ζ |
| TTP | CD28δ | b2c | CD3δ |
| TTP | CD28δ | b2c | CD3γ |
| TTP | CD28δ | b2c | CD3ε |
| TTP | CD28δ | b2c | FcγRI-γ |
| TTP | CD28δ | b2c | FcγRIII-γ |
| TTP | CD28δ | b2c | FcεRIβ |
| TTP | CD28δ | b2c | FcεRIγ |
| TTP | CD28δ | b2c | DAP10 |
| TTP | CD28δ | b2c | DAP12 |
| TTP | CD28δ | b2c | CD32 |
| TTP | CD28δ | b2c | CD79a |
| TTP | CD28δ | b2c | CD79b |
| TTP | CD28δ | CD137/41BB | CD8 |
| TTP | CD28δ | CD137/41BB | CD3ζ |
| TTP | CD28δ | CD137/41BB | CD3δ |
| TTP | CD28δ | CD137/41BB | CD3γ |
| TTP | CD28δ | CD137/41BB | CD3ε |
| TTP | CD28δ | CD137/41BB | FcγRI-γ |
| TTP | CD28δ | CD137/41BB | FcγRIII-γ |
| TTP | CD28δ | CD137/41BB | FcεRIβ |
| TTP | CD28δ | CD137/41BB | FcεRIγ |

TABLE 3-continued

| Third Generation CARs | | | |
|---|---|---|---|
| | Co-stimulatory Signal | Co-stimulatory Signal | Signal Domain |
| TTP | CD28δ | CD137/41BB | DAP10 |
| TTP | CD28δ | CD137/41BB | DAP12 |
| TTP | CD28δ | CD137/41BB | CD32 |
| TTP | CD28δ | CD137/41BB | CD79a |
| TTP | CD28δ | CD137/41BB | CD79b |
| TTP | CD28δ | ICOS | CD8 |
| TTP | CD28δ | ICOS | CD3ζ |
| TTP | CD28δ | ICOS | CD3δ |
| TTP | CD28δ | ICOS | CD3γ |
| TTP | CD28δ | ICOS | CD3ε |
| TTP | CD28δ | ICOS | FcγRI-γ |
| TTP | CD28δ | ICOS | FcγRIII-γ |
| TTP | CD28δ | ICOS | FcεRIβ |
| TTP | CD28δ | ICOS | FcεRIγ |
| TTP | CD28δ | ICOS | DAP10 |
| TTP | CD28δ | ICOS | DAP12 |
| TTP | CD28δ | ICOS | CD32 |
| TTP | CD28δ | ICOS | CD79a |
| TTP | CD28δ | ICOS | CD79b |
| TTP | CD28δ | CD27 | CD8 |
| TTP | CD28δ | CD27 | CD3ζ |
| TTP | CD28δ | CD27 | CD3δ |
| TTP | CD28δ | CD27 | CD3γ |
| TTP | CD28δ | CD27 | CD3ε |
| TTP | CD28δ | CD27 | FcγRI-γ |
| TTP | CD28δ | CD27 | FcγRIII-γ |
| TTP | CD28δ | CD27 | FcεRIβ |
| TTP | CD28δ | CD27 | FcεRIγ |
| TTP | CD28δ | CD27 | DAP10 |
| TTP | CD28δ | CD27 | DAP12 |
| TTP | CD28δ | CD27 | CD32 |
| TTP | CD28δ | CD27 | CD79a |
| TTP | CD28δ | CD27 | CD79b |
| TTP | CD28δ | CD28δ | CD8 |
| TTP | CD28δ | CD28δ | CD3ζ |
| TTP | CD28δ | CD28δ | CD3δ |
| TTP | CD28δ | CD28δ | CD3γ |
| TTP | CD28δ | CD28δ | CD3ε |
| TTP | CD28δ | CD28δ | FcγRI-γ |
| TTP | CD28δ | CD28δ | FcγRIII-γ |
| TTP | CD28δ | CD28δ | FcεRIβ |
| TTP | CD28δ | CD28δ | FcεRIγ |
| TTP | CD28δ | CD28δ | DAP10 |
| TTP | CD28δ | CD28δ | DAP12 |
| TTP | CD28δ | CD28δ | CD32 |
| TTP | CD28δ | CD28δ | CD79a |
| TTP | CD28δ | CD28δ | CD79b |
| TTP | CD28δ | CD80 | CD8 |
| TTP | CD28δ | CD80 | CD3ζ |
| TTP | CD28δ | CD80 | CD3δ |
| TTP | CD28δ | CD80 | CD3γ |
| TTP | CD28δ | CD80 | CD3ε |
| TTP | CD28δ | CD80 | FcγRI-γ |
| TTP | CD28δ | CD80 | FcγRIII-γ |
| TTP | CD28δ | CD80 | FcεRIβ |
| TTP | CD28δ | CD80 | FcεRIγ |
| TTP | CD28δ | CD80 | DAP10 |
| TTP | CD28δ | CD80 | DAP12 |
| TTP | CD28δ | CD80 | CD32 |
| TTP | CD28δ | CD80 | CD79a |
| TTP | CD28δ | CD80 | CD79b |
| TTP | CD28δ | CD86 | CD8 |
| TTP | CD28δ | CD86 | CD3ζ |
| TTP | CD28δ | CD86 | CD3δ |
| TTP | CD28δ | CD86 | CD3γ |
| TTP | CD28δ | CD86 | CD3ε |
| TTP | CD28δ | CD86 | FcγRI-γ |
| TTP | CD28δ | CD86 | FcγRIII-γ |
| TTP | CD28δ | CD86 | FcεRIβ |
| TTP | CD28δ | CD86 | FcεRIγ |
| TTP | CD28δ | CD86 | DAP10 |
| TTP | CD28δ | CD86 | DAP12 |
| TTP | CD28δ | CD86 | CD32 |
| TTP | CD28δ | CD86 | CD79a |
| TTP | CD28δ | CD86 | CD79b |

TABLE 3-continued

| Third Generation CARs | | | |
|---|---|---|---|
| | Co-stimulatory Signal | Co-stimulatory Signal | Signal Domain |
| TTP | CD28δ | OX40 | CD8 |
| TTP | CD28δ | OX40 | CD3ζ |
| TTP | CD28δ | OX40 | CD3δ |
| TTP | CD28δ | OX40 | CD3γ |
| TTP | CD28δ | OX40 | CD3ε |
| TTP | CD28δ | OX40 | FcγRI-γ |
| TTP | CD28δ | OX40 | FcγRIII-γ |
| TTP | CD28δ | OX40 | FcεRIβ |
| TTP | CD28δ | OX40 | FcεRIγ |
| TTP | CD28δ | OX40 | DAP10 |
| TTP | CD28δ | OX40 | DAP12 |
| TTP | CD28δ | OX40 | CD32 |
| TTP | CD28δ | OX40 | CD79a |
| TTP | CD28δ | OX40 | CD79b |
| TTP | CD28δ | DAP10 | CD8 |
| TTP | CD28δ | DAP10 | CD3ζ |
| TTP | CD28δ | DAP10 | CD3δ |
| TTP | CD28δ | DAP10 | CD3γ |
| TTP | CD28δ | DAP10 | CD3ε |
| TTP | CD28δ | DAP10 | FcγRI-γ |
| TTP | CD28δ | DAP10 | FcγRIII-γ |
| TTP | CD28δ | DAP10 | FcεRIβ |
| TTP | CD28δ | DAP10 | FcεRIγ |
| TTP | CD28δ | DAP10 | DAP10 |
| TTP | CD28δ | DAP10 | DAP12 |
| TTP | CD28δ | DAP10 | CD32 |
| TTP | CD28δ | DAP10 | CD79a |
| TTP | CD28δ | DAP10 | CD79b |
| TTP | CD28δ | DAP12 | CD8 |
| TTP | CD28δ | DAP12 | CD3ζ |
| TTP | CD28δ | DAP12 | CD3δ |
| TTP | CD28δ | DAP12 | CD3γ |
| TTP | CD28δ | DAP12 | CD3ε |
| TTP | CD28δ | DAP12 | FcγRI-γ |
| TTP | CD28δ | DAP12 | FcγRIII-γ |
| TTP | CD28δ | DAP12 | FcεRIβ |
| TTP | CD28δ | DAP12 | FcεRIγ |
| TTP | CD28δ | DAP12 | DAP10 |
| TTP | CD28δ | DAP12 | DAP12 |
| TTP | CD28δ | DAP12 | CD32 |
| TTP | CD28δ | DAP12 | CD79a |
| TTP | CD28δ | DAP12 | CD79b |
| TTP | CD28δ | MyD88 | CD8 |
| TTP | CD28δ | MyD88 | CD3ζ |
| TTP | CD28δ | MyD88 | CD3δ |
| TTP | CD28δ | MyD88 | CD3γ |
| TTP | CD28δ | MyD88 | CD3ε |
| TTP | CD28δ | MyD88 | FcγRI-γ |
| TTP | CD28δ | MyD88 | FcγRIII-γ |
| TTP | CD28δ | MyD88 | FcεRIβ |
| TTP | CD28δ | MyD88 | FcεRIγ |
| TTP | CD28δ | MyD88 | DAP10 |
| TTP | CD28δ | MyD88 | DAP12 |
| TTP | CD28δ | MyD88 | CD32 |
| TTP | CD28δ | MyD88 | CD79a |
| TTP | CD28δ | MyD88 | CD79b |
| TTP | CD28δ | CD7 | CD8 |
| TTP | CD28δ | CD7 | CD3ζ |
| TTP | CD28δ | CD7 | CD3δ |
| TTP | CD28δ | CD7 | CD3γ |
| TTP | CD28δ | CD7 | CD3ε |
| TTP | CD28δ | CD7 | FcγRI-γ |
| TTP | CD28δ | CD7 | FcγRIII-γ |
| TTP | CD28δ | CD7 | FcεRIβ |
| TTP | CD28δ | CD7 | FcεRIγ |
| TTP | CD28δ | CD7 | DAP10 |
| TTP | CD28δ | CD7 | DAP12 |
| TTP | CD28δ | CD7 | CD32 |
| TTP | CD28δ | CD7 | CD79a |
| TTP | CD28δ | CD7 | CD79b |
| TTP | CD28δ | BTNL3 | CD8 |
| TTP | CD28δ | BTNL3 | CD3ζ |
| TTP | CD28δ | BTNL3 | CD3δ |
| TTP | CD28δ | BTNL3 | CD3γ |
| TTP | CD28δ | BTNL3 | CD3ε |

TABLE 3-continued

| Third Generation CARs | | | |
|---|---|---|---|
| | Co-stimulatory Signal | Co-stimulatory Signal | Signal Domain |
| TTP | CD28δ | BTNL3 | FcγRI-γ |
| TTP | CD28δ | BTNL3 | FcγRIII-γ |
| TTP | CD28δ | BTNL3 | FcεRIβ |
| TTP | CD28δ | BTNL3 | FcεRIγ |
| TTP | CD28δ | BTNL3 | DAP10 |
| TTP | CD28δ | BTNL3 | DAP12 |
| TTP | CD28δ | BTNL3 | CD32 |
| TTP | CD28δ | BTNL3 | CD79a |
| TTP | CD28δ | BTNL3 | CD79b |
| TTP | CD28δ | NKG2D | CD8 |
| TTP | CD28δ | NKG2D | CD3ζ |
| TTP | CD28δ | NKG2D | CD3δ |
| TTP | CD28δ | NKG2D | CD3γ |
| TTP | CD28δ | NKG2D | CD3ε |
| TTP | CD28δ | NKG2D | FcγRI-γ |
| TTP | CD28δ | NKG2D | FcγRIII-γ |
| TTP | CD28δ | NKG2D | FcεRIβ |
| TTP | CD28δ | NKG2D | FcεRIγ |
| TTP | CD28δ | NKG2D | DAP10 |
| TTP | CD28δ | NKG2D | DAP12 |
| TTP | CD28δ | NKG2D | CD32 |
| TTP | CD28δ | NKG2D | CD79a |
| TTP | CD28δ | NKG2D | CD79b |
| TTP | CD80 | CD28 | CD8 |
| TTP | CD80 | CD28 | CD3ζ |
| TTP | CD80 | CD28 | CD3δ |
| TTP | CD80 | CD28 | CD3γ |
| TTP | CD80 | CD28 | CD3ε |
| TTP | CD80 | CD28 | FcγRI-γ |
| TTP | CD80 | CD28 | FcγRIII-γ |
| TTP | CD80 | CD28 | FcεRIβ |
| TTP | CD80 | CD28 | FcεRIγ |
| TTP | CD80 | CD28 | DAP10 |
| TTP | CD80 | CD28 | DAP12 |
| TTP | CD80 | CD28 | CD32 |
| TTP | CD80 | CD28 | CD79a |
| TTP | CD80 | CD28 | CD79b |
| TTP | CD80 | CD8 | CD8 |
| TTP | CD80 | CD8 | CD3ζ |
| TTP | CD80 | CD8 | CD3δ |
| TTP | CD80 | CD8 | CD3γ |
| TTP | CD80 | CD8 | CD3ε |
| TTP | CD80 | CD8 | FcγRI-γ |
| TTP | CD80 | CD8 | FcγRIII-γ |
| TTP | CD80 | CD8 | FcεRIβ |
| TTP | CD80 | CD8 | FcεRIγ |
| TTP | CD80 | CD8 | DAP10 |
| TTP | CD80 | CD8 | DAP12 |
| TTP | CD80 | CD8 | CD32 |
| TTP | CD80 | CD8 | CD79a |
| TTP | CD80 | CD8 | CD79b |
| TTP | CD80 | CD4 | CD8 |
| TTP | CD80 | CD4 | CD3ζ |
| TTP | CD80 | CD4 | CD3δ |
| TTP | CD80 | CD4 | CD3γ |
| TTP | CD80 | CD4 | CD3ε |
| TTP | CD80 | CD4 | FcγRI-γ |
| TTP | CD80 | CD4 | FcγRIII-γ |
| TTP | CD80 | CD4 | FcεRIβ |
| TTP | CD80 | CD4 | FcεRIγ |
| TTP | CD80 | CD4 | DAP10 |
| TTP | CD80 | CD4 | DAP12 |
| TTP | CD80 | CD4 | CD32 |
| TTP | CD80 | CD4 | CD79a |
| TTP | CD80 | CD4 | CD79b |
| TTP | CD80 | b2c | CD8 |
| TTP | CD80 | b2c | CD3ζ |
| TTP | CD80 | b2c | CD3δ |
| TTP | CD80 | b2c | CD3γ |
| TTP | CD80 | b2c | CD3ε |
| TTP | CD80 | b2c | FcγRI-γ |
| TTP | CD80 | b2c | FcγRIII-γ |
| TTP | CD80 | b2c | FcεRIβ |
| TTP | CD80 | b2c | FcεRIγ |
| TTP | CD80 | b2c | DAP10 |

TABLE 3-continued

| Third Generation CARs | | | |
|---|---|---|---|
| | Co-stimulatory Signal | Co-stimulatory Signal | Signal Domain |
| TTP | CD80 | b2c | DAP12 |
| TTP | CD80 | b2c | CD32 |
| TTP | CD80 | b2c | CD79a |
| TTP | CD80 | b2c | CD79b |
| TTP | CD80 | CD137/41BB | CD8 |
| TTP | CD80 | CD137/41BB | CD3ζ |
| TTP | CD80 | CD137/41BB | CD3δ |
| TTP | CD80 | CD137/41BB | CD3γ |
| TTP | CD80 | CD137/41BB | CD3ε |
| TTP | CD80 | CD137/41BB | FcγRI-γ |
| TTP | CD80 | CD137/41BB | FcγRIII-γ |
| TTP | CD80 | CD137/41BB | FcεRIβ |
| TTP | CD80 | CD137/41BB | FcεRIγ |
| TTP | CD80 | CD137/41BB | DAP10 |
| TTP | CD80 | CD137/41BB | DAP12 |
| TTP | CD80 | CD137/41BB | CD32 |
| TTP | CD80 | CD137/41BB | CD79a |
| TTP | CD80 | CD137/41BB | CD79b |
| TTP | CD80 | ICOS | CD8 |
| TTP | CD80 | ICOS | CD3ζ |
| TTP | CD80 | ICOS | CD3δ |
| TTP | CD80 | ICOS | CD3γ |
| TTP | CD80 | ICOS | CD3ε |
| TTP | CD80 | ICOS | FcγRI-γ |
| TTP | CD80 | ICOS | FcγRIII-γ |
| TTP | CD80 | ICOS | FcεRIβ |
| TTP | CD80 | ICOS | FcεRIγ |
| TTP | CD80 | ICOS | DAP10 |
| TTP | CD80 | ICOS | DAP12 |
| TTP | CD80 | ICOS | CD32 |
| TTP | CD80 | ICOS | CD79a |
| TTP | CD80 | ICOS | CD79b |
| TTP | CD80 | CD27 | CD8 |
| TTP | CD80 | CD27 | CD3ζ |
| TTP | CD80 | CD27 | CD3δ |
| TTP | CD80 | CD27 | CD3γ |
| TTP | CD80 | CD27 | CD3ε |
| TTP | CD80 | CD27 | FcγRI-γ |
| TTP | CD80 | CD27 | FcγRIII-γ |
| TTP | CD80 | CD27 | FcεRIβ |
| TTP | CD80 | CD27 | FcεRIγ |
| TTP | CD80 | CD27 | DAP10 |
| TTP | CD80 | CD27 | DAP12 |
| TTP | CD80 | CD27 | CD32 |
| TTP | CD80 | CD27 | CD79a |
| TTP | CD80 | CD27 | CD79b |
| TTP | CD80 | CD28δ | CD8 |
| TTP | CD80 | CD28δ | CD3ζ |
| TTP | CD80 | CD28δ | CD3δ |
| TTP | CD80 | CD28δ | CD3γ |
| TTP | CD80 | CD28δ | CD3ε |
| TTP | CD80 | CD28δ | FcγRI-γ |
| TTP | CD80 | CD28δ | FcγRIII-γ |
| TTP | CD80 | CD28δ | FcεRIβ |
| TTP | CD80 | CD28δ | FcεRIγ |
| TTP | CD80 | CD28δ | DAP10 |
| TTP | CD80 | CD28δ | DAP12 |
| TTP | CD80 | CD28δ | CD32 |
| TTP | CD80 | CD28δ | CD79a |
| TTP | CD80 | CD28δ | CD79b |
| TTP | CD80 | CD80 | CD8 |
| TTP | CD80 | CD80 | CD3ζ |
| TTP | CD80 | CD80 | CD3δ |
| TTP | CD80 | CD80 | CD3γ |
| TTP | CD80 | CD80 | CD3ε |
| TTP | CD80 | CD80 | FcγRI-γ |
| TTP | CD80 | CD80 | FcγRIII-γ |
| TTP | CD80 | CD80 | FcεRIβ |
| TTP | CD80 | CD80 | FcεRIγ |
| TTP | CD80 | CD80 | DAP10 |
| TTP | CD80 | CD80 | DAP12 |
| TTP | CD80 | CD80 | CD32 |
| TTP | CD80 | CD80 | CD79a |
| TTP | CD80 | CD80 | CD79b |
| TTP | CD80 | CD86 | CD8 |

TABLE 3-continued

| Third Generation CARs | | | |
|---|---|---|---|
| | Co-stimulatory Signal | Co-stimulatory Signal | Signal Domain |
| TTP | CD80 | CD86 | CD3ζ |
| TTP | CD80 | CD86 | CD3δ |
| TTP | CD80 | CD86 | CD3γ |
| TTP | CD80 | CD86 | CD3ε |
| TTP | CD80 | CD86 | FcγRI-γ |
| TTP | CD80 | CD86 | FcγRIII-γ |
| TTP | CD80 | CD86 | FcεRIβ |
| TTP | CD80 | CD86 | FcεRIγ |
| TTP | CD80 | CD86 | DAP10 |
| TTP | CD80 | CD86 | DAP12 |
| TTP | CD80 | CD86 | CD32 |
| TTP | CD80 | CD86 | CD79a |
| TTP | CD80 | CD86 | CD79b |
| TTP | CD80 | OX40 | CD8 |
| TTP | CD80 | OX40 | CD3ζ |
| TTP | CD80 | OX40 | CD3δ |
| TTP | CD80 | OX40 | CD3γ |
| TTP | CD80 | OX40 | CD3ε |
| TTP | CD80 | OX40 | FcγRI-γ |
| TTP | CD80 | OX40 | FcγRIII-γ |
| TTP | CD80 | OX40 | FcεRIβ |
| TTP | CD80 | OX40 | FcεRIγ |
| TTP | CD80 | OX40 | DAP10 |
| TTP | CD80 | OX40 | DAP12 |
| TTP | CD80 | OX40 | CD32 |
| TTP | CD80 | OX40 | CD79a |
| TTP | CD80 | OX40 | CD79b |
| TTP | CD80 | DAP10 | CD8 |
| TTP | CD80 | DAP10 | CD3ζ |
| TTP | CD80 | DAP10 | CD3δ |
| TTP | CD80 | DAP10 | CD3γ |
| TTP | CD80 | DAP10 | CD3ε |
| TTP | CD80 | DAP10 | FcγRI-γ |
| TTP | CD80 | DAP10 | FcγRIII-γ |
| TTP | CD80 | DAP10 | FcεRIβ |
| TTP | CD80 | DAP10 | FcεRIγ |
| TTP | CD80 | DAP10 | DAP10 |
| TTP | CD80 | DAP10 | DAP12 |
| TTP | CD80 | DAP10 | CD32 |
| TTP | CD80 | DAP10 | CD79a |
| TTP | CD80 | DAP10 | CD79b |
| TTP | CD80 | DAP12 | CD8 |
| TTP | CD80 | DAP12 | CD3ζ |
| TTP | CD80 | DAP12 | CD3δ |
| TTP | CD80 | DAP12 | CD3γ |
| TTP | CD80 | DAP12 | CD3ε |
| TTP | CD80 | DAP12 | FcγRI-γ |
| TTP | CD80 | DAP12 | FcγRIII-γ |
| TTP | CD80 | DAP12 | FcεRIβ |
| TTP | CD80 | DAP12 | FcεRIγ |
| TTP | CD80 | DAP12 | DAP10 |
| TTP | CD80 | DAP12 | DAP12 |
| TTP | CD80 | DAP12 | CD32 |
| TTP | CD80 | DAP12 | CD79a |
| TTP | CD80 | DAP12 | CD79b |
| TTP | CD80 | MyD88 | CD8 |
| TTP | CD80 | MyD88 | CD3ζ |
| TTP | CD80 | MyD88 | CD3δ |
| TTP | CD80 | MyD88 | CD3γ |
| TTP | CD80 | MyD88 | CD3ε |
| TTP | CD80 | MyD88 | FcγRI-γ |
| TTP | CD80 | MyD88 | FcγRIII-γ |
| TTP | CD80 | MyD88 | FcεRIβ |
| TTP | CD80 | MyD88 | FcεRIγ |
| TTP | CD80 | MyD88 | DAP10 |
| TTP | CD80 | MyD88 | DAP12 |
| TTP | CD80 | MyD88 | CD32 |
| TTP | CD80 | MyD88 | CD79a |
| TTP | CD80 | MyD88 | CD79b |
| TTP | CD80 | CD7 | CD8 |
| TTP | CD80 | CD7 | CD3ζ |
| TTP | CD80 | CD7 | CD3δ |
| TTP | CD80 | CD7 | CD3γ |
| TTP | CD80 | CD7 | CD3ε |
| TTP | CD80 | CD7 | FcγRI-γ |

TABLE 3-continued

| Third Generation CARs | | | |
|---|---|---|---|
| | Co-stimulatory Signal | Co-stimulatory Signal | Signal Domain |
| TTP | CD80 | CD7 | FcγRIII-γ |
| TTP | CD80 | CD7 | FcεRIβ |
| TTP | CD80 | CD7 | FcεRIγ |
| TTP | CD80 | CD7 | DAP10 |
| TTP | CD80 | CD7 | DAP12 |
| TTP | CD80 | CD7 | CD32 |
| TTP | CD80 | CD7 | CD79a |
| TTP | CD80 | CD7 | CD79b |
| TTP | CD80 | BTNL3 | CD8 |
| TTP | CD80 | BTNL3 | CD3ζ |
| TTP | CD80 | BTNL3 | CD3δ |
| TTP | CD80 | BTNL3 | CD3γ |
| TTP | CD80 | BTNL3 | CD3ε |
| TTP | CD80 | BTNL3 | FcγRI-γ |
| TTP | CD80 | BTNL3 | FcγRIII-γ |
| TTP | CD80 | BTNL3 | FcεRIβ |
| TTP | CD80 | BTNL3 | FcεRIγ |
| TTP | CD80 | BTNL3 | DAP10 |
| TTP | CD80 | BTNL3 | DAP12 |
| TTP | CD80 | BTNL3 | CD32 |
| TTP | CD80 | BTNL3 | CD79a |
| TTP | CD80 | BTNL3 | CD79b |
| TTP | CD80 | NKG2D | CD8 |
| TTP | CD80 | NKG2D | CD3ζ |
| TTP | CD80 | NKG2D | CD3δ |
| TTP | CD80 | NKG2D | CD3γ |
| TTP | CD80 | NKG2D | CD3ε |
| TTP | CD80 | NKG2D | FcγRI-γ |
| TTP | CD80 | NKG2D | FcγRIII-γ |
| TTP | CD80 | NKG2D | FcεRIβ |
| TTP | CD80 | NKG2D | FcεRIγ |
| TTP | CD80 | NKG2D | DAP10 |
| TTP | CD80 | NKG2D | DAP12 |
| TTP | CD80 | NKG2D | CD32 |
| TTP | CD80 | NKG2D | CD79a |
| TTP | CD80 | NKG2D | CD79b |
| TTP | CD86 | CD28 | CD8 |
| TTP | CD86 | CD28 | CD3ζ |
| TTP | CD86 | CD28 | CD3δ |
| TTP | CD86 | CD28 | CD3γ |
| TTP | CD86 | CD28 | CD3ε |
| TTP | CD86 | CD28 | FcγRI-γ |
| TTP | CD86 | CD28 | FcγRIII-γ |
| TTP | CD86 | CD28 | FcεRIβ |
| TTP | CD86 | CD28 | FcεRIγ |
| TTP | CD86 | CD28 | DAP10 |
| TTP | CD86 | CD28 | DAP12 |
| TTP | CD86 | CD28 | CD32 |
| TTP | CD86 | CD28 | CD79a |
| TTP | CD86 | CD28 | CD79b |
| TTP | CD86 | CD8 | CD8 |
| TTP | CD86 | CD8 | CD3ζ |
| TTP | CD86 | CD8 | CD3δ |
| TTP | CD86 | CD8 | CD3γ |
| TTP | CD86 | CD8 | CD3ε |
| TTP | CD86 | CD8 | FcγRI-γ |
| TTP | CD86 | CD8 | FcγRIII-γ |
| TTP | CD86 | CD8 | FcεRIβ |
| TTP | CD86 | CD8 | FcεRIγ |
| TTP | CD86 | CD8 | DAP10 |
| TTP | CD86 | CD8 | DAP12 |
| TTP | CD86 | CD8 | CD32 |
| TTP | CD86 | CD8 | CD79a |
| TTP | CD86 | CD8 | CD79b |
| TTP | CD86 | CD4 | CD8 |
| TTP | CD86 | CD4 | CD3ζ |
| TTP | CD86 | CD4 | CD3δ |
| TTP | CD86 | CD4 | CD3γ |
| TTP | CD86 | CD4 | CD3ε |
| TTP | CD86 | CD4 | FcγRI-γ |
| TTP | CD86 | CD4 | FcγRIII-γ |
| TTP | CD86 | CD4 | FcεRIβ |
| TTP | CD86 | CD4 | FcεRIγ |
| TTP | CD86 | CD4 | DAP10 |
| TTP | CD86 | CD4 | DAP12 |

TABLE 3-continued

Third Generation CARs

| | Co-stimulatory Signal | Co-stimulatory Signal | Signal Domain |
|---|---|---|---|
| TTP | CD86 | CD4 | CD32 |
| TTP | CD86 | CD4 | CD79a |
| TTP | CD86 | CD4 | CD79b |
| TTP | CD86 | b2c | CD8 |
| TTP | CD86 | b2c | CD3ζ |
| TTP | CD86 | b2c | CD3δ |
| TTP | CD86 | b2c | CD3γ |
| TTP | CD86 | b2c | CD3ε |
| TTP | CD86 | b2c | FcγRI-γ |
| TTP | CD86 | b2c | FcγRIII-γ |
| TTP | CD86 | b2c | FcεRIβ |
| TTP | CD86 | b2c | FcεRIγ |
| TTP | CD86 | b2c | DAP10 |
| TTP | CD86 | b2c | DAP12 |
| TTP | CD86 | b2c | CD32 |
| TTP | CD86 | b2c | CD79a |
| TTP | CD86 | b2c | CD79b |
| TTP | CD86 | CD137/41BB | CD8 |
| TTP | CD86 | CD137/41BB | CD3ζ |
| TTP | CD86 | CD137/41BB | CD3δ |
| TTP | CD86 | CD137/41BB | CD3γ |
| TTP | CD86 | CD137/41BB | CD3ε |
| TTP | CD86 | CD137/41BB | FcγRI-γ |
| TTP | CD86 | CD137/41BB | FcγRIII-γ |
| TTP | CD86 | CD137/41BB | FcεRIβ |
| TTP | CD86 | CD137/41BB | FcεRIγ |
| TTP | CD86 | CD137/41BB | DAP10 |
| TTP | CD86 | CD137/41BB | DAP12 |
| TTP | CD86 | CD137/41BB | CD32 |
| TTP | CD86 | CD137/41BB | CD79a |
| TTP | CD86 | CD137/41BB | CD79b |
| TTP | CD86 | ICOS | CD8 |
| TTP | CD86 | ICOS | CD3ζ |
| TTP | CD86 | ICOS | CD3δ |
| TTP | CD86 | ICOS | CD3γ |
| TTP | CD86 | ICOS | CD3ε |
| TTP | CD86 | ICOS | FcγRI-γ |
| TTP | CD86 | ICOS | FcγRIII-γ |
| TTP | CD86 | ICOS | FcεRIβ |
| TTP | CD86 | ICOS | FcεRIγ |
| TTP | CD86 | ICOS | DAP10 |
| TTP | CD86 | ICOS | DAP12 |
| TTP | CD86 | ICOS | CD32 |
| TTP | CD86 | ICOS | CD79a |
| TTP | CD86 | ICOS | CD79b |
| TTP | CD86 | CD27 | CD8 |
| TTP | CD86 | CD27 | CD3ζ |
| TTP | CD86 | CD27 | CD3δ |
| TTP | CD86 | CD27 | CD3γ |
| TTP | CD86 | CD27 | CD3ε |
| TTP | CD86 | CD27 | FcγRI-γ |
| TTP | CD86 | CD27 | FcγRIII-γ |
| TTP | CD86 | CD27 | FcεRIβ |
| TTP | CD86 | CD27 | FcεRIγ |
| TTP | CD86 | CD27 | DAP10 |
| TTP | CD86 | CD27 | DAP12 |
| TTP | CD86 | CD27 | CD32 |
| TTP | CD86 | CD27 | CD79a |
| TTP | CD86 | CD27 | CD79b |
| TTP | CD86 | CD28δ | CD8 |
| TTP | CD86 | CD28δ | CD3ζ |
| TTP | CD86 | CD28δ | CD3δ |
| TTP | CD86 | CD28δ | CD3γ |
| TTP | CD86 | CD28δ | CD3ε |
| TTP | CD86 | CD28δ | FcγRI-γ |
| TTP | CD86 | CD28δ | FcγRIII-γ |
| TTP | CD86 | CD28δ | FcεRIβ |
| TTP | CD86 | CD28δ | FcεRIγ |
| TTP | CD86 | CD28δ | DAP10 |
| TTP | CD86 | CD28δ | DAP12 |
| TTP | CD86 | CD28δ | CD32 |
| TTP | CD86 | CD28δ | CD79a |
| TTP | CD86 | CD28δ | CD79b |
| TTP | CD86 | CD80 | CD8 |
| TTP | CD86 | CD80 | CD3ζ |

TABLE 3-continued

Third Generation CARs

| | Co-stimulatory Signal | Co-stimulatory Signal | Signal Domain |
|---|---|---|---|
| TTP | CD86 | CD80 | CD3δ |
| TTP | CD86 | CD80 | CD3γ |
| TTP | CD86 | CD80 | CD3ε |
| TTP | CD86 | CD80 | FcγRI-γ |
| TTP | CD86 | CD80 | FcγRIII-γ |
| TTP | CD86 | CD80 | FcεRIβ |
| TTP | CD86 | CD80 | FcεRIγ |
| TTP | CD86 | CD80 | DAP10 |
| TTP | CD86 | CD80 | DAP12 |
| TTP | CD86 | CD80 | CD32 |
| TTP | CD86 | CD80 | CD79a |
| TTP | CD86 | CD80 | CD79b |
| TTP | CD86 | CD86 | CD8 |
| TTP | CD86 | CD86 | CD3ζ |
| TTP | CD86 | CD86 | CD3δ |
| TTP | CD86 | CD86 | CD3γ |
| TTP | CD86 | CD86 | CD3ε |
| TTP | CD86 | CD86 | FcγRI-γ |
| TTP | CD86 | CD86 | FcγRIII-γ |
| TTP | CD86 | CD86 | FcεRIβ |
| TTP | CD86 | CD86 | FcεRIγ |
| TTP | CD86 | CD86 | DAP10 |
| TTP | CD86 | CD86 | DAP12 |
| TTP | CD86 | CD86 | CD32 |
| TTP | CD86 | CD86 | CD79a |
| TTP | CD86 | CD86 | CD79b |
| TTP | CD86 | OX40 | CD8 |
| TTP | CD86 | OX40 | CD3ζ |
| TTP | CD86 | OX40 | CD3δ |
| TTP | CD86 | OX40 | CD3γ |
| TTP | CD86 | OX40 | CD3ε |
| TTP | CD86 | OX40 | FcγRI-γ |
| TTP | CD86 | OX40 | FcγRIII-γ |
| TTP | CD86 | OX40 | FcεRIβ |
| TTP | CD86 | OX40 | FcεRIγ |
| TTP | CD86 | OX40 | DAP10 |
| TTP | CD86 | OX40 | DAP12 |
| TTP | CD86 | OX40 | CD32 |
| TTP | CD86 | OX40 | CD79a |
| TTP | CD86 | OX40 | CD79b |
| TTP | CD86 | DAP10 | CD8 |
| TTP | CD86 | DAP10 | CD3ζ |
| TTP | CD86 | DAP10 | CD3δ |
| TTP | CD86 | DAP10 | CD3γ |
| TTP | CD86 | DAP10 | CD3ε |
| TTP | CD86 | DAP10 | FcγRI-γ |
| TTP | CD86 | DAP10 | FcγRIII-γ |
| TTP | CD86 | DAP10 | FcεRIβ |
| TTP | CD86 | DAP10 | FcεRIγ |
| TTP | CD86 | DAP10 | DAP10 |
| TTP | CD86 | DAP10 | DAP12 |
| TTP | CD86 | DAP10 | CD32 |
| TTP | CD86 | DAP10 | CD79a |
| TTP | CD86 | DAP10 | CD79b |
| TTP | CD86 | DAP12 | CD8 |
| TTP | CD86 | DAP12 | CD3ζ |
| TTP | CD86 | DAP12 | CD3δ |
| TTP | CD86 | DAP12 | CD3γ |
| TTP | CD86 | DAP12 | CD3ε |
| TTP | CD86 | DAP12 | FcγRI-γ |
| TTP | CD86 | DAP12 | FcγRIII-γ |
| TTP | CD86 | DAP12 | FcεRIβ |
| TTP | CD86 | DAP12 | FcεRIγ |
| TTP | CD86 | DAP12 | DAP10 |
| TTP | CD86 | DAP12 | DAP12 |
| TTP | CD86 | DAP12 | CD32 |
| TTP | CD86 | DAP12 | CD79a |
| TTP | CD86 | DAP12 | CD79b |
| TTP | CD86 | MyD88 | CD8 |
| TTP | CD86 | MyD88 | CD3ζ |
| TTP | CD86 | MyD88 | CD3δ |
| TTP | CD86 | MyD88 | CD3γ |
| TTP | CD86 | MyD88 | CD3ε |
| TTP | CD86 | MyD88 | FcγRI-γ |
| TTP | CD86 | MyD88 | FcγRIII-γ |

TABLE 3-continued

Third Generation CARs

| | Co-stimulatory Signal | Co-stimulatory Signal | Signal Domain |
|---|---|---|---|
| TTP | CD86 | MyD88 | FcεRIβ |
| TTP | CD86 | MyD88 | FcεRIγ |
| TTP | CD86 | MyD88 | DAP10 |
| TTP | CD86 | MyD88 | DAP12 |
| TTP | CD86 | MyD88 | CD32 |
| TTP | CD86 | MyD88 | CD79a |
| TTP | CD86 | MyD88 | CD79b |
| TTP | CD86 | CD7 | CD8 |
| TTP | CD86 | CD7 | CD3ζ |
| TTP | CD86 | CD7 | CD3δ |
| TTP | CD86 | CD7 | CD3γ |
| TTP | CD86 | CD7 | CD3ε |
| TTP | CD86 | CD7 | FcγRI-γ |
| TTP | CD86 | CD7 | FcγRIII-γ |
| TTP | CD86 | CD7 | FcεRIβ |
| TTP | CD86 | CD7 | FcεRIγ |
| TTP | CD86 | CD7 | DAP10 |
| TTP | CD86 | CD7 | DAP12 |
| TTP | CD86 | CD7 | CD32 |
| TTP | CD86 | CD7 | CD79a |
| TTP | CD86 | CD7 | CD79b |
| TTP | CD86 | BTNL3 | CD8 |
| TTP | CD86 | BTNL3 | CD3ζ |
| TTP | CD86 | BTNL3 | CD3δ |
| TTP | CD86 | BTNL3 | CD3γ |
| TTP | CD86 | BTNL3 | CD3ε |
| TTP | CD86 | BTNL3 | FcγRI-γ |
| TTP | CD86 | BTNL3 | FcγRIII-γ |
| TTP | CD86 | BTNL3 | FcεRIβ |
| TTP | CD86 | BTNL3 | FcεRIγ |
| TTP | CD86 | BTNL3 | DAP10 |
| TTP | CD86 | BTNL3 | DAP12 |
| TTP | CD86 | BTNL3 | CD32 |
| TTP | CD86 | BTNL3 | CD79a |
| TTP | CD86 | BTNL3 | CD79b |
| TTP | CD86 | NKG2D | CD8 |
| TTP | CD86 | NKG2D | CD3ζ |
| TTP | CD86 | NKG2D | CD3δ |
| TTP | CD86 | NKG2D | CD3γ |
| TTP | CD86 | NKG2D | CD3ε |
| TTP | CD86 | NKG2D | FcγRI-γ |
| TTP | CD86 | NKG2D | FcγRIII-γ |
| TTP | CD86 | NKG2D | FcεRIβ |
| TTP | CD86 | NKG2D | FcεRIγ |
| TTP | CD86 | NKG2D | DAP10 |
| TTP | CD86 | NKG2D | DAP12 |
| TTP | CD86 | NKG2D | CD32 |
| TTP | CD86 | NKG2D | CD79a |
| TTP | CD86 | NKG2D | CD79b |
| TTP | OX40 | CD28 | CD8 |
| TTP | OX40 | CD28 | CD3ζ |
| TTP | OX40 | CD28 | CD3δ |
| TTP | OX40 | CD28 | CD3γ |
| TTP | OX40 | CD28 | CD3ε |
| TTP | OX40 | CD28 | FcγRI-γ |
| TTP | OX40 | CD28 | FcγRIII-γ |
| TTP | OX40 | CD28 | FcεRIβ |
| TTP | OX40 | CD28 | FcεRIγ |
| TTP | OX40 | CD28 | DAP10 |
| TTP | OX40 | CD28 | DAP12 |
| TTP | OX40 | CD28 | CD32 |
| TTP | OX40 | CD28 | CD79a |
| TTP | OX40 | CD28 | CD79b |
| TTP | OX40 | CD8 | CD8 |
| TTP | OX40 | CD8 | CD3ζ |
| TTP | OX40 | CD8 | CD3δ |
| TTP | OX40 | CD8 | CD3γ |
| TTP | OX40 | CD8 | CD3ε |
| TTP | OX40 | CD8 | FcγRI-γ |
| TTP | OX40 | CD8 | FcγRIII-γ |
| TTP | OX40 | CD8 | FcεRIβ |
| TTP | OX40 | CD8 | FcεRIγ |
| TTP | OX40 | CD8 | DAP10 |
| TTP | OX40 | CD8 | DAP12 |
| TTP | OX40 | CD8 | CD32 |

TABLE 3-continued

Third Generation CARs

| | Co-stimulatory Signal | Co-stimulatory Signal | Signal Domain |
|---|---|---|---|
| TTP | OX40 | CD8 | CD79a |
| TTP | OX40 | CD8 | CD79b |
| TTP | OX40 | CD4 | CD8 |
| TTP | OX40 | CD4 | CD3ζ |
| TTP | OX40 | CD4 | CD3δ |
| TTP | OX40 | CD4 | CD3γ |
| TTP | OX40 | CD4 | CD3ε |
| TTP | OX40 | CD4 | FcγRI-γ |
| TTP | OX40 | CD4 | FcγRIII-γ |
| TTP | OX40 | CD4 | FcεRIβ |
| TTP | OX40 | CD4 | FcεRIγ |
| TTP | OX40 | CD4 | DAP10 |
| TTP | OX40 | CD4 | DAP12 |
| TTP | OX40 | CD4 | CD32 |
| TTP | OX40 | CD4 | CD79a |
| TTP | OX40 | CD4 | CD79b |
| TTP | OX40 | b2c | CD8 |
| TTP | OX40 | b2c | CD3ζ |
| TTP | OX40 | b2c | CD3δ |
| TTP | OX40 | b2c | CD3γ |
| TTP | OX40 | b2c | CD3ε |
| TTP | OX40 | b2c | FcγRI-γ |
| TTP | OX40 | b2c | FcγRIII-γ |
| TTP | OX40 | b2c | FcεRIβ |
| TTP | OX40 | b2c | FcεRIγ |
| TTP | OX40 | b2c | DAP10 |
| TTP | OX40 | b2c | DAP12 |
| TTP | OX40 | b2c | CD32 |
| TTP | OX40 | b2c | CD79a |
| TTP | OX40 | b2c | CD79b |
| TTP | OX40 | CD137/41BB | CD8 |
| TTP | OX40 | CD137/41BB | CD3ζ |
| TTP | OX40 | CD137/41BB | CD3δ |
| TTP | OX40 | CD137/41BB | CD3γ |
| TTP | OX40 | CD137/41BB | CD3ε |
| TTP | OX40 | CD137/41BB | FcγRI-γ |
| TTP | OX40 | CD137/41BB | FcγRIII-γ |
| TTP | OX40 | CD137/41BB | FcεRIβ |
| TTP | OX40 | CD137/41BB | FcεRIγ |
| TTP | OX40 | CD137/41BB | DAP10 |
| TTP | OX40 | CD137/41BB | DAP12 |
| TTP | OX40 | CD137/41BB | CD32 |
| TTP | OX40 | CD137/41BB | CD79a |
| TTP | OX40 | CD137/41BB | CD79b |
| TTP | OX40 | ICOS | CD8 |
| TTP | OX40 | ICOS | CD3ζ |
| TTP | OX40 | ICOS | CD3δ |
| TTP | OX40 | ICOS | CD3γ |
| TTP | OX40 | ICOS | CD3ε |
| TTP | OX40 | ICOS | FcγRI-γ |
| TTP | OX40 | ICOS | FcγRIII-γ |
| TTP | OX40 | ICOS | FcεRIβ |
| TTP | OX40 | ICOS | FcεRIγ |
| TTP | OX40 | ICOS | DAP10 |
| TTP | OX40 | ICOS | DAP12 |
| TTP | OX40 | ICOS | CD32 |
| TTP | OX40 | ICOS | CD79a |
| TTP | OX40 | ICOS | CD79b |
| TTP | OX40 | CD27 | CD8 |
| TTP | OX40 | CD27 | CD3ζ |
| TTP | OX40 | CD27 | CD3δ |
| TTP | OX40 | CD27 | CD3γ |
| TTP | OX40 | CD27 | CD3ε |
| TTP | OX40 | CD27 | FcγRI-γ |
| TTP | OX40 | CD27 | FcγRIII-γ |
| TTP | OX40 | CD27 | FcεRIβ |
| TTP | OX40 | CD27 | FcεRIγ |
| TTP | OX40 | CD27 | DAP10 |
| TTP | OX40 | CD27 | DAP12 |
| TTP | OX40 | CD27 | CD32 |
| TTP | OX40 | CD27 | CD79a |
| TTP | OX40 | CD27 | CD79b |
| TTP | OX40 | CD28δ | CD8 |
| TTP | OX40 | CD28δ | CD3ζ |
| TTP | OX40 | CD28δ | CD3δ |

TABLE 3-continued

| Third Generation CARs | | | |
|---|---|---|---|
| | Co-stimulatory Signal | Co-stimulatory Signal | Signal Domain |
| TTP | OX40 | CD28δ | CD3γ |
| TTP | OX40 | CD28δ | CD3ε |
| TTP | OX40 | CD28δ | FcγRI-γ |
| TTP | OX40 | CD28δ | FcγRIII-γ |
| TTP | OX40 | CD28δ | FcεRIβ |
| TTP | OX40 | CD28δ | FcεRIγ |
| TTP | OX40 | CD28δ | DAP10 |
| TTP | OX40 | CD28δ | DAP12 |
| TTP | OX40 | CD28δ | CD32 |
| TTP | OX40 | CD28δ | CD79a |
| TTP | OX40 | CD28δ | CD79b |
| TTP | OX40 | CD80 | CD8 |
| TTP | OX40 | CD80 | CD3ζ |
| TTP | OX40 | CD80 | CD3δ |
| TTP | OX40 | CD80 | CD3γ |
| TTP | OX40 | CD80 | CD3ε |
| TTP | OX40 | CD80 | FcγRI-γ |
| TTP | OX40 | CD80 | FcγRIII-γ |
| TTP | OX40 | CD80 | FcεRIβ |
| TTP | OX40 | CD80 | FcεRIγ |
| TTP | OX40 | CD80 | DAP10 |
| TTP | OX40 | CD80 | DAP12 |
| TTP | OX40 | CD80 | CD32 |
| TTP | OX40 | CD80 | CD79a |
| TTP | OX40 | CD80 | CD79b |
| TTP | OX40 | CD86 | CD8 |
| TTP | OX40 | CD86 | CD3ζ |
| TTP | OX40 | CD86 | CD3δ |
| TTP | OX40 | CD86 | CD3γ |
| TTP | OX40 | CD86 | CD3ε |
| TTP | OX40 | CD86 | FcγRI-γ |
| TTP | OX40 | CD86 | FcγRIII-γ |
| TTP | OX40 | CD86 | FcεRIβ |
| TTP | OX40 | CD86 | FcεRIγ |
| TTP | OX40 | CD86 | DAP10 |
| TTP | OX40 | CD86 | DAP12 |
| TTP | OX40 | CD86 | CD32 |
| TTP | OX40 | CD86 | CD79a |
| TTP | OX40 | CD86 | CD79b |
| TTP | OX40 | OX40 | CD8 |
| TTP | OX40 | OX40 | CD3ζ |
| TTP | OX40 | OX40 | CD3δ |
| TTP | OX40 | OX40 | CD3γ |
| TTP | OX40 | OX40 | CD3ε |
| TTP | OX40 | OX40 | FcγRI-γ |
| TTP | OX40 | OX40 | FcγRIII-γ |
| TTP | OX40 | OX40 | FcεRIβ |
| TTP | OX40 | OX40 | FcεRIγ |
| TTP | OX40 | OX40 | DAP10 |
| TTP | OX40 | OX40 | DAP12 |
| TTP | OX40 | OX40 | CD32 |
| TTP | OX40 | OX40 | CD79a |
| TTP | OX40 | OX40 | CD79b |
| TTP | OX40 | DAP10 | CD8 |
| TTP | OX40 | DAP10 | CD3ζ |
| TTP | OX40 | DAP10 | CD3δ |
| TTP | OX40 | DAP10 | CD3γ |
| TTP | OX40 | DAP10 | CD3ε |
| TTP | OX40 | DAP10 | FcγRI-γ |
| TTP | OX40 | DAP10 | FcγRIII-γ |
| TTP | OX40 | DAP10 | FcεRIβ |
| TTP | OX40 | DAP10 | FcεRIγ |
| TTP | OX40 | DAP10 | DAP10 |
| TTP | OX40 | DAP10 | DAP12 |
| TTP | OX40 | DAP10 | CD32 |
| TTP | OX40 | DAP10 | CD79a |
| TTP | OX40 | DAP10 | CD79b |
| TTP | OX40 | DAP12 | CD8 |
| TTP | OX40 | DAP12 | CD3ζ |
| TTP | OX40 | DAP12 | CD3δ |
| TTP | OX40 | DAP12 | CD3γ |
| TTP | OX40 | DAP12 | CD3ε |
| TTP | OX40 | DAP12 | FcγRI-γ |
| TTP | OX40 | DAP12 | FcγRIII-γ |
| TTP | OX40 | DAP12 | FcεRIβ |

TABLE 3-continued

| Third Generation CARs | | | |
|---|---|---|---|
| | Co-stimulatory Signal | Co-stimulatory Signal | Signal Domain |
| TTP | OX40 | DAP12 | FcεRIγ |
| TTP | OX40 | DAP12 | DAP10 |
| TTP | OX40 | DAP12 | DAP12 |
| TTP | OX40 | DAP12 | CD32 |
| TTP | OX40 | DAP12 | CD79a |
| TTP | OX40 | DAP12 | CD79b |
| TTP | OX40 | MyD88 | CD8 |
| TTP | OX40 | MyD88 | CD3ζ |
| TTP | OX40 | MyD88 | CD3δ |
| TTP | OX40 | MyD88 | CD3γ |
| TTP | OX40 | MyD88 | CD3ε |
| TTP | OX40 | MyD88 | FcγRI-γ |
| TTP | OX40 | MyD88 | FcγRIII-γ |
| TTP | OX40 | MyD88 | FcεRIβ |
| TTP | OX40 | MyD88 | FcεRIγ |
| TTP | OX40 | MyD88 | DAP10 |
| TTP | OX40 | MyD88 | DAP12 |
| TTP | OX40 | MyD88 | CD32 |
| TTP | OX40 | MyD88 | CD79a |
| TTP | OX40 | MyD88 | CD79b |
| TTP | OX40 | CD7 | CD8 |
| TTP | OX40 | CD7 | CD3ζ |
| TTP | OX40 | CD7 | CD3δ |
| TTP | OX40 | CD7 | CD3γ |
| TTP | OX40 | CD7 | CD3ε |
| TTP | OX40 | CD7 | FcγRI-γ |
| TTP | OX40 | CD7 | FcγRIII-γ |
| TTP | OX40 | CD7 | FcεRIβ |
| TTP | OX40 | CD7 | FcεRIγ |
| TTP | OX40 | CD7 | DAP10 |
| TTP | OX40 | CD7 | DAP12 |
| TTP | OX40 | CD7 | CD32 |
| TTP | OX40 | CD7 | CD79a |
| TTP | OX40 | CD7 | CD79b |
| TTP | OX40 | BTNL3 | CD8 |
| TTP | OX40 | BTNL3 | CD3ζ |
| TTP | OX40 | BTNL3 | CD3δ |
| TTP | OX40 | BTNL3 | CD3γ |
| TTP | OX40 | BTNL3 | CD3ε |
| TTP | OX40 | BTNL3 | FcγRI-γ |
| TTP | OX40 | BTNL3 | FcγRIII-γ |
| TTP | OX40 | BTNL3 | FcεRIβ |
| TTP | OX40 | BTNL3 | FcεRIγ |
| TTP | OX40 | BTNL3 | DAP10 |
| TTP | OX40 | BTNL3 | DAP12 |
| TTP | OX40 | BTNL3 | CD32 |
| TTP | OX40 | BTNL3 | CD79a |
| TTP | OX40 | BTNL3 | CD79b |
| TTP | OX40 | NKG2D | CD8 |
| TTP | OX40 | NKG2D | CD3ζ |
| TTP | OX40 | NKG2D | CD3δ |
| TTP | OX40 | NKG2D | CD3γ |
| TTP | OX40 | NKG2D | CD3ε |
| TTP | OX40 | NKG2D | FcγRI-γ |
| TTP | OX40 | NKG2D | FcγRIII-γ |
| TTP | OX40 | NKG2D | FcεRIβ |
| TTP | OX40 | NKG2D | FcεRIγ |
| TTP | OX40 | NKG2D | DAP10 |
| TTP | OX40 | NKG2D | DAP12 |
| TTP | OX40 | NKG2D | CD32 |
| TTP | OX40 | NKG2D | CD79a |
| TTP | OX40 | NKG2D | CD79b |
| TTP | DAP10 | CD28 | CD8 |
| TTP | DAP10 | CD28 | CD3ζ |
| TTP | DAP10 | CD28 | CD3δ |
| TTP | DAP10 | CD28 | CD3γ |
| TTP | DAP10 | CD28 | CD3ε |
| TTP | DAP10 | CD28 | FcγRI-γ |
| TTP | DAP10 | CD28 | FcγRIII-γ |
| TTP | DAP10 | CD28 | FcεRIβ |
| TTP | DAP10 | CD28 | FcεRIγ |
| TTP | DAP10 | CD28 | DAP10 |
| TTP | DAP10 | CD28 | DAP12 |
| TTP | DAP10 | CD28 | CD32 |
| TTP | DAP10 | CD28 | CD79a |

TABLE 3-continued

Third Generation CARs

| | Co-stimulatory Signal | Co-stimulatory Signal | Signal Domain |
|---|---|---|---|
| TTP | DAP10 | CD28 | CD79b |
| TTP | DAP10 | CD8 | CD8 |
| TTP | DAP10 | CD8 | CD3ζ |
| TTP | DAP10 | CD8 | CD3δ |
| TTP | DAP10 | CD8 | CD3γ |
| TTP | DAP10 | CD8 | CD3ε |
| TTP | DAP10 | CD8 | FcγRI-γ |
| TTP | DAP10 | CD8 | FcγRIII-γ |
| TTP | DAP10 | CD8 | FcεRIβ |
| TTP | DAP10 | CD8 | FcεRIγ |
| TTP | DAP10 | CD8 | DAP10 |
| TTP | DAP10 | CD8 | DAP12 |
| TTP | DAP10 | CD8 | CD32 |
| TTP | DAP10 | CD8 | CD79a |
| TTP | DAP10 | CD8 | CD79b |
| TTP | DAP10 | CD4 | CD8 |
| TTP | DAP10 | CD4 | CD3ζ |
| TTP | DAP10 | CD4 | CD3δ |
| TTP | DAP10 | CD4 | CD3γ |
| TTP | DAP10 | CD4 | CD3ε |
| TTP | DAP10 | CD4 | FcγRI-γ |
| TTP | DAP10 | CD4 | FcγRIII-γ |
| TTP | DAP10 | CD4 | FcεRIβ |
| TTP | DAP10 | CD4 | FcεRIγ |
| TTP | DAP10 | CD4 | DAP10 |
| TTP | DAP10 | CD4 | DAP12 |
| TTP | DAP10 | CD4 | CD32 |
| TTP | DAP10 | CD4 | CD79a |
| TTP | DAP10 | CD4 | CD79b |
| TTP | DAP10 | b2c | CD8 |
| TTP | DAP10 | b2c | CD3ζ |
| TTP | DAP10 | b2c | CD3δ |
| TTP | DAP10 | b2c | CD3γ |
| TTP | DAP10 | b2c | CD3ε |
| TTP | DAP10 | b2c | FcγRI-γ |
| TTP | DAP10 | b2c | FcγRIII-γ |
| TTP | DAP10 | b2c | FcεRIβ |
| TTP | DAP10 | b2c | FcεRIγ |
| TTP | DAP10 | b2c | DAP10 |
| TTP | DAP10 | b2c | DAP12 |
| TTP | DAP10 | b2c | CD32 |
| TTP | DAP10 | b2c | CD79a |
| TTP | DAP10 | b2c | CD79b |
| TTP | DAP10 | CD137/41BB | CD8 |
| TTP | DAP10 | CD137/41BB | CD3ζ |
| TTP | DAP10 | CD137/41BB | CD3δ |
| TTP | DAP10 | CD137/41BB | CD3γ |
| TTP | DAP10 | CD137/41BB | CD3ε |
| TTP | DAP10 | CD137/41BB | FcγRI-γ |
| TTP | DAP10 | CD137/41BB | FcγRIII-γ |
| TTP | DAP10 | CD137/41BB | FcεRIβ |
| TTP | DAP10 | CD137/41BB | FcεRIγ |
| TTP | DAP10 | CD137/41BB | DAP10 |
| TTP | DAP10 | CD137/41BB | DAP12 |
| TTP | DAP10 | CD137/41BB | CD32 |
| TTP | DAP10 | CD137/41BB | CD79a |
| TTP | DAP10 | CD137/41BB | CD79b |
| TTP | DAP10 | ICOS | CD8 |
| TTP | DAP10 | ICOS | CD3ζ |
| TTP | DAP10 | ICOS | CD3δ |
| TTP | DAP10 | ICOS | CD3γ |
| TTP | DAP10 | ICOS | CD3ε |
| TTP | DAP10 | ICOS | FcγRI-γ |
| TTP | DAP10 | ICOS | FcγRIII-γ |
| TTP | DAP10 | ICOS | FcεRIβ |
| TTP | DAP10 | ICOS | FcεRIγ |
| TTP | DAP10 | ICOS | DAP10 |
| TTP | DAP10 | ICOS | DAP12 |
| TTP | DAP10 | ICOS | CD32 |
| TTP | DAP10 | ICOS | CD79a |
| TTP | DAP10 | ICOS | CD79b |
| TTP | DAP10 | CD27 | CD8 |
| TTP | DAP10 | CD27 | CD3ζ |
| TTP | DAP10 | CD27 | CD3δ |
| TTP | DAP10 | CD27 | CD3γ |

TABLE 3-continued

Third Generation CARs

| | Co-stimulatory Signal | Co-stimulatory Signal | Signal Domain |
|---|---|---|---|
| TTP | DAP10 | CD27 | CD3ε |
| TTP | DAP10 | CD27 | FcγRI-γ |
| TTP | DAP10 | CD27 | FcγRIII-γ |
| TTP | DAP10 | CD27 | FcεRIβ |
| TTP | DAP10 | CD27 | FcεRIγ |
| TTP | DAP10 | CD27 | DAP10 |
| TTP | DAP10 | CD27 | DAP12 |
| TTP | DAP10 | CD27 | CD32 |
| TTP | DAP10 | CD27 | CD79a |
| TTP | DAP10 | CD27 | CD79b |
| TTP | DAP10 | CD28δ | CD8 |
| TTP | DAP10 | CD28δ | CD3ζ |
| TTP | DAP10 | CD28δ | CD3δ |
| TTP | DAP10 | CD28δ | CD3γ |
| TTP | DAP10 | CD28δ | CD3ε |
| TTP | DAP10 | CD28δ | FcγRI-γ |
| TTP | DAP10 | CD28δ | FcγRIII-γ |
| TTP | DAP10 | CD28δ | FcεRIβ |
| TTP | DAP10 | CD28δ | FcεRIγ |
| TTP | DAP10 | CD28δ | DAP10 |
| TTP | DAP10 | CD28δ | DAP12 |
| TTP | DAP10 | CD28δ | CD32 |
| TTP | DAP10 | CD28δ | CD79a |
| TTP | DAP10 | CD28δ | CD79b |
| TTP | DAP10 | CD80 | CD8 |
| TTP | DAP10 | CD80 | CD3ζ |
| TTP | DAP10 | CD80 | CD3δ |
| TTP | DAP10 | CD80 | CD3γ |
| TTP | DAP10 | CD80 | CD3ε |
| TTP | DAP10 | CD80 | FcγRI-γ |
| TTP | DAP10 | CD80 | FcγRIII-γ |
| TTP | DAP10 | CD80 | FcεRIβ |
| TTP | DAP10 | CD80 | FcεRIγ |
| TTP | DAP10 | CD80 | DAP10 |
| TTP | DAP10 | CD80 | DAP12 |
| TTP | DAP10 | CD80 | CD32 |
| TTP | DAP10 | CD80 | CD79a |
| TTP | DAP10 | CD80 | CD79b |
| TTP | DAP10 | CD86 | CD8 |
| TTP | DAP10 | CD86 | CD3ζ |
| TTP | DAP10 | CD86 | CD3δ |
| TTP | DAP10 | CD86 | CD3γ |
| TTP | DAP10 | CD86 | CD3ε |
| TTP | DAP10 | CD86 | FcγRI-γ |
| TTP | DAP10 | CD86 | FcγRIII-γ |
| TTP | DAP10 | CD86 | FcγRIβ |
| TTP | DAP10 | CD86 | FcγRIγ |
| TTP | DAP10 | CD86 | DAP10 |
| TTP | DAP10 | CD86 | DAP12 |
| TTP | DAP10 | CD86 | CD32 |
| TTP | DAP10 | CD86 | CD79a |
| TTP | DAP10 | CD86 | CD79b |
| TTP | DAP10 | OX40 | CD8 |
| TTP | DAP10 | OX40 | CD3ζ |
| TTP | DAP10 | OX40 | CD3δ |
| TTP | DAP10 | OX40 | CD3γ |
| TTP | DAP10 | OX40 | CD3ε |
| TTP | DAP10 | OX40 | FcγRI-γ |
| TTP | DAP10 | OX40 | FcγRIII-γ |
| TTP | DAP10 | OX40 | FcεRIβ |
| TTP | DAP10 | OX40 | FcεRIγ |
| TTP | DAP10 | OX40 | DAP10 |
| TTP | DAP10 | OX40 | DAP12 |
| TTP | DAP10 | OX40 | CD32 |
| TTP | DAP10 | OX40 | CD79a |
| TTP | DAP10 | OX40 | CD79b |
| TTP | DAP10 | DAP10 | CD8 |
| TTP | DAP10 | DAP10 | CD3ζ |
| TTP | DAP10 | DAP10 | CD3δ |
| TTP | DAP10 | DAP10 | CD3γ |
| TTP | DAP10 | DAP10 | CD3ε |
| TTP | DAP10 | DAP10 | FcγRI-γ |
| TTP | DAP10 | DAP10 | FcγRIII-γ |
| TTP | DAP10 | DAP10 | FcεRIβ |
| TTP | DAP10 | DAP10 | FcεRIγ |

TABLE 3-continued

Third Generation CARs

| | Co-stimulatory Signal | Co-stimulatory Signal | Signal Domain |
|---|---|---|---|
| TTP | DAP10 | DAP10 | DAP10 |
| TTP | DAP10 | DAP10 | DAP12 |
| TTP | DAP10 | DAP10 | CD32 |
| TTP | DAP10 | DAP10 | CD79a |
| TTP | DAP10 | DAP10 | CD79b |
| TTP | DAP10 | DAP12 | CD8 |
| TTP | DAP10 | DAP12 | CD3ζ |
| TTP | DAP10 | DAP12 | CD3δ |
| TTP | DAP10 | DAP12 | CD3γ |
| TTP | DAP10 | DAP12 | CD3ε |
| TTP | DAP10 | DAP12 | FcγRI-γ |
| TTP | DAP10 | DAP12 | FcγRIII-γ |
| TTP | DAP10 | DAP12 | FcεRIβ |
| TTP | DAP10 | DAP12 | FcεRIγ |
| TTP | DAP10 | DAP12 | DAP10 |
| TTP | DAP10 | DAP12 | DAP12 |
| TTP | DAP10 | DAP12 | CD32 |
| TTP | DAP10 | DAP12 | CD79a |
| TTP | DAP10 | DAP12 | CD79b |
| TTP | DAP10 | MyD88 | CD8 |
| TTP | DAP10 | MyD88 | CD3ζ |
| TTP | DAP10 | MyD88 | CD3δ |
| TTP | DAP10 | MyD88 | CD3γ |
| TTP | DAP10 | MyD88 | CD3ε |
| TTP | DAP10 | MyD88 | FcγRI-γ |
| TTP | DAP10 | MyD88 | FcγRIII-γ |
| TTP | DAP10 | MyD88 | FcεRIβ |
| TTP | DAP10 | MyD88 | FcεRIγ |
| TTP | DAP10 | MyD88 | DAP10 |
| TTP | DAP10 | MyD88 | DAP12 |
| TTP | DAP10 | MyD88 | CD32 |
| TTP | DAP10 | MyD88 | CD79a |
| TTP | DAP10 | MyD88 | CD79b |
| TTP | DAP10 | CD7 | CD8 |
| TTP | DAP10 | CD7 | CD3ζ |
| TTP | DAP10 | CD7 | CD3δ |
| TTP | DAP10 | CD7 | CD3γ |
| TTP | DAP10 | CD7 | CD3ε |
| TTP | DAP10 | CD7 | FcγRI-γ |
| TTP | DAP10 | CD7 | FcγRIII-γ |
| TTP | DAP10 | CD7 | FcεRIβ |
| TTP | DAP10 | CD7 | FcεRIγ |
| TTP | DAP10 | CD7 | DAP10 |
| TTP | DAP10 | CD7 | DAP12 |
| TTP | DAP10 | CD7 | CD32 |
| TTP | DAP10 | CD7 | CD79a |
| TTP | DAP10 | CD7 | CD79b |
| TTP | DAP10 | BTNL3 | CD8 |
| TTP | DAP10 | BTNL3 | CD3ζ |
| TTP | DAP10 | BTNL3 | CD3δ |
| TTP | DAP10 | BTNL3 | CD3γ |
| TTP | DAP10 | BTNL3 | CD3ε |
| TTP | DAP10 | BTNL3 | FcγRI-γ |
| TTP | DAP10 | BTNL3 | FcγRIII-γ |
| TTP | DAP10 | BTNL3 | FcεRIβ |
| TTP | DAP10 | BTNL3 | FcεRIγ |
| TTP | DAP10 | BTNL3 | DAP10 |
| TTP | DAP10 | BTNL3 | DAP12 |
| TTP | DAP10 | BTNL3 | CD32 |
| TTP | DAP10 | BTNL3 | CD79a |
| TTP | DAP10 | BTNL3 | CD79b |
| TTP | DAP10 | NKG2D | CD8 |
| TTP | DAP10 | NKG2D | CD3ζ |
| TTP | DAP10 | NKG2D | CD3δ |
| TTP | DAP10 | NKG2D | CD3γ |
| TTP | DAP10 | NKG2D | CD3ε |
| TTP | DAP10 | NKG2D | FcγRI-γ |
| TTP | DAP10 | NKG2D | FcγRIII-γ |
| TTP | DAP10 | NKG2D | FcεRIβ |
| TTP | DAP10 | NKG2D | FcεRIγ |
| TTP | DAP10 | NKG2D | DAP10 |
| TTP | DAP10 | NKG2D | DAP12 |
| TTP | DAP10 | NKG2D | CD32 |
| TTP | DAP10 | NKG2D | CD79a |
| TTP | DAP10 | NKG2D | CD79b |

TABLE 3-continued

Third Generation CARs

| | Co-stimulatory Signal | Co-stimulatory Signal | Signal Domain |
|---|---|---|---|
| TTP | DAP12 | CD28 | CD8 |
| TTP | DAP12 | CD28 | CD3ζ |
| TTP | DAP12 | CD28 | CD3δ |
| TTP | DAP12 | CD28 | CD3γ |
| TTP | DAP12 | CD28 | CD3ε |
| TTP | DAP12 | CD28 | FcγRI-γ |
| TTP | DAP12 | CD28 | FcγRIII-γ |
| TTP | DAP12 | CD28 | FcεRIβ |
| TTP | DAP12 | CD28 | FcεRIγ |
| TTP | DAP12 | CD28 | DAP10 |
| TTP | DAP12 | CD28 | DAP12 |
| TTP | DAP12 | CD28 | CD32 |
| TTP | DAP12 | CD28 | CD79a |
| TTP | DAP12 | CD28 | CD79b |
| TTP | DAP12 | CD8 | CD8 |
| TTP | DAP12 | CD8 | CD3ζ |
| TTP | DAP12 | CD8 | CD3δ |
| TTP | DAP12 | CD8 | CD3γ |
| TTP | DAP12 | CD8 | CD3ε |
| TTP | DAP12 | CD8 | FcγRI-γ |
| TTP | DAP12 | CD8 | FcγRIII-γ |
| TTP | DAP12 | CD8 | FcεRIβ |
| TTP | DAP12 | CD8 | FcεRIγ |
| TTP | DAP12 | CD8 | DAP10 |
| TTP | DAP12 | CD8 | DAP12 |
| TTP | DAP12 | CD8 | CD32 |
| TTP | DAP12 | CD8 | CD79a |
| TTP | DAP12 | CD8 | CD79b |
| TTP | DAP12 | CD4 | CD8 |
| TTP | DAP12 | CD4 | CD3ζ |
| TTP | DAP12 | CD4 | CD3δ |
| TTP | DAP12 | CD4 | CD3γ |
| TTP | DAP12 | CD4 | CD3ε |
| TTP | DAP12 | CD4 | FcγRI-γ |
| TTP | DAP12 | CD4 | FcγRIII-γ |
| TTP | DAP12 | CD4 | FcεRIβ |
| TTP | DAP12 | CD4 | FcεRIγ |
| TTP | DAP12 | CD4 | DAP10 |
| TTP | DAP12 | CD4 | DAP12 |
| TTP | DAP12 | CD4 | CD32 |
| TTP | DAP12 | CD4 | CD79a |
| TTP | DAP12 | CD4 | CD79b |
| TTP | DAP12 | b2c | CD8 |
| TTP | DAP12 | b2c | CD3ζ |
| TTP | DAP12 | b2c | CD3δ |
| TTP | DAP12 | b2c | CD3γ |
| TTP | DAP12 | b2c | CD3ε |
| TTP | DAP12 | b2c | FcγRI-γ |
| TTP | DAP12 | b2c | FcγRIII-γ |
| TTP | DAP12 | b2c | FcεRIβ |
| TTP | DAP12 | b2c | FcεRIγ |
| TTP | DAP12 | b2c | DAP10 |
| TTP | DAP12 | b2c | DAP12 |
| TTP | DAP12 | b2c | CD32 |
| TTP | DAP12 | b2c | CD79a |
| TTP | DAP12 | b2c | CD79b |
| TTP | DAP12 | CD137/41BB | CD8 |
| TTP | DAP12 | CD137/41BB | CD3ζ |
| TTP | DAP12 | CD137/41BB | CD3δ |
| TTP | DAP12 | CD137/41BB | CD3γ |
| TTP | DAP12 | CD137/41BB | CD3ε |
| TTP | DAP12 | CD137/41BB | FcγRI-γ |
| TTP | DAP12 | CD137/41BB | FcγRIII-γ |
| TTP | DAP12 | CD137/41BB | FcεRIβ |
| TTP | DAP12 | CD137/41BB | FcεRIγ |
| TTP | DAP12 | CD137/41BB | DAP10 |
| TTP | DAP12 | CD137/41BB | DAP12 |
| TTP | DAP12 | CD137/41BB | CD32 |
| TTP | DAP12 | CD137/41BB | CD79a |
| TTP | DAP12 | CD137/41BB | CD79b |
| TTP | DAP12 | ICOS | CD8 |
| TTP | DAP12 | ICOS | CD3ζ |
| TTP | DAP12 | ICOS | CD3δ |
| TTP | DAP12 | ICOS | CD3γ |
| TTP | DAP12 | ICOS | CD3ε |

TABLE 3-continued

| Third Generation CARs | | | |
|---|---|---|---|
| | Co-stimulatory Signal | Co-stimulatory Signal | Signal Domain |
| TTP | DAP12 | ICOS | FcγRI-γ |
| TTP | DAP12 | ICOS | FcγRIII-γ |
| TTP | DAP12 | ICOS | FcεRIβ |
| TTP | DAP12 | ICOS | FcεRIγ |
| TTP | DAP12 | ICOS | DAP10 |
| TTP | DAP12 | ICOS | DAP12 |
| TTP | DAP12 | ICOS | CD32 |
| TTP | DAP12 | ICOS | CD79a |
| TTP | DAP12 | ICOS | CD79b |
| TTP | DAP12 | CD27 | CD8 |
| TTP | DAP12 | CD27 | CD3ζ |
| TTP | DAP12 | CD27 | CD3δ |
| TTP | DAP12 | CD27 | CD3γ |
| TTP | DAP12 | CD27 | CD3ε |
| TTP | DAP12 | CD27 | FcγRI-γ |
| TTP | DAP12 | CD27 | FcγRIII-γ |
| TTP | DAP12 | CD27 | FcεRIβ |
| TTP | DAP12 | CD27 | FcεRIγ |
| TTP | DAP12 | CD27 | DAP10 |
| TTP | DAP12 | CD27 | DAP12 |
| TTP | DAP12 | CD27 | CD32 |
| TTP | DAP12 | CD27 | CD79a |
| TTP | DAP12 | CD27 | CD79b |
| TTP | DAP12 | CD28δ | CD8 |
| TTP | DAP12 | CD28δ | CD3ζ |
| TTP | DAP12 | CD28δ | CD3δ |
| TTP | DAP12 | CD28δ | CD3γ |
| TTP | DAP12 | CD28δ | CD3ε |
| TTP | DAP12 | CD28δ | FcγRI-γ |
| TTP | DAP12 | CD28δ | FcγRIII-γ |
| TTP | DAP12 | CD28δ | FcεRIβ |
| TTP | DAP12 | CD28δ | FcεRIγ |
| TTP | DAP12 | CD28δ | DAP10 |
| TTP | DAP12 | CD28δ | DAP12 |
| TTP | DAP12 | CD28δ | CD32 |
| TTP | DAP12 | CD28δ | CD79a |
| TTP | DAP12 | CD28δ | CD79b |
| TTP | DAP12 | CD80 | CD8 |
| TTP | DAP12 | CD80 | CD3ζ |
| TTP | DAP12 | CD80 | CD3δ |
| TTP | DAP12 | CD80 | CD3γ |
| TTP | DAP12 | CD80 | CD3ε |
| TTP | DAP12 | CD80 | FcγRI-γ |
| TTP | DAP12 | CD80 | FcγRIII-γ |
| TTP | DAP12 | CD80 | FcεRIβ |
| TTP | DAP12 | CD80 | FcεRIγ |
| TTP | DAP12 | CD80 | DAP10 |
| TTP | DAP12 | CD80 | DAP12 |
| TTP | DAP12 | CD80 | CD32 |
| TTP | DAP12 | CD80 | CD79a |
| TTP | DAP12 | CD80 | CD79b |
| TTP | DAP12 | CD86 | CD8 |
| TTP | DAP12 | CD86 | CD3ζ |
| TTP | DAP12 | CD86 | CD3δ |
| TTP | DAP12 | CD86 | CD3γ |
| TTP | DAP12 | CD86 | CD3ε |
| TTP | DAP12 | CD86 | FcγRI-γ |
| TTP | DAP12 | CD86 | FcγRIII-γ |
| TTP | DAP12 | CD86 | FcεRIβ |
| TTP | DAP12 | CD86 | FcεRIγ |
| TTP | DAP12 | CD86 | DAP10 |
| TTP | DAP12 | CD86 | DAP12 |
| TTP | DAP12 | CD86 | CD32 |
| TTP | DAP12 | CD86 | CD79a |
| TTP | DAP12 | CD86 | CD79b |
| TTP | DAP12 | OX40 | CD8 |
| TTP | DAP12 | OX40 | CD3ζ |
| TTP | DAP12 | OX40 | CD3δ |
| TTP | DAP12 | OX40 | CD3γ |
| TTP | DAP12 | OX40 | CD3ε |
| TTP | DAP12 | OX40 | FcγRI-γ |
| TTP | DAP12 | OX40 | FcγRIII-γ |
| TTP | DAP12 | OX40 | FcεRIβ |
| TTP | DAP12 | OX40 | FcεRIγ |
| TTP | DAP12 | OX40 | DAP10 |

TABLE 3-continued

| Third Generation CARs | | | |
|---|---|---|---|
| | Co-stimulatory Signal | Co-stimulatory Signal | Signal Domain |
| TTP | DAP12 | OX40 | DAP12 |
| TTP | DAP12 | OX40 | CD32 |
| TTP | DAP12 | OX40 | CD79a |
| TTP | DAP12 | OX40 | CD79b |
| TTP | DAP12 | DAP10 | CD8 |
| TTP | DAP12 | DAP10 | CD3ζ |
| TTP | DAP12 | DAP10 | CD3δ |
| TTP | DAP12 | DAP10 | CD3γ |
| TTP | DAP12 | DAP10 | CD3ε |
| TTP | DAP12 | DAP10 | FcγRI-γ |
| TTP | DAP12 | DAP10 | FcγRIII-γ |
| TTP | DAP12 | DAP10 | FcεRIβ |
| TTP | DAP12 | DAP10 | FcεRIγ |
| TTP | DAP12 | DAP10 | DAP10 |
| TTP | DAP12 | DAP10 | DAP12 |
| TTP | DAP12 | DAP10 | CD32 |
| TTP | DAP12 | DAP10 | CD79a |
| TTP | DAP12 | DAP10 | CD79b |
| TTP | DAP12 | DAP12 | CD8 |
| TTP | DAP12 | DAP12 | CD3ζ |
| TTP | DAP12 | DAP12 | CD3δ |
| TTP | DAP12 | DAP12 | CD3γ |
| TTP | DAP12 | DAP12 | CD3ε |
| TTP | DAP12 | DAP12 | FcγRI-γ |
| TTP | DAP12 | DAP12 | FcγRIII-γ |
| TTP | DAP12 | DAP12 | FcεRIβ |
| TTP | DAP12 | DAP12 | FcεRIγ |
| TTP | DAP12 | DAP12 | DAP10 |
| TTP | DAP12 | DAP12 | DAP12 |
| TTP | DAP12 | DAP12 | CD32 |
| TTP | DAP12 | DAP12 | CD79a |
| TTP | DAP12 | DAP12 | CD79b |
| TTP | DAP12 | MyD88 | CD8 |
| TTP | DAP12 | MyD88 | CD3ζ |
| TTP | DAP12 | MyD88 | CD3δ |
| TTP | DAP12 | MyD88 | CD3γ |
| TTP | DAP12 | MyD88 | CD3ε |
| TTP | DAP12 | MyD88 | FcγRI-γ |
| TTP | DAP12 | MyD88 | FcγRIII-γ |
| TTP | DAP12 | MyD88 | FcεRIβ |
| TTP | DAP12 | MyD88 | FcεRIγ |
| TTP | DAP12 | MyD88 | DAP10 |
| TTP | DAP12 | MyD88 | DAP12 |
| TTP | DAP12 | MyD88 | CD32 |
| TTP | DAP12 | MyD88 | CD79a |
| TTP | DAP12 | MyD88 | CD79b |
| TTP | DAP12 | CD7 | CD8 |
| TTP | DAP12 | CD7 | CD3ζ |
| TTP | DAP12 | CD7 | CD3δ |
| TTP | DAP12 | CD7 | CD3γ |
| TTP | DAP12 | CD7 | CD3ε |
| TTP | DAP12 | CD7 | FcγRI-γ |
| TTP | DAP12 | CD7 | FcγRIII-γ |
| TTP | DAP12 | CD7 | FcεRIβ |
| TTP | DAP12 | CD7 | FcεRIγ |
| TTP | DAP12 | CD7 | DAP10 |
| TTP | DAP12 | CD7 | DAP12 |
| TTP | DAP12 | CD7 | CD32 |
| TTP | DAP12 | CD7 | CD79a |
| TTP | DAP12 | CD7 | CD79b |
| TTP | DAP12 | BTNL3 | CD8 |
| TTP | DAP12 | BTNL3 | CD3ζ |
| TTP | DAP12 | BTNL3 | CD3δ |
| TTP | DAP12 | BTNL3 | CD3γ |
| TTP | DAP12 | BTNL3 | CD3ε |
| TTP | DAP12 | BTNL3 | FcγRI-γ |
| TTP | DAP12 | BTNL3 | FcγRIII-γ |
| TTP | DAP12 | BTNL3 | FcεRIβ |
| TTP | DAP12 | BTNL3 | FcεRIγ |
| TTP | DAP12 | BTNL3 | DAP10 |
| TTP | DAP12 | BTNL3 | DAP12 |
| TTP | DAP12 | BTNL3 | CD32 |
| TTP | DAP12 | BTNL3 | CD79a |
| TTP | DAP12 | BTNL3 | CD79b |
| TTP | DAP12 | NKG2D | CD8 |

TABLE 3-continued

| Third Generation CARs | | | |
|---|---|---|---|
| | Co-stimulatory Signal | Co-stimulatory Signal | Signal Domain |
| TTP | DAP12 | NKG2D | CD3ζ |
| TTP | DAP12 | NKG2D | CD3δ |
| TTP | DAP12 | NKG2D | CD3γ |
| TTP | DAP12 | NKG2D | CD3ε |
| TTP | DAP12 | NKG2D | FcγRI-γ |
| TTP | DAP12 | NKG2D | FcγRIII-γ |
| TTP | DAP12 | NKG2D | FcεRIβ |
| TTP | DAP12 | NKG2D | FcεRIγ |
| TTP | DAP12 | NKG2D | DAP10 |
| TTP | DAP12 | NKG2D | DAP12 |
| TTP | DAP12 | NKG2D | CD32 |
| TTP | DAP12 | NKG2D | CD79a |
| TTP | DAP12 | NKG2D | CD79b |
| TTP | MyD88 | CD28 | CD8 |
| TTP | MyD88 | CD28 | CD3ζ |
| TTP | MyD88 | CD28 | CD3δ |
| TTP | MyD88 | CD28 | CD3γ |
| TTP | MyD88 | CD28 | CD3ε |
| TTP | MyD88 | CD28 | FcγRI-γ |
| TTP | MyD88 | CD28 | FcγRIII-γ |
| TTP | MyD88 | CD28 | FcεRIβ |
| TTP | MyD88 | CD28 | FcεRIγ |
| TTP | MyD88 | CD28 | DAP10 |
| TTP | MyD88 | CD28 | DAP12 |
| TTP | MyD88 | CD28 | CD32 |
| TTP | MyD88 | CD28 | CD79a |
| TTP | MyD88 | CD28 | CD79b |
| TTP | MyD88 | CD8 | CD8 |
| TTP | MyD88 | CD8 | CD3ζ |
| TTP | MyD88 | CD8 | CD3δ |
| TTP | MyD88 | CD8 | CD3γ |
| TTP | MyD88 | CD8 | CD3ε |
| TTP | MyD88 | CD8 | FcγRI-γ |
| TTP | MyD88 | CD8 | FcγRIII-γ |
| TTP | MyD88 | CD8 | FcεRIβ |
| TTP | MyD88 | CD8 | FcεRIγ |
| TTP | MyD88 | CD8 | DAP10 |
| TTP | MyD88 | CD8 | DAP12 |
| TTP | MyD88 | CD8 | CD32 |
| TTP | MyD88 | CD8 | CD79a |
| TTP | MyD88 | CD8 | CD79b |
| TTP | MyD88 | CD4 | CD8 |
| TTP | MyD88 | CD4 | CD3ζ |
| TTP | MyD88 | CD4 | CD3δ |
| TTP | MyD88 | CD4 | CD3γ |
| TTP | MyD88 | CD4 | CD3ε |
| TTP | MyD88 | CD4 | FcγRI-γ |
| TTP | MyD88 | CD4 | FcγRIII-γ |
| TTP | MyD88 | CD4 | FcεRIβ |
| TTP | MyD88 | CD4 | FcεRIγ |
| TTP | MyD88 | CD4 | DAP10 |
| TTP | MyD88 | CD4 | DAP12 |
| TTP | MyD88 | CD4 | CD32 |
| TTP | MyD88 | CD4 | CD79a |
| TTP | MyD88 | CD4 | CD79b |
| TTP | MyD88 | b2c | CD8 |
| TTP | MyD88 | b2c | CD3ζ |
| TTP | MyD88 | b2c | CD3δ |
| TTP | MyD88 | b2c | CD3γ |
| TTP | MyD88 | b2c | CD3ε |
| TTP | MyD88 | b2c | FcγRI-γ |
| TTP | MyD88 | b2c | FcγRIII-γ |
| TTP | MyD88 | b2c | FcεRIβ |
| TTP | MyD88 | b2c | FcεRIγ |
| TTP | MyD88 | b2c | DAP10 |
| TTP | MyD88 | b2c | DAP12 |
| TTP | MyD88 | b2c | CD32 |
| TTP | MyD88 | b2c | CD79a |
| TTP | MyD88 | b2c | CD79b |
| TTP | MyD88 | CD137/41BB | CD8 |
| TTP | MyD88 | CD137/41BB | CD3ζ |
| TTP | MyD88 | CD137/41BB | CD3δ |
| TTP | MyD88 | CD137/41BB | CD3γ |
| TTP | MyD88 | CD137/41BB | CD3ε |
| TTP | MyD88 | CD137/41BB | FcγRI-γ |

TABLE 3-continued

| Third Generation CARs | | | |
|---|---|---|---|
| | Co-stimulatory Signal | Co-stimulatory Signal | Signal Domain |
| TTP | MyD88 | CD137/41BB | FcγRIII-γ |
| TTP | MyD88 | CD137/41BB | FcεRIβ |
| TTP | MyD88 | CD137/41BB | FcεRIγ |
| TTP | MyD88 | CD137/41BB | DAP10 |
| TTP | MyD88 | CD137/41BB | DAP12 |
| TTP | MyD88 | CD137/41BB | CD32 |
| TTP | MyD88 | CD137/41BB | CD79a |
| TTP | MyD88 | CD137/41BB | CD79b |
| TTP | MyD88 | ICOS | CD8 |
| TTP | MyD88 | ICOS | CD3ζ |
| TTP | MyD88 | ICOS | CD3δ |
| TTP | MyD88 | ICOS | CD3γ |
| TTP | MyD88 | ICOS | CD3ε |
| TTP | MyD88 | ICOS | FcγRI-γ |
| TTP | MyD88 | ICOS | FcγRIII-γ |
| TTP | MyD88 | ICOS | FcεRIβ |
| TTP | MyD88 | ICOS | FcεRIγ |
| TTP | MyD88 | ICOS | DAP10 |
| TTP | MyD88 | ICOS | DAP12 |
| TTP | MyD88 | ICOS | CD32 |
| TTP | MyD88 | ICOS | CD79a |
| TTP | MyD88 | ICOS | CD79b |
| TTP | MyD88 | CD27 | CD8 |
| TTP | MyD88 | CD27 | CD3ζ |
| TTP | MyD88 | CD27 | CD3δ |
| TTP | MyD88 | CD27 | CD3γ |
| TTP | MyD88 | CD27 | CD3ε |
| TTP | MyD88 | CD27 | FcγRI-γ |
| TTP | MyD88 | CD27 | FcγRIII-γ |
| TTP | MyD88 | CD27 | FcεRIβ |
| TTP | MyD88 | CD27 | FcεRIγ |
| TTP | MyD88 | CD27 | DAP10 |
| TTP | MyD88 | CD27 | DAP12 |
| TTP | MyD88 | CD27 | CD32 |
| TTP | MyD88 | CD27 | CD79a |
| TTP | MyD88 | CD27 | CD79b |
| TTP | MyD88 | CD28δ | CD8 |
| TTP | MyD88 | CD28δ | CD3ζ |
| TTP | MyD88 | CD28δ | CD3δ |
| TTP | MyD88 | CD28δ | CD3γ |
| TTP | MyD88 | CD28δ | CD3ε |
| TTP | MyD88 | CD28δ | FcγRI-γ |
| TTP | MyD88 | CD28δ | FcγRIII-γ |
| TTP | MyD88 | CD28δ | FcεRIβ |
| TTP | MyD88 | CD28δ | FcεRIγ |
| TTP | MyD88 | CD28δ | DAP10 |
| TTP | MyD88 | CD28δ | DAP12 |
| TTP | MyD88 | CD28δ | CD32 |
| TTP | MyD88 | CD28δ | CD79a |
| TTP | MyD88 | CD28δ | CD79b |
| TTP | MyD88 | CD80 | CD8 |
| TTP | MyD88 | CD80 | CD3ζ |
| TTP | MyD88 | CD80 | CD3δ |
| TTP | MyD88 | CD80 | CD3γ |
| TTP | MyD88 | CD80 | CD3ε |
| TTP | MyD88 | CD80 | FcγRI-γ |
| TTP | MyD88 | CD80 | FcγRIII-γ |
| TTP | MyD88 | CD80 | FcεRIβ |
| TTP | MyD88 | CD80 | FcεRIγ |
| TTP | MyD88 | CD80 | DAP10 |
| TTP | MyD88 | CD80 | DAP12 |
| TTP | MyD88 | CD80 | CD32 |
| TTP | MyD88 | CD80 | CD79a |
| TTP | MyD88 | CD80 | CD79b |
| TTP | MyD88 | CD86 | CD8 |
| TTP | MyD88 | CD86 | CD3ζ |
| TTP | MyD88 | CD86 | CD3δ |
| TTP | MyD88 | CD86 | CD3γ |
| TTP | MyD88 | CD86 | CD3ε |
| TTP | MyD88 | CD86 | FcγRI-γ |
| TTP | MyD88 | CD86 | FcγRIII-γ |
| TTP | MyD88 | CD86 | FcεRIβ |
| TTP | MyD88 | CD86 | FcεRIγ |
| TTP | MyD88 | CD86 | DAP10 |
| TTP | MyD88 | CD86 | DAP12 |

TABLE 3-continued

| Third Generation CARs | | | |
|---|---|---|---|
| | Co-stimulatory Signal | Co-stimulatory Signal | Signal Domain |
| TTP | MyD88 | CD86 | CD32 |
| TTP | MyD88 | CD86 | CD79a |
| TTP | MyD88 | CD86 | CD79b |
| TTP | MyD88 | OX40 | CD8 |
| TTP | MyD88 | OX40 | CD3ζ |
| TTP | MyD88 | OX40 | CD3δ |
| TTP | MyD88 | OX40 | CD3γ |
| TTP | MyD88 | OX40 | CD3ε |
| TTP | MyD88 | OX40 | FcγRI-γ |
| TTP | MyD88 | OX40 | FcγRIII-γ |
| TTP | MyD88 | OX40 | FcεRIβ |
| TTP | MyD88 | OX40 | FcεRIγ |
| TTP | MyD88 | OX40 | DAP10 |
| TTP | MyD88 | OX40 | DAP12 |
| TTP | MyD88 | OX40 | CD32 |
| TTP | MyD88 | OX40 | CD79a |
| TTP | MyD88 | OX40 | CD79b |
| TTP | MyD88 | DAP10 | CD8 |
| TTP | MyD88 | DAP10 | CD3ζ |
| TTP | MyD88 | DAP10 | CD3δ |
| TTP | MyD88 | DAP10 | CD3γ |
| TTP | MyD88 | DAP10 | CD3ε |
| TTP | MyD88 | DAP10 | FcγRI-γ |
| TTP | MyD88 | DAP10 | FcγRIII-γ |
| TTP | MyD88 | DAP10 | FcεRIβ |
| TTP | MyD88 | DAP10 | FcεRIγ |
| TTP | MyD88 | DAP10 | DAP10 |
| TTP | MyD88 | DAP10 | DAP12 |
| TTP | MyD88 | DAP10 | CD32 |
| TTP | MyD88 | DAP10 | CD79a |
| TTP | MyD88 | DAP10 | CD79b |
| TTP | MyD88 | DAP12 | CD8 |
| TTP | MyD88 | DAP12 | CD3ζ |
| TTP | MyD88 | DAP12 | CD3δ |
| TTP | MyD88 | DAP12 | CD3γ |
| TTP | MyD88 | DAP12 | CD3ε |
| TTP | MyD88 | DAP12 | FcγRI-γ |
| TTP | MyD88 | DAP12 | FcγRIII-γ |
| TTP | MyD88 | DAP12 | FcεRIβ |
| TTP | MyD88 | DAP12 | FcεRIγ |
| TTP | MyD88 | DAP12 | DAP10 |
| TTP | MyD88 | DAP12 | DAP12 |
| TTP | MyD88 | DAP12 | CD32 |
| TTP | MyD88 | DAP12 | CD79a |
| TTP | MyD88 | DAP12 | CD79b |
| TTP | MyD88 | MyD88 | CD8 |
| TTP | MyD88 | MyD88 | CD3ζ |
| TTP | MyD88 | MyD88 | CD3δ |
| TTP | MyD88 | MyD88 | CD3γ |
| TTP | MyD88 | MyD88 | CD3ε |
| TTP | MyD88 | MyD88 | FcγRI-γ |
| TTP | MyD88 | MyD88 | FcγRIII-γ |
| TTP | MyD88 | MyD88 | FcεRIβ |
| TTP | MyD88 | MyD88 | FcεRIγ |
| TTP | MyD88 | MyD88 | DAP10 |
| TTP | MyD88 | MyD88 | DAP12 |
| TTP | MyD88 | MyD88 | CD32 |
| TTP | MyD88 | MyD88 | CD79a |
| TTP | MyD88 | MyD88 | CD79b |
| TTP | MyD88 | CD7 | CD8 |
| TTP | MyD88 | CD7 | CD3ζ |
| TTP | MyD88 | CD7 | CD3δ |
| TTP | MyD88 | CD7 | CD3γ |
| TTP | MyD88 | CD7 | CD3ε |
| TTP | MyD88 | CD7 | FcγRI-γ |
| TTP | MyD88 | CD7 | FcγRIII-γ |
| TTP | MyD88 | CD7 | FcεRIβ |
| TTP | MyD88 | CD7 | FcεRIγ |
| TTP | MyD88 | CD7 | DAP10 |
| TTP | MyD88 | CD7 | DAP12 |
| TTP | MyD88 | CD7 | CD32 |
| TTP | MyD88 | CD7 | CD79a |
| TTP | MyD88 | CD7 | CD79b |
| TTP | MyD88 | BTNL3 | CD8 |
| TTP | MyD88 | BTNL3 | CD3ζ |

TABLE 3-continued

| Third Generation CARs | | | |
|---|---|---|---|
| | Co-stimulatory Signal | Co-stimulatory Signal | Signal Domain |
| TTP | MyD88 | BTNL3 | CD3δ |
| TTP | MyD88 | BTNL3 | CD3γ |
| TTP | MyD88 | BTNL3 | CD3ε |
| TTP | MyD88 | BTNL3 | FcγRI-γ |
| TTP | MyD88 | BTNL3 | FcγRIII-γ |
| TTP | MyD88 | BTNL3 | FcεRIβ |
| TTP | MyD88 | BTNL3 | FcεRIγ |
| TTP | MyD88 | BTNL3 | DAP10 |
| TTP | MyD88 | BTNL3 | DAP12 |
| TTP | MyD88 | BTNL3 | CD32 |
| TTP | MyD88 | BTNL3 | CD79a |
| TTP | MyD88 | BTNL3 | CD79b |
| TTP | MyD88 | NKG2D | CD8 |
| TTP | MyD88 | NKG2D | CD3ζ |
| TTP | MyD88 | NKG2D | CD3δ |
| TTP | MyD88 | NKG2D | CD3γ |
| TTP | MyD88 | NKG2D | CD3ε |
| TTP | MyD88 | NKG2D | FcγRI-γ |
| TTP | MyD88 | NKG2D | FcγRIII-γ |
| TTP | MyD88 | NKG2D | FcεRIβ |
| TTP | MyD88 | NKG2D | FcεRIγ |
| TTP | MyD88 | NKG2D | DAP10 |
| TTP | MyD88 | NKG2D | DAP12 |
| TTP | MyD88 | NKG2D | CD32 |
| TTP | MyD88 | NKG2D | CD79a |
| TTP | MyD88 | NKG2D | CD79b |
| TTP | CD7 | CD28 | CD8 |
| TTP | CD7 | CD28 | CD3ζ |
| TTP | CD7 | CD28 | CD3δ |
| TTP | CD7 | CD28 | CD3γ |
| TTP | CD7 | CD28 | CD3ε |
| TTP | CD7 | CD28 | FcγRI-γ |
| TTP | CD7 | CD28 | FcγRIII-γ |
| TTP | CD7 | CD28 | FcεRIβ |
| TTP | CD7 | CD28 | FcεRIγ |
| TTP | CD7 | CD28 | DAP10 |
| TTP | CD7 | CD28 | DAP12 |
| TTP | CD7 | CD28 | CD32 |
| TTP | CD7 | CD28 | CD79a |
| TTP | CD7 | CD28 | CD79b |
| TTP | CD7 | CD8 | CD8 |
| TTP | CD7 | CD8 | CD3ζ |
| TTP | CD7 | CD8 | CD3δ |
| TTP | CD7 | CD8 | CD3γ |
| TTP | CD7 | CD8 | CD3ε |
| TTP | CD7 | CD8 | FcγRI-γ |
| TTP | CD7 | CD8 | FcγRIII-γ |
| TTP | CD7 | CD8 | FcεRIβ |
| TTP | CD7 | CD8 | FcεRIγ |
| TTP | CD7 | CD8 | DAP10 |
| TTP | CD7 | CD8 | DAP12 |
| TTP | CD7 | CD8 | CD32 |
| TTP | CD7 | CD8 | CD79a |
| TTP | CD7 | CD8 | CD79b |
| TTP | CD7 | CD4 | CD8 |
| TTP | CD7 | CD4 | CD3ζ |
| TTP | CD7 | CD4 | CD3δ |
| TTP | CD7 | CD4 | CD3γ |
| TTP | CD7 | CD4 | CD3ε |
| TTP | CD7 | CD4 | FcγRI-γ |
| TTP | CD7 | CD4 | FcγRIII-γ |
| TTP | CD7 | CD4 | FcεRIβ |
| TTP | CD7 | CD4 | FcεRIγ |
| TTP | CD7 | CD4 | DAP10 |
| TTP | CD7 | CD4 | DAP12 |
| TTP | CD7 | CD4 | CD32 |
| TTP | CD7 | CD4 | CD79a |
| TTP | CD7 | CD4 | CD79b |
| TTP | CD7 | b2c | CD8 |
| TTP | CD7 | b2c | CD3ζ |
| TTP | CD7 | b2c | CD3δ |
| TTP | CD7 | b2c | CD3γ |
| TTP | CD7 | b2c | CD3ε |
| TTP | CD7 | b2c | FcγRI-γ |
| TTP | CD7 | b2c | FcγRIII-γ |

TABLE 3-continued

| Third Generation CARs | | | |
|---|---|---|---|
| | Co-stimulatory Signal | Co-stimulatory Signal | Signal Domain |
| TTP | CD7 | b2c | FcεRIβ |
| TTP | CD7 | b2c | FcεRIγ |
| TTP | CD7 | b2c | DAP10 |
| TTP | CD7 | b2c | DAP12 |
| TTP | CD7 | b2c | CD32 |
| TTP | CD7 | b2c | CD79a |
| TTP | CD7 | b2c | CD79b |
| TTP | CD7 | CD137/41BB | CD8 |
| TTP | CD7 | CD137/41BB | CD3ζ |
| TTP | CD7 | CD137/41BB | CD3δ |
| TTP | CD7 | CD137/41BB | CD3γ |
| TTP | CD7 | CD137/41BB | CD3ε |
| TTP | CD7 | CD137/41BB | FcγRI-γ |
| TTP | CD7 | CD137/41BB | FcγRIII-γ |
| TTP | CD7 | CD137/41BB | FcεRIβ |
| TTP | CD7 | CD137/41BB | FcεRIγ |
| TTP | CD7 | CD137/41BB | DAP10 |
| TTP | CD7 | CD137/41BB | DAP12 |
| TTP | CD7 | CD137/41BB | CD32 |
| TTP | CD7 | CD137/41BB | CD79a |
| TTP | CD7 | CD137/41BB | CD79b |
| TTP | CD7 | ICOS | CD8 |
| TTP | CD7 | ICOS | CD3ζ |
| TTP | CD7 | ICOS | CD3δ |
| TTP | CD7 | ICOS | CD3γ |
| TTP | CD7 | ICOS | CD3ε |
| TTP | CD7 | ICOS | FcγRI-γ |
| TTP | CD7 | ICOS | FcγRIII-γ |
| TTP | CD7 | ICOS | FcεRIβ |
| TTP | CD7 | ICOS | FcεRIγ |
| TTP | CD7 | ICOS | DAP10 |
| TTP | CD7 | ICOS | DAP12 |
| TTP | CD7 | ICOS | CD32 |
| TTP | CD7 | ICOS | CD79a |
| TTP | CD7 | ICOS | CD79b |
| TTP | CD7 | CD27 | CD8 |
| TTP | CD7 | CD27 | CD3ζ |
| TTP | CD7 | CD27 | CD3δ |
| TTP | CD7 | CD27 | CD3γ |
| TTP | CD7 | CD27 | CD3ε |
| TTP | CD7 | CD27 | FcγRI-γ |
| TTP | CD7 | CD27 | FcγRIII-γ |
| TTP | CD7 | CD27 | FcεRIβ |
| TTP | CD7 | CD27 | FcεRIγ |
| TTP | CD7 | CD27 | DAP10 |
| TTP | CD7 | CD27 | DAP12 |
| TTP | CD7 | CD27 | CD32 |
| TTP | CD7 | CD27 | CD79a |
| TTP | CD7 | CD27 | CD79b |
| TTP | CD7 | CD28δ | CD8 |
| TTP | CD7 | CD28δ | CD3ζ |
| TTP | CD7 | CD28δ | CD3δ |
| TTP | CD7 | CD28δ | CD3γ |
| TTP | CD7 | CD28δ | CD3ε |
| TTP | CD7 | CD28δ | FcγRI-γ |
| TTP | CD7 | CD28δ | FcγRIII-γ |
| TTP | CD7 | CD28δ | FcεRIβ |
| TTP | CD7 | CD28δ | FcεRIγ |
| TTP | CD7 | CD28δ | DAP10 |
| TTP | CD7 | CD28δ | DAP12 |
| TTP | CD7 | CD28δ | CD32 |
| TTP | CD7 | CD28δ | CD79a |
| TTP | CD7 | CD28δ | CD79b |
| TTP | CD7 | CD80 | CD8 |
| TTP | CD7 | CD80 | CD3ζ |
| TTP | CD7 | CD80 | CD3δ |
| TTP | CD7 | CD80 | CD3γ |
| TTP | CD7 | CD80 | CD3ε |
| TTP | CD7 | CD80 | FcγRI-γ |
| TTP | CD7 | CD80 | FcγRIII-γ |
| TTP | CD7 | CD80 | FcεRIβ |
| TTP | CD7 | CD80 | FcεRIγ |
| TTP | CD7 | CD80 | DAP10 |
| TTP | CD7 | CD80 | DAP12 |
| TTP | CD7 | CD80 | CD32 |

TABLE 3-continued

| Third Generation CARs | | | |
|---|---|---|---|
| | Co-stimulatory Signal | Co-stimulatory Signal | Signal Domain |
| TTP | CD7 | CD80 | CD79a |
| TTP | CD7 | CD80 | CD79b |
| TTP | CD7 | CD86 | CD8 |
| TTP | CD7 | CD86 | CD3ζ |
| TTP | CD7 | CD86 | CD3δ |
| TTP | CD7 | CD86 | CD3γ |
| TTP | CD7 | CD86 | CD3ε |
| TTP | CD7 | CD86 | FcγRI-γ |
| TTP | CD7 | CD86 | FcγRIII-γ |
| TTP | CD7 | CD86 | FcεRIβ |
| TTP | CD7 | CD86 | FcεRIγ |
| TTP | CD7 | CD86 | DAP10 |
| TTP | CD7 | CD86 | DAP12 |
| TTP | CD7 | CD86 | CD32 |
| TTP | CD7 | CD86 | CD79a |
| TTP | CD7 | CD86 | CD79b |
| TTP | CD7 | OX40 | CD8 |
| TTP | CD7 | OX40 | CD3ζ |
| TTP | CD7 | OX40 | CD3δ |
| TTP | CD7 | OX40 | CD3γ |
| TTP | CD7 | OX40 | CD3ε |
| TTP | CD7 | OX40 | FcγRI-γ |
| TTP | CD7 | OX40 | FcγRIII-γ |
| TTP | CD7 | OX40 | FcεRIβ |
| TTP | CD7 | OX40 | FcεRIγ |
| TTP | CD7 | OX40 | DAP10 |
| TTP | CD7 | OX40 | DAP12 |
| TTP | CD7 | OX40 | CD32 |
| TTP | CD7 | OX40 | CD79a |
| TTP | CD7 | OX40 | CD79b |
| TTP | CD7 | DAP10 | CD8 |
| TTP | CD7 | DAP10 | CD3ζ |
| TTP | CD7 | DAP10 | CD3δ |
| TTP | CD7 | DAP10 | CD3γ |
| TTP | CD7 | DAP10 | CD3ε |
| TTP | CD7 | DAP10 | FcγRI-γ |
| TTP | CD7 | DAP10 | FcγRIII-γ |
| TTP | CD7 | DAP10 | FcεRIβ |
| TTP | CD7 | DAP10 | FcεRIγ |
| TTP | CD7 | DAP10 | DAP10 |
| TTP | CD7 | DAP10 | DAP12 |
| TTP | CD7 | DAP10 | CD32 |
| TTP | CD7 | DAP10 | CD79a |
| TTP | CD7 | DAP10 | CD79b |
| TTP | CD7 | DAP12 | CD8 |
| TTP | CD7 | DAP12 | CD3ζ |
| TTP | CD7 | DAP12 | CD3δ |
| TTP | CD7 | DAP12 | CD3γ |
| TTP | CD7 | DAP12 | CD3ε |
| TTP | CD7 | DAP12 | FcγRI-γ |
| TTP | CD7 | DAP12 | FcγRIII-γ |
| TTP | CD7 | DAP12 | FcεRIβ |
| TTP | CD7 | DAP12 | FcεRIγ |
| TTP | CD7 | DAP12 | DAP10 |
| TTP | CD7 | DAP12 | DAP12 |
| TTP | CD7 | DAP12 | CD32 |
| TTP | CD7 | DAP12 | CD79a |
| TTP | CD7 | DAP12 | CD79b |
| TTP | CD7 | MyD88 | CD8 |
| TTP | CD7 | MyD88 | CD3ζ |
| TTP | CD7 | MyD88 | CD3δ |
| TTP | CD7 | MyD88 | CD3γ |
| TTP | CD7 | MyD88 | CD3ε |
| TTP | CD7 | MyD88 | FcγRI-γ |
| TTP | CD7 | MyD88 | FcγRIII-γ |
| TTP | CD7 | MyD88 | FcεRIβ |
| TTP | CD7 | MyD88 | FcεRIγ |
| TTP | CD7 | MyD88 | DAP10 |
| TTP | CD7 | MyD88 | DAP12 |
| TTP | CD7 | MyD88 | CD32 |
| TTP | CD7 | MyD88 | CD79a |
| TTP | CD7 | MyD88 | CD79b |
| TTP | CD7 | CD7 | CD8 |
| TTP | CD7 | CD7 | CD3ζ |
| TTP | CD7 | CD7 | CD3δ |

TABLE 3-continued

| Third Generation CARs | | | |
|---|---|---|---|
| | Co-stimulatory Signal | Co-stimulatory Signal | Signal Domain |
| TTP | CD7 | CD7 | CD3γ |
| TTP | CD7 | CD7 | CD3ε |
| TTP | CD7 | CD7 | FcγRI-γ |
| TTP | CD7 | CD7 | FcγRIII-γ |
| TTP | CD7 | CD7 | FcεRIβ |
| TTP | CD7 | CD7 | FcεRIγ |
| TTP | CD7 | CD7 | DAP10 |
| TTP | CD7 | CD7 | DAP12 |
| TTP | CD7 | CD7 | CD32 |
| TTP | CD7 | CD7 | CD79a |
| TTP | CD7 | CD7 | CD79b |
| TTP | CD7 | BTNL3 | CD8 |
| TTP | CD7 | BTNL3 | CD3ζ |
| TTP | CD7 | BTNL3 | CD3δ |
| TTP | CD7 | BTNL3 | CD3γ |
| TTP | CD7 | BTNL3 | CD3ε |
| TTP | CD7 | BTNL3 | FcγRI-γ |
| TTP | CD7 | BTNL3 | FcγRIII-γ |
| TTP | CD7 | BTNL3 | FcεRIβ |
| TTP | CD7 | BTNL3 | FcεRIγ |
| TTP | CD7 | BTNL3 | DAP10 |
| TTP | CD7 | BTNL3 | DAP12 |
| TTP | CD7 | BTNL3 | CD32 |
| TTP | CD7 | BTNL3 | CD79a |
| TTP | CD7 | BTNL3 | CD79b |
| TTP | CD7 | NKG2D | CD8 |
| TTP | CD7 | NKG2D | CD3ζ |
| TTP | CD7 | NKG2D | CD3δ |
| TTP | CD7 | NKG2D | CD3γ |
| TTP | CD7 | NKG2D | CD3ε |
| TTP | CD7 | NKG2D | FcγRI-γ |
| TTP | CD7 | NKG2D | FcγRIII-γ |
| TTP | CD7 | NKG2D | FcεRIβ |
| TTP | CD7 | NKG2D | FcεRIγ |
| TTP | CD7 | NKG2D | DAP10 |
| TTP | CD7 | NKG2D | DAP12 |
| TTP | CD7 | NKG2D | CD32 |
| TTP | CD7 | NKG2D | CD79a |
| TTP | CD7 | NKG2D | CD79b |
| TTP | BTNL3 | CD28 | CD8 |
| TTP | BTNL3 | CD28 | CD3ζ |
| TTP | BTNL3 | CD28 | CD3δ |
| TTP | BTNL3 | CD28 | CD3γ |
| TTP | BTNL3 | CD28 | CD3ε |
| TTP | BTNL3 | CD28 | FcγRI-γ |
| TTP | BTNL3 | CD28 | FcγRIII-γ |
| TTP | BTNL3 | CD28 | FcεRIβ |
| TTP | BTNL3 | CD28 | FcεRIγ |
| TTP | BTNL3 | CD28 | DAP10 |
| TTP | BTNL3 | CD28 | DAP12 |
| TTP | BTNL3 | CD28 | CD32 |
| TTP | BTNL3 | CD28 | CD79a |
| TTP | BTNL3 | CD28 | CD79b |
| TTP | BTNL3 | CD8 | CD8 |
| TTP | BTNL3 | CD8 | CD3ζ |
| TTP | BTNL3 | CD8 | CD3δ |
| TTP | BTNL3 | CD8 | CD3γ |
| TTP | BTNL3 | CD8 | CD3ε |
| TTP | BTNL3 | CD8 | FcγRI-γ |
| TTP | BTNL3 | CD8 | FcγRIII-γ |
| TTP | BTNL3 | CD8 | FcεRIβ |
| TTP | BTNL3 | CD8 | FcεRIγ |
| TTP | BTNL3 | CD8 | DAP10 |
| TTP | BTNL3 | CD8 | DAP12 |
| TTP | BTNL3 | CD8 | CD32 |
| TTP | BTNL3 | CD8 | CD79a |
| TTP | BTNL3 | CD8 | CD79b |
| TTP | BTNL3 | CD4 | CD8 |
| TTP | BTNL3 | CD4 | CD3ζ |
| TTP | BTNL3 | CD4 | CD3δ |
| TTP | BTNL3 | CD4 | CD3γ |
| TTP | BTNL3 | CD4 | CD3ε |
| TTP | BTNL3 | CD4 | FcγRI-γ |
| TTP | BTNL3 | CD4 | FcγRIII-γ |
| TTP | BTNL3 | CD4 | FcεRIβ |

TABLE 3-continued

| Third Generation CARs | | | |
|---|---|---|---|
| | Co-stimulatory Signal | Co-stimulatory Signal | Signal Domain |
| TTP | BTNL3 | CD4 | FcεRIγ |
| TTP | BTNL3 | CD4 | DAP10 |
| TTP | BTNL3 | CD4 | DAP12 |
| TTP | BTNL3 | CD4 | CD32 |
| TTP | BTNL3 | CD4 | CD79a |
| TTP | BTNL3 | CD4 | CD79b |
| TTP | BTNL3 | b2c | CD8 |
| TTP | BTNL3 | b2c | CD3ζ |
| TTP | BTNL3 | b2c | CD3δ |
| TTP | BTNL3 | b2c | CD3γ |
| TTP | BTNL3 | b2c | CD3ε |
| TTP | BTNL3 | b2c | FcγRI-γ |
| TTP | BTNL3 | b2c | FcγRIII-γ |
| TTP | BTNL3 | b2c | FcεRIβ |
| TTP | BTNL3 | b2c | FcεRIγ |
| TTP | BTNL3 | b2c | DAP10 |
| TTP | BTNL3 | b2c | DAP12 |
| TTP | BTNL3 | b2c | CD32 |
| TTP | BTNL3 | b2c | CD79a |
| TTP | BTNL3 | b2c | CD79b |
| TTP | BTNL3 | CD137/41BB | CD8 |
| TTP | BTNL3 | CD137/41BB | CD3ζ |
| TTP | BTNL3 | CD137/41BB | CD3δ |
| TTP | BTNL3 | CD137/41BB | CD3γ |
| TTP | BTNL3 | CD137/41BB | CD3ε |
| TTP | BTNL3 | CD137/41BB | FcγRI-γ |
| TTP | BTNL3 | CD137/41BB | FcγRIII-γ |
| TTP | BTNL3 | CD137/41BB | FcεRIβ |
| TTP | BTNL3 | CD137/41BB | FcεRIγ |
| TTP | BTNL3 | CD137/41BB | DAP10 |
| TTP | BTNL3 | CD137/41BB | DAP12 |
| TTP | BTNL3 | CD137/41BB | CD32 |
| TTP | BTNL3 | CD137/41BB | CD79a |
| TTP | BTNL3 | CD137/41BB | CD79b |
| TTP | BTNL3 | ICOS | CD8 |
| TTP | BTNL3 | ICOS | CD3ζ |
| TTP | BTNL3 | ICOS | CD3δ |
| TTP | BTNL3 | ICOS | CD3γ |
| TTP | BTNL3 | ICOS | CD3ε |
| TTP | BTNL3 | ICOS | FcγRI-γ |
| TTP | BTNL3 | ICOS | FcγRIII-γ |
| TTP | BTNL3 | ICOS | FcεRIβ |
| TTP | BTNL3 | ICOS | FcεRIγ |
| TTP | BTNL3 | ICOS | DAP10 |
| TTP | BTNL3 | ICOS | DAP12 |
| TTP | BTNL3 | ICOS | CD32 |
| TTP | BTNL3 | ICOS | CD79a |
| TTP | BTNL3 | ICOS | CD79b |
| TTP | BTNL3 | CD27 | CD8 |
| TTP | BTNL3 | CD27 | CD3ζ |
| TTP | BTNL3 | CD27 | CD3δ |
| TTP | BTNL3 | CD27 | CD3γ |
| TTP | BTNL3 | CD27 | CD3ε |
| TTP | BTNL3 | CD27 | FcγRI-γ |
| TTP | BTNL3 | CD27 | FcγRIII-γ |
| TTP | BTNL3 | CD27 | FcεRIβ |
| TTP | BTNL3 | CD27 | FcεRIγ |
| TTP | BTNL3 | CD27 | DAP10 |
| TTP | BTNL3 | CD27 | DAP12 |
| TTP | BTNL3 | CD27 | CD32 |
| TTP | BTNL3 | CD27 | CD79a |
| TTP | BTNL3 | CD27 | CD79b |
| TTP | BTNL3 | CD28δ | CD8 |
| TTP | BTNL3 | CD28δ | CD3ζ |
| TTP | BTNL3 | CD28δ | CD3δ |
| TTP | BTNL3 | CD28δ | CD3γ |
| TTP | BTNL3 | CD28δ | CD3ε |
| TTP | BTNL3 | CD28δ | FcγRI-γ |
| TTP | BTNL3 | CD28δ | FcγRIII-γ |
| TTP | BTNL3 | CD28δ | FcεRIβ |
| TTP | BTNL3 | CD28δ | FcεRIγ |
| TTP | BTNL3 | CD28δ | DAP10 |
| TTP | BTNL3 | CD28δ | DAP12 |
| TTP | BTNL3 | CD28δ | CD32 |
| TTP | BTNL3 | CD28δ | CD79a |

TABLE 3-continued

| Third Generation CARs | | | |
|---|---|---|---|
| | Co-stimulatory Signal | Co-stimulatory Signal | Signal Domain |
| TTP | BTNL3 | CD28δ | CD79b |
| TTP | BTNL3 | CD80 | CD8 |
| TTP | BTNL3 | CD80 | CD3ζ |
| TTP | BTNL3 | CD80 | CD3δ |
| TTP | BTNL3 | CD80 | CD3γ |
| TTP | BTNL3 | CD80 | CD3ε |
| TTP | BTNL3 | CD80 | FcγRI-γ |
| TTP | BTNL3 | CD80 | FcγRIII-γ |
| TTP | BTNL3 | CD80 | FcεRIβ |
| TTP | BTNL3 | CD80 | FcεRIγ |
| TTP | BTNL3 | CD80 | DAP10 |
| TTP | BTNL3 | CD80 | DAP12 |
| TTP | BTNL3 | CD80 | CD32 |
| TTP | BTNL3 | CD80 | CD79a |
| TTP | BTNL3 | CD80 | CD79b |
| TTP | BTNL3 | CD86 | CD8 |
| TTP | BTNL3 | CD86 | CD3ζ |
| TTP | BTNL3 | CD86 | CD3δ |
| TTP | BTNL3 | CD86 | CD3γ |
| TTP | BTNL3 | CD86 | CD3ε |
| TTP | BTNL3 | CD86 | FcγRI-γ |
| TTP | BTNL3 | CD86 | FcγRIII-γ |
| TTP | BTNL3 | CD86 | FcεRIβ |
| TTP | BTNL3 | CD86 | FcεRIγ |
| TTP | BTNL3 | CD86 | DAP10 |
| TTP | BTNL3 | CD86 | DAP12 |
| TTP | BTNL3 | CD86 | CD32 |
| TTP | BTNL3 | CD86 | CD79a |
| TTP | BTNL3 | CD86 | CD79b |
| TTP | BTNL3 | OX40 | CD8 |
| TTP | BTNL3 | OX40 | CD3ζ |
| TTP | BTNL3 | OX40 | CD3δ |
| TTP | BTNL3 | OX40 | CD3γ |
| TTP | BTNL3 | OX40 | CD3ε |
| TTP | BTNL3 | OX40 | FcγRI-γ |
| TTP | BTNL3 | OX40 | FcγRIII-γ |
| TTP | BTNL3 | OX40 | FcεRIβ |
| TTP | BTNL3 | OX40 | FcεRIγ |
| TTP | BTNL3 | OX40 | DAP10 |
| TTP | BTNL3 | OX40 | DAP12 |
| TTP | BTNL3 | OX40 | CD32 |
| TTP | BTNL3 | OX40 | CD79a |
| TTP | BTNL3 | OX40 | CD79b |
| TTP | BTNL3 | DAP10 | CD8 |
| TTP | BTNL3 | DAP10 | CD3ζ |
| TTP | BTNL3 | DAP10 | CD3δ |
| TTP | BTNL3 | DAP10 | CD3γ |
| TTP | BTNL3 | DAP10 | CD3ε |
| TTP | BTNL3 | DAP10 | FcγRI-γ |
| TTP | BTNL3 | DAP10 | FcγRIII-γ |
| TTP | BTNL3 | DAP10 | FcεRIβ |
| TTP | BTNL3 | DAP10 | FcεRIγ |
| TTP | BTNL3 | DAP10 | DAP10 |
| TTP | BTNL3 | DAP10 | DAP12 |
| TTP | BTNL3 | DAP10 | CD32 |
| TTP | BTNL3 | DAP10 | CD79a |
| TTP | BTNL3 | DAP10 | CD79b |
| TTP | BTNL3 | DAP12 | CD8 |
| TTP | BTNL3 | DAP12 | CD3ζ |
| TTP | BTNL3 | DAP12 | CD3δ |
| TTP | BTNL3 | DAP12 | CD3γ |
| TTP | BTNL3 | DAP12 | CD3ε |
| TTP | BTNL3 | DAP12 | FcγRI-γ |
| TTP | BTNL3 | DAP12 | FcγRIII-γ |
| TTP | BTNL3 | DAP12 | FcεRIβ |
| TTP | BTNL3 | DAP12 | FcεRIγ |
| TTP | BTNL3 | DAP12 | DAP10 |
| TTP | BTNL3 | DAP12 | DAP12 |
| TTP | BTNL3 | DAP12 | CD32 |
| TTP | BTNL3 | DAP12 | CD79a |
| TTP | BTNL3 | DAP12 | CD79b |
| TTP | BTNL3 | MyD88 | CD8 |
| TTP | BTNL3 | MyD88 | CD3ζ |
| TTP | BTNL3 | MyD88 | CD3δ |
| TTP | BTNL3 | MyD88 | CD3γ |

TABLE 3-continued

| Third Generation CARs | | | |
|---|---|---|---|
| | Co-stimulatory Signal | Co-stimulatory Signal | Signal Domain |
| TTP | BTNL3 | MyD88 | CD3ε |
| TTP | BTNL3 | MyD88 | FcγRI-γ |
| TTP | BTNL3 | MyD88 | FcγRIII-γ |
| TTP | BTNL3 | MyD88 | FcεRIβ |
| TTP | BTNL3 | MyD88 | FcεRIγ |
| TTP | BTNL3 | MyD88 | DAP10 |
| TTP | BTNL3 | MyD88 | DAP12 |
| TTP | BTNL3 | MyD88 | CD32 |
| TTP | BTNL3 | MyD88 | CD79a |
| TTP | BTNL3 | MyD88 | CD79b |
| TTP | BTNL3 | CD7 | CD8 |
| TTP | BTNL3 | CD7 | CD3ζ |
| TTP | BTNL3 | CD7 | CD3δ |
| TTP | BTNL3 | CD7 | CD3γ |
| TTP | BTNL3 | CD7 | CD3ε |
| TTP | BTNL3 | CD7 | FcγRI-γ |
| TTP | BTNL3 | CD7 | FcγRIII-γ |
| TTP | BTNL3 | CD7 | FcεRIβ |
| TTP | BTNL3 | CD7 | FcεRIγ |
| TTP | BTNL3 | CD7 | DAP10 |
| TTP | BTNL3 | CD7 | DAP12 |
| TTP | BTNL3 | CD7 | CD32 |
| TTP | BTNL3 | CD7 | CD79a |
| TTP | BTNL3 | CD7 | CD79b |
| TTP | BTNL3 | BTNL3 | CD8 |
| TTP | BTNL3 | BTNL3 | CD3ζ |
| TTP | BTNL3 | BTNL3 | CD3δ |
| TTP | BTNL3 | BTNL3 | CD3γ |
| TTP | BTNL3 | BTNL3 | CD3ε |
| TTP | BTNL3 | BTNL3 | FcγRI-γ |
| TTP | BTNL3 | BTNL3 | FcγRIII-γ |
| TTP | BTNL3 | BTNL3 | FcεRIβ |
| TTP | BTNL3 | BTNL3 | FcεRIγ |
| TTP | BTNL3 | BTNL3 | DAP10 |
| TTP | BTNL3 | BTNL3 | DAP12 |
| TTP | BTNL3 | BTNL3 | CD32 |
| TTP | BTNL3 | BTNL3 | CD79a |
| TTP | BTNL3 | BTNL3 | CD79b |
| TTP | BTNL3 | NKG2D | CD8 |
| TTP | BTNL3 | NKG2D | CD3ζ |
| TTP | BTNL3 | NKG2D | CD3δ |
| TTP | BTNL3 | NKG2D | CD3γ |
| TTP | BTNL3 | NKG2D | CD3ε |
| TTP | BTNL3 | NKG2D | FcγRI-γ |
| TTP | BTNL3 | NKG2D | FcγRIII-γ |
| TTP | BTNL3 | NKG2D | FcεRIβ |
| TTP | BTNL3 | NKG2D | FcεRIγ |
| TTP | BTNL3 | NKG2D | DAP10 |
| TTP | BTNL3 | NKG2D | DAP12 |
| TTP | BTNL3 | NKG2D | CD32 |
| TTP | BTNL3 | NKG2D | CD79a |
| TTP | BTNL3 | NKG2D | CD79b |
| TTP | NKG2D | CD28 | CD8 |
| TTP | NKG2D | CD28 | CD3ζ |
| TTP | NKG2D | CD28 | CD3δ |
| TTP | NKG2D | CD28 | CD3γ |
| TTP | NKG2D | CD28 | CD3ε |
| TTP | NKG2D | CD28 | FcγRI-γ |
| TTP | NKG2D | CD28 | FcγRIII-γ |
| TTP | NKG2D | CD28 | FcεRIβ |
| TTP | NKG2D | CD28 | FcεRIγ |
| TTP | NKG2D | CD28 | DAP10 |
| TTP | NKG2D | CD28 | DAP12 |
| TTP | NKG2D | CD28 | CD32 |
| TTP | NKG2D | CD28 | CD79a |
| TTP | NKG2D | CD28 | CD79b |
| TTP | NKG2D | CD8 | CD8 |
| TTP | NKG2D | CD8 | CD3ζ |
| TTP | NKG2D | CD8 | CD3δ |
| TTP | NKG2D | CD8 | CD3γ |
| TTP | NKG2D | CD8 | CD3ε |
| TTP | NKG2D | CD8 | FcγRI-γ |
| TTP | NKG2D | CD8 | FcγRIII-γ |
| TTP | NKG2D | CD8 | FcεRIβ |
| TTP | NKG2D | CD8 | FcεRIγ |

TABLE 3-continued

| Third Generation CARs | | | |
|---|---|---|---|
| | Co-stimulatory Signal | Co-stimulatory Signal | Signal Domain |
| TTP | NKG2D | CD8 | DAP10 |
| TTP | NKG2D | CD8 | DAP12 |
| TTP | NKG2D | CD8 | CD32 |
| TTP | NKG2D | CD8 | CD79a |
| TTP | NKG2D | CD8 | CD79b |
| TTP | NKG2D | CD4 | CD8 |
| TTP | NKG2D | CD4 | CD3ζ |
| TTP | NKG2D | CD4 | CD3δ |
| TTP | NKG2D | CD4 | CD3γ |
| TTP | NKG2D | CD4 | CD3ε |
| TTP | NKG2D | CD4 | FcγRI-γ |
| TTP | NKG2D | CD4 | FcγRIII-γ |
| TTP | NKG2D | CD4 | FcεRIβ |
| TTP | NKG2D | CD4 | FcεRIγ |
| TTP | NKG2D | CD4 | DAP10 |
| TTP | NKG2D | CD4 | DAP12 |
| TTP | NKG2D | CD4 | CD32 |
| TTP | NKG2D | CD4 | CD79a |
| TTP | NKG2D | CD4 | CD79b |
| TTP | NKG2D | b2c | CD8 |
| TTP | NKG2D | b2c | CD3ζ |
| TTP | NKG2D | b2c | CD3δ |
| TTP | NKG2D | b2c | CD3γ |
| TTP | NKG2D | b2c | CD3ε |
| TTP | NKG2D | b2c | FcγRI-γ |
| TTP | NKG2D | b2c | FcγRIII-γ |
| TTP | NKG2D | b2c | FcεRIβ |
| TTP | NKG2D | b2c | FcεRIγ |
| TTP | NKG2D | b2c | DAP10 |
| TTP | NKG2D | b2c | DAP12 |
| TTP | NKG2D | b2c | CD32 |
| TTP | NKG2D | b2c | CD79a |
| TTP | NKG2D | b2c | CD79b |
| TTP | NKG2D | CD137/41BB | CD8 |
| TTP | NKG2D | CD137/41BB | CD3ζ |
| TTP | NKG2D | CD137/41BB | CD3δ |
| TTP | NKG2D | CD137/41BB | CD3γ |
| TTP | NKG2D | CD137/41BB | CD3ε |
| TTP | NKG2D | CD137/41BB | FcγRI-γ |
| TTP | NKG2D | CD137/41BB | FcγRIII-γ |
| TTP | NKG2D | CD137/41BB | FcεRIβ |
| TTP | NKG2D | CD137/41BB | FcεRIγ |
| TTP | NKG2D | CD137/41BB | DAP10 |
| TTP | NKG2D | CD137/41BB | DAP12 |
| TTP | NKG2D | CD137/41BB | CD32 |
| TTP | NKG2D | CD137/41BB | CD79a |
| TTP | NKG2D | CD137/41BB | CD79b |
| TTP | NKG2D | ICOS | CD8 |
| TTP | NKG2D | ICOS | CD3ζ |
| TTP | NKG2D | ICOS | CD3δ |
| TTP | NKG2D | ICOS | CD3γ |
| TTP | NKG2D | ICOS | CD3ε |
| TTP | NKG2D | ICOS | FcγRI-γ |
| TTP | NKG2D | ICOS | FcγRIII-γ |
| TTP | NKG2D | ICOS | FcεRIβ |
| TTP | NKG2D | ICOS | FcεRIγ |
| TTP | NKG2D | ICOS | DAP10 |
| TTP | NKG2D | ICOS | DAP12 |
| TTP | NKG2D | ICOS | CD32 |
| TTP | NKG2D | ICOS | CD79a |
| TTP | NKG2D | ICOS | CD79b |
| TTP | NKG2D | CD27 | CD8 |
| TTP | NKG2D | CD27 | CD3ζ |
| TTP | NKG2D | CD27 | CD3δ |
| TTP | NKG2D | CD27 | CD3γ |
| TTP | NKG2D | CD27 | CD3ε |
| TTP | NKG2D | CD27 | FcγRI-γ |
| TTP | NKG2D | CD27 | FcγRIII-γ |
| TTP | NKG2D | CD27 | FcεRIβ |
| TTP | NKG2D | CD27 | FcεRIγ |
| TTP | NKG2D | CD27 | DAP10 |
| TTP | NKG2D | CD27 | DAP12 |
| TTP | NKG2D | CD27 | CD32 |
| TTP | NKG2D | CD27 | CD79a |
| TTP | NKG2D | CD27 | CD79b |

TABLE 3-continued

| Third Generation CARs | | | |
|---|---|---|---|
| | Co-stimulatory Signal | Co-stimulatory Signal | Signal Domain |
| TTP | NKG2D | CD28δ | CD8 |
| TTP | NKG2D | CD28δ | CD3ζ |
| TTP | NKG2D | CD28δ | CD3δ |
| TTP | NKG2D | CD28δ | CD3γ |
| TTP | NKG2D | CD28δ | CD3ε |
| TTP | NKG2D | CD28δ | FcγRI-γ |
| TTP | NKG2D | CD28δ | FcγRIII-γ |
| TTP | NKG2D | CD28δ | FcεRIβ |
| TTP | NKG2D | CD28δ | FcεRIγ |
| TTP | NKG2D | CD28δ | DAP10 |
| TTP | NKG2D | CD28δ | DAP12 |
| TTP | NKG2D | CD28δ | CD32 |
| TTP | NKG2D | CD28δ | CD79a |
| TTP | NKG2D | CD28δ | CD79b |
| TTP | NKG2D | CD8 | CD80 |
| TTP | NKG2D | CD80 | CD3ζ |
| TTP | NKG2D | CD80 | CD3δ |
| TTP | NKG2D | CD80 | CD3γ |
| TTP | NKG2D | CD80 | CD3ε |
| TTP | NKG2D | CD80 | FcγRI-γ |
| TTP | NKG2D | CD80 | FcγRIII-γ |
| TTP | NKG2D | CD80 | FcεRIβ |
| TTP | NKG2D | CD80 | FcεRIγ |
| TTP | NKG2D | CD80 | DAP10 |
| TTP | NKG2D | CD80 | DAP12 |
| TTP | NKG2D | CD80 | CD32 |
| TTP | NKG2D | CD80 | CD79a |
| TTP | NKG2D | CD80 | CD79b |
| TTP | NKG2D | CD86 | CD8 |
| TTP | NKG2D | CD86 | CD3ζ |
| TTP | NKG2D | CD86 | CD3δ |
| TTP | NKG2D | CD86 | CD3γ |
| TTP | NKG2D | CD86 | CD3ε |
| TTP | NKG2D | CD86 | FcγRI-γ |
| TTP | NKG2D | CD86 | FcγRIII-γ |
| TTP | NKG2D | CD86 | FcεRIβ |
| TTP | NKG2D | CD86 | FcεRIγ |
| TTP | NKG2D | CD86 | DAP10 |
| TTP | NKG2D | CD86 | DAP12 |
| TTP | NKG2D | CD86 | CD32 |
| TTP | NKG2D | CD86 | CD79a |
| TTP | NKG2D | CD86 | CD79b |
| TTP | NKG2D | OX40 | CD8 |
| TTP | NKG2D | OX40 | CD3ζ |
| TTP | NKG2D | OX40 | CD3δ |
| TTP | NKG2D | OX40 | CD3γ |
| TTP | NKG2D | OX40 | CD3ε |
| TTP | NKG2D | OX40 | FcγRI-γ |
| TTP | NKG2D | OX40 | FcγRIII-γ |
| TTP | NKG2D | OX40 | FcεRIβ |
| TTP | NKG2D | OX40 | FcεRIγ |
| TTP | NKG2D | OX40 | DAP10 |
| TTP | NKG2D | OX40 | DAP12 |
| TTP | NKG2D | OX40 | CD32 |
| TTP | NKG2D | OX40 | CD79a |
| TTP | NKG2D | OX40 | CD79b |
| TTP | NKG2D | DAP10 | CD8 |
| TTP | NKG2D | DAP10 | CD3ζ |
| TTP | NKG2D | DAP10 | CD3δ |
| TTP | NKG2D | DAP10 | CD3γ |
| TTP | NKG2D | DAP10 | CD3ε |
| TTP | NKG2D | DAP10 | FcγRI-γ |
| TTP | NKG2D | DAP10 | FcγRIII-γ |
| TTP | NKG2D | DAP10 | FcεRIβ |
| TTP | NKG2D | DAP10 | FcεRIγ |
| TTP | NKG2D | DAP10 | DAP10 |
| TTP | NKG2D | DAP10 | DAP12 |
| TTP | NKG2D | DAP10 | CD32 |
| TTP | NKG2D | DAP10 | CD79a |
| TTP | NKG2D | DAP10 | CD79b |
| TTP | NKG2D | DAP12 | CD8 |
| TTP | NKG2D | DAP12 | CD3ζ |
| TTP | NKG2D | DAP12 | CD3δ |
| TTP | NKG2D | DAP12 | CD3γ |
| TTP | NKG2D | DAP12 | CD3ε |

TABLE 3-continued

| Third Generation CARs | | | |
|---|---|---|---|
| | Co-stimulatory Signal | Co-stimulatory Signal | Signal Domain |
| TTP | NKG2D | DAP12 | FcγRI-γ |
| TTP | NKG2D | DAP12 | FcγRIII-γ |
| TTP | NKG2D | DAP12 | FcεRIβ |
| TTP | NKG2D | DAP12 | FcεRIγ |
| TTP | NKG2D | DAP12 | DAP10 |
| TTP | NKG2D | DAP12 | DAP12 |
| TTP | NKG2D | DAP12 | CD32 |
| TTP | NKG2D | DAP12 | CD79a |
| TTP | NKG2D | DAP12 | CD79b |
| TTP | NKG2D | MyD88 | CD8 |
| TTP | NKG2D | MyD88 | CD3ζ |
| TTP | NKG2D | MyD88 | CD3δ |
| TTP | NKG2D | MyD88 | CD3γ |
| TTP | NKG2D | MyD88 | CD3ε |
| TTP | NKG2D | MyD88 | FcγRI-γ |
| TTP | NKG2D | MyD88 | FcγRIII-γ |
| TTP | NKG2D | MyD88 | FcεRIβ |
| TTP | NKG2D | MyD88 | FcεRIγ |
| TTP | NKG2D | MyD88 | DAP10 |
| TTP | NKG2D | MyD88 | DAP12 |
| TTP | NKG2D | MyD88 | CD32 |
| TTP | NKG2D | MyD88 | CD79a |
| TTP | NKG2D | MyD88 | CD79b |
| TTP | NKG2D | CD7 | CD8 |
| TTP | NKG2D | CD7 | CD3ζ |
| TTP | NKG2D | CD7 | CD3δ |
| TTP | NKG2D | CD7 | CD3γ |
| TTP | NKG2D | CD7 | CD3ε |
| TTP | NKG2D | CD7 | FcγRI-γ |
| TTP | NKG2D | CD7 | FcγRIII-γ |
| TTP | NKG2D | CD7 | FcεRIβ |
| TTP | NKG2D | CD7 | FcεRIγ |
| TTP | NKG2D | CD7 | DAP10 |
| TTP | NKG2D | CD7 | DAP12 |
| TTP | NKG2D | CD7 | CD32 |
| TTP | NKG2D | CD7 | CD79a |
| TTP | NKG2D | CD7 | CD79b |
| TTP | NKG2D | BTNL3 | CD8 |
| TTP | NKG2D | BTNL3 | CD3ζ |
| TTP | NKG2D | BTNL3 | CD3δ |
| TTP | NKG2D | BTNL3 | CD3γ |
| TTP | NKG2D | BTNL3 | CD3ε |
| TTP | NKG2D | BTNL3 | FcγRI-γ |
| TTP | NKG2D | BTNL3 | FcγRIII-γ |
| TTP | NKG2D | BTNL3 | FcεRIβ |
| TTP | NKG2D | BTNL3 | FcεRIγ |
| TTP | NKG2D | BTNL3 | DAP10 |
| TTP | NKG2D | BTNL3 | DAP12 |
| TTP | NKG2D | BTNL3 | CD32 |
| TTP | NKG2D | BTNL3 | CD79a |
| TTP | NKG2D | BTNL3 | CD79b |
| TTP | NKG2D | NKG2D | CD8 |
| TTP | NKG2D | NKG2D | CD3ζ |
| TTP | NKG2D | NKG2D | CD3δ |
| TTP | NKG2D | NKG2D | CD3γ |
| TTP | NKG2D | NKG2D | CD3ε |
| TTP | NKG2D | NKG2D | FcγRI-γ |
| TTP | NKG2D | NKG2D | FcγRIII-γ |
| TTP | NKG2D | NKG2D | FcεRIβ |
| TTP | NKG2D | NKG2D | FcεRIγ |
| TTP | NKG2D | NKG2D | DAP10 |
| TTP | NKG2D | NKG2D | DAP12 |
| TTP | NKG2D | NKG2D | CD32 |
| TTP | NKG2D | NKG2D | CD79a |
| TTP | NKG2D | NKG2D | CD79b |

TABLE 4

| CARs lacking Co-Simulatory Signal (for dual CAR approach) | | |
|---|---|---|
| | Co-stimulatory Signal | Signal Domain |
| TTP | none | CD8 |
| TTP | none | CD3 |
| TTP | none | CD3ζ |
| TTP | none | CD3γ |
| TTP | none | CD3ε |
| TTP | none | FcγRI-γ |
| TTP | none | FcγRIII-γ |
| TTP | none | FcεRI8 |
| TTP | none | FcεRIγ |
| TTP | none | DAP10 |
| TTP | none | DAP12 |
| TTP | none | CD32 |
| TTP | none | CD79a |
| TTP | none | CD8 |
| TTP | none | CD3ζ |
| TTP | none | CD3δ |
| TTP | none | CD3γ |
| TTP | none | CD3ε |
| TTP | none | FcγRI-γ |

TABLE 5

| CARs lacking Signal Domain (for dual CAR approach) | | |
|---|---|---|
| | Co-stimulatory Signal | Signal Domain |
| TTP | CD28 | none |
| TTP | CD8 | none |
| TTP | CD4 | none |
| TTP | b2c | none |
| TTP | CD137/41BB | none |
| TTP | ICOS | none |
| TTP | CD27 | none |
| TTP | CD28δ | none |
| TTP | CD80 | none |
| TTP | CD86 | none |
| TTP | OX40 | none |
| TTP | DAP10 | none |
| TTP | MyD88 | none |
| TTP | CD7 | none |
| TTP | DAP12 | none |
| TTP | MyD88 | none |
| TTP | CD7 | none |
| TTP | BTNL3 | none |
| TTP | NKG2D | none |

TABLE 6

| Third Generation CARs lacking Signal Domain (for dual CAR approach) | | | |
|---|---|---|---|
| | Co-stimulatory Signal | Co-stimulatory Signal | Signal Domain |
| TTP | CD28 | CD28 | none |
| TTP | CD28 | CD8 | none |
| TTP | CD28 | CD4 | none |
| TTP | CD28 | b2c | none |
| TTP | CD28 | CD137/41BB | none |
| TTP | CD28 | ICOS | none |
| TTP | CD28 | CD27 | none |
| TTP | CD28 | CD286 | none |
| TTP | CD28 | CD80 | none |
| TTP | CD28 | CD86 | none |
| TTP | CD28 | OX40 | none |
| TTP | CD28 | DAP10 | none |
| TTP | CD28 | MyD88 | none |
| TTP | CD28 | CD7 | none |
| TTP | CD28 | DAP12 | none |
| TTP | CD28 | MyD88 | none |
| TTP | CD28 | CD7 | none |

TABLE 6-continued

Third Generation CARs lacking Signal Domain (for dual CAR approach)

| | Co-stimulatory Signal | Co-stimulatory Signal | Signal Domain |
|---|---|---|---|
| TTP | CD8 | CD28 | none |
| TTP | CD8 | CD8 | none |
| TTP | CD8 | CD4 | none |
| TTP | CD8 | b2c | none |
| TTP | CD8 | CD137/41BB | none |
| TTP | CD8 | ICOS | none |
| TTP | CD8 | CD27 | none |
| TTP | CD8 | CD28δ | none |
| TTP | CD8 | CD80 | none |
| TTP | CD8 | CD86 | none |
| TTP | CD8 | OX40 | none |
| TTP | CD8 | DAP10 | none |
| TTP | CD8 | MyD88 | none |
| TTP | CD8 | CD7 | none |
| TTP | CD8 | DAP12 | none |
| TTP | CD8 | MyD88 | none |
| TTP | CD8 | CD7 | none |
| TTP | CD4 | CD28 | none |
| TTP | CD4 | CD8 | none |
| TTP | CD4 | CD4 | none |
| TTP | CD4 | b2c | none |
| TTP | CD4 | CD137/41BB | none |
| TTP | CD4 | ICOS | none |
| TTP | CD4 | CD27 | none |
| TTP | CD4 | CD286 | none |
| TTP | CD4 | CD80 | none |
| TTP | CD4 | CD86 | none |
| TTP | CD4 | OX40 | none |
| TTP | CD4 | DAP10 | none |
| TTP | CD4 | MyD88 | none |
| TTP | CD4 | CD7 | none |
| TTP | CD4 | DAP12 | none |
| TTP | CD4 | MyD88 | none |
| TTP | CD4 | CD7 | none |
| TTP | b2c | CD28 | none |
| TTP | b2c | CD8 | none |
| TTP | b2c | CD4 | none |
| TTP | b2c | b2c | none |
| TTP | b2c | CD137/41BB | none |
| TTP | b2c | ICOS | none |
| TTP | b2c | CD27 | none |
| TTP | b2c | CD28δ | none |
| TTP | b2c | CD80 | none |
| TTP | b2c | CD86 | none |
| TTP | b2c | OX40 | none |
| TTP | b2c | DAP10 | none |
| TTP | b2c | MyD88 | none |
| TTP | b2c | CD7 | none |
| TTP | b2c | DAP12 | none |
| TTP | b2c | MyD88 | none |
| TTP | b2c | CD7 | none |
| TTP | CD137/41BB | CD28 | none |
| TTP | CD137/41BB | CD8 | none |
| TTP | CD137/41BB | CD4 | none |
| TTP | CD137/41BB | b2c | none |
| TTP | CD137/41BB | CD137/41BB | none |
| TTP | CD137/41BB | ICOS | none |
| TTP | CD137/41BB | CD27 | none |
| TTP | CD137/41BB | CD28δ | none |
| TTP | CD137/41BB | CD80 | none |
| TTP | CD137/41BB | CD86 | none |
| TTP | CD137/41BB | OX40 | none |
| TTP | CD137/41BB | DAP10 | none |
| TTP | CD137/41BB | MyD88 | none |
| TTP | CD137/41BB | CD7 | none |
| TTP | CD137/41BB | DAP12 | none |
| TTP | CD137/41BB | MyD88 | none |
| TTP | CD137/41BB | CD7 | none |
| TTP | ICOS | CD28 | none |
| TTP | ICOS | CD8 | none |
| TTP | ICOS | CD4 | none |
| TTP | ICOS | b2c | none |
| TTP | ICOS | CD137/41BB | none |
| TTP | ICOS | ICOS | none |

TABLE 6-continued

Third Generation CARs lacking Signal Domain (for dual CAR approach)

| | Co-stimulatory Signal | Co-stimulatory Signal | Signal Domain |
|---|---|---|---|
| TTP | ICOS | CD27 | none |
| TTP | ICOS | CD28δ | none |
| TTP | ICOS | CD80 | none |
| TTP | ICOS | CD86 | none |
| TTP | ICOS | OX40 | none |
| TTP | ICOS | DAP10 | none |
| TTP | ICOS | MyD88 | none |
| TTP | ICOS | CD7 | none |
| TTP | ICOS | DAP12 | none |
| TTP | ICOS | MyD88 | none |
| TTP | ICOS | CD7 | none |
| TTP | ICOS | CD28 | none |
| TTP | ICOS | CD8 | none |
| TTP | ICOS | CD4 | none |
| TTP | ICOS | b2c | none |
| TTP | ICOS | CD137/41BB | none |
| TTP | ICOS | ICOS | none |
| TTP | ICOS | CD27 | none |
| TTP | ICOS | CD28δ | none |
| TTP | ICOS | CD80 | none |
| TTP | ICOS | CD86 | none |
| TTP | ICOS | OX40 | none |
| TTP | ICOS | DAP10 | none |
| TTP | ICOS | MyD88 | none |
| TTP | ICOS | CD7 | none |
| TTP | ICOS | DAP12 | none |
| TTP | ICOS | MyD88 | none |
| TTP | ICOS | CD7 | none |
| TTP | CD27 | CD28 | none |
| TTP | CD27 | CD8 | none |
| TTP | CD27 | CD4 | none |
| TTP | CD27 | b2c | none |
| TTP | CD27 | CD137/41BB | none |
| TTP | CD27 | ICOS | none |
| TTP | CD27 | CD27 | none |
| TTP | CD27 | CD28δ | none |
| TTP | CD27 | CD80 | none |
| TTP | CD27 | CD86 | none |
| TTP | CD27 | OX40 | none |
| TTP | CD27 | DAP10 | none |
| TTP | CD27 | MyD88 | none |
| TTP | CD27 | CD7 | none |
| TTP | CD27 | DAP12 | none |
| TTP | CD27 | MyD88 | none |
| TTP | CD27 | CD7 | none |
| TTP | CD28δ | CD28 | none |
| TTP | CD28δ | CD8 | none |
| TTP | CD28δ | CD4 | none |
| TTP | CD28δ | b2c | none |
| TTP | CD28δ | CD137/41BB | none |
| TTP | CD28δ | ICOS | none |
| TTP | CD28δ | CD27 | none |
| TTP | CD28δ | CD28δ | none |
| TTP | CD28δ | CD80 | none |
| TTP | CD28δ | CD86 | none |
| TTP | CD28δ | OX40 | none |
| TTP | CD28δ | DAP10 | none |
| TTP | CD28δ | MyD88 | none |
| TTP | CD28δ | CD7 | none |
| TTP | CD28δ | DAP12 | none |
| TTP | CD28δ | MyD88 | none |
| TTP | CD28δ | CD7 | none |
| TTP | CD80 | CD28 | none |
| TTP | CD80 | CD8 | none |
| TTP | CD80 | CD4 | none |
| TTP | CD80 | b2c | none |
| TTP | CD80 | CD137/41BB | none |
| TTP | CD80 | ICOS | none |
| TTP | CD80 | CD27 | none |
| TTP | CD80 | CD28δ | none |
| TTP | CD80 | CD80 | none |
| TTP | CD80 | CD86 | none |
| TTP | CD80 | OX40 | none |
| TTP | CD80 | DAP10 | none |

TABLE 6-continued

| Third Generation CARs lacking Signal Domain (for dual CAR approach) | | | |
|---|---|---|---|
| | Co-stimulatory Signal | Co-stimulatory Signal | Signal Domain |
| TTP | CD80 | MyD88 | none |
| TTP | CD80 | CD7 | none |
| TTP | CD80 | DAP12 | none |
| TTP | CD80 | MyD88 | none |
| TTP | CD80 | CD7 | none |
| TTP | CD86 | CD28 | none |
| TTP | CD86 | CD8 | none |
| TTP | CD86 | CD4 | none |
| TTP | CD86 | b2c | none |
| TTP | CD86 | CD137/41BB | none |
| TTP | CD86 | ICOS | none |
| TTP | CD86 | CD27 | none |
| TTP | CD86 | CD28δ | none |
| TTP | CD86 | CD80 | none |
| TTP | CD86 | CD86 | none |
| TTP | CD86 | OX40 | none |
| TTP | CD86 | DAP10 | none |
| TTP | CD86 | MyD88 | none |
| TTP | CD86 | CD7 | none |
| TTP | CD86 | DAP12 | none |
| TTP | CD86 | MyD88 | none |
| TTP | CD86 | CD7 | none |
| TTP | OX40 | CD28 | none |
| TTP | OX40 | CD8 | none |
| TTP | OX40 | CD4 | none |
| TTP | OX40 | b2c | none |
| TTP | OX40 | CD137/41BB | none |
| TTP | OX40 | ICOS | none |
| TTP | OX40 | CD27 | none |
| TTP | OX40 | CD28δ | none |
| TTP | OX40 | CD80 | none |
| TTP | OX40 | CD86 | none |
| TTP | OX40 | OX40 | none |
| TTP | OX40 | DAP10 | none |
| TTP | OX40 | MyD88 | none |
| TTP | OX40 | CD7 | none |
| TTP | OX40 | DAP12 | none |
| TTP | OX40 | MyD88 | none |
| TTP | OX40 | CD7 | none |
| TTP | DAP10 | CD28 | none |
| TTP | DAP10 | CD8 | none |
| TTP | DAP10 | CD4 | none |
| TTP | DAP10 | b2c | none |
| TTP | DAP10 | CD137/41BB | none |
| TTP | DAP10 | ICOS | none |
| TTP | DAP10 | CD27 | none |
| TTP | DAP10 | CD28δ | none |
| TTP | DAP10 | CD80 | none |
| TTP | DAP10 | CD86 | none |
| TTP | DAP10 | OX40 | none |
| TTP | DAP10 | DAP10 | none |
| TTP | DAP10 | MyD88 | none |
| TTP | DAP10 | CD7 | none |
| TTP | DAP10 | DAP12 | none |
| TTP | DAP10 | MyD88 | none |
| TTP | DAP10 | CD7 | none |
| TTP | DAP12 | CD28 | none |
| TTP | DAP12 | CD8 | none |
| TTP | DAP12 | CD4 | none |
| TTP | DAP12 | b2c | none |
| TTP | DAP12 | CD137/41BB | none |
| TTP | DAP12 | ICOS | none |
| TTP | DAP12 | CD27 | none |
| TTP | DAP12 | CD28δ | none |
| TTP | DAP12 | CD80 | none |
| TTP | DAP12 | CD86 | none |
| TTP | DAP12 | OX40 | none |
| TTP | DAP12 | DAP10 | none |
| TTP | DAP12 | MyD88 | none |
| TTP | DAP12 | CD7 | none |
| TTP | DAP12 | DAP12 | none |
| TTP | DAP12 | MyD88 | none |
| TTP | DAP12 | CD7 | none |
| TTP | MyD88 | CD28 | none |

TABLE 6-continued

| Third Generation CARs lacking Signal Domain (for dual CAR approach) | | | |
|---|---|---|---|
| | Co-stimulatory Signal | Co-stimulatory Signal | Signal Domain |
| TTP | MyD88 | CD8 | none |
| TTP | MyD88 | CD4 | none |
| TTP | MyD88 | b2c | none |
| TTP | MyD88 | CD137/41BB | none |
| TTP | MyD88 | ICOS | none |
| TTP | MyD88 | CD27 | none |
| TTP | MyD88 | CD28δ | none |
| TTP | MyD88 | CD80 | none |
| TTP | MyD88 | CD86 | none |
| TTP | MyD88 | OX40 | none |
| TTP | MyD88 | DAP10 | none |
| TTP | MyD88 | MyD88 | none |
| TTP | MyD88 | CD7 | none |
| TTP | MyD88 | DAP12 | none |
| TTP | MyD88 | MyD88 | none |
| TTP | MyD88 | CD7 | none |
| TTP | CD7 | CD28 | none |
| TTP | CD7 | CD8 | none |
| TTP | CD7 | CD4 | none |
| TTP | CD7 | b2c | none |
| TTP | CD7 | CD137/41BB | none |
| TTP | CD7 | ICOS | none |
| TTP | CD7 | CD27 | none |
| TTP | CD7 | CD28δ | none |
| TTP | CD7 | CD80 | none |
| TTP | CD7 | CD86 | none |
| TTP | CD7 | OX40 | none |
| TTP | CD7 | DAP10 | none |
| TTP | CD7 | MyD88 | none |
| TTP | CD7 | CD7 | none |
| TTP | CD7 | DAP12 | none |
| TTP | CD7 | MyD88 | none |
| TTP | CD7 | CD7 | none |
| TTP | BTNL3 | CD28 | none |
| TTP | BTNL3 | CD8 | none |
| TTP | BTNL3 | CD4 | none |
| TTP | BTNL3 | b2c | none |
| TTP | BTNL3 | CD137/41BB | none |
| TTP | BTNL3 | ICOS | none |
| TTP | BTNL3 | CD27 | none |
| TTP | BTNL3 | CD28δ | none |
| TTP | BTNL3 | CD80 | none |
| TTP | BTNL3 | CD86 | none |
| TTP | BTNL3 | OX40 | none |
| TTP | BTNL3 | DAP10 | none |
| TTP | BTNL3 | MyD88 | none |
| TTP | BTNL3 | CD7 | none |
| TTP | BTNL3 | DAP12 | none |
| TTP | BTNL3 | MyD88 | none |
| TTP | BTNL3 | CD7 | none |
| TTP | NKG2D | CD28 | none |
| TTP | NKG2D | CD8 | none |
| TTP | NKG2D | CD4 | none |
| TTP | NKG2D | b2c | none |
| TTP | NKG2D | CD137/41BB | none |
| TTP | NKG2D | ICOS | none |
| TTP | NKG2D | CD27 | none |
| TTP | NKG2D | CD28δ | none |
| TTP | NKG2D | CD80 | none |
| TTP | NKG2D | CD86 | none |
| TTP | NKG2D | OX40 | none |
| TTP | NKG2D | DAP10 | none |
| TTP | NKG2D | MyD88 | none |
| TTP | NKG2D | CD7 | none |
| TTP | NKG2D | DAP12 | none |
| TTP | NKG2D | MyD88 | none |
| TTP | NKG2D | CD7 | none |

Also disclosed are bi-specific CARs. Also disclosed are CARs designed to work only in conjunction with another CAR that binds a different antigen, such as a tumor antigen. For example, in these embodiments, the endodomain of the disclosed CAR can contain only a signaling domain (SD) or a co-stimulatory signaling region (CSR), but not both. The second CAR (or endogenous T-cell) provides the missing signal if it is activated. For example, if the disclosed CAR contains an SD but not a CSR, then the immune effector cell containing this CAR is only activated if another CAR (or T-cell) containing a CSR binds its respective antigen. Likewise, if the disclosed CAR contains a CSR but not a SD, then the immune effector cell containing this CAR is only activated if another CAR (or T-cell) containing an SD binds its respective antigen.

Tumor antigens are proteins that are produced by tumor cells that elicit an immune response, particularly T-cell mediated immune responses. The additional antigen binding domain can be an antibody or a natural ligand of the tumor antigen. The selection of the additional antigen binding domain will depend on the particular type of cancer to be treated. Tumor antigens are well known in the art and include, for example, a glioma-associated antigen, carcinoembryonic antigen (CEA), EGFRvIII, IL-IIRa, IL-13Ra, EGFR, FAP, B7H3, Kit, CA LX, CS-1, MUC1, BCMA, bcr-abl, HER2, β-human chorionic gonadotropin, alphafetoprotein (AFP), ALK, CD19, TIM3, cyclin BI, lectin-reactive AFP, Fos-related antigen 1, ADRB3, thyroglobulin, EphA2, RAGE-1, RUI, RU2, SSX2, AKAP-4, LCK, OY-TESI, PAX5, SART3, CLL-1, fucosyl GM1, GloboH, MN-CA IX, EPCAM, EVT6-AML, TGS5, human telomerase reverse transcriptase, plysialic acid, PLAC1, RUI, RU2 (AS), intestinal carboxyl esterase, lewisY, sLe, LY6K, mut hsp70-2, M-CSF, MYCN, RhoC, TRP-2, CYPIBI, BORIS, prostase, prostate-specific antigen (PSA), PAX3, PAP, NY-ESO-1, LAGE-Ia, LMP2, NCAM, p53, p53 mutant, Ras mutant, gplOO, prostein, OR51E2, PANX3, PSMA, PSCA, Her2/neu, hTERT, HMWMAA, HAVCR1, VEGFR2, PDGFR-beta, survivin and telomerase, legumain, HPV E6, E7, sperm protein 17, SSEA-4, tyrosinase, TARP, WT1, prostate-carcinoma tumor antigen-1 (PCTA-1), ML-IAP, MAGE, MAGE-A1, MAD-CT-1, MAD-CT-2, MelanA/MART 1, XAGE1, ELF2M, ERG (TMPRSS2 ETS fusion gene), NA17, neutrophil elastase, sarcoma translocation breakpoints, NY-BR-1, ephnnB2, CD20, CD22, CD24, CD30, TIM3, CD38, CD44v6, CD97, CD171, CD179a, androgen receptor, FAP, insulin growth factor (IGF)-I, IGFII, IGF-I receptor, GD2, o-acetyl-GD2, GD3, GM3, GPRC5D, GPR20, CXORF61, folate receptor (FRa), folate receptor beta, ROR1, Flt3, TAG72, TN Ag, Tie 2, TEM1, TEM7R, CLDN6, TSHR, UPK2, and mesothelin. In a preferred embodiment, the tumor antigen is selected from the group consisting of folate receptor (FRa), mesothelin, EGFRvIII, IL-13Ra, SSTR2, CD19, TIM3, BCMA, GD2, CLL-1, CA-IX, MUCI, HER2, and any combination thereof.

Non-limiting examples of tumor antigens include the following: Differentiation antigens such as tyrosinase, TRP-1, TRP-2 and tumor-specific multilineage antigens such as MAGE-1, MAGE-3, BAGE, GAGE-1, GAGE-2, pi 5; overexpressed embryonic antigens such as CEA; overexpressed oncogenes and mutated tumor-suppressor genes such as p53, Ras, HER-2/neu; unique tumor antigens resulting from chromosomal translocations; such as BCR-ABL, E2A-PRL, H4-RET, IGH-IGK, MYL-RAR; and viral antigens, such as the Epstein Barr virus antigens EBVA and the human papillomavirus (HPV) antigens E6 and E7. Other large, protein-based antigens include TSP-180, MAGE-4, MAGE-5, MAGE-6, RAGE, NY-ESO, pl85erbB2, pl80erbB-3, c-met, nm-23H1, PSA, CA 19-9, CA 72-4, CAM 17.1, NuMa, K-ras, beta-Catenin, CDK4, Mum-1, p 15, p 16, 43-9F, 5T4, 791Tgp72, alpha-fetoprotein, beta-HCG, BCA225, BTAA, CA 125, CA 15-3\CA 27.29\BCAA, CA 195, CA 242, CA-50, CAM43, CD68\P1, CO-029, FGF-5, G250, Ga733\EpCAM, HTgp-175, M344, MA-50, MG7-Ag, MOV18, NB/70K, NY-CO-1, RCASI, SDCCAG1 6, TA-90\Mac-2 binding protein\cyclophilm C-associated protein, TAAL6, TAG72, TLP, TPS, GPC3, MUC16, LMP1, EBMA-1, BARF-1, CS1, CD319, HER1, B7H6, L1CAM, IL6, and MET.

Also disclosed are polynucleotides and polynucleotide vectors encoding the disclosed GSC-specific CARs that allow expression of the GSC-specific CARs in the disclosed immune effector cells.

Nucleic acid sequences encoding the disclosed CARs, and regions thereof, can be obtained using recombinant methods known in the art, such as, for example by screening libraries from cells expressing the gene, by deriving the gene from a vector known to include the same, or by isolating directly from cells and tissues containing the same, using standard techniques. Alternatively, the gene of interest can be produced synthetically, rather than cloned.

Expression of nucleic acids encoding CARs is typically achieved by operably linking a nucleic acid encoding the CAR polypeptide to a promoter, and incorporating the construct into an expression vector. Typical cloning vectors contain transcription and translation terminators, initiation sequences, and promoters useful for regulation of the expression of the desired nucleic acid sequence.

The disclosed nucleic acid can be cloned into a number of types of vectors. For example, the nucleic acid can be cloned into a vector including, but not limited to a plasmid, a phagemid, a phage derivative, an animal virus, and a cosmid. Vectors of particular interest include expression vectors, replication vectors, probe generation vectors, and sequencing vectors.

Further, the expression vector may be provided to a cell in the form of a viral vector. Viral vector technology is well known in the art and is described, for example, in Sambrook et al. (2001, Molecular Cloning: A Laboratory Manual, Cold Spring Harbor Laboratory, New York), and in other virology and molecular biology manuals. Viruses, which are useful as vectors include, but are not limited to, retroviruses, adenoviruses, adeno-associated viruses, herpes viruses, and lentiviruses. In general, a suitable vector contains an origin of replication functional in at least one organism, a promoter sequence, convenient restriction endonuclease sites, and one or more selectable markers. In some embodiments, the polynucleotide vectors are lentiviral or retroviral vectors.

A number of viral based systems have been developed for gene transfer into mammalian cells. For example, retroviruses provide a convenient platform for gene delivery systems. A selected gene can be inserted into a vector and packaged in retroviral particles using techniques known in the art. The recombinant virus can then be isolated and delivered to cells of the subject either in vivo or ex vivo.

One example of a suitable promoter is the immediate early cytomegalovirus (CMV) promoter sequence. This promoter sequence is a strong constitutive promoter sequence capable of driving high levels of expression of any polynucleotide sequence operatively linked thereto. Another example of a suitable promoter is Elongation Growth Factor-1a (EF-1a). However, other constitutive promoter sequences may also be used, including, but not limited to the simian virus 40 (SV40) early promoter, MND (myeloproliferative sarcoma virus) promoter, mouse mammary tumor virus (MMTV), human immunodeficiency virus (HIV) long terminal repeat (LTR) promoter, MoMuLV promoter, an avian leukemia virus promoter, an Epstein-Barr virus immediate early promoter, a Rous sarcoma virus promoter, as well as human gene promoters such as, but not limited to, the actin promoter, the myosin promoter, the hemoglobin promoter, and the creatine kinase promoter. The promoter can alternatively be an inducible promoter. Examples of inducible promoters include, but are not limited to a metallothionine promoter, a glucocorticoid promoter, a progesterone promoter, and a tetracycline promoter.

Additional promoter elements, e.g., enhancers, regulate the frequency of transcriptional initiation. Typically, these are located in the region 30-110 bp upstream of the start site, although a number of promoters have recently been shown to contain functional elements downstream of the start site as well. The spacing between promoter elements frequently is flexible, so that promoter function is preserved when elements are inverted or moved relative to one another.

In order to assess the expression of a CAR polypeptide or portions thereof, the expression vector to be introduced into a cell can also contain either a selectable marker gene or a reporter gene or both to facilitate identification and selection of expressing cells from the population of cells sought to be transfected or infected through viral vectors. In other aspects, the selectable marker may be carried on a separate piece of DNA and used in a co-transfection procedure. Both selectable markers and reporter genes may be flanked with appropriate regulatory sequences to enable expression in the host cells. Useful selectable markers include, for example, antibiotic-resistance genes.

Reporter genes are used for identifying potentially transfected cells and for evaluating the functionality of regulatory sequences. In general, a reporter gene is a gene that is not present in or expressed by the recipient organism or tissue and that encodes a polypeptide whose expression is manifested by some easily detectable property, e.g., enzymatic activity. Expression of the reporter gene is assayed at a suitable time after the DNA has been introduced into the recipient cells. Suitable reporter genes may include genes encoding luciferase, beta-galactosidase, chloramphenicol acetyl transferase, secreted alkaline phosphatase, or the green fluorescent protein gene. Suitable expression systems are well known and may be prepared using known techniques or obtained commercially. In general, the construct with the minimal 5' flanking region showing the highest level of expression of reporter gene is identified as the promoter. Such promoter regions may be linked to a reporter gene and used to evaluate agents for the ability to modulate promoter-driven transcription.

Methods of introducing and expressing genes into a cell are known in the art. In the context of an expression vector, the vector can be readily introduced into a host cell, e.g., mammalian, bacterial, yeast, or insect cell by any method in the art. For example, the expression vector can be transferred into a host cell by physical, chemical, or biological means.

Physical methods for introducing a polynucleotide into a host cell include calcium phosphate precipitation, lipofection, particle bombardment, microinjection, electroporation, and the like. Methods for producing cells comprising vectors and/or exogenous nucleic acids are well-known in the art. See, for example, Sambrook et al. (2001, Molecular Cloning: A Laboratory Manual, Cold Spring Harbor Laboratory, New York).

Biological methods for introducing a polynucleotide of interest into a host cell include the use of DNA and RNA vectors. Viral vectors, and especially retroviral vectors, have become the most widely used method for inserting genes into mammalian, e.g., human cells.

Chemical means for introducing a polynucleotide into a host cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as a delivery vehicle in vitro and in vivo is a liposome (e.g., an artificial membrane vesicle).

In the case where a non-viral delivery system is utilized, an exemplary delivery vehicle is a liposome. In another aspect, the nucleic acid may be associated with a lipid. The nucleic acid associated with a lipid may be encapsulated in the aqueous interior of a liposome, interspersed within the lipid bilayer of a liposome, attached to a liposome via a linking molecule that is associated with both the liposome and the oligonucleotide, entrapped in a liposome, complexed with a liposome, dispersed in a solution containing a lipid, mixed with a lipid, combined with a lipid, contained as a suspension in a lipid, contained or complexed with a micelle, or otherwise associated with a lipid. Lipid, lipid/DNA or lipid/expression vector associated compositions are not limited to any particular structure in solution. For example, they may be present in a bilayer structure, as micelles, or with a "collapsed" structure. They may also simply be interspersed in a solution, possibly forming aggregates that are not uniform in size or shape. Lipids are fatty substances which may be naturally occurring or synthetic lipids. For example, lipids include the fatty droplets that naturally occur in the cytoplasm as well as the class of compounds which contain long-chain aliphatic hydrocarbons and their derivatives, such as fatty acids, alcohols, amines, amino alcohols, and aldehydes. Lipids suitable for use can be obtained from commercial sources. For example, dimyristyl phosphatidylcholine ("DMPC") can be obtained from Sigma, St. Louis, Mo.; dicetyl phosphate ("DCP") can be obtained from K & K Laboratories (Plainview, N.Y.); cholesterol ("Choi") can be obtained from Calbiochem-Behring; dimyristyl phosphatidylglycerol ("DMPG") and other lipids may be obtained from Avanti Polar Lipids, Inc, (Birmingham, Ala.).

Also disclosed are immune effector cells that are engineered to express the disclosed CARs (also referred to herein as "CAR-T cells." These cells are preferably obtained from the subject to be treated (i.e. are autologous). However, in some embodiments, immune effector cell lines or donor effector cells (allogeneic) are used. Immune effector cells can be obtained from a number of sources, including peripheral blood mononuclear cells, bone marrow, lymph node tissue, cord blood, thymus tissue, tissue from a site of infection, ascites, pleural effusion, spleen tissue, and tumors. Immune effector cells can be obtained from blood collected from a subject using any number of techniques known to the skilled artisan, such as Ficoll™ separation. For example, cells from the circulating blood of an individual may be obtained by apheresis. In some embodiments, immune effector cells are isolated from peripheral blood lymphocytes by lysing the red blood cells and depleting the monocytes, for example, by centrifugation through a PERCOLL™ gradient or by counterflow centrifugal elutriation. A specific subpopulation of immune effector cells can be further isolated by positive or negative selection techniques. For example, immune effector cells can be isolated using a combination of antibodies directed to surface markers unique to the positively selected cells, e.g., by incubation with antibody-conjugated beads for a time period sufficient for positive selection of the desired immune effector cells. Alternatively, enrichment of immune effector cells population can be accomplished by negative selection using a combination of antibodies directed to surface markers unique to the negatively selected cells.

In some embodiments, the immune effector cells comprise any leukocyte involved in defending the body against infectious disease and foreign materials. For example, the immune effector cells can comprise lymphocytes, monocytes, macrophages, dentritic cells, mast cells, neutrophils, basophils, eosinophils, or any combinations thereof. For example, the immune effector cells can comprise T lymphocytes.

T cells or T lymphocytes can be distinguished from other lymphocytes, such as B cells and natural killer cells (NK cells), by the presence of a T-cell receptor (TCR) on the cell surface. They are called T cells because they mature in the thymus (although some also mature in the tonsils). There are several subsets of T cells, each with a distinct function.

T helper cells ($T_H$ cells) assist other white blood cells in immunologic processes, including maturation of B cells into plasma cells and memory B cells, and activation of cytotoxic T cells and macrophages. These cells are also known as CD4+ T cells because they express the CD4 glycoprotein on their surface. Helper T cells become activated when they are presented with peptide antigens by MHC class II molecules, which are expressed on the surface of antigen-presenting cells (APCs). Once activated, they divide rapidly and secrete small proteins called cytokines that regulate or assist in the active immune response. These cells can differentiate into one of several subtypes, including $T_H1$, $T_H2$, $T_H3$, $T_H7$, $T_H9$, or $T_{FH}$, which secrete different cytokines to facilitate a different type of immune response.

Cytotoxic T cells ($T_C$ cells, or CTLs) destroy virally infected cells and tumor cells, and are also implicated in transplant rejection. These cells are also known as $CD8^+$ T cells since they express the CD8 glycoprotein at their surface. These cells recognize their targets by binding to antigen associated with MHC class I molecules, which are present on the surface of all nucleated cells. Through IL-10, adenosine and other molecules secreted by regulatory T cells, the CD8+ cells can be inactivated to an anergic state, which prevents autoimmune diseases.

Memory T cells are a subset of antigen-specific T cells that persist long-term after an infection has resolved. They quickly expand to large numbers of effector T cells upon re-exposure to their cognate antigen, thus providing the immune system with "memory" against past infections. Memory cells may be either $CD4^+$ or $CD8^+$. Memory T cells typically express the cell surface protein CD45RO.

Regulatory T cells ($T_{reg}$ cells), formerly known as suppressor T cells, are crucial for the maintenance of immunological tolerance. Their major role is to shut down T cell-mediated immunity toward the end of an immune reaction and to suppress auto-reactive T cells that escaped the process of negative selection in the thymus. Two major classes of $CD4^+$ $T_{reg}$ cells have been described—naturally occurring $T_{reg}$ cells and adaptive $T_{reg}$ cells.

Natural killer T (NKT) cells (not to be confused with natural killer (NK) cells) bridge the adaptive immune system with the innate immune system. Unlike conventional T cells that recognize peptide antigens presented by major histocompatibility complex (MHC) molecules, NKT cells recognize glycolipid antigen presented by a molecule called CD1d.

In some embodiments, the T cells comprise a mixture of CD4+ cells. In other embodiments, the T cells are enriched for one or more subsets based on cell surface expression. For example, in some cases, the T comprise are cytotoxic $CD8^+$ T lymphocytes. In some embodiments, the T cells comprise γδ T cells, which possess a distinct T-cell receptor (TCR) having one γ chain and one δ chain instead of α and β chains.

Natural-killer (NK) cells are $CD56^+CD3^-$ large granular lymphocytes that can kill virally infected and transformed cells, and constitute a critical cellular subset of the innate immune system (Godfrey J, et al. Leuk Lymphoma 2012 53:1666-1676). Unlike cytotoxic $CD8^+$ T lymphocytes, NK cells launch cytotoxicity against tumor cells without the requirement for prior sensitization, and can also eradicate MHC-1-negative cells (Narni-Mancinelli E, et al. Int Immunol 2011 23:427-431). NK cells are safer effector cells, as they may avoid the potentially lethal complications of cytokine storms (Morgan R A, et al. Mol Ther 2010 18:843-851), tumor lysis syndrome (Porter D L, et al. N Engl J Med 2011 365:725-733), and on-target, off-tumor effects. Although NK cells have a well-known role as killers of cancer cells, and NK cell impairment has been extensively documented as crucial for progression of MM (Godfrey J, et al. Leuk Lymphoma 2012 53:1666-1676; Fauriat C, et al. Leukemia 2006 20:732-733), the means by which one might enhance NK cell-mediated anti-MM activity has been largely unexplored prior to the disclosed CARs.

Immune effector cells expressing the disclosed CARs can elicit an anti-tumor immune response against GSCs. The anti-tumor immune response elicited by the disclosed CAR-modified immune effector cells may be an active or a passive immune response. In addition, the CAR-mediated immune response may be part of an adoptive immunotherapy approach in which CAR-modified immune effector cells induce an immune response specific to GSCs.

Adoptive transfer of immune effector cells expressing chimeric antigen receptors is a promising anti-cancer therapeutic. Following the collection of a patient's immune effector cells, the cells may be genetically engineered to express the disclosed GSC-specific CARs, then infused back into the patient.

The disclosed CAR-modified immune effector cells may be administered either alone, or as a pharmaceutical composition in combination with diluents and/or with other components such as IL-2, IL-15, or other cytokines or cell populations. Briefly, pharmaceutical compositions may comprise a target cell population as described herein, in combination with one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions for use in the disclosed methods are in some embodiments formulated for intravenous administration. Pharmaceutical compositions may be administered in any manner appropriate treat MM. The quantity and frequency of administration will be determined by such factors as the condition of the patient, and the severity of the patient's disease, although appropriate dosages may be determined by clinical trials.

When "an immunologically effective amount", "an anti-tumor effective amount", "an tumor-inhibiting effective amount", or "therapeutic amount" is indicated, the precise amount of the compositions of the present invention to be administered can be determined by a physician with consideration of individual differences in age, weight, tumor size, extent of infection or metastasis, and condition of the patient (subject). It can generally be stated that a pharmaceutical composition comprising the T cells described herein may be administered at a dosage of $10^4$ to $10^9$ cells/kg body weight, such as $10^5$ to $10^6$ cells/kg body weight, including all integer values within those ranges. T cell compositions may also be administered multiple times at these dosages. The cells can be administered by using infusion techniques that are commonly known in immunotherapy (see, e.g., Rosenberg et al., New Eng. J. of Med. 319:1676, 1988). The optimal dosage and treatment regime for a particular patient can readily be determined by one skilled in the art of medicine by monitoring the patient for signs of disease and adjusting the treatment accordingly.

In certain embodiments, it may be desired to administer activated T cells to a subject and then subsequently re-draw blood (or have an apheresis performed), activate T cells therefrom according to the disclosed methods, and reinfuse the patient with these activated and expanded T cells. This process can be carried out multiple times every few weeks. In certain embodiments, T cells can be activated from blood draws of from 10 cc to 400 cc. In certain embodiments, T cells are activated from blood draws of 20 cc, 30 cc, 40 cc, 50 cc, 60 cc, 70 cc, 80 cc, 90 cc, or 100 cc. Using this multiple blood draw/multiple reinfusion protocol may serve to select out certain populations of T cells.

The administration of the disclosed compositions may be carried out in any convenient manner, including by injection, transfusion, or implantation. The compositions described herein may be administered to a patient subcutaneously, intradermally, intratumorally, intranodally, intramedullary, intramuscularly, by intravenous (i.v.) injection, or intraperitoneally. In some embodiments, the disclosed compositions are administered to a patient by intradermal or subcutaneous injection. In some embodiments, the disclosed compositions are administered by i.v. injection. The compositions may also be injected directly into a tumor, lymph node, or site of infection.

In certain embodiments, the disclosed CAR-modified immune effector cells are administered to a patient in conjunction with (e.g., before, simultaneously or following) any number of relevant treatment modalities, including but not limited to thalidomide, dexamethasone, bortezomib, and lenalidomide. In further embodiments, the CAR-modified immune effector cells may be used in combination with chemotherapy, radiation, immunosuppressive agents, such as cyclosporin, azathioprine, methotrexate, mycophenolate, and FK506, antibodies, or other immunoablative agents such as CAM PATH, anti-CD3 antibodies or other antibody therapies, cytoxin, fludaribine, cyclosporin, FK506, rapamycin, mycophenolic acid, steroids, FR901228, cytokines, and irradiation. In some embodiments, the CAR-modified immune effector cells are administered to a patient in conjunction with (e.g., before, simultaneously or following) bone marrow transplantation, T cell ablative therapy using either chemotherapy agents such as, fludarabine, external-beam radiation therapy (XRT), cyclophosphamide, or antibodies such as OKT3 or CAMPATH. In another embodiment, the cell compositions of the present invention are administered following B-cell ablative therapy such as agents that react with CD20, e.g., Rituxan. For example, in some embodiments, subjects may undergo standard treatment with high dose chemotherapy followed by peripheral blood stem cell transplantation. In certain embodiments, following the transplant, subjects receive an infusion of the expanded immune cells of the present invention. In an The disclosed CARs can be used in combination with any compound, moiety or group which has a cytotoxic or cytostatic effect. Drug moieties include chemotherapeutic agents, which may function as microtubulin inhibitors, mitosis inhibitors, topoisomerase inhibitors, or DNA intercalators, and particularly those which are used for cancer therapy.

The disclosed CARs can be used in combination with a checkpoint inhibitor. The two known inhibitory checkpoint pathways involve signaling through the cytotoxic T-lymphocyte antigen-4 (CTLA-4) and programmed-death 1 (PD-1) receptors. These proteins are members of the CD28-B7 family of cosignaling molecules that play important roles throughout all stages of T cell function. The PD-1 receptor (also known as CD279) is expressed on the surface of activated T cells. Its ligands, PD-L1 (B7-H1; CD274) and PD-L2 (B7-DC; CD273), are expressed on the surface of APCs such as dendritic cells or macrophages. PD-L1 is the predominant ligand, while PD-L2 has a much more restricted expression pattern. When the ligands bind to PD-1, an inhibitory signal is transmitted into the T cell, which reduces cytokine production and suppresses T-cell proliferation. Checkpoint inhibitors include, but are not limited to antibodies that block PD-1 (Nivolumab (BMS-936558 or MDX1106), CT-011, MK-3475), PD-L1 (MDX-1105 (BMS-936559), MPDL3280A, MSB0010718C), PD-L2 (rHIgM12B7), CTLA-4 (Ipilimumab (MDX-010), Tremelimumab (CP-675,206)), IDO, B7-H3 (MGA271), B7-H4, TIM3, LAG-3 (BMS-986016).

Human monoclonal antibodies to programmed death 1 (PD-1) and methods for treating cancer using anti-PD-1 antibodies alone or in combination with other immunotherapeutics are described in U.S. Pat. No. 8,008,449, which is incorporated by reference for these antibodies. Anti-PD-L1 antibodies and uses therefor are described in U.S. Pat. No. 8,552,154, which is incorporated by reference for these antibodies. Anticancer agent comprising anti-PD-1 antibody or anti-PD-L1 antibody are described in U.S. Pat. No. 8,617,546, which is incorporated by reference for these antibodies.

In some embodiments, the PDL1 inhibitor comprises an antibody that specifically binds PDL1, such as BMS-936559 (Bristol-Myers Squibb) or MPDL3280A (Roche). In some embodiments, the PD1 inhibitor comprises an antibody that specifically binds PD1, such as lambrolizumab (Merck), nivolumab (Bristol-Myers Squibb), or MEDI4736 (AstraZeneca). Human monoclonal antibodies to PD-1 and methods for treating cancer using anti-PD-1 antibodies alone or in combination with other immunotherapeutics are described in U.S. Pat. No. 8,008,449, which is incorporated by reference for these antibodies. Anti-PD-L1 antibodies and uses therefor are described in U.S. Pat. No. 8,552,154, which is incorporated by reference for these antibodies. Anticancer agent comprising anti-PD-1 antibody or anti-PD-L1 antibody are described in U.S. Pat. No. 8,617,546, which is incorporated by reference for these antibodies.

The disclosed CARs can be used in combination with other cancer immunotherapies. There are two distinct types of immunotherapy: passive immunotherapy uses components of the immune system to direct targeted cytotoxic activity against cancer cells, without necessarily initiating an immune response in the patient, while active immunotherapy actively triggers an endogenous immune response. Passive strategies include the use of the monoclonal antibodies (mAbs) produced by B cells in response to a specific antigen. The development of hybridoma technology in the 1970s and the identification of tumor-specific antigens permitted the pharmaceutical development of mAbs that could specifically target tumor cells for destruction by the immune system. Thus far, mAbs have been the biggest success story for immunotherapy; the top three best-selling anticancer drugs in 2012 were mAbs. Among them is rituximab (Rituxan, Genentech), which binds to the CD20 protein that is highly expressed on the surface of B cell malignancies such as non-Hodgkin's lymphoma (NHL). Rituximab is approved by the FDA for the treatment of NHL and chronic lymphocytic leukemia (CLL) in combination with chemotherapy. Another important mAb is trastuzumab (Herceptin; Genentech), which revolutionized the treatment of HER2 (human epidermal growth factor receptor 2)-positive breast cancer by targeting the expression of HER2.

Generating optimal "killer" CD8 T cell responses also requires T cell receptor activation plus co-stimulation, which can be provided through ligation of tumor necrosis factor receptor family members, including OX40 (CD134) and 4-1BB (CD137). OX40 is of particular interest as treatment with an activating (agonist) anti-OX40 mAb augments T cell differentiation and cytolytic function leading to enhanced anti-tumor immunity against a variety of tumors.

In some embodiments, such an additional therapeutic agent may be selected from an antimetabolite, such as methotrexate, 6-mercaptopurine, 6-thioguanine, cytarabine, fludarabine, 5-fluorouracil, decarbazine, hydroxyurea, asparaginase, gemcitabine or cladribine.

In some embodiments, such an additional therapeutic agent may be selected from an alkylating agent, such as mechlorethamine, thioepa, chlorambucil, melphalan, carmustine (BSNU), lomustine (CCNU), cyclophosphamide, busulfan, dibromomannitol, streptozotocin, dacarbazine (DTIC), procarbazine, mitomycin C, cisplatin and other platinum derivatives, such as carboplatin.

In some embodiments, such an additional therapeutic agent may be selected from an anti-mitotic agent, such as taxanes, for instance docetaxel, and paclitaxel, and *vinca* alkaloids, for instance vindesine, vincristine, vinblastine, and vinorelbine.

In some embodiments, such an additional therapeutic agent may be selected from a topoisomerase inhibitor, such as topotecan or irinotecan, or a cytostatic drug, such as etoposide and teniposide.

In some embodiments, such an additional therapeutic agent may be selected from a growth factor inhibitor, such as an inhibitor of ErbBI (EGFR) (such as an EGFR antibody, e.g. zalutumumab, cetuximab, panitumumab or nimotuzumab or other EGFR inhibitors, such as gefitinib or erlotinib), another inhibitor of ErbB2 (HER2/neu) (such as a HER2 antibody, e.g. trastuzumab, trastuzumab-DM I or pertuzumab) or an inhibitor of both EGFR and HER2, such as lapatinib).

In some embodiments, such an additional therapeutic agent may be selected from a tyrosine kinase inhibitor, such as imatinib (Glivec, Gleevec STI571) or lapatinib.

Therefore, in some embodiments, a disclosed antibody is used in combination with ofatumumab, zanolimumab, daratumumab, ranibizumab, nimotuzumab, panitumumab, hu806, daclizumab (Zenapax), basiliximab (Simulect), infliximab (Remicade), adalimumab (Humira), natalizumab (Tysabri), omalizumab (Xolair), efalizumab (Raptiva), and/or rituximab.

In some embodiments, a therapeutic agent for use in combination with a CARs for treating the disorders as described above may be an anti-cancer cytokine, chemokine, or combination thereof. Examples of suitable cytokines and growth factors include IFNy, IL-2, IL-4, IL-6, IL-7, IL-10, IL-12, IL-13, IL-15, IL-18, IL-23, IL-24, IL-27, IL-28a, IL-28b, IL-29, KGF, IFNa (e.g., INFa2b), IFN, GM-CSF, CD40L, Flt3 ligand, stem cell factor, ancestim, and TNFa. Suitable chemokines may include Glu-Leu-Arg (ELR)-negative chemokines such as IP-10, MCP-3, MIG, and SDF-Ia from the human CXC and C-C chemokine families. Suitable cytokines include cytokine derivatives, cytokine variants, cytokine fragments, and cytokine fusion proteins.

In some embodiments, a therapeutic agent for use in combination with a CARs for treating the disorders as described above may be a cell cycle control/apoptosis regulator (or "regulating agent"). A cell cycle control/apoptosis regulator may include molecules that target and modulate cell cycle control/apoptosis regulators such as (i) cdc-25 (such as NSC 663284), (ii) cyclin-dependent kinases that overstimulate the cell cycle (such as flavopiridol (L868275, HMR1275), 7-hydroxystaurosporine (UCN-01, KW-2401), and roscovitine (R-roscovitine, CYC202)), and (iii) telomerase modulators (such as BIBR1532, SOT-095, GRN163 and compositions described in for instance U.S. Pat. Nos. 6,440,735 and 6,713,055). Non-limiting examples of molecules that interfere with apoptotic pathways include TNF-related apoptosis-inducing ligand (TRAIL)/apoptosis-2 ligand (Apo-2L), antibodies that activate TRAIL receptors, IFNs, and anti-sense Bcl-2.

In some embodiments, a therapeutic agent for use in combination with a CARs for treating the disorders as described above may be a hormonal regulating agent, such as agents useful for anti-androgen and anti-estrogen therapy. Examples of such hormonal regulating agents are tamoxifen, idoxifene, fulvestrant, droloxifene, toremifene, raloxifene, diethylstilbestrol, ethinyl estradiol/estinyl, an antiandrogene (such as flutaminde/eulexin), a progestin (such as such as hydroxyprogesterone caproate, medroxy-progesterone/provera, megestrol acepate/megace), an adrenocorticosteroid (such as hydrocortisone, prednisone), luteinizing hormone-releasing hormone (and analogs thereof and other LHRH agonists such as buserelin and goserelin), an aromatase inhibitor (such as anastrazole/arimidex, aminoglutethimide/cytraden, exemestane) or a hormone inhibitor (such as octreotide/sandostatin).

In some embodiments, a therapeutic agent for use in combination with a CARs for treating the disorders as described above may be an anti-cancer nucleic acid or an anti-cancer inhibitory RNA molecule.

Combined administration, as described above, may be simultaneous, separate, or sequential. For simultaneous administration the agents may be administered as one composition or as separate compositions, as appropriate.

In some embodiments, the disclosed CARs is administered in combination with radiotherapy. Radiotherapy may comprise radiation or associated administration of radiopharmaceuticals to a patient is provided. The source of radiation may be either external or internal to the patient being treated (radiation treatment may, for example, be in the form of external beam radiation therapy (EBRT) or brachytherapy (BT)). Radioactive elements that may be used in practicing such methods include, e.g., radium, cesium-137, iridium-192, americium-241, gold-198, cobalt-57, copper-67, technetium-99, iodide-123, iodide-131, and indium-111.

In some embodiments, the disclosed CARs is administered in combination with surgery.

CAR-T cells may be designed in several ways that enhance tumor cytotoxicity and specificity, evade tumor immunosuppression, avoid host rejection, and prolong their therapeutic half-life. TRUCK (T-cells Redirected for Universal Cytokine Killing) T cells for example, possess a CAR but are also engineered to release cytokines such as IL-12 that promote tumor killing. Because these cells are designed to release a molecular payload upon activation of the CAR once localized to the tumor environment, these CAR-T cells are sometimes also referred to as 'armored CARs'. Several cytokines as cancer therapies are being investigated both pre-clinically and clinically, and may also prove useful when similarly incorporated into a TRUCK form of CAR-T therapy. Among these include IL-2, IL-3. IL-4, IL-5, IL-6, IL-7, IL-10, IL-12, IL-13, IL-15, IL-18, M-CSF, GM-CSF, IFN-α, IFN-γ, TNF-α, TRAIL, FLT3 ligand, Lymphotactin, and TGF-β (Dranoff 2004). "Self-driving" or "homing" CAR-T cells are engineered to express a chemokine receptor in addition to their CAR. As certain chemokines can be upregulated in tumors, incorporation of a chemokine receptor aids in tumor trafficking to and infiltration by the adoptive T-cell, thereby enhancing both specificity and functionality of the CAR-T (Moon 2011). Universal CAR-T cells also possess a CAR, but are engineered such that they do not express endogenous TCR (T-cell receptor) or MHC (major histocompatibility complex) proteins. Removal of these two proteins from the signaling repertoire of the adoptive T-cell therapy prevents graft-versus-host-disease and rejection, respectively. Armored CAR-T cells are additionally so named for their ability to evade tumor immunosuppression and tumor-induced CAR-T hypofunction. These particular CAR-Ts possess a CAR, and may be engineered to not express checkpoint inhibitors. Alternatively, these CAR-Ts can be co-administered with a monoclonal antibody (mAb) that blocks checkpoint signaling. Administration of an anti-PDL1 antibody significantly restored the killing ability of CAR TILs (tumor infiltrating lymphocytes). While PD1-PDL1 and CTLA-4-CD80/CD86 signaling pathways have been investigated, it is possible to target other immune checkpoint signaling molecules in the design of an armored CAR-T including LAG-3, Tim-3, IDO-1, 2B4, and KIR. Other intracellular inhibitors of TILs include phosphatases (SHP1), ubiquitin-ligases (i.e., cbl-b), and kinases (i.e., diacylglycerol kinase). Armored CAR-Ts may also be engineered to express proteins or receptors that protect them against or make them resistant to the effects of tumor-secreted cytokines. For example, CTLs (cytotoxic T lymphocytes) transduced with the double negative form of the TGF-β receptor are resistant to the immunosuppression by lymphoma secreted TGF-β. These transduced cells showed notably increased antitumor activity in vivo when compared to their control counterparts.

A tandem CAR contains two sequential antigen binding domains facing the extracellular environment connected to the intracellular costimulatory and stimulatory domains. A dual CAR can be engineered such that one extracellular antigen binding domain is connected to the intracellular costimulatory domain and a second, distinct extracellular antigen binding domain is connected to the intracellular stimulatory domain. Because the stimulatory and costimulatory domains are split between two separate antigen binding domains, dual CARs are also referred to as "split CARs". In both tandem and dual CAR designs, binding of both antigen binding domains is necessary to allow signaling of the CAR circuit in the T-cell. Because these two CAR designs have binding affinities for different, distinct antigens, they are also referred to as "bi-specific" CARs.

One primary concern with CAR-T cells as a form of "living therapeutic" is their manipulability in vivo and their potential immune-stimulating side effects. To better control CAR-T therapy and prevent against unwanted side effects, a variety of features have been engineered including off-switches, safety mechanisms, and conditional control mechanisms. Both self-destruct and marked/tagged CAR-T cells for example, are engineered to have an "off-switch" that promotes clearance of the CAR-expressing T-cell. A self-destruct CAR-T contains a CAR, but is also engineered to express a pro-apoptotic suicide gene or "elimination gene" inducible upon administration of an exogenous molecule. A variety of suicide genes may be employed for this purpose, including HSV-TK (herpes simplex virus thymidine kinase), Fas, iCasp9 (inducible caspase 9), CD20, MYC TAG, and truncated EGFR (endothelial growth factor receptor). HSK for example, will convert the prodrug ganciclovir (GCV) into GCV-triphosphate that incorporates itself into replicating DNA, ultimately leading to cell death. iCasp9 is a chimeric protein containing components of FK506-binding protein that binds the small molecule AP1903, leading to caspase 9 dimerization and apoptosis. A marked/tagged CAR-T cell however, is one that possesses a CAR but also is engineered to express a selection marker. Administration of a mAb against this selection marker will promote clearance of the CAR-T cell. Truncated EGFR is one such targetable antigen by the anti-EGFR mAb, and administration of cetuximab works to promotes elimination of the CAR-T cell. CARs created to have these features are also referred to as sCARs for 'switchable CARs', and RCARs for 'regulatable CARs'. A "safety CAR", also known as an "inhibitory CAR" (iCAR), is engineered to express two antigen binding domains. One of these extracellular domains is directed against a tumor related antigen and bound to an intracellular costimulatory and stimulatory domain. The second extracellular antigen binding domain however is specific for normal tissue and bound to an intracellular checkpoint domain such as CTLA4, PD1, or CD45. Incorporation of multiple intracellular inhibitory domains to the iCAR is also possible. Some inhibitory molecules that may provide these inhibitory domains include B7-H1, B7-1, CD160, PIH, 2B4, CEACAM (CEACAM-1. CEACAM-3, and/or CEACAM-5), LAG-3, TIGIT, BTLA, LAIR1, and TGFβ-R. In the presence of normal tissue, stimulation of this second antigen binding domain will work to inhibit the CAR. It should be noted that due to this dual antigen specificity, iCARs are also a form of bi-specific CAR-T cells. The safety CAR-T engineering enhances specificity of the CAR-T cell for tumor tissue, and is advantageous in situations where certain normal tissues may express very low levels of a tumor associated antigen that would lead to off target effects with a standard CAR (Morgan 2010). A conditional CAR-T cell expresses an extracellular antigen binding domain connected to an intracellular costimulatory domain and a separate, intracellular costimulator. The costimulatory and stimulatory domain sequences are engineered in such a way that upon administration of an exogenous molecule the resultant proteins will come together intracellularly to complete the CAR circuit. In this way, CAR-T activation can be modulated, and possibly even 'fine-tuned' or personalized to a specific patient. Similar to a dual CAR design, the stimulatory and costimulatory domains are physically separated when inactive in the conditional CAR; for this reason these too are also referred to as a "split CAR".

In some embodiments, two or more of these engineered features may be combined to create an enhanced, multifunctional CAR-T. For example, it is possible to create a CAR-T cell with either dual- or conditional-CAR design that also releases cytokines like a TRUCK. In some embodiments, a dual-conditional CAR-T cell could be made such that it expresses two CARs with two separate antigen binding domains against two distinct cancer antigens, each bound to their respective costimulatory domains. The costimulatory domain would only become functional with the stimulatory domain after the activating molecule is administered. For this CAR-T cell to be effective the cancer must express both cancer antigens and the activating molecule must be administered to the patient; this design thereby incorporating features of both dual and conditional CAR-T cells.

Typically, CAR-T cells are created using α-β T cells, however γ-δ T cells may also be used. In some embodiments, the described CAR constructs, domains, and engineered features used to generate CAR-T cells could similarly be employed in the generation of other types of CAR-expressing immune cells including NK (natural killer) cells, B cells, mast cells, myeloid-derived phagocytes, and NKT cells. Alternatively, a CAR-expressing cell may be created to have properties of both T-cell and NK cells. In an additional embodiment, the transduced with CARs may be autologous or allogeneic.

Several different methods for CAR expression may be used including retroviral transduction (including γ-retroviral), lentiviral transduction, transposon/transposases (Sleeping Beauty and PiggyBac systems), and messenger RNA transfer-mediated gene expression. Gene editing (gene insertion or gene deletion/disruption) has become of increasing importance with respect to the possibility for engineering CAR-T cells as well. CRISPR-Cas9, ZFN (zinc finger nuclease), and TALEN (transcription activator like effector nuclease) systems are three potential methods through which CAR-T cells may be generated.

Also disclosed is a pharmaceutical composition comprising a molecule disclosed herein in a pharmaceutically acceptable carrier. Pharmaceutical carriers are known to those skilled in the art. These most typically would be standard carriers for administration of drugs to humans, including solutions such as sterile water, saline, and buffered solutions at physiological pH. For example, suitable carriers and their formulations are described in Remington: The Science and Practice of Pharmacy (21 ed.) ed. PP. Gerbino, Lippincott Williams & Wilkins, Philadelphia, PA. 2005. Typically, an appropriate amount of a pharmaceutically-acceptable salt is used in the formulation to render the formulation isotonic. Examples of the pharmaceutically-acceptable carrier include, but are not limited to, saline, Ringer's solution and dextrose solution. The pH of the solution is preferably from about 5 to about 8, and more preferably from about 7 to about 7.5. It will be apparent to those persons skilled in the art that certain carriers may be more preferable depending upon, for instance, the route of administration and concentration of composition being administered.

Pharmaceutical compositions may include carriers, thickeners, diluents, buffers, preservatives, surface active agents and the like in addition to the molecule of choice. Pharmaceutical compositions may also include one or more active ingredients such as antimicrobial agents, antiinflammatory agents, anesthetics, and the like.

Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

Some of the compositions may potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines and substituted ethanolamines.

Also disclosed is a method for treating a lung cancer-derived metastatic brain tumor in a subject by administering to the subject a therapeutically effective amount of the disclosed pharmaceutical composition.

The disclosed compositions, including pharmaceutical composition, may be administered in a number of ways depending on whether local or systemic treatment is desired, and on the area to be treated. For example, the disclosed compositions can be administered intravenously, intraperitoneally, intramuscularly, subcutaneously, intracavity, or transdermally. In some embodiments, the disclosed composition is administered intrathecally.

Parenteral administration of the composition, if used, is generally characterized by injection. Injectables can be prepared in conventional forms, either as liquid solutions or suspensions, solid forms suitable for solution of suspension in liquid prior to injection, or as emulsions. A revised approach for parenteral administration involves use of a slow release or sustained release system such that a constant dosage is maintained.

The compositions disclosed herein may be administered prophylactically to patients or subjects who are at risk for a lung cancer-derived metastatic brain tumor. Thus, the method can further comprise identifying a subject at risk for a lung cancer-derived metastatic brain tumor prior to administration of the herein disclosed compositions.

The exact amount of the compositions required will vary from subject to subject, depending on the species, age, weight and general condition of the subject, the severity of the allergic disorder being treated, the particular nucleic acid or vector used, its mode of administration and the like. Thus, it is not possible to specify an exact amount for every composition. However, an appropriate amount can be determined by one of ordinary skill in the art using only routine experimentation given the teachings herein. For example, effective dosages and schedules for administering the compositions may be determined empirically, and making such determinations is within the skill in the art. The dosage ranges for the administration of the compositions are those large enough to produce the desired effect in which the symptoms disorder are affected. The dosage should not be so large as to cause adverse side effects, such as unwanted cross-reactions, anaphylactic reactions, and the like. Generally, the dosage will vary with the age, condition, sex and extent of the disease in the patient, route of administration, or whether other drugs are included in the regimen, and can be determined by one of skill in the art. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. Atypical daily dosage of the disclosed composition used alone might range from about 1 μg/kg to up to 100 mg/kg of body weight or more per day, depending on the factors mentioned above.

In some embodiments, the molecule is administered in a dose equivalent to parenteral administration of about 0.1 ng to about 100 g per kg of body weight, about 10 ng to about 50 g per kg of body weight, about 100 ng to about 1 g per kg of body weight, from about 1 μg to about 100 mg per kg of body weight, from about 1 μg to about 50 mg per kg of body weight, from about 1 mg to about 500 mg per kg of body weight; and from about 1 mg to about 50 mg per kg of body weight. Alternatively, the amount of molecule administered to achieve a therapeutic effective dose is about 0.1 ng, 1 ng, 10 ng, 100 ng, 1 μg, 10 μg, 100 μg, 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 30 mg, 40 mg, 50 mg, 60 mg, 70 mg, 80 mg, 90 mg, 100 mg, 500 mg per kg of body weight or greater.

A number of embodiments of the invention have been described. Nevertheless, it will be understood that various modifications may be made without departing from the spirit and scope of the invention. Accordingly, other embodiments are within the scope of the following claims.

EXAMPLES

Example 1

Methods

Figure 1A:
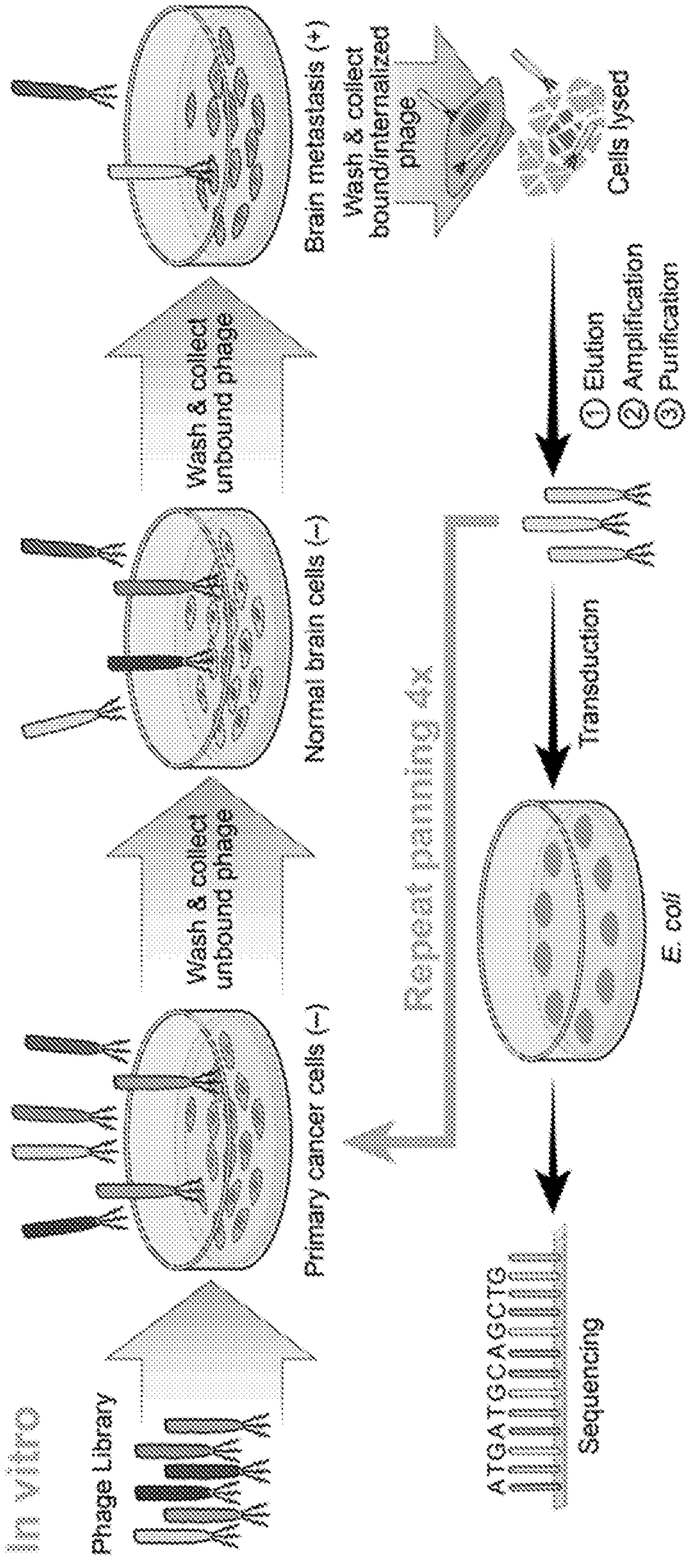
FIGS. 1A and 1B illustrate the in vitro (FIG. 1A) and in vivo (FIG. 1B) phage display screenings used to isolate lung cancer derived metastatic brain tumors.

Two strategies were used for phage display screening use to isolate lung cancer derived metastatic brain tumors. FIG. 1A illustrates an in vitro screening method. The phage library (commercially avail through New England Biolabs), was applied to lung cancer cells. Phage peptides that were NOT bound were collected. This is a negative selection process to eliminate peptides that bind lung cancer cells. The collected peptides were applied to normal brain tissue, and again peptides that were NOT bound were collected. The phage library was then applied to lung cancer derived metastatic brain tumor cells. After washing away non-binding peptides, phage peptides were collected and amplified. The amplified peptides were then applied to the primary cancer cells, and this is repeated 4× to enrich for phage peptides that strongly bind lung cancer brain metastases. After 4 rounds, the peptides were collected and sequenced.

Figure 1B:
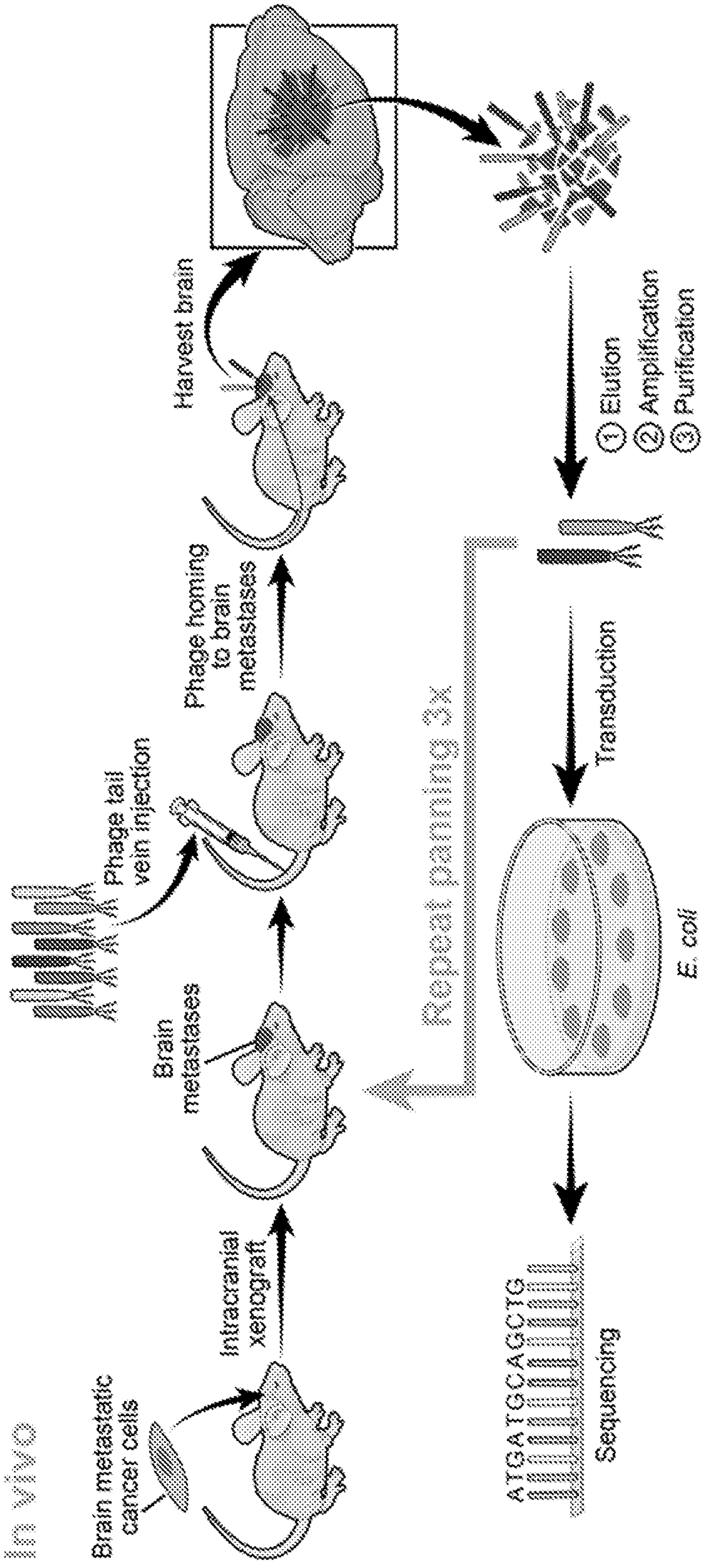

In the in vivo strategy (FIG. 1B), NSG mice have lung cancer brain mets injected into the intracranial cavity. After maximal tumor growth, the phage library was injected into the tail vein and after 24 hours, the intracranial tumors were collected and the phage peptides were harvested. This phage peptides were amplified and reapplied to new mice with intracranial tumors for 4 total rounds. After 4 rounds, the peptides were collected and sequenced.

Results

Table 7 shows all the phage peptides that came up from the in vitro screening process. The right column are all the phage peptides that came up from the in vivo screening process.

TABLE 7

| In vitro Phage Screening | | In vivo Phage Screening | |
|---|---|---|---|
| D04 | ADSNHAYERDSVGGG (SEQ ID NO: 85) | B06 | AHPHSDKLVPPRGGGS (SEQ ID NO: 122) |
| D01 | AESPLTNRGWNPGGG (SEQ ID NO: 86) | B07 | AHSSFGFSHLAVGGGS (SEQ ID NO: 123) |
| F03 | AHVNSSERIHPYGGG (SEQ ID NO: 87) | F03 | AMNMRSLTYSDLGGGS (SEQ ID NO: 124) |
| F02 | ANTELALANRKHGGG (SEQ ID NO: 88) | D05 | APQTSDSTLTVMGGGS (SEQ ID NO: 125) |
| D06 | APNVGDLTSLLGGGG (SEQ ID NO: 89) | A07 | EALLKPYSFAYPGGGS (SEQ ID NO: 126) |
| A03 | AQSTTMSTSQRNGGG (SEQ ID NO: 90) | A05 | EHVDMWNLVSASGGGS (SEQ ID NO: 127) |
| B02 | ARSLEPAPSRHSGGG (SEQ ID NO: 91) | G01 | EKYPPSSMDQRSGGGS (SEQ ID NO: 128) |
| B03 | ATPGSFQTIRANGGG (SEQ ID NO: 92) | D01 | FPKSVYPAMPRPGGGS (SEQ ID NO: 129) |
| C03 | | G02 | FSPTQANTIHRWGGGS (SEQ ID NO: 130) |
| A04 | CVTPSNRDCSHSGGG (SEQ ID NO: 93) | G04 | |
| H04 | ELVSSSDQRNKNGGG (SEQ ID NO: 94) | H02 | |
| G03 | GPWLGSNMRGASGGG (SEQ ID NO: 95) | H05 | FTNPFGPYPTGRGGGS (SEQ ID NO: 131) |
| E01 | GSAARTISPSLLGGG (SEQ ID NO: 96) | A04 | GKQTLHSFATHWGGGS (SEQ ID NO: 132) |
| F04 | GSMFYLPMPERGGGG (SEQ ID NO: 97) | F04 | GRDMPMSALMRHGGGS (SEQ ID NO: 133) |
| A01 | GTASRTHSYYSLGGG (SEQ ID NO: 98) | A06 | GTDIIHPRVIFNGGGS (SEQ ID NO: 134) |
| A06 | | E06 | |
| C05 | HPALSQHLGPVAGGG (SEQ ID NO: 99) | F02 | HNTPMLDSRGNNGGGS (SEQ ID NO: 135) |
| A02 | HTPHPGGRSVPPGGG (SEQ ID NO: 100) | E02 | HSPTTSLTLSYKGGGS (LBM4, SEQ ID NO: 136) |
| E05 | IGSKSPLRLTMDGGG (SEQ ID NO: 101) | G03 | |
| D05 | KLTTDKVRTITLGGG (SEQ ID NO: 102) | B02 | HYKPHVSSLPLAGGGS (SEQ ID NO: 137) |
| G05 | LIAGWDISSKRGGG (SEQ ID NO: 103) | B01 | LTPHLGTHKSTTGGGS (SEQ ID NO: 138) |
| C04 | LPKVSVPRHPSVGGG (SEQ ID NO: 104) | F05 | MNIAELRNSDLNGGGS (SEQ ID NO: 139) |

TABLE 7-continued

| In vitro Phage Screening | | In vivo Phage Screening | |
|---|---|---|---|
| B01 | MKAHHSQLYPRHGGG (SEQ ID NO: 105) | D06 | N/A |
| C01 | | E04 | N/A |
| G04 | | G06 | N/A |
| C02 | N/A | G05 | NANHNPLNLKSAGGGS (SEQ ID NO: 140) |
| B04 | N/A | A03 | QFAKTSDPGSLTGGGS (SEQ ID NO: 141) |
| B06 | N/A | F06 | QIFNHSPNDPKKGGGS (SEQ ID NO: 142) |
| C06 | N/A | A02 | RIPMPSYMNHMGGGS (SEQ ID NO: 143) |
| H06 | N/A | H01 | SDASGIPKRLAFPGGS (SEQ ID NO: 144) |
| H02 | QYVPYLPPAILGGG (SEQ ID NO: 106) | A01 | SDTTSKHLYTRLGGGS (SEQ ID NO: 145) |
| F01 | NNTDHRQLTSTTGGG (SEQ ID NO: 107) | C07 | SGYSAEGGKPVLGGGS (SEQ ID NO: 146) |
| D02 | NYLPHQSSSPSRGGG (SEQ ID NO: 108) | H03 | |
| H02 | QYVPYLPPAILGGG (SEQ ID NO: 109) | B05 | SGYSQGGKPVLGGGS (SEQ ID NO: 147) |
| F05 | SNPSAHKDDSKRGGG (SEQ ID NO: 110) | E01 | SHGISSTPPGQAGGGS (SEQ ID NO: 148) |
| H01 | SRYMGPLDLLAPGGG (SEQ ID NO: 111) | B04 | SLPLAIHNSRPNGGGS (SEQ ID NO: 149) |
| F06 | SRYMGPLDLLAPGGG (SEQ ID NO: 111) | C01 | SLTDYVRKGPRIGGGS (SEQ ID NO: 150) |
| G06 | SVDYSFSNRTDRGGG (SEQ ID NO: 112) | E03 | SSMPINSPATRQGGGS (SEQ ID NO: 151) |
| G01 | SYHLSNTFRVQAGGG (SEQ ID NO: 113) | F01 | SYPSNALSLHKYGGGS (LBM1, SEQ ID NO: 152) |
| D03 | SYPSNALSLHKYGGG (SEQ ID NO: 114) | C03 | TAVLAPQPWLNLGGGS (SEQ ID NO: 153) |
| A05 | TLGLRPVPVATTGGG (SEQ ID NO: 115) | D04 | TGSAKFLQRDTHGGGS (SEQ ID NO: 154) |
| H05 | TTDFFYKRTFFTGGG (SEQ ID NO: 116) | H06 | TKPSVVHWPMIRGGGS (SEQ ID NO: 155) |
| E03 | TTRPNHVHLAKIGGG (SEQ ID NO: 117) | H04 | TLGLRPVPVATTGGGS (LBM2, SEQ ID NO: 156) |
| E04 | VAQRHTLTSITVGGG (SEQ ID NO: 118) | C06 | TPHGYQPMQGKTGGGS (SEQ ID NO: 157) |
| H03 | VPTQWTHRESHAGGG (SEQ ID NO: 119) | C05 | TQGSGFSSPILPGGGS (SEQ ID NO: 158) |
| B05 | WGVTKPIRTSTLGGG (SEQ ID NO: 120) | D02 | VDAKYGRHIPPVGGGS (SEQ ID NO: 159) |
| E06 | WGVTKPIRTSTLGGG (SEQ ID NO: 120) | C02 | WYPSNALSLHKGGGS (SEQ ID NO: 160) |
| E02 | YDAIQRPTGQLSGGG (SEQ ID NO: 121) | B03 | YASQSALSHSARGGGS (SEQ ID NO: 161) |
| | | C04 | YDAIQRPTGQLSGGGS (LBM3, SEQ ID NO: 162) |
| | | D03 | |
| | | E05 | YVKSHTTTAVRQGGGS (SEQ ID NO: 163) |

Figure 2A:
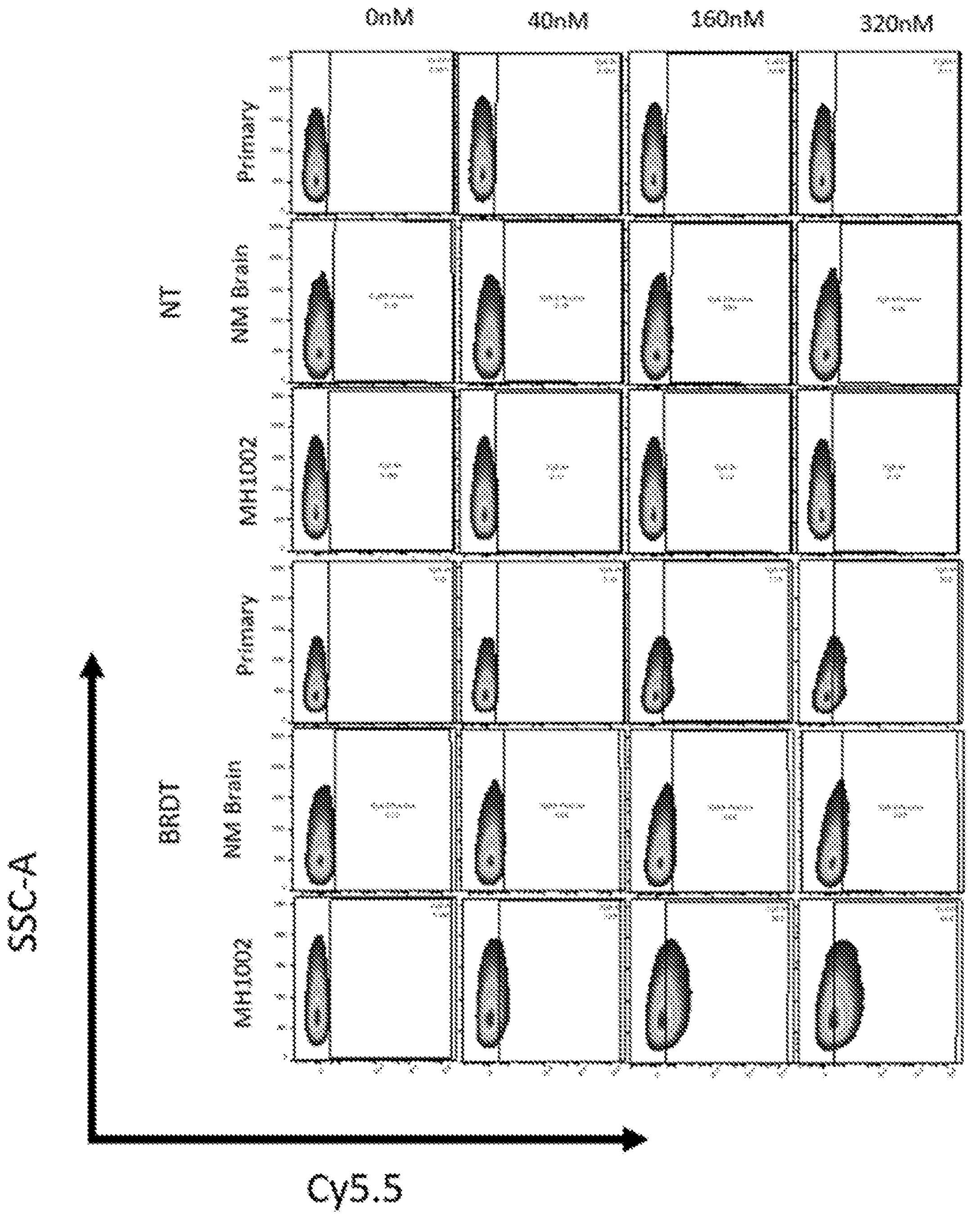
FIGS. 2A to 2C show binding of BRDT (LBM1) peptide applied to Primary Lung Cancer Cells, Non Malignant Brain Cells, Lung Cancer Brain Metastases Cells (MH1002, MH1016, H1915) analyzed through flow cytometry. Flow cytometry demonstrated right shift with BRDT peptide applied to lung cancer BM cells when compared to primary lung cancer cells and non-targeting peptides.
Figure 2B:
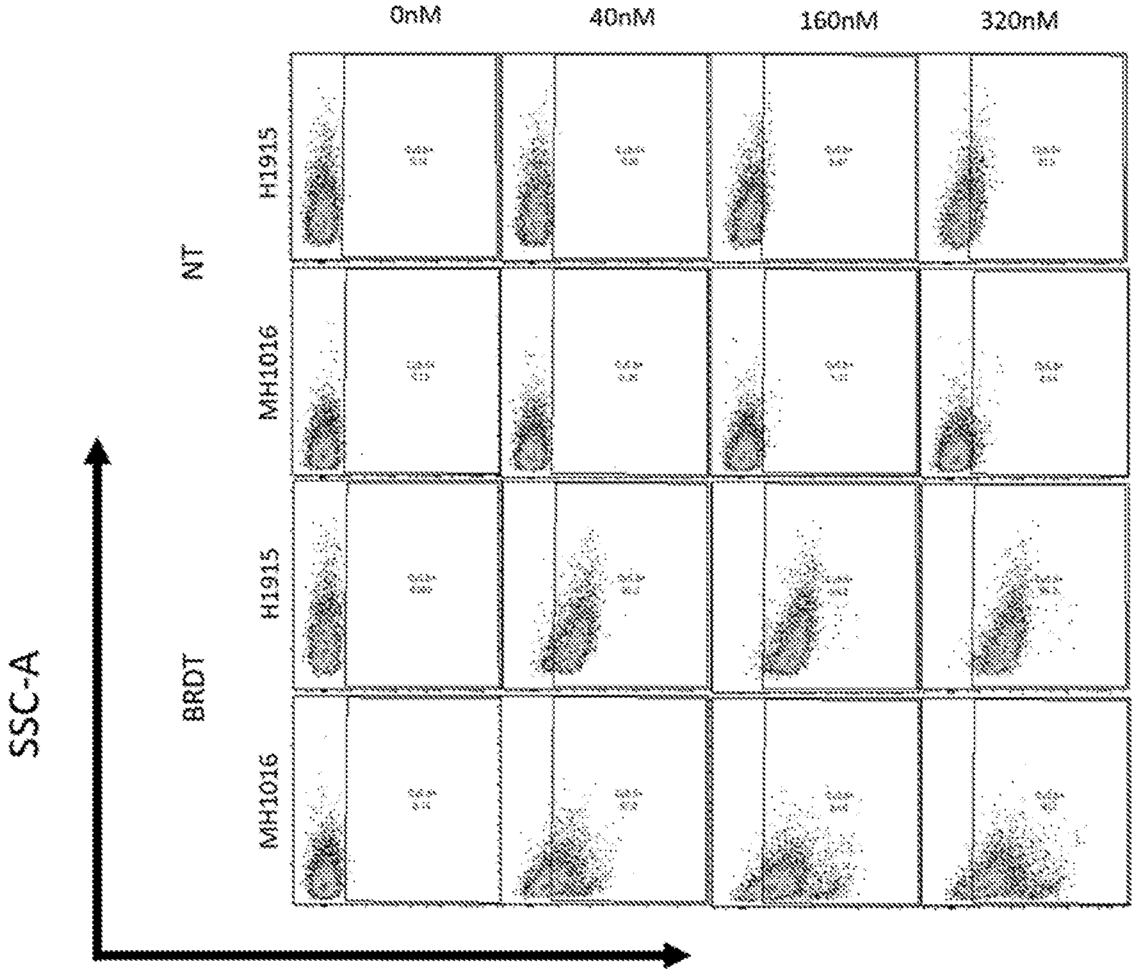
Figure 2C:
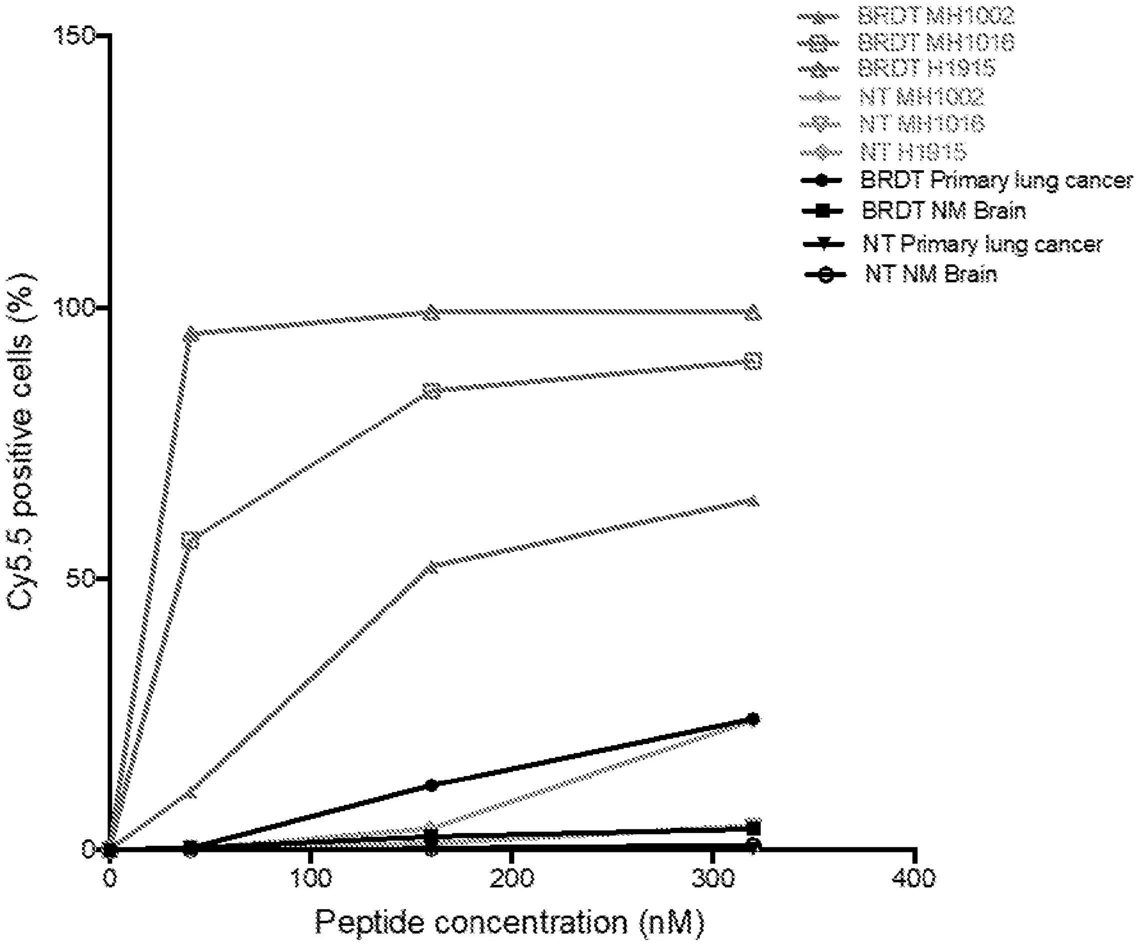

FIGS. 2A to 2C show binding of BRDT (LBM1) peptide applied to Primary Lung Cancer Cells, Non Malignant Brain Cells, Lung Cancer Brain Metastases Cells (MH1002, MH1016, H1915) analyzed through flow cytometry. Flow cytometry demonstrated right shift with BRDT peptide applied to lung cancer BM cells when compared to primary lung cancer cells and non-targeting peptides.

Figure 3:
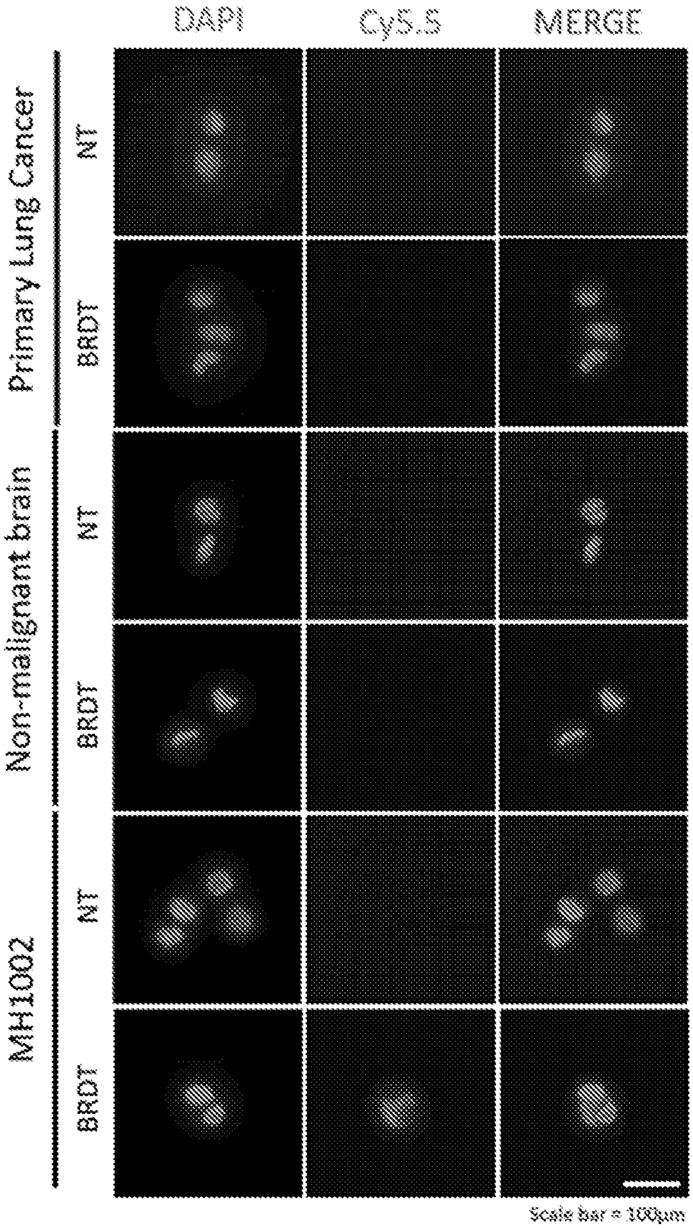
FIG. 3 shows positive binding of BRDT (LBM1) peptide applied to Lung Cancer Brain Metastases cells (MH1002). LBM1 peptide applied to primary lung cancer cells (Primary) and non-malignant brain cells shows no binding.

FIG. 3 shows positive binding of BRDT (LBM1) peptide applied to Lung Cancer Brain Metastases cells (MH1002). LBM1 peptide applied to primary lung cancer cells (Primary) and non-malignant brain cells shows no binding.

Figure 4A:
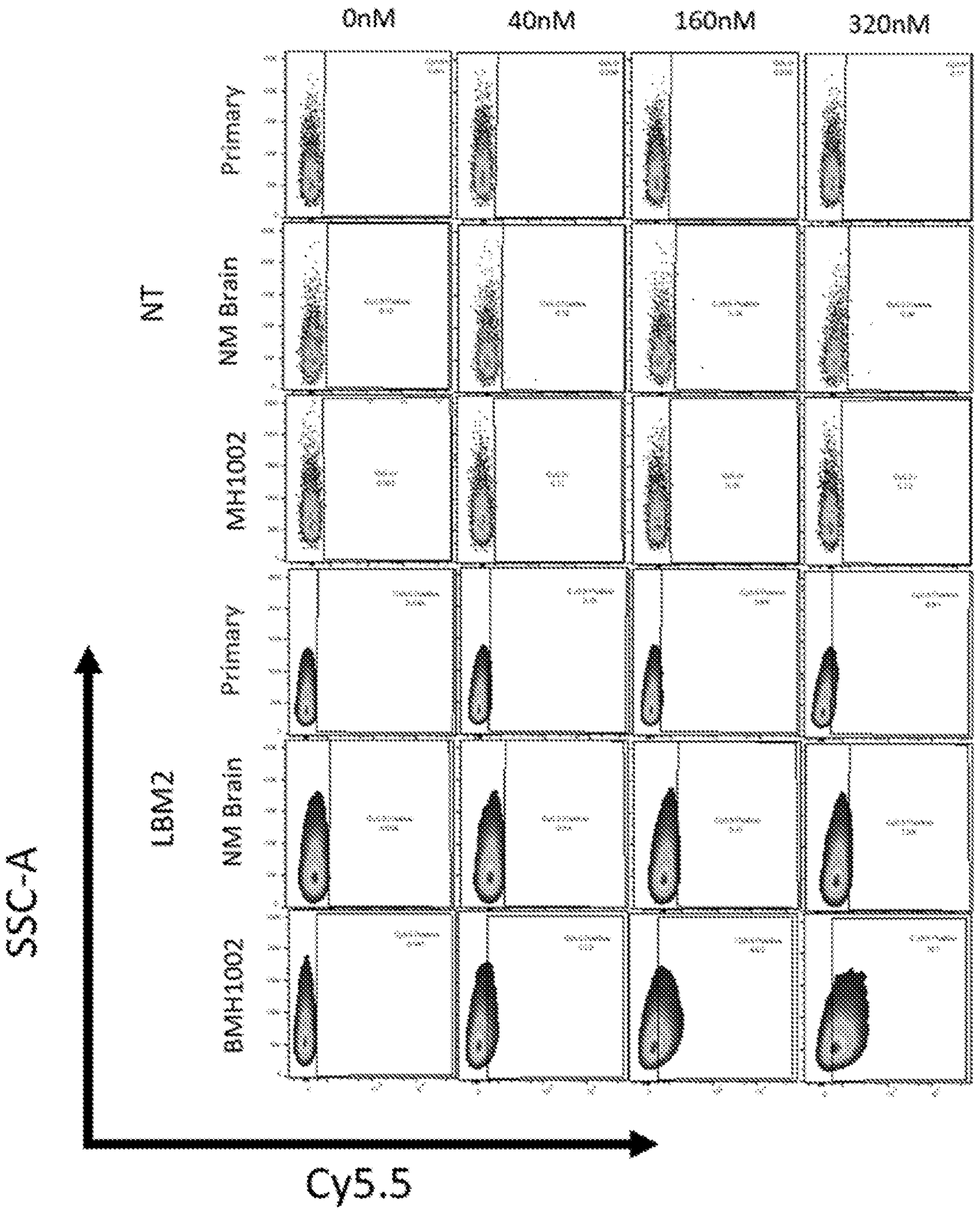
FIGS. 4A to 4C show binding of LBM2 peptide applied to Primary Lung Cancer Cells, Non Malignant Brain Cells, Lung Cancer Brain Metastases Cells (MH1002, MH1016, H1915) analyzed through flow cytometry. Flow cytometry demonstrated right shift with LBM2 peptide applied to lung cancer BM cells when compared to primary lung cancer cells and non-targeting peptides.
Figure 4B:
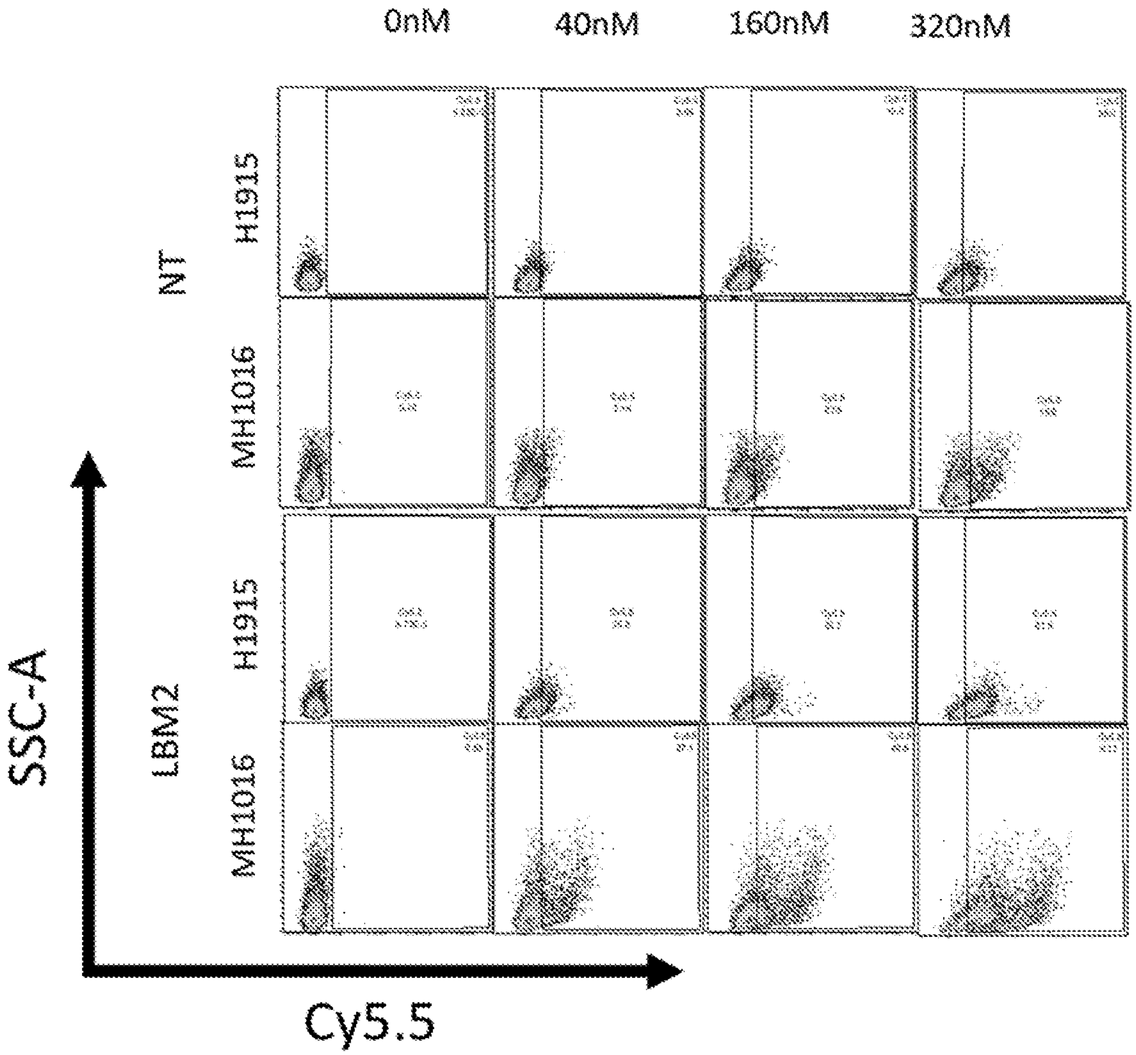
Figure 4C:
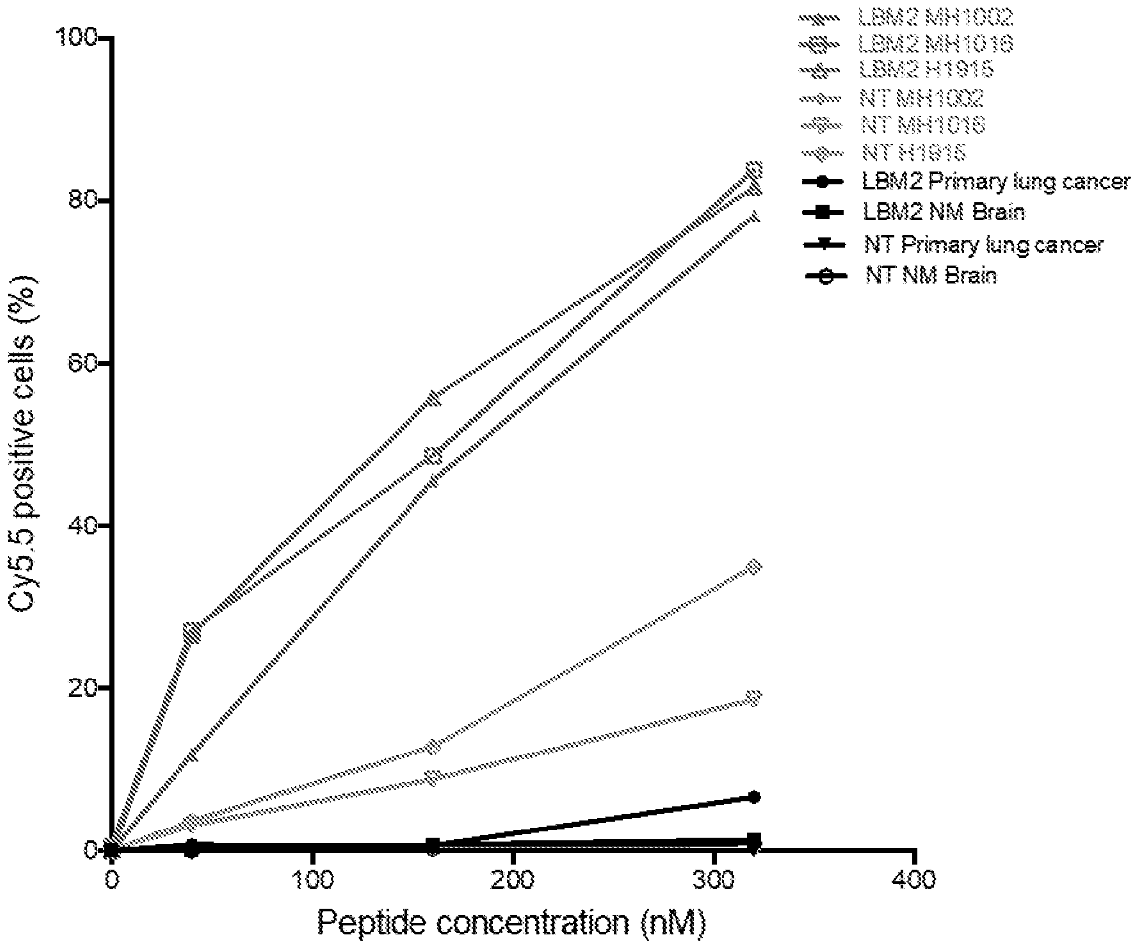

FIGS. 4A to 4C show binding of LBM2 peptide applied to Primary Lung Cancer Cells, Non Malignant Brain Cells, Lung Cancer Brain Metastases Cells (MH1002, MH1016, H1915) analyzed through flow cytometry. Flow cytometry demonstrated right shift with LBM2 peptide applied to lung cancer BM cells when compared to primary lung cancer cells and non-targeting peptides.

Figure 5:
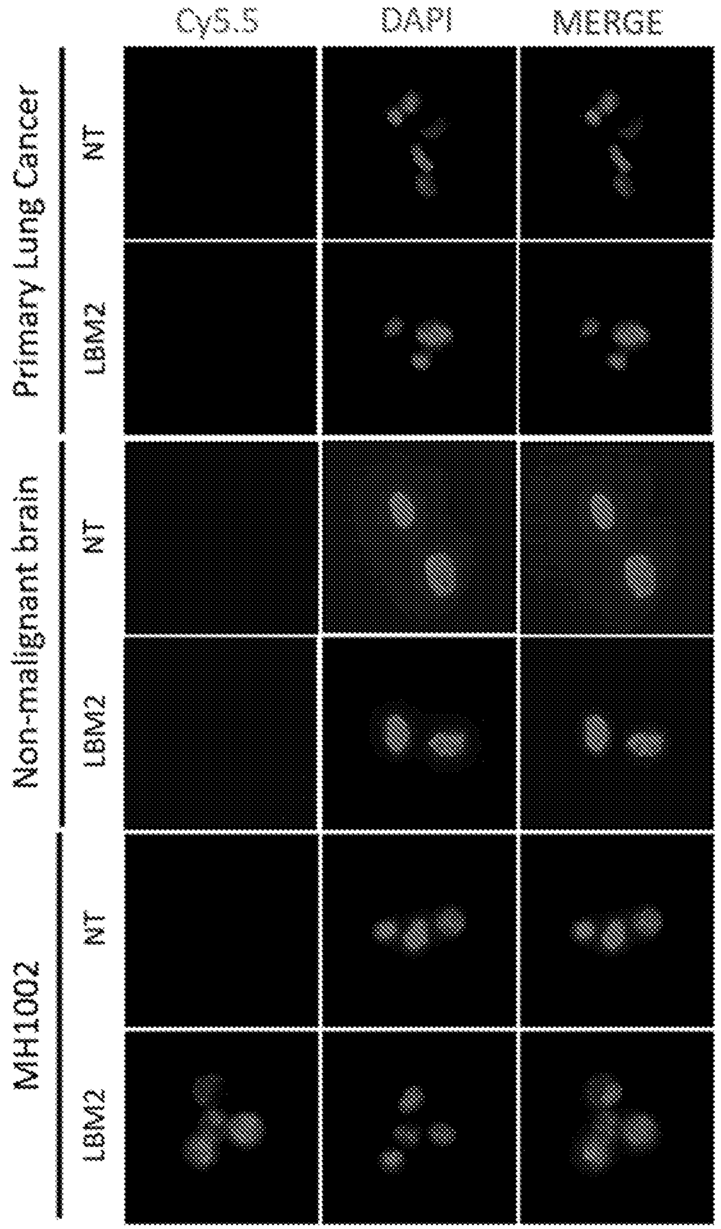
FIG. 5 shows positive binding of LBM2 peptide applied to Lung Cancer Brain Metastases cells (MH1002). LBM2 peptide applied to primary lung cancer cells (Primary) and non-malignant brain cells shows no binding.

FIG. 5 shows positive binding of LBM2 peptide applied to Lung Cancer Brain Metastases cells (MH1002). LBM2 peptide applied to primary lung cancer cells (Primary) and non-malignant brain cells shows no binding.

Figure 6A:
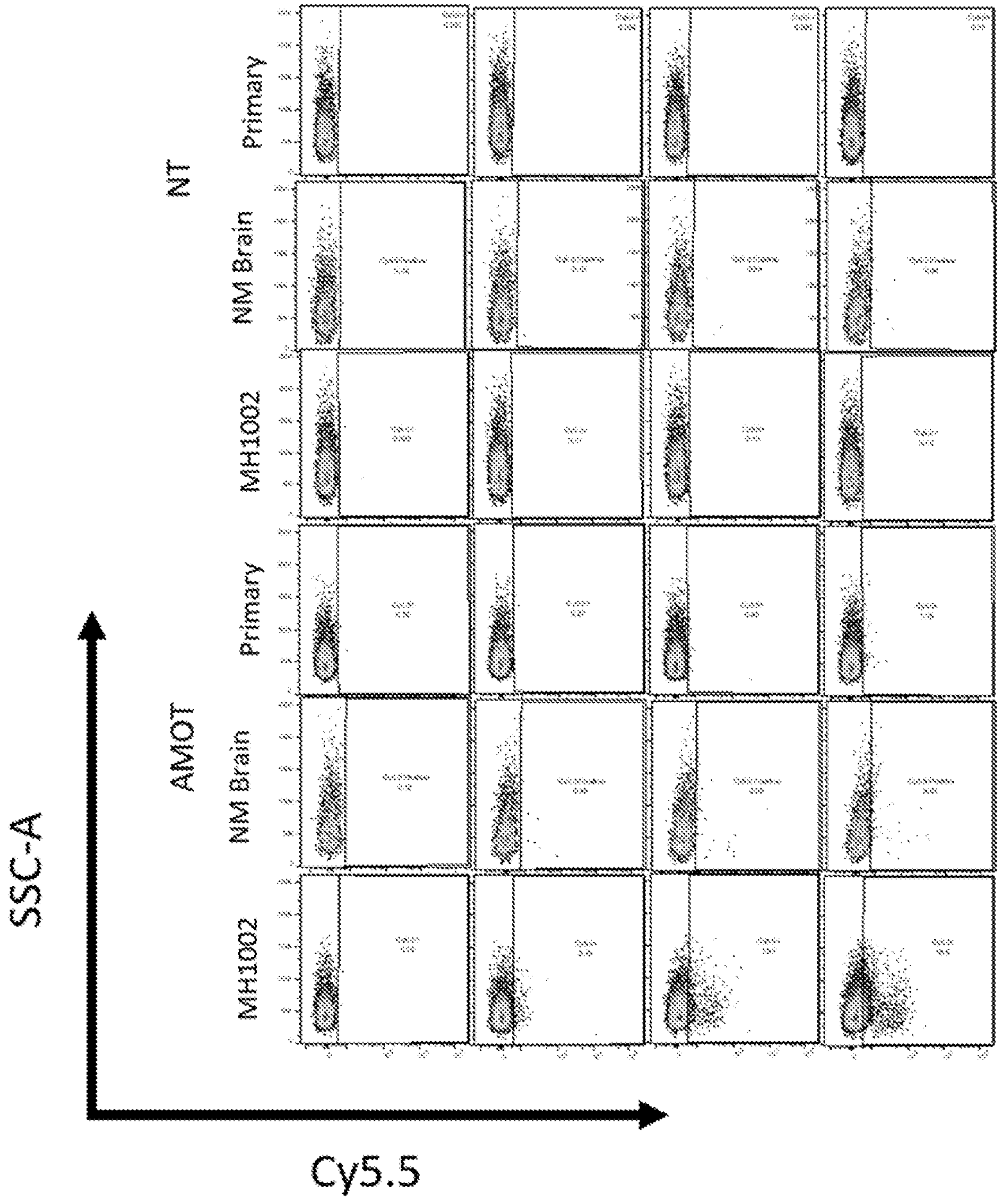
FIGS. 6A to 6C show binding AMOT (LBM4) peptide applied to Primary Lung Cancer Cells, Non Malignant Brain Cells, Lung Cancer Brain Metastases Cells (MH1002, MH1016, H1915) analyzed through flow cytometry. Flow cytometry demonstrated right shift with AMOT peptide applied to lung cancer BM cells when compared to primary lung cancer cells and non targeting peptides.
Figure 6B:
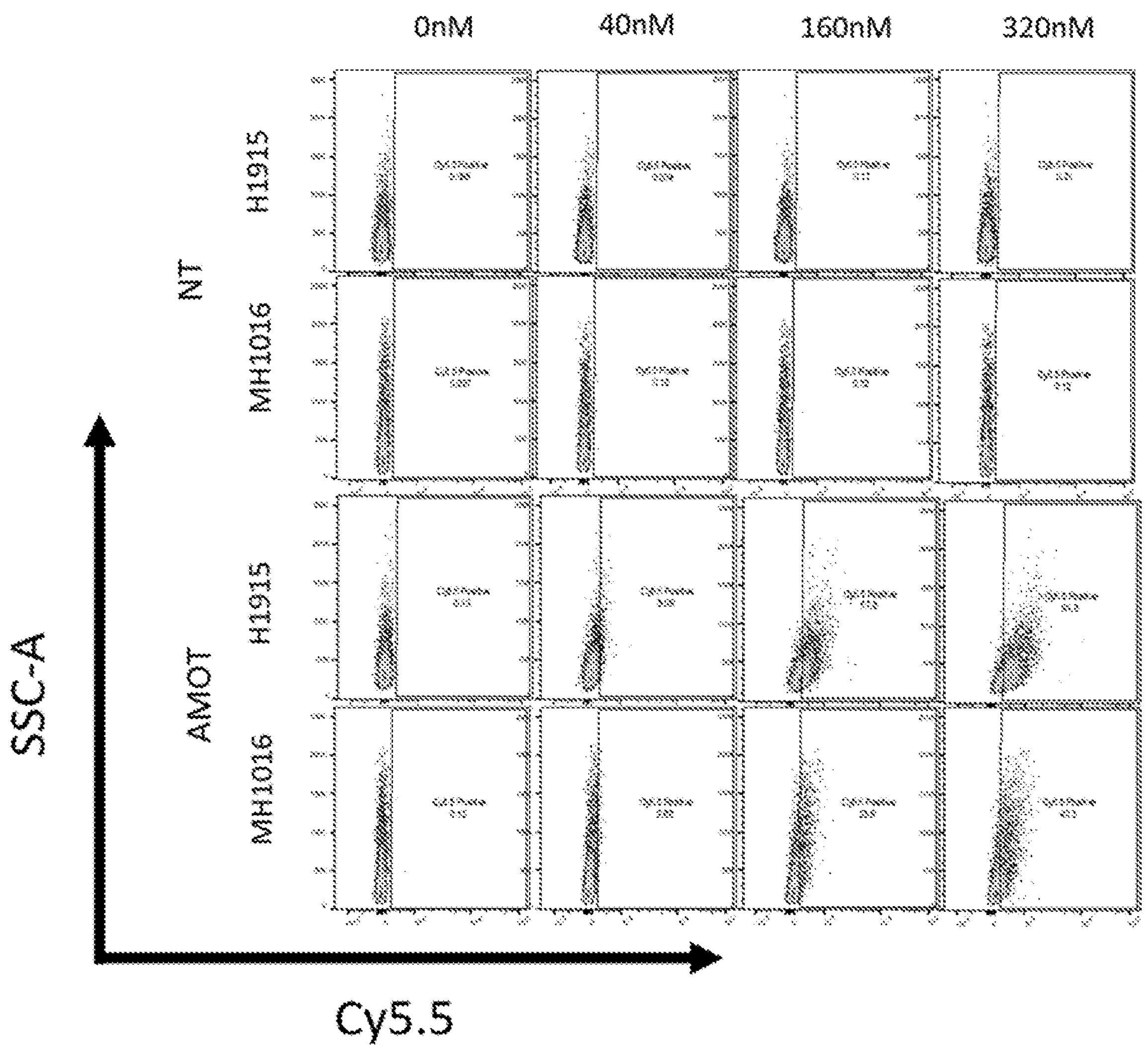
Figure 6C:
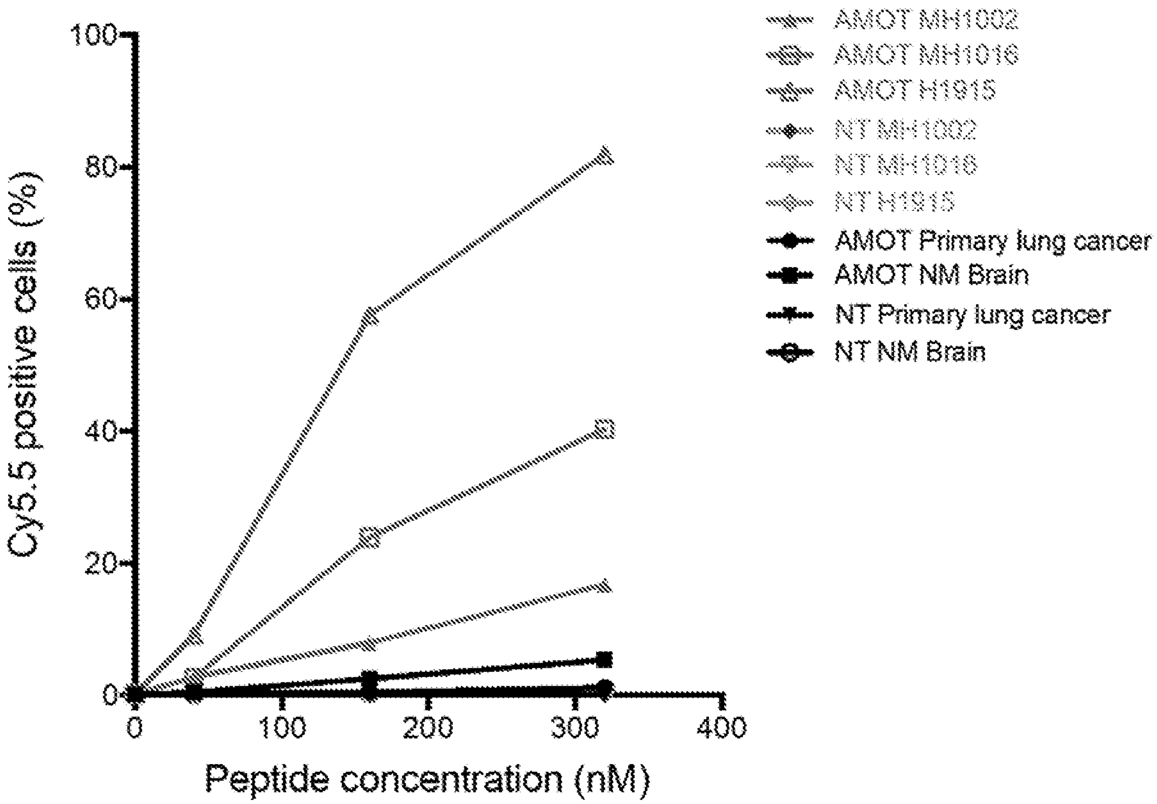

FIGS. 6A to 6C show binding AMOT (LBM4) peptide applied to Primary Lung Cancer Cells, Non Malignant Brain Cells, Lung Cancer Brain Metastases Cells (MH1002, MH1016, H1915) analyzed through flow cytometry. Flow cytometry demonstrated right shift with AMOT peptide applied to lung cancer BM cells when compared to primary lung cancer cells and non targeting peptides.

Figure 7A:
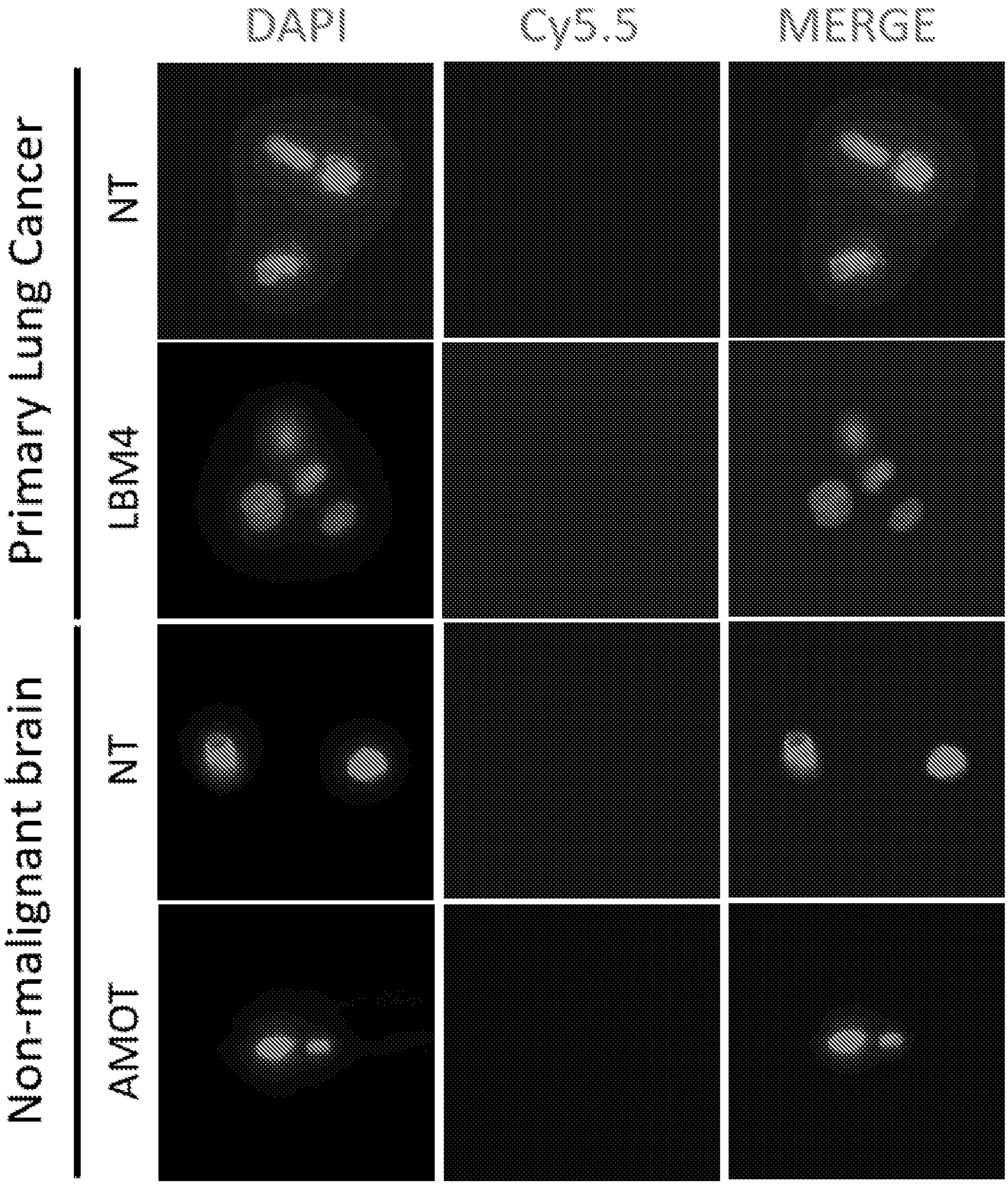
FIG. 7A shows no binding of AMOT (LBM4) peptide applied to primary lung cancer cells and non-malignant brain cells.
Figure 7B:
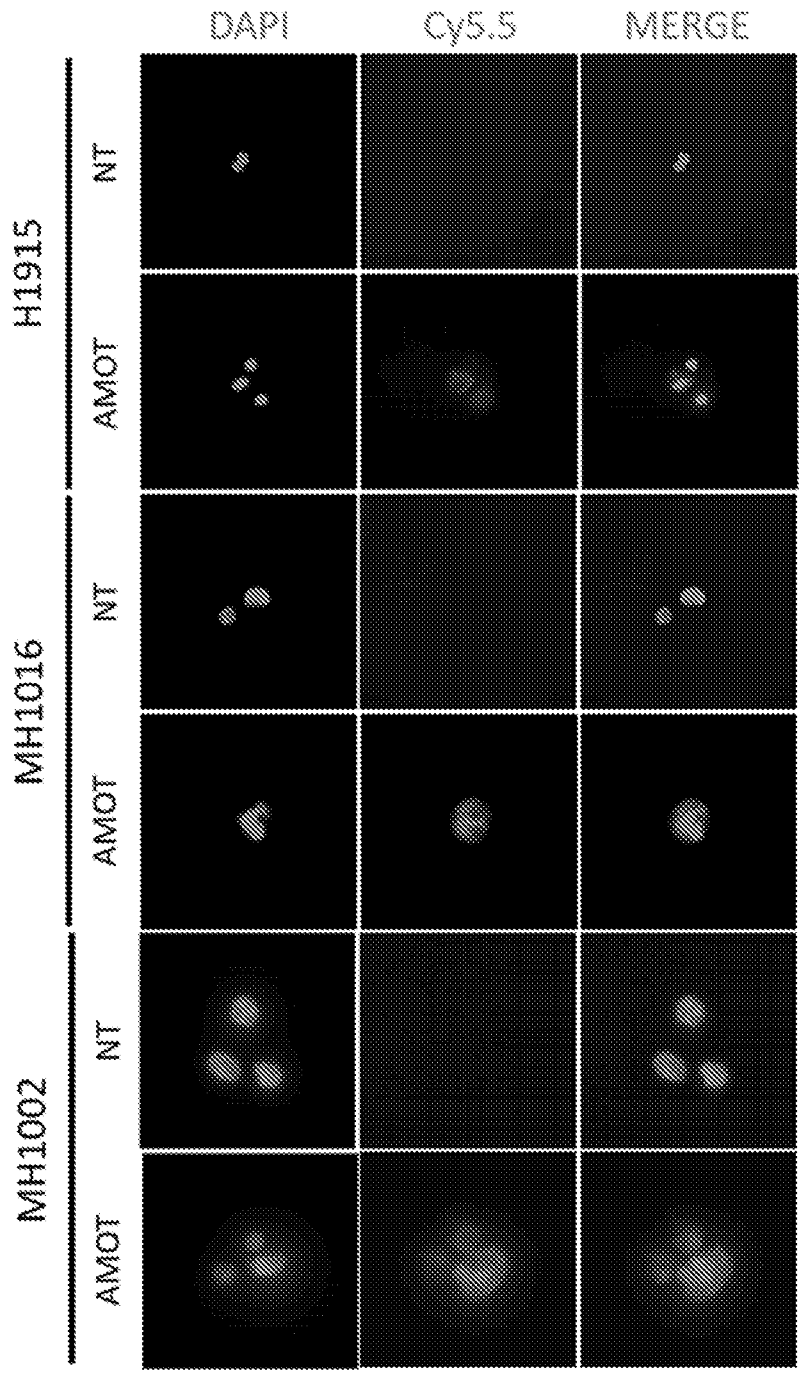
FIG. 7B shows positive binding of AMOT peptide applied to Lung Cancer Brain Metastases cells (M1002, M1016, H1915).

FIG. 7A shows no binding of AMOT (LBM4) peptide applied to primary lung cancer cells and non-malignant brain cells. FIG. 7B shows positive binding of AMOT peptide applied to Lung Cancer Brain Metastases cells (M1002, M1016, H1915).

Figure 8A:
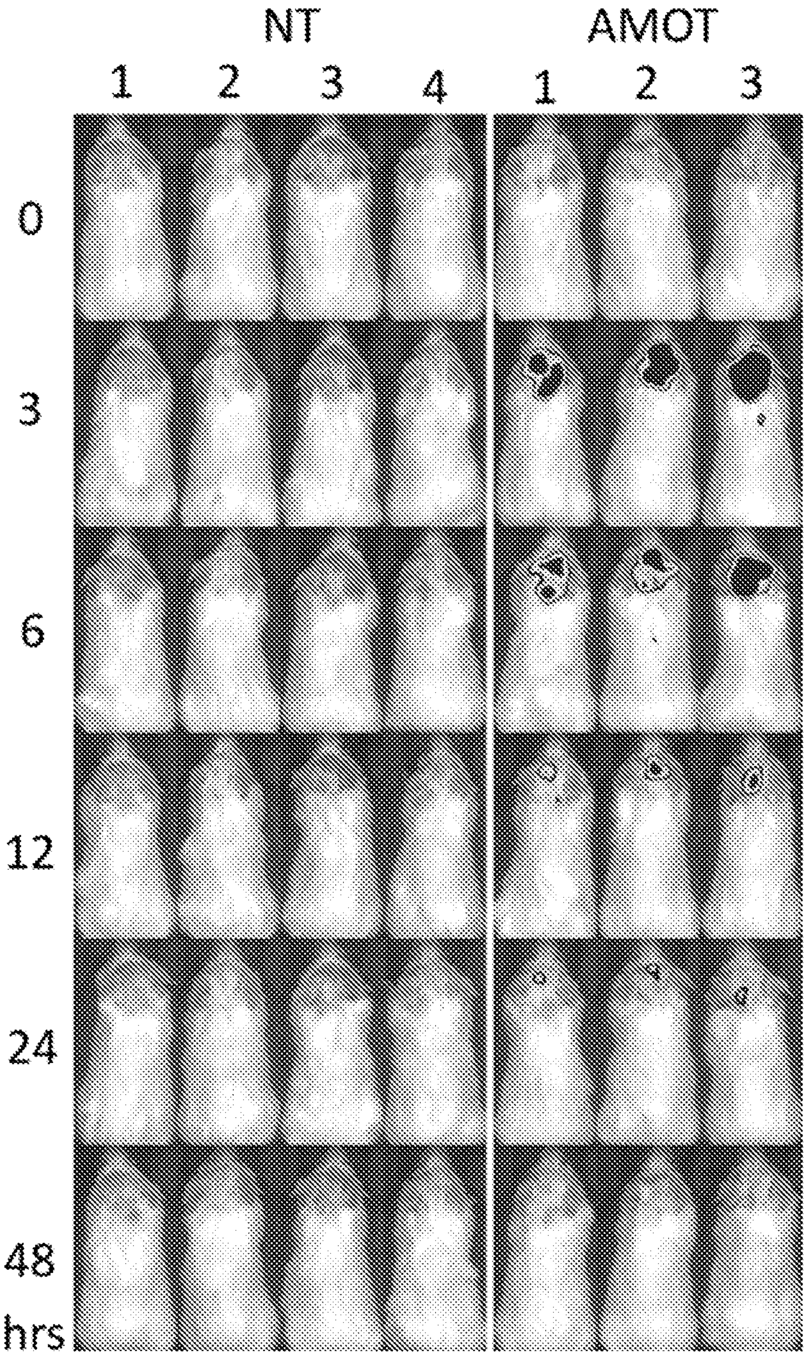
FIGS. 8A and 8B show peptide signal time course. Mice were 29 days post implantation of intracranial lung cancer brain metastatic tumor. 400 μM of LBM4 peptide was injected via tail vein. Mice were imaged at 0, 3, 6, 12, 24, and 48 hours after initial injection.
Figure 8B:
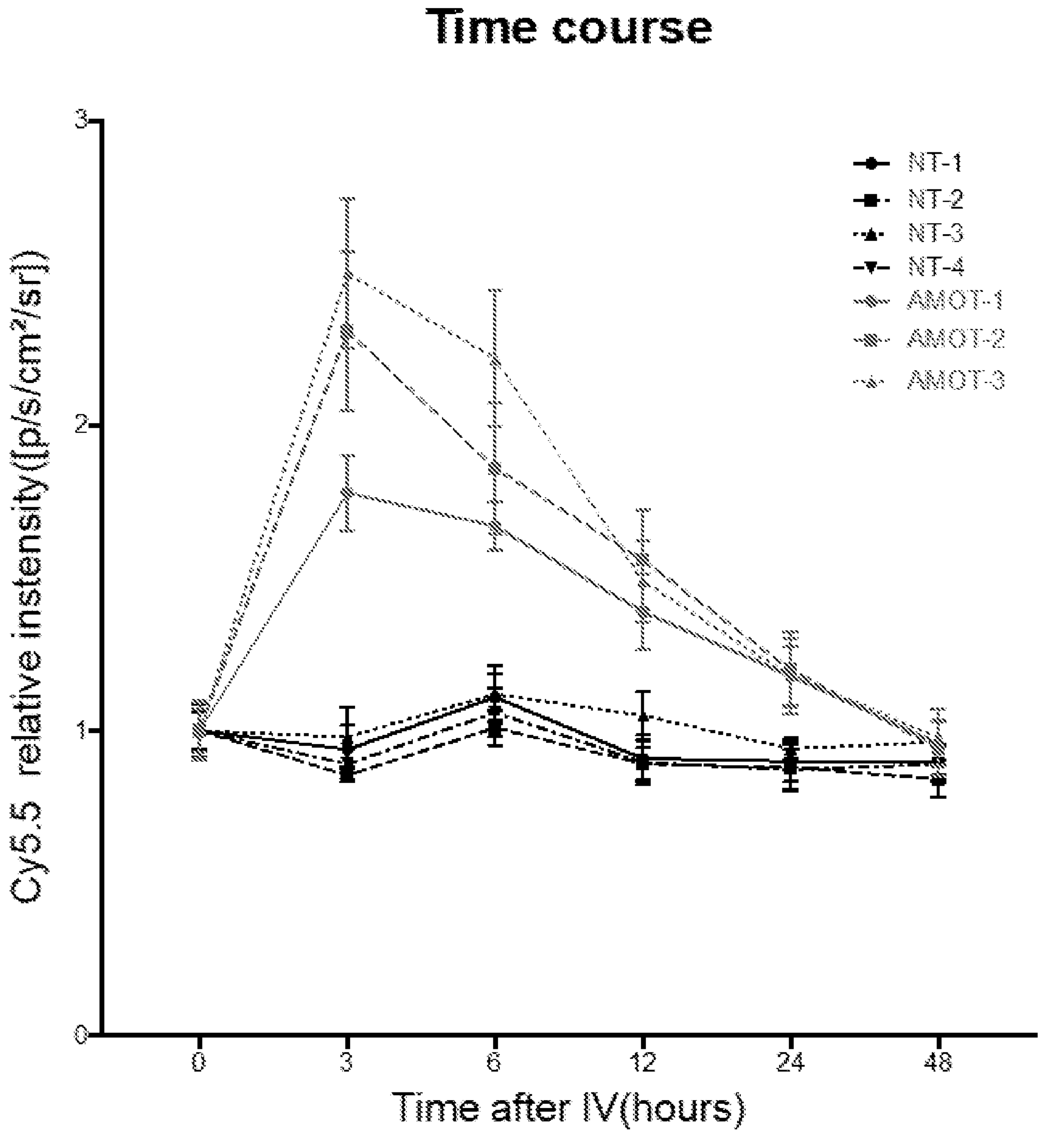

FIGS. 8A and 8B show peptide signal time course. Mice were 29 days post implantation of intracranial lung cancer brain metastatic tumor. 400 μM of LBM4 peptide was injected via tail vein. Mice were imaged at 0, 3, 6, 12, 24, and 48 hours after initial injection. Graph demonstrate signal height at 3 hours with gradual decrease. NT=non targeting peptide (non specific peptide).

FIG. 9 shows binding of 400 uM peptide injected into the tail vein of mice with intracranial implanted lung cancer brain metastasis. Cy5.5 visualizes peptide binding.

For each peptide, as the concentration of peptide goes up, there was a right shift indicating binding to the brain met cells, with minimal binding to the lung cancer primary cells, showing specificity of binding to the brain mets over the lung cancer.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A molecule comprising a peptide conjugated to an anti-cancer agent, wherein the peptide comprises the amino acid sequence SEQ ID NO:1, SEQ ID NO:2, or SEQ ID NO:4, or a variant having at least 10, 11, 12, 13, 14, or 15 contiguous amino acids and at least 90%-sequence identity to SEQ ID NO:1, SEQ ID NO:2, or SEQ ID NO:4.

2. The molecule of claim 1, wherein the peptide is separated from the anti-cancer agent by a linker.

3. The molecule of claim 2, wherein the linker comprises the amino acid sequence GGGS (SEQ ID NO:79), GGGSGG (SEQ ID NO:80), GGGSGGGS (SEQ ID NO:81), GGGGSGGGGSGGGGS (SEQ ID NO:82), GGGGSGGGGSGGGGSGG (SEQ ID NO:83), or GGGGSGGGGSGGGGSGGGGS (SEQ ID NO:84).

4. A pharmaceutical composition comprising the molecule of claim 1 in a pharmaceutically acceptable carrier.

5. A method for treating a lung cancer-derived metastatic brain tumor in a subject, comprising administering to the subject a therapeutically effective amount of the pharmaceutical composition of claim 4.

* * * * *

SEQUENCE LISTING

```
<160> NUMBER OF SEQ ID NOS: 180

<210> SEQ ID NO 1
<211> LENGTH: 12
<212> TYPE: PRT
<213> ORGANISM: Artificial Sequence
<220> FEATURE:
<223> OTHER INFORMATION: Synthetic Construct

<400> SEQUENCE: 1

Ser Tyr Pro Ser Asn Ala Leu Ser Leu His Lys Tyr
1               5                   10


<210> SEQ ID NO 2
<211> LENGTH: 12
<212> TYPE: PRT
<213> ORGANISM: Artificial Sequence
<220> FEATURE:
<223> OTHER INFORMATION: Synthetic Construct

<400> SEQUENCE: 2

Thr Leu Gly Leu Arg Pro Val Pro Val Ala Thr Thr
1               5                   10


<210> SEQ ID NO 3
<211> LENGTH: 12
<212> TYPE: PRT
<213> ORGANISM: Artificial Sequence
<220> FEATURE:
<223> OTHER INFORMATION: Synthetic Construct

<400> SEQUENCE: 3

Tyr Asp Ala Ile Gln Arg Pro Thr Gly Gln Leu Ser
1               5                   10


<210> SEQ ID NO 4
<211> LENGTH: 12
<212> TYPE: PRT
<213> ORGANISM: Artificial Sequence
<220> FEATURE:
<223> OTHER INFORMATION: Synthetic Construct

<400> SEQUENCE: 4

His Ser Pro Thr Thr Ser Leu Thr Leu Ser Tyr Lys
1               5                   10


<210> SEQ ID NO 5
<211> LENGTH: 12
<212> TYPE: PRT
<213> ORGANISM: Artificial Sequence
<220> FEATURE:
<223> OTHER INFORMATION: Synthetic Construct
```

<400> SEQUENCE: 5

Ala Asp Ser Asn His Ala Tyr Glu Arg Asp Ser Val
1 5 10

<210> SEQ ID NO 6
<211> LENGTH: 12
<212> TYPE: PRT
<213> ORGANISM: Artificial Sequence
<220> FEATURE:
<223> OTHER INFORMATION: Synthetic Construct

<400> SEQUENCE: 6

Ala Glu Ser Pro Leu Thr Asn Arg Gly Trp Asn Pro
1 5 10

<210> SEQ ID NO 7
<211> LENGTH: 12
<212> TYPE: PRT
<213> ORGANISM: Artificial Sequence
<220> FEATURE:
<223> OTHER INFORMATION: Synthetic Construct

<400> SEQUENCE: 7

Ala His Pro His Ser Asp Lys Leu Val Pro Pro Arg
1 5 10

<210> SEQ ID NO 8
<211> LENGTH: 12
<212> TYPE: PRT
<213> ORGANISM: Artificial Sequence
<220> FEATURE:
<223> OTHER INFORMATION: Synthetic Construct

<400> SEQUENCE: 8

Ala His Ser Ser Phe Gly Phe Ser His Leu Ala Val
1 5 10

<210> SEQ ID NO 9
<211> LENGTH: 12
<212> TYPE: PRT
<213> ORGANISM: Artificial Sequence
<220> FEATURE:
<223> OTHER INFORMATION: Synthetic Construct

<400> SEQUENCE: 9

Ala His Val Asn Ser Ser Glu Arg Ile His Pro Tyr
1 5 10

<210> SEQ ID NO 10
<211> LENGTH: 12
<212> TYPE: PRT
<213> ORGANISM: Artificial Sequence
<220> FEATURE:
<223> OTHER INFORMATION: Synthetic Construct

<400> SEQUENCE: 10

Ala Asn Thr Glu Leu Ala Leu Ala Asn Arg Lys His
1 5 10

<210> SEQ ID NO 11
<211> LENGTH: 12
<212> TYPE: PRT
<213> ORGANISM: Artificial Sequence
<220> FEATURE:
<223> OTHER INFORMATION: Synthetic Construct

<400> SEQUENCE: 11

Ala Pro Asn Val Gly Asp Leu Thr Ser Leu Leu Gly
1 5 10

<210> SEQ ID NO 12
<211> LENGTH: 12
<212> TYPE: PRT
<213> ORGANISM: Artificial Sequence
<220> FEATURE:
<223> OTHER INFORMATION: Synthetic Construct

<400> SEQUENCE: 12

Ala Gln Ser Thr Thr Met Ser Thr Ser Gln Arg Asn
1 5 10

<210> SEQ ID NO 13
<211> LENGTH: 12
<212> TYPE: PRT
<213> ORGANISM: Artificial Sequence
<220> FEATURE:
<223> OTHER INFORMATION: Synthetic Construct

<400> SEQUENCE: 13

Ala Arg Ser Leu Glu Pro Ala Pro Ser Arg His Ser
1 5 10

<210> SEQ ID NO 14
<211> LENGTH: 12
<212> TYPE: PRT
<213> ORGANISM: Artificial Sequence
<220> FEATURE:
<223> OTHER INFORMATION: Synthetic Construct

<400> SEQUENCE: 14

Ala Thr Pro Gly Ser Phe Gln Thr Ile Arg Ala Asn
1 5 10

<210> SEQ ID NO 15
<211> LENGTH: 12
<212> TYPE: PRT
<213> ORGANISM: Artificial Sequence
<220> FEATURE:
<223> OTHER INFORMATION: Synthetic Construct

<400> SEQUENCE: 15

Ala Met Asn Met Arg Ser Leu Thr Tyr Ser Asp Leu
1 5 10

<210> SEQ ID NO 16
<211> LENGTH: 12
<212> TYPE: PRT
<213> ORGANISM: Artificial Sequence
<220> FEATURE:
<223> OTHER INFORMATION: Synthetic Construct

<400> SEQUENCE: 16

Ala Pro Gln Thr Ser Asp Ser Thr Leu Thr Val Met
1 5 10

<210> SEQ ID NO 17
<211> LENGTH: 12
<212> TYPE: PRT
<213> ORGANISM: Artificial Sequence
<220> FEATURE:
<223> OTHER INFORMATION: Synthetic Construct

<400> SEQUENCE: 17

Cys Val Thr Pro Ser Asn Arg Asp Cys Ser His Ser
1 5 10

<210> SEQ ID NO 18
<211> LENGTH: 12
<212> TYPE: PRT
<213> ORGANISM: Artificial Sequence
<220> FEATURE:
<223> OTHER INFORMATION: Synthetic Construct

<400> SEQUENCE: 18

Glu Ala Leu Leu Lys Pro Tyr Ser Phe Ala Tyr Pro
1 5 10

<210> SEQ ID NO 19
<211> LENGTH: 12
<212> TYPE: PRT
<213> ORGANISM: Artificial Sequence
<220> FEATURE:
<223> OTHER INFORMATION: Synthetic Construct

<400> SEQUENCE: 19

Glu His Val Asp Met Trp Asn Leu Val Ser Ala Ser
1 5 10

<210> SEQ ID NO 20
<211> LENGTH: 12
<212> TYPE: PRT
<213> ORGANISM: Artificial Sequence
<220> FEATURE:
<223> OTHER INFORMATION: Synthetic Construct

<400> SEQUENCE: 20

Glu Lys Tyr Pro Pro Ser Ser Met Asp Gln Arg Ser
1 5 10

<210> SEQ ID NO 21
<211> LENGTH: 12
<212> TYPE: PRT
<213> ORGANISM: Artificial Sequence
<220> FEATURE:
<223> OTHER INFORMATION: Synthetic Construct

<400> SEQUENCE: 21

Glu Leu Val Ser Ser Ser Asp Gln Arg Asn Lys Asn
1 5 10

<210> SEQ ID NO 22
<211> LENGTH: 12
<212> TYPE: PRT
<213> ORGANISM: Artificial Sequence
<220> FEATURE:
<223> OTHER INFORMATION: Synthetic Construct

<400> SEQUENCE: 22

Phe Pro Lys Ser Val Tyr Pro Ala Met Pro Arg Pro
1 5 10

<210> SEQ ID NO 23
<211> LENGTH: 12
<212> TYPE: PRT
<213> ORGANISM: Artificial Sequence
<220> FEATURE:
<223> OTHER INFORMATION: Synthetic Construct

<400> SEQUENCE: 23

Phe Ser Pro Thr Gln Ala Asn Thr Ile His Arg Trp 1 5 10

<210> SEQ ID NO 24
<211> LENGTH: 12
<212> TYPE: PRT
<213> ORGANISM: Artificial Sequence
<220> FEATURE:
<223> OTHER INFORMATION: Synthetic Construct

<400> SEQUENCE: 24

Phe Thr Asn Pro Phe Gly Pro Tyr Pro Thr Gly Arg
1 5 10

<210> SEQ ID NO 25
<211> LENGTH: 12
<212> TYPE: PRT
<213> ORGANISM: Artificial Sequence
<220> FEATURE:
<223> OTHER INFORMATION: Synthetic Construct

<400> SEQUENCE: 25

Gly Lys Gln Thr Leu His Ser Phe Ala Thr His Trp
1 5 10

<210> SEQ ID NO 26
<211> LENGTH: 12
<212> TYPE: PRT
<213> ORGANISM: Artificial Sequence
<220> FEATURE:
<223> OTHER INFORMATION: Synthetic Construct

<400> SEQUENCE: 26

Gly Pro Trp Leu Gly Ser Asn Met Arg Gly Ala Ser
1 5 10

<210> SEQ ID NO 27
<211> LENGTH: 12
<212> TYPE: PRT
<213> ORGANISM: Artificial Sequence
<220> FEATURE:
<223> OTHER INFORMATION: Synthetic Construct

<400> SEQUENCE: 27

Gly Arg Asp Met Pro Met Ser Ala Leu Met Arg His
1 5 10

<210> SEQ ID NO 28
<211> LENGTH: 12
<212> TYPE: PRT
<213> ORGANISM: Artificial Sequence
<220> FEATURE:
<223> OTHER INFORMATION: Synthetic Construct

<400> SEQUENCE: 28

Gly Ser Ala Ala Arg Thr Ile Ser Pro Ser Leu Leu
1 5 10

<210> SEQ ID NO 29
<211> LENGTH: 12
<212> TYPE: PRT
<213> ORGANISM: Artificial Sequence
<220> FEATURE:
<223> OTHER INFORMATION: Synthetic Construct

<400> SEQUENCE: 29

Gly Ser Met Phe Tyr Leu Pro Met Pro Glu Arg Gly
1 5 10

<210> SEQ ID NO 30
<211> LENGTH: 12
<212> TYPE: PRT
<213> ORGANISM: Artificial Sequence
<220> FEATURE:
<223> OTHER INFORMATION: Synthetic Construct

<400> SEQUENCE: 30

Gly Thr Asp Ile Ile His Pro Arg Val Ile Phe Asn
1 5 10

<210> SEQ ID NO 31
<211> LENGTH: 12
<212> TYPE: PRT
<213> ORGANISM: Artificial Sequence
<220> FEATURE:
<223> OTHER INFORMATION: Synthetic Construct

<400> SEQUENCE: 31

Gly Thr Ala Ser Arg Thr His Ser Tyr Tyr Ser Leu
1 5 10

<210> SEQ ID NO 32
<211> LENGTH: 12
<212> TYPE: PRT
<213> ORGANISM: Artificial Sequence
<220> FEATURE:
<223> OTHER INFORMATION: Synthetic Construct

<400> SEQUENCE: 32

His Asn Thr Pro Met Leu Asp Ser Arg Gly Asn Asn
1 5 10

<210> SEQ ID NO 33
<211> LENGTH: 12
<212> TYPE: PRT
<213> ORGANISM: Artificial Sequence
<220> FEATURE:
<223> OTHER INFORMATION: Synthetic Construct

<400> SEQUENCE: 33

His Pro Ala Leu Ser Gln His Leu Gly Pro Val Ala
1 5 10

<210> SEQ ID NO 34
<211> LENGTH: 12
<212> TYPE: PRT
<213> ORGANISM: Artificial Sequence
<220> FEATURE:
<223> OTHER INFORMATION: Synthetic Construct

<400> SEQUENCE: 34

His Thr Pro His Pro Gly Gly Arg Ser Val Pro Pro
1 5 10

<210> SEQ ID NO 35
<211> LENGTH: 12
<212> TYPE: PRT
<213> ORGANISM: Artificial Sequence
<220> FEATURE:
<223> OTHER INFORMATION: Synthetic Construct

<400> SEQUENCE: 35

His Tyr Lys Pro His Val Ser Ser Leu Pro Leu Ala
1 5 10

<210> SEQ ID NO 36
<211> LENGTH: 12
<212> TYPE: PRT
<213> ORGANISM: Artificial Sequence
<220> FEATURE:
<223> OTHER INFORMATION: Synthetic Construct

<400> SEQUENCE: 36

Ile Gly Ser Lys Ser Pro Leu Arg Leu Thr Met Asp
1 5 10

<210> SEQ ID NO 37
<211> LENGTH: 12
<212> TYPE: PRT
<213> ORGANISM: Artificial Sequence
<220> FEATURE:
<223> OTHER INFORMATION: Synthetic Construct

<400> SEQUENCE: 37

Lys Leu Thr Thr Asp Lys Val Arg Thr Ile Thr Leu
1 5 10

<210> SEQ ID NO 38
<211> LENGTH: 11
<212> TYPE: PRT
<213> ORGANISM: Artificial Sequence
<220> FEATURE:
<223> OTHER INFORMATION: Synthetic Construct

<400> SEQUENCE: 38

Leu Ile Ala Gly Trp Asp Ile Ser Ser Lys Arg
1 5 10

<210> SEQ ID NO 39
<211> LENGTH: 12
<212> TYPE: PRT
<213> ORGANISM: Artificial Sequence
<220> FEATURE:
<223> OTHER INFORMATION: Synthetic Construct

<400> SEQUENCE: 39

Leu Pro Lys Val Ser Val Pro Arg His Pro Ser Val
1 5 10

<210> SEQ ID NO 40
<211> LENGTH: 12
<212> TYPE: PRT
<213> ORGANISM: Artificial Sequence
<220> FEATURE:
<223> OTHER INFORMATION: Synthetic Construct

<400> SEQUENCE: 40

Leu Thr Pro His Leu Gly Thr His Lys Ser Thr Thr
1 5 10

<210> SEQ ID NO 41
<211> LENGTH: 12
<212> TYPE: PRT
<213> ORGANISM: Artificial Sequence
<220> FEATURE:
<223> OTHER INFORMATION: Synthetic Construct

<400> SEQUENCE: 41

Met Lys Ala His His Ser Gln Leu Tyr Pro Arg His
1 5 10

<210> SEQ ID NO 42
<211> LENGTH: 12
<212> TYPE: PRT
<213> ORGANISM: Artificial Sequence
<220> FEATURE:
<223> OTHER INFORMATION: Synthetic Construct

<400> SEQUENCE: 42

Met Asn Ile Ala Glu Leu Arg Asn Ser Asp Leu Asn
1 5 10

<210> SEQ ID NO 43
<211> LENGTH: 12
<212> TYPE: PRT
<213> ORGANISM: Artificial Sequence
<220> FEATURE:
<223> OTHER INFORMATION: Synthetic Construct

<400> SEQUENCE: 43

Asn Ala Asn His Asn Pro Leu Asn Leu Lys Ser Ala
1 5 10

<210> SEQ ID NO 44
<211> LENGTH: 12
<212> TYPE: PRT
<213> ORGANISM: Artificial Sequence
<220> FEATURE:
<223> OTHER INFORMATION: Synthetic Construct

<400> SEQUENCE: 44

Gln Phe Ala Lys Thr Ser Asp Pro Gly Ser Leu Thr
1 5 10

<210> SEQ ID NO 45
<211> LENGTH: 12
<212> TYPE: PRT
<213> ORGANISM: Artificial Sequence
<220> FEATURE:
<223> OTHER INFORMATION: Synthetic Construct

<400> SEQUENCE: 45

Gln Ile Phe Asn His Ser Pro Asn Asp Pro Lys Lys
1 5 10

<210> SEQ ID NO 46
<211> LENGTH: 11
<212> TYPE: PRT
<213> ORGANISM: Artificial Sequence
<220> FEATURE:
<223> OTHER INFORMATION: Synthetic Construct

<400> SEQUENCE: 46

Gln Tyr Val Pro Tyr Leu Pro Pro Ala Ile Leu
1 5 10

<210> SEQ ID NO 47
<211> LENGTH: 12
<212> TYPE: PRT
<213> ORGANISM: Artificial Sequence
<220> FEATURE:
<223> OTHER INFORMATION: Synthetic Construct

<400> SEQUENCE: 47

Asn Asn Thr Asp His Arg Gln Leu Thr Ser Thr Thr
1 5 10

<210> SEQ ID NO 48

<211> LENGTH: 13
<212> TYPE: PRT
<213> ORGANISM: Artificial Sequence
<220> FEATURE:
<223> OTHER INFORMATION: Synthetic Construct

<400> SEQUENCE: 48

Asn Tyr Leu Pro His Gln Ser Ser Ser Pro Ser Arg Gly
1               5                   10

<210> SEQ ID NO 49
<211> LENGTH: 11
<212> TYPE: PRT
<213> ORGANISM: Artificial Sequence
<220> FEATURE:
<223> OTHER INFORMATION: Synthetic Construct

<400> SEQUENCE: 49

Gln Tyr Val Pro Tyr Leu Pro Pro Ala Ile Leu
1               5                   10

<210> SEQ ID NO 50
<211> LENGTH: 11
<212> TYPE: PRT
<213> ORGANISM: Artificial Sequence
<220> FEATURE:
<223> OTHER INFORMATION: Synthetic Construct

<400> SEQUENCE: 50

Arg Ile Pro Met Pro Ser Tyr Met Asn His Met
1               5                   10

<210> SEQ ID NO 51
<211> LENGTH: 13
<212> TYPE: PRT
<213> ORGANISM: Artificial Sequence
<220> FEATURE:
<223> OTHER INFORMATION: Synthetic Construct

<400> SEQUENCE: 51

Ser Asp Ala Ser Gly Ile Pro Lys Arg Leu Ala Phe Pro
1               5                   10

<210> SEQ ID NO 52
<211> LENGTH: 12
<212> TYPE: PRT
<213> ORGANISM: Artificial Sequence
<220> FEATURE:
<223> OTHER INFORMATION: Synthetic Construct

<400> SEQUENCE: 52

Ser Asp Thr Thr Ser Lys His Leu Tyr Thr Arg Leu
1               5                   10

<210> SEQ ID NO 53
<211> LENGTH: 12
<212> TYPE: PRT
<213> ORGANISM: Artificial Sequence
<220> FEATURE:
<223> OTHER INFORMATION: Synthetic Construct

<400> SEQUENCE: 53

Ser Gly Tyr Ser Ala Glu Gly Gly Lys Pro Val Leu
1               5                   10

<210> SEQ ID NO 54
<211> LENGTH: 11

<212> TYPE: PRT
<213> ORGANISM: Artificial Sequence
<220> FEATURE:
<223> OTHER INFORMATION: Synthetic Construct

<400> SEQUENCE: 54

Ser Gly Tyr Ser Gln Gly Gly Lys Pro Val Leu
1 5 10

<210> SEQ ID NO 55
<211> LENGTH: 12
<212> TYPE: PRT
<213> ORGANISM: Artificial Sequence
<220> FEATURE:
<223> OTHER INFORMATION: Synthetic Construct

<400> SEQUENCE: 55

Ser His Gly Ile Ser Ser Thr Pro Pro Gly Gln Ala
1 5 10

<210> SEQ ID NO 56
<211> LENGTH: 12
<212> TYPE: PRT
<213> ORGANISM: Artificial Sequence
<220> FEATURE:
<223> OTHER INFORMATION: Synthetic Construct

<400> SEQUENCE: 56

Ser Leu Pro Leu Ala Ile His Asn Ser Arg Pro Asn
1 5 10

<210> SEQ ID NO 57
<211> LENGTH: 12
<212> TYPE: PRT
<213> ORGANISM: Artificial Sequence
<220> FEATURE:
<223> OTHER INFORMATION: Synthetic Construct

<400> SEQUENCE: 57

Ser Leu Thr Asp Tyr Val Arg Lys Gly Pro Arg Ile
1 5 10

<210> SEQ ID NO 58
<211> LENGTH: 12
<212> TYPE: PRT
<213> ORGANISM: Artificial Sequence
<220> FEATURE:
<223> OTHER INFORMATION: Synthetic Construct

<400> SEQUENCE: 58

Ser Asn Pro Ser Ala His Lys Asp Asp Ser Lys Arg
1 5 10

<210> SEQ ID NO 59
<211> LENGTH: 12
<212> TYPE: PRT
<213> ORGANISM: Artificial Sequence
<220> FEATURE:
<223> OTHER INFORMATION: Synthetic Construct

<400> SEQUENCE: 59

Ser Arg Tyr Met Gly Pro Leu Asp Leu Leu Ala Pro
1 5 10

<210> SEQ ID NO 60
<211> LENGTH: 12
<212> TYPE: PRT

<213> ORGANISM: Artificial Sequence
<220> FEATURE:
<223> OTHER INFORMATION: Synthetic Construct

<400> SEQUENCE: 60

Ser Arg Tyr Met Gly Pro Leu Asp Leu Leu Ala Pro
1               5                   10

<210> SEQ ID NO 61
<211> LENGTH: 12
<212> TYPE: PRT
<213> ORGANISM: Artificial Sequence
<220> FEATURE:
<223> OTHER INFORMATION: Synthetic Construct

<400> SEQUENCE: 61

Ser Ser Met Pro Ile Asn Ser Pro Ala Thr Arg Gln
1               5                   10

<210> SEQ ID NO 62
<211> LENGTH: 12
<212> TYPE: PRT
<213> ORGANISM: Artificial Sequence
<220> FEATURE:
<223> OTHER INFORMATION: Synthetic Construct

<400> SEQUENCE: 62

Ser Val Asp Tyr Ser Phe Ser Asn Arg Thr Asp Arg
1               5                   10

<210> SEQ ID NO 63
<211> LENGTH: 12
<212> TYPE: PRT
<213> ORGANISM: Artificial Sequence
<220> FEATURE:
<223> OTHER INFORMATION: Synthetic Construct

<400> SEQUENCE: 63

Ser Tyr His Leu Ser Asn Thr Phe Arg Val Gln Ala
1               5                   10

<210> SEQ ID NO 64
<211> LENGTH: 12
<212> TYPE: PRT
<213> ORGANISM: Artificial Sequence
<220> FEATURE:
<223> OTHER INFORMATION: Synthetic Construct

<400> SEQUENCE: 64

Thr Ala Val Leu Ala Pro Gln Pro Trp Leu Asn Leu
1               5                   10

<210> SEQ ID NO 65
<211> LENGTH: 12
<212> TYPE: PRT
<213> ORGANISM: Artificial Sequence
<220> FEATURE:
<223> OTHER INFORMATION: Synthetic Construct

<400> SEQUENCE: 65

Thr Gly Ser Ala Lys Phe Leu Gln Arg Asp Thr His
1               5                   10

<210> SEQ ID NO 66
<211> LENGTH: 12
<212> TYPE: PRT
<213> ORGANISM: Artificial Sequence
<220> FEATURE:
<223> OTHER INFORMATION: Synthetic Construct

<400> SEQUENCE: 66

Thr Lys Pro Ser Val Val His Trp Pro Met Ile Arg
1 5 10

<210> SEQ ID NO 67
<211> LENGTH: 12
<212> TYPE: PRT
<213> ORGANISM: Artificial Sequence
<220> FEATURE:
<223> OTHER INFORMATION: Synthetic Construct

<400> SEQUENCE: 67

Thr Pro His Gly Tyr Gln Pro Met Gln Gly Lys Thr
1 5 10

<210> SEQ ID NO 68
<211> LENGTH: 12
<212> TYPE: PRT
<213> ORGANISM: Artificial Sequence
<220> FEATURE:
<223> OTHER INFORMATION: Synthetic Construct

<400> SEQUENCE: 68

Thr Gln Gly Ser Gly Phe Ser Ser Pro Ile Leu Pro
1 5 10

<210> SEQ ID NO 69
<211> LENGTH: 12
<212> TYPE: PRT
<213> ORGANISM: Artificial Sequence
<220> FEATURE:
<223> OTHER INFORMATION: Synthetic Construct

<400> SEQUENCE: 69

Thr Thr Asp Phe Phe Tyr Lys Arg Thr Phe Phe Thr
1 5 10

<210> SEQ ID NO 70
<211> LENGTH: 12
<212> TYPE: PRT
<213> ORGANISM: Artificial Sequence
<220> FEATURE:
<223> OTHER INFORMATION: Synthetic Construct

<400> SEQUENCE: 70

Thr Thr Arg Pro Asn His Val His Leu Ala Lys Ile
1 5 10

<210> SEQ ID NO 71
<211> LENGTH: 12
<212> TYPE: PRT
<213> ORGANISM: Artificial Sequence
<220> FEATURE:
<223> OTHER INFORMATION: Synthetic Construct

<400> SEQUENCE: 71

Val Ala Gln Arg His Thr Leu Thr Ser Ile Thr Val
1 5 10

<210> SEQ ID NO 72
<211> LENGTH: 12
<212> TYPE: PRT
<213> ORGANISM: Artificial Sequence
<220> FEATURE:

<223> OTHER INFORMATION: Synthetic Construct

<400> SEQUENCE: 72

Val Asp Ala Lys Tyr Gly Arg His Ile Pro Pro Val
1 5 10

<210> SEQ ID NO 73
<211> LENGTH: 12
<212> TYPE: PRT
<213> ORGANISM: Artificial Sequence
<220> FEATURE:
<223> OTHER INFORMATION: Synthetic Construct

<400> SEQUENCE: 73

Val Pro Thr Gln Trp Thr His Arg Glu Ser His Ala
1 5 10

<210> SEQ ID NO 74
<211> LENGTH: 12
<212> TYPE: PRT
<213> ORGANISM: Artificial Sequence
<220> FEATURE:
<223> OTHER INFORMATION: Synthetic Construct

<400> SEQUENCE: 74

Trp Gly Val Thr Lys Pro Ile Arg Thr Ser Thr Leu
1 5 10

<210> SEQ ID NO 75
<211> LENGTH: 12
<212> TYPE: PRT
<213> ORGANISM: Artificial Sequence
<220> FEATURE:
<223> OTHER INFORMATION: Synthetic Construct

<400> SEQUENCE: 75

Trp Gly Val Thr Lys Pro Ile Arg Thr Ser Thr Leu
1 5 10

<210> SEQ ID NO 76
<211> LENGTH: 11
<212> TYPE: PRT
<213> ORGANISM: Artificial Sequence
<220> FEATURE:
<223> OTHER INFORMATION: Synthetic Construct

<400> SEQUENCE: 76

Trp Tyr Pro Ser Asn Ala Leu Ser Leu His Lys
1 5 10

<210> SEQ ID NO 77
<211> LENGTH: 12
<212> TYPE: PRT
<213> ORGANISM: Artificial Sequence
<220> FEATURE:
<223> OTHER INFORMATION: Synthetic Construct

<400> SEQUENCE: 77

Tyr Ala Ser Gln Ser Ala Leu Ser His Ser Ala Arg
1 5 10

<210> SEQ ID NO 78
<211> LENGTH: 12
<212> TYPE: PRT
<213> ORGANISM: Artificial Sequence
<220> FEATURE:
<223> OTHER INFORMATION: Synthetic Construct

<400> SEQUENCE: 78

Tyr Val Lys Ser His Thr Thr Thr Ala Val Arg Gln
1 5 10

<210> SEQ ID NO 79
<211> LENGTH: 4
<212> TYPE: PRT
<213> ORGANISM: Artificial Sequence
<220> FEATURE:
<223> OTHER INFORMATION: Synthetic Construct

<400> SEQUENCE: 79

Gly Gly Gly Ser
1

<210> SEQ ID NO 80
<211> LENGTH: 6
<212> TYPE: PRT
<213> ORGANISM: Artificial Sequence
<220> FEATURE:
<223> OTHER INFORMATION: Synthetic Construct

<400> SEQUENCE: 80

Gly Gly Gly Ser Gly Gly
1 5

<210> SEQ ID NO 81
<211> LENGTH: 8
<212> TYPE: PRT
<213> ORGANISM: Artificial Sequence
<220> FEATURE:
<223> OTHER INFORMATION: Synthetic Construct

<400> SEQUENCE: 81

Gly Gly Gly Ser Gly Gly Gly Ser
1 5

<210> SEQ ID NO 82
<211> LENGTH: 15
<212> TYPE: PRT
<213> ORGANISM: Artificial Sequence
<220> FEATURE:
<223> OTHER INFORMATION: Synthetic Construct

<400> SEQUENCE: 82

Gly Gly Gly Gly Ser Gly Gly Gly Gly Ser Gly Gly Gly Gly Ser
1 5 10 15

<210> SEQ ID NO 83
<211> LENGTH: 17
<212> TYPE: PRT
<213> ORGANISM: Artificial Sequence
<220> FEATURE:
<223> OTHER INFORMATION: Synthetic Construct

<400> SEQUENCE: 83

Gly Gly Gly Gly Ser Gly Gly Gly Gly Ser Gly Gly Gly Gly Ser Gly
1 5 10 15

Gly

<210> SEQ ID NO 84
<211> LENGTH: 20
<212> TYPE: PRT
<213> ORGANISM: Artificial Sequence
<220> FEATURE:

<223> OTHER INFORMATION: Synthetic Construct

<400> SEQUENCE: 84

Gly Gly Gly Gly Ser Gly Gly Gly Gly Ser Gly Gly Gly Gly Ser Gly
1               5                   10                  15

Gly Gly Gly Ser
            20

<210> SEQ ID NO 85
<211> LENGTH: 15
<212> TYPE: PRT
<213> ORGANISM: Artificial Sequence
<220> FEATURE:
<223> OTHER INFORMATION: Synthetic Construct

<400> SEQUENCE: 85

Ala Asp Ser Asn His Ala Tyr Glu Arg Asp Ser Val Gly Gly Gly
1               5                   10                  15

<210> SEQ ID NO 86
<211> LENGTH: 15
<212> TYPE: PRT
<213> ORGANISM: Artificial Sequence
<220> FEATURE:
<223> OTHER INFORMATION: Synthetic Construct

<400> SEQUENCE: 86

Ala Glu Ser Pro Leu Thr Asn Arg Gly Trp Asn Pro Gly Gly Gly
1               5                   10                  15

<210> SEQ ID NO 87
<211> LENGTH: 15
<212> TYPE: PRT
<213> ORGANISM: Artificial Sequence
<220> FEATURE:
<223> OTHER INFORMATION: Synthetic Construct

<400> SEQUENCE: 87

Ala His Val Asn Ser Ser Glu Arg Ile His Pro Tyr Gly Gly Gly
1               5                   10                  15

<210> SEQ ID NO 88
<211> LENGTH: 15
<212> TYPE: PRT
<213> ORGANISM: Artificial Sequence
<220> FEATURE:
<223> OTHER INFORMATION: Synthetic Construct

<400> SEQUENCE: 88

Ala Asn Thr Glu Leu Ala Leu Ala Asn Arg Lys His Gly Gly Gly
1               5                   10                  15

<210> SEQ ID NO 89
<211> LENGTH: 15
<212> TYPE: PRT
<213> ORGANISM: Artificial Sequence
<220> FEATURE:
<223> OTHER INFORMATION: Synthetic Construct

<400> SEQUENCE: 89

Ala Pro Asn Val Gly Asp Leu Thr Ser Leu Leu Gly Gly Gly Gly
1               5                   10                  15

<210> SEQ ID NO 90
<211> LENGTH: 15
<212> TYPE: PRT

<213> ORGANISM: Artificial Sequence
<220> FEATURE:
<223> OTHER INFORMATION: Synthetic Construct

<400> SEQUENCE: 90

Ala Gln Ser Thr Thr Met Ser Thr Ser Gln Arg Asn Gly Gly Gly
1 5 10 15

<210> SEQ ID NO 91
<211> LENGTH: 15
<212> TYPE: PRT
<213> ORGANISM: Artificial Sequence
<220> FEATURE:
<223> OTHER INFORMATION: Synthetic Construct

<400> SEQUENCE: 91

Ala Arg Ser Leu Glu Pro Ala Pro Ser Arg His Ser Gly Gly Gly
1 5 10 15

<210> SEQ ID NO 92
<211> LENGTH: 15
<212> TYPE: PRT
<213> ORGANISM: Artificial Sequence
<220> FEATURE:
<223> OTHER INFORMATION: Synthetic Construct

<400> SEQUENCE: 92

Ala Thr Pro Gly Ser Phe Gln Thr Ile Arg Ala Asn Gly Gly Gly
1 5 10 15

<210> SEQ ID NO 93
<211> LENGTH: 15
<212> TYPE: PRT
<213> ORGANISM: Artificial Sequence
<220> FEATURE:
<223> OTHER INFORMATION: Synthetic Construct

<400> SEQUENCE: 93

Cys Val Thr Pro Ser Asn Arg Asp Cys Ser His Ser Gly Gly Gly
1 5 10 15

<210> SEQ ID NO 94
<211> LENGTH: 15
<212> TYPE: PRT
<213> ORGANISM: Artificial Sequence
<220> FEATURE:
<223> OTHER INFORMATION: Synthetic Construct

<400> SEQUENCE: 94

Glu Leu Val Ser Ser Ser Asp Gln Arg Asn Lys Asn Gly Gly Gly
1 5 10 15

<210> SEQ ID NO 95
<211> LENGTH: 15
<212> TYPE: PRT
<213> ORGANISM: Artificial Sequence
<220> FEATURE:
<223> OTHER INFORMATION: Synthetic Construct

<400> SEQUENCE: 95

Gly Pro Trp Leu Gly Ser Asn Met Arg Gly Ala Ser Gly Gly Gly
1 5 10 15

<210> SEQ ID NO 96
<211> LENGTH: 15
<212> TYPE: PRT
<213> ORGANISM: Artificial Sequence
<220> FEATURE:
<223> OTHER INFORMATION: Synthetic Construct

<400> SEQUENCE: 96

Gly Ser Ala Ala Arg Thr Ile Ser Pro Ser Leu Leu Gly Gly Gly
1 5 10 15

<210> SEQ ID NO 97
<211> LENGTH: 15
<212> TYPE: PRT
<213> ORGANISM: Artificial Sequence
<220> FEATURE:
<223> OTHER INFORMATION: Synthetic Construct

<400> SEQUENCE: 97

Gly Ser Met Phe Tyr Leu Pro Met Pro Glu Arg Gly Gly Gly Gly
1 5 10 15

<210> SEQ ID NO 98
<211> LENGTH: 15
<212> TYPE: PRT
<213> ORGANISM: Artificial Sequence
<220> FEATURE:
<223> OTHER INFORMATION: Synthetic Construct

<400> SEQUENCE: 98

Gly Thr Ala Ser Arg Thr His Ser Tyr Tyr Ser Leu Gly Gly Gly
1 5 10 15

<210> SEQ ID NO 99
<211> LENGTH: 15
<212> TYPE: PRT
<213> ORGANISM: Artificial Sequence
<220> FEATURE:
<223> OTHER INFORMATION: Synthetic Construct

<400> SEQUENCE: 99

His Pro Ala Leu Ser Gln His Leu Gly Pro Val Ala Gly Gly Gly
1 5 10 15

<210> SEQ ID NO 100
<211> LENGTH: 15
<212> TYPE: PRT
<213> ORGANISM: Artificial Sequence
<220> FEATURE:
<223> OTHER INFORMATION: Synthetic Construct

<400> SEQUENCE: 100

His Thr Pro His Pro Gly Gly Arg Ser Val Pro Pro Gly Gly Gly
1 5 10 15

<210> SEQ ID NO 101
<211> LENGTH: 15
<212> TYPE: PRT
<213> ORGANISM: Artificial Sequence
<220> FEATURE:
<223> OTHER INFORMATION: Synthetic Construct

<400> SEQUENCE: 101

Ile Gly Ser Lys Ser Pro Leu Arg Leu Thr Met Asp Gly Gly Gly
1 5 10 15

<210> SEQ ID NO 102
<211> LENGTH: 15
<212> TYPE: PRT
<213> ORGANISM: Artificial Sequence
<220> FEATURE:

<223> OTHER INFORMATION: Synthetic Construct

<400> SEQUENCE: 102

Lys Leu Thr Thr Asp Lys Val Arg Thr Ile Thr Leu Gly Gly Gly
1 5 10 15

<210> SEQ ID NO 103
<211> LENGTH: 14
<212> TYPE: PRT
<213> ORGANISM: Artificial Sequence
<220> FEATURE:
<223> OTHER INFORMATION: Synthetic Construct

<400> SEQUENCE: 103

Leu Ile Ala Gly Trp Asp Ile Ser Ser Lys Arg Gly Gly Gly
1 5 10

<210> SEQ ID NO 104
<211> LENGTH: 15
<212> TYPE: PRT
<213> ORGANISM: Artificial Sequence
<220> FEATURE:
<223> OTHER INFORMATION: Synthetic Construct

<400> SEQUENCE: 104

Leu Pro Lys Val Ser Val Pro Arg His Pro Ser Val Gly Gly Gly
1 5 10 15

<210> SEQ ID NO 105
<211> LENGTH: 15
<212> TYPE: PRT
<213> ORGANISM: Artificial Sequence
<220> FEATURE:
<223> OTHER INFORMATION: Synthetic Construct

<400> SEQUENCE: 105

Met Lys Ala His His Ser Gln Leu Tyr Pro Arg His Gly Gly Gly
1 5 10 15

<210> SEQ ID NO 106
<211> LENGTH: 14
<212> TYPE: PRT
<213> ORGANISM: Artificial Sequence
<220> FEATURE:
<223> OTHER INFORMATION: Synthetic Construct

<400> SEQUENCE: 106

Gln Tyr Val Pro Tyr Leu Pro Pro Ala Ile Leu Gly Gly Gly
1 5 10

<210> SEQ ID NO 107
<211> LENGTH: 15
<212> TYPE: PRT
<213> ORGANISM: Artificial Sequence
<220> FEATURE:
<223> OTHER INFORMATION: Synthetic Construct

<400> SEQUENCE: 107

Asn Asn Thr Asp His Arg Gln Leu Thr Ser Thr Thr Gly Gly Gly
1 5 10 15

<210> SEQ ID NO 108
<211> LENGTH: 15
<212> TYPE: PRT
<213> ORGANISM: Artificial Sequence
<220> FEATURE:
<223> OTHER INFORMATION: Synthetic Construct

<400> SEQUENCE: 108

Asn Tyr Leu Pro His Gln Ser Ser Ser Pro Ser Arg Gly Gly Gly
1 5 10 15

<210> SEQ ID NO 109
<211> LENGTH: 14
<212> TYPE: PRT
<213> ORGANISM: Artificial Sequence
<220> FEATURE:
<223> OTHER INFORMATION: Synthetic Construct

<400> SEQUENCE: 109

Gln Tyr Val Pro Tyr Leu Pro Pro Ala Ile Leu Gly Gly Gly
1 5 10

<210> SEQ ID NO 110
<211> LENGTH: 15
<212> TYPE: PRT
<213> ORGANISM: Artificial Sequence
<220> FEATURE:
<223> OTHER INFORMATION: Synthetic Construct

<400> SEQUENCE: 110

Ser Asn Pro Ser Ala His Lys Asp Asp Ser Lys Arg Gly Gly Gly
1 5 10 15

<210> SEQ ID NO 111
<211> LENGTH: 15
<212> TYPE: PRT
<213> ORGANISM: Artificial Sequence
<220> FEATURE:
<223> OTHER INFORMATION: Synthetic Construct

<400> SEQUENCE: 111

Ser Arg Tyr Met Gly Pro Leu Asp Leu Leu Ala Pro Gly Gly Gly
1 5 10 15

<210> SEQ ID NO 112
<211> LENGTH: 15
<212> TYPE: PRT
<213> ORGANISM: Artificial Sequence
<220> FEATURE:
<223> OTHER INFORMATION: Synthetic Construct

<400> SEQUENCE: 112

Ser Val Asp Tyr Ser Phe Ser Asn Arg Thr Asp Arg Gly Gly Gly
1 5 10 15

<210> SEQ ID NO 113
<211> LENGTH: 15
<212> TYPE: PRT
<213> ORGANISM: Artificial Sequence
<220> FEATURE:
<223> OTHER INFORMATION: Synthetic Construct

<400> SEQUENCE: 113

Ser Tyr His Leu Ser Asn Thr Phe Arg Val Gln Ala Gly Gly Gly
1 5 10 15

<210> SEQ ID NO 114
<211> LENGTH: 15
<212> TYPE: PRT
<213> ORGANISM: Artificial Sequence
<220> FEATURE:
<223> OTHER INFORMATION: Synthetic Construct

<400> SEQUENCE: 114

Ser Tyr Pro Ser Asn Ala Leu Ser Leu His Lys Tyr Gly Gly Gly
1 5 10 15

<210> SEQ ID NO 115
<211> LENGTH: 15
<212> TYPE: PRT
<213> ORGANISM: Artificial Sequence
<220> FEATURE:
<223> OTHER INFORMATION: Synthetic Construct

<400> SEQUENCE: 115

Thr Leu Gly Leu Arg Pro Val Pro Val Ala Thr Thr Gly Gly Gly
1 5 10 15

<210> SEQ ID NO 116
<211> LENGTH: 15
<212> TYPE: PRT
<213> ORGANISM: Artificial Sequence
<220> FEATURE:
<223> OTHER INFORMATION: Synthetic Construct

<400> SEQUENCE: 116

Thr Thr Asp Phe Phe Tyr Lys Arg Thr Phe Phe Thr Gly Gly Gly
1 5 10 15

<210> SEQ ID NO 117
<211> LENGTH: 15
<212> TYPE: PRT
<213> ORGANISM: Artificial Sequence
<220> FEATURE:
<223> OTHER INFORMATION: Synthetic Construct

<400> SEQUENCE: 117

Thr Thr Arg Pro Asn His Val His Leu Ala Lys Ile Gly Gly Gly
1 5 10 15

<210> SEQ ID NO 118
<211> LENGTH: 15
<212> TYPE: PRT
<213> ORGANISM: Artificial Sequence
<220> FEATURE:
<223> OTHER INFORMATION: Synthetic Construct

<400> SEQUENCE: 118

Val Ala Gln Arg His Thr Leu Thr Ser Ile Thr Val Gly Gly Gly
1 5 10 15

<210> SEQ ID NO 119
<211> LENGTH: 15
<212> TYPE: PRT
<213> ORGANISM: Artificial Sequence
<220> FEATURE:
<223> OTHER INFORMATION: Synthetic Construct

<400> SEQUENCE: 119

Val Pro Thr Gln Trp Thr His Arg Glu Ser His Ala Gly Gly Gly
1 5 10 15

<210> SEQ ID NO 120
<211> LENGTH: 15
<212> TYPE: PRT
<213> ORGANISM: Artificial Sequence
<220> FEATURE:
<223> OTHER INFORMATION: Synthetic Construct

<400> SEQUENCE: 120

Trp Gly Val Thr Lys Pro Ile Arg Thr Ser Thr Leu Gly Gly Gly
1 5 10 15

<210> SEQ ID NO 121
<211> LENGTH: 15
<212> TYPE: PRT
<213> ORGANISM: Artificial Sequence
<220> FEATURE:
<223> OTHER INFORMATION: Synthetic Construct

<400> SEQUENCE: 121

Tyr Asp Ala Ile Gln Arg Pro Thr Gly Gln Leu Ser Gly Gly Gly
1 5 10 15

<210> SEQ ID NO 122
<211> LENGTH: 16
<212> TYPE: PRT
<213> ORGANISM: Artificial Sequence
<220> FEATURE:
<223> OTHER INFORMATION: Synthetic Construct

<400> SEQUENCE: 122

Ala His Pro His Ser Asp Lys Leu Val Pro Pro Arg Gly Gly Gly Ser
1 5 10 15

<210> SEQ ID NO 123
<211> LENGTH: 16
<212> TYPE: PRT
<213> ORGANISM: Artificial Sequence
<220> FEATURE:
<223> OTHER INFORMATION: Synthetic Construct

<400> SEQUENCE: 123

Ala His Ser Ser Phe Gly Phe Ser His Leu Ala Val Gly Gly Gly Ser
1 5 10 15

<210> SEQ ID NO 124
<211> LENGTH: 16
<212> TYPE: PRT
<213> ORGANISM: Artificial Sequence
<220> FEATURE:
<223> OTHER INFORMATION: Synthetic Construct

<400> SEQUENCE: 124

Ala Met Asn Met Arg Ser Leu Thr Tyr Ser Asp Leu Gly Gly Gly Ser
1 5 10 15

<210> SEQ ID NO 125
<211> LENGTH: 16
<212> TYPE: PRT
<213> ORGANISM: Artificial Sequence
<220> FEATURE:
<223> OTHER INFORMATION: Synthetic Construct

<400> SEQUENCE: 125

Ala Pro Gln Thr Ser Asp Ser Thr Leu Thr Val Met Gly Gly Gly Ser
1 5 10 15

<210> SEQ ID NO 126
<211> LENGTH: 16
<212> TYPE: PRT
<213> ORGANISM: Artificial Sequence
<220> FEATURE:
<223> OTHER INFORMATION: Synthetic Construct

<400> SEQUENCE: 126

Glu Ala Leu Leu Lys Pro Tyr Ser Phe Ala Tyr Pro Gly Gly Gly Ser
1 5 10 15

<210> SEQ ID NO 127
<211> LENGTH: 16
<212> TYPE: PRT
<213> ORGANISM: Artificial Sequence
<220> FEATURE:
<223> OTHER INFORMATION: Synthetic Construct

<400> SEQUENCE: 127

Glu His Val Asp Met Trp Asn Leu Val Ser Ala Ser Gly Gly Gly Ser
1 5 10 15

<210> SEQ ID NO 128
<211> LENGTH: 16
<212> TYPE: PRT
<213> ORGANISM: Artificial Sequence
<220> FEATURE:
<223> OTHER INFORMATION: Synthetic Construct

<400> SEQUENCE: 128

Glu Lys Tyr Pro Pro Ser Ser Met Asp Gln Arg Ser Gly Gly Gly Ser
1 5 10 15

<210> SEQ ID NO 129
<211> LENGTH: 16
<212> TYPE: PRT
<213> ORGANISM: Artificial Sequence
<220> FEATURE:
<223> OTHER INFORMATION: Synthetic Construct

<400> SEQUENCE: 129

Phe Pro Lys Ser Val Tyr Pro Ala Met Pro Arg Pro Gly Gly Gly Ser
1 5 10 15

<210> SEQ ID NO 130
<211> LENGTH: 16
<212> TYPE: PRT
<213> ORGANISM: Artificial Sequence
<220> FEATURE:
<223> OTHER INFORMATION: Synthetic Construct

<400> SEQUENCE: 130

Phe Ser Pro Thr Gln Ala Asn Thr Ile His Arg Trp Gly Gly Gly Ser
1 5 10 15

<210> SEQ ID NO 131
<211> LENGTH: 16
<212> TYPE: PRT
<213> ORGANISM: Artificial Sequence
<220> FEATURE:
<223> OTHER INFORMATION: Synthetic Construct

<400> SEQUENCE: 131

Phe Thr Asn Pro Phe Gly Pro Tyr Pro Thr Gly Arg Gly Gly Gly Ser
1 5 10 15

<210> SEQ ID NO 132
<211> LENGTH: 16
<212> TYPE: PRT
<213> ORGANISM: Artificial Sequence
<220> FEATURE:
<223> OTHER INFORMATION: Synthetic Construct

<400> SEQUENCE: 132

Gly Lys Gln Thr Leu His Ser Phe Ala Thr His Trp Gly Gly Gly Ser 1 5 10 15

<210> SEQ ID NO 133
<211> LENGTH: 16
<212> TYPE: PRT
<213> ORGANISM: Artificial Sequence
<220> FEATURE:
<223> OTHER INFORMATION: Synthetic Construct

<400> SEQUENCE: 133

Gly Arg Asp Met Pro Met Ser Ala Leu Met Arg His Gly Gly Gly Ser
1 5 10 15

<210> SEQ ID NO 134
<211> LENGTH: 16
<212> TYPE: PRT
<213> ORGANISM: Artificial Sequence
<220> FEATURE:
<223> OTHER INFORMATION: Synthetic Construct

<400> SEQUENCE: 134

Gly Thr Asp Ile Ile His Pro Arg Val Ile Phe Asn Gly Gly Gly Ser
1 5 10 15

<210> SEQ ID NO 135
<211> LENGTH: 16
<212> TYPE: PRT
<213> ORGANISM: Artificial Sequence
<220> FEATURE:
<223> OTHER INFORMATION: Synthetic Construct

<400> SEQUENCE: 135

His Asn Thr Pro Met Leu Asp Ser Arg Gly Asn Asn Gly Gly Gly Ser
1 5 10 15

<210> SEQ ID NO 136
<211> LENGTH: 16
<212> TYPE: PRT
<213> ORGANISM: Artificial Sequence
<220> FEATURE:
<223> OTHER INFORMATION: Synthetic Construct

<400> SEQUENCE: 136

His Ser Pro Thr Thr Ser Leu Thr Leu Ser Tyr Lys Gly Gly Gly Ser
1 5 10 15

<210> SEQ ID NO 137
<211> LENGTH: 16
<212> TYPE: PRT
<213> ORGANISM: Artificial Sequence
<220> FEATURE:
<223> OTHER INFORMATION: Synthetic Construct

<400> SEQUENCE: 137

His Tyr Lys Pro His Val Ser Ser Leu Pro Leu Ala Gly Gly Gly Ser
1 5 10 15

<210> SEQ ID NO 138
<211> LENGTH: 16
<212> TYPE: PRT
<213> ORGANISM: Artificial Sequence
<220> FEATURE:
<223> OTHER INFORMATION: Synthetic Construct

<400> SEQUENCE: 138

Leu Thr Pro His Leu Gly Thr His Lys Ser Thr Thr Gly Gly Gly Ser
1 5 10 15

<210> SEQ ID NO 139
<211> LENGTH: 16
<212> TYPE: PRT
<213> ORGANISM: Artificial Sequence
<220> FEATURE:
<223> OTHER INFORMATION: Synthetic Construct

<400> SEQUENCE: 139

Met Asn Ile Ala Glu Leu Arg Asn Ser Asp Leu Asn Gly Gly Gly Ser
1 5 10 15

<210> SEQ ID NO 140
<211> LENGTH: 16
<212> TYPE: PRT
<213> ORGANISM: Artificial Sequence
<220> FEATURE:
<223> OTHER INFORMATION: Synthetic Construct

<400> SEQUENCE: 140

Asn Ala Asn His Asn Pro Leu Asn Leu Lys Ser Ala Gly Gly Gly Ser
1 5 10 15

<210> SEQ ID NO 141
<211> LENGTH: 16
<212> TYPE: PRT
<213> ORGANISM: Artificial Sequence
<220> FEATURE:
<223> OTHER INFORMATION: Synthetic Construct

<400> SEQUENCE: 141

Gln Phe Ala Lys Thr Ser Asp Pro Gly Ser Leu Thr Gly Gly Gly Ser
1 5 10 15

<210> SEQ ID NO 142
<211> LENGTH: 16
<212> TYPE: PRT
<213> ORGANISM: Artificial Sequence
<220> FEATURE:
<223> OTHER INFORMATION: Synthetic Construct

<400> SEQUENCE: 142

Gln Ile Phe Asn His Ser Pro Asn Asp Pro Lys Lys Gly Gly Gly Ser
1 5 10 15

<210> SEQ ID NO 143
<211> LENGTH: 15
<212> TYPE: PRT
<213> ORGANISM: Artificial Sequence
<220> FEATURE:
<223> OTHER INFORMATION: Synthetic Construct

<400> SEQUENCE: 143

Arg Ile Pro Met Pro Ser Tyr Met Asn His Met Gly Gly Gly Ser
1 5 10 15

<210> SEQ ID NO 144
<211> LENGTH: 16
<212> TYPE: PRT
<213> ORGANISM: Artificial Sequence
<220> FEATURE:
<223> OTHER INFORMATION: Synthetic Construct

<400> SEQUENCE: 144

Ser Asp Ala Ser Gly Ile Pro Lys Arg Leu Ala Phe Pro Gly Gly Ser
1 5 10 15

<210> SEQ ID NO 145
<211> LENGTH: 16
<212> TYPE: PRT
<213> ORGANISM: Artificial Sequence
<220> FEATURE:
<223> OTHER INFORMATION: Synthetic Construct

<400> SEQUENCE: 145

Ser Asp Thr Thr Ser Lys His Leu Tyr Thr Arg Leu Gly Gly Gly Ser
1 5 10 15

<210> SEQ ID NO 146
<211> LENGTH: 16
<212> TYPE: PRT
<213> ORGANISM: Artificial Sequence
<220> FEATURE:
<223> OTHER INFORMATION: Synthetic Construct

<400> SEQUENCE: 146

Ser Gly Tyr Ser Ala Glu Gly Gly Lys Pro Val Leu Gly Gly Gly Ser
1 5 10 15

<210> SEQ ID NO 147
<211> LENGTH: 15
<212> TYPE: PRT
<213> ORGANISM: Artificial Sequence
<220> FEATURE:
<223> OTHER INFORMATION: Synthetic Construct

<400> SEQUENCE: 147

Ser Gly Tyr Ser Gln Gly Gly Lys Pro Val Leu Gly Gly Gly Ser
1 5 10 15

<210> SEQ ID NO 148
<211> LENGTH: 16
<212> TYPE: PRT
<213> ORGANISM: Artificial Sequence
<220> FEATURE:
<223> OTHER INFORMATION: Synthetic Construct

<400> SEQUENCE: 148

Ser His Gly Ile Ser Ser Thr Pro Pro Gly Gln Ala Gly Gly Gly Ser
1 5 10 15

<210> SEQ ID NO 149
<211> LENGTH: 16
<212> TYPE: PRT
<213> ORGANISM: Artificial Sequence
<220> FEATURE:
<223> OTHER INFORMATION: Synthetic Construct

<400> SEQUENCE: 149

Ser Leu Pro Leu Ala Ile His Asn Ser Arg Pro Asn Gly Gly Gly Ser
1 5 10 15

<210> SEQ ID NO 150
<211> LENGTH: 16
<212> TYPE: PRT
<213> ORGANISM: Artificial Sequence
<220> FEATURE:
<223> OTHER INFORMATION: Synthetic Construct

<400> SEQUENCE: 150

Ser Leu Thr Asp Tyr Val Arg Lys Gly Pro Arg Ile Gly Gly Gly Ser
1 5 10 15

<210> SEQ ID NO 151
<211> LENGTH: 16
<212> TYPE: PRT
<213> ORGANISM: Artificial Sequence
<220> FEATURE:
<223> OTHER INFORMATION: Synthetic Construct

<400> SEQUENCE: 151

Ser Ser Met Pro Ile Asn Ser Pro Ala Thr Arg Gln Gly Gly Gly Ser
1 5 10 15

<210> SEQ ID NO 152
<211> LENGTH: 16
<212> TYPE: PRT
<213> ORGANISM: Artificial Sequence
<220> FEATURE:
<223> OTHER INFORMATION: Synthetic Construct

<400> SEQUENCE: 152

Ser Tyr Pro Ser Asn Ala Leu Ser Leu His Lys Tyr Gly Gly Gly Ser
1 5 10 15

<210> SEQ ID NO 153
<211> LENGTH: 16
<212> TYPE: PRT
<213> ORGANISM: Artificial Sequence
<220> FEATURE:
<223> OTHER INFORMATION: Synthetic Construct

<400> SEQUENCE: 153

Thr Ala Val Leu Ala Pro Gln Pro Trp Leu Asn Leu Gly Gly Gly Ser
1 5 10 15

<210> SEQ ID NO 154
<211> LENGTH: 16
<212> TYPE: PRT
<213> ORGANISM: Artificial Sequence
<220> FEATURE:
<223> OTHER INFORMATION: Synthetic Construct

<400> SEQUENCE: 154

Thr Gly Ser Ala Lys Phe Leu Gln Arg Asp Thr His Gly Gly Gly Ser
1 5 10 15

<210> SEQ ID NO 155
<211> LENGTH: 16
<212> TYPE: PRT
<213> ORGANISM: Artificial Sequence
<220> FEATURE:
<223> OTHER INFORMATION: Synthetic Construct

<400> SEQUENCE: 155

Thr Lys Pro Ser Val Val His Trp Pro Met Ile Arg Gly Gly Gly Ser
1 5 10 15

<210> SEQ ID NO 156
<211> LENGTH: 16
<212> TYPE: PRT
<213> ORGANISM: Artificial Sequence
<220> FEATURE:
<223> OTHER INFORMATION: Synthetic Construct

<400> SEQUENCE: 156

Thr Leu Gly Leu Arg Pro Val Pro Val Ala Thr Thr Gly Gly Gly Ser
1 5 10 15

<210> SEQ ID NO 157

<211> LENGTH: 16
<212> TYPE: PRT
<213> ORGANISM: Artificial Sequence
<220> FEATURE:
<223> OTHER INFORMATION: Synthetic Construct

<400> SEQUENCE: 157

Thr Pro His Gly Tyr Gln Pro Met Gln Gly Lys Thr Gly Gly Gly Ser
1 5 10 15

<210> SEQ ID NO 158
<211> LENGTH: 16
<212> TYPE: PRT
<213> ORGANISM: Artificial Sequence
<220> FEATURE:
<223> OTHER INFORMATION: Synthetic Construct

<400> SEQUENCE: 158

Thr Gln Gly Ser Gly Phe Ser Ser Pro Ile Leu Pro Gly Gly Gly Ser
1 5 10 15

<210> SEQ ID NO 159
<211> LENGTH: 16
<212> TYPE: PRT
<213> ORGANISM: Artificial Sequence
<220> FEATURE:
<223> OTHER INFORMATION: Synthetic Construct

<400> SEQUENCE: 159

Val Asp Ala Lys Tyr Gly Arg His Ile Pro Pro Val Gly Gly Gly Ser
1 5 10 15

<210> SEQ ID NO 160
<211> LENGTH: 15
<212> TYPE: PRT
<213> ORGANISM: Artificial Sequence
<220> FEATURE:
<223> OTHER INFORMATION: Synthetic Construct

<400> SEQUENCE: 160

Trp Tyr Pro Ser Asn Ala Leu Ser Leu His Lys Gly Gly Gly Ser
1 5 10 15

<210> SEQ ID NO 161
<211> LENGTH: 16
<212> TYPE: PRT
<213> ORGANISM: Artificial Sequence
<220> FEATURE:
<223> OTHER INFORMATION: Synthetic Construct

<400> SEQUENCE: 161

Tyr Ala Ser Gln Ser Ala Leu Ser His Ser Ala Arg Gly Gly Gly Ser
1 5 10 15

<210> SEQ ID NO 162
<211> LENGTH: 16
<212> TYPE: PRT
<213> ORGANISM: Artificial Sequence
<220> FEATURE:
<223> OTHER INFORMATION: Synthetic Construct

<400> SEQUENCE: 162

Tyr Asp Ala Ile Gln Arg Pro Thr Gly Gln Leu Ser Gly Gly Gly Ser
1 5 10 15

<210> SEQ ID NO 163
<211> LENGTH: 16

<212> TYPE: PRT
<213> ORGANISM: Artificial Sequence
<220> FEATURE:
<223> OTHER INFORMATION: Synthetic Construct

<400> SEQUENCE: 163

Tyr Val Lys Ser His Thr Thr Thr Ala Val Arg Gln Gly Gly Gly Ser
1 5 10 15

<210> SEQ ID NO 164
<211> LENGTH: 18
<212> TYPE: PRT
<213> ORGANISM: Artificial Sequence
<220> FEATURE:
<223> OTHER INFORMATION: Synthetic Construct

<400> SEQUENCE: 164

Gly Ser Thr Ser Gly Ser Gly Lys Pro Gly Ser Gly Glu Gly Ser Thr
1 5 10 15

Lys Gly

<210> SEQ ID NO 165
<211> LENGTH: 39
<212> TYPE: PRT
<213> ORGANISM: Artificial Sequence
<220> FEATURE:
<223> OTHER INFORMATION: Synthetic Construct

<400> SEQUENCE: 165

His Ser Pro Thr Thr Ser Leu Thr Leu Ser Tyr Lys Gly Gly Gly Gly
1 5 10 15

Ser Gly Gly Gly Gly Ser Gly Gly Gly Gly Ser His Ser Pro Thr Thr
20 25 30

Ser Leu Thr Leu Ser Tyr Lys
35

<210> SEQ ID NO 166
<211> LENGTH: 39
<212> TYPE: PRT
<213> ORGANISM: Artificial Sequence
<220> FEATURE:
<223> OTHER INFORMATION: Synthetic Construct

<400> SEQUENCE: 166

Ser Tyr Pro Ser Asn Ala Leu Ser Leu His Lys Tyr Gly Gly Gly Gly
1 5 10 15

Ser Gly Gly Gly Gly Ser Gly Gly Gly Gly Ser Ser Tyr Pro Ser Asn
20 25 30

Ala Leu Ser Leu His Lys Tyr
35

<210> SEQ ID NO 167
<211> LENGTH: 39
<212> TYPE: PRT
<213> ORGANISM: Artificial Sequence
<220> FEATURE:
<223> OTHER INFORMATION: Synthetic Construct

<400> SEQUENCE: 167

Thr Leu Gly Leu Arg Pro Val Pro Val Ala Thr Thr Gly Gly Gly Gly
1 5 10 15

Ser Gly Gly Gly Gly Ser Gly Gly Gly Gly Ser Thr Leu Gly Leu Arg
20 25 30

```
Pro Val Pro Val Ala Thr Thr
        35


<210> SEQ ID NO 168
<211> LENGTH: 39
<212> TYPE: PRT
<213> ORGANISM: Artificial Sequence
<220> FEATURE:
<223> OTHER INFORMATION: Synthetic Construct

<400> SEQUENCE: 168

His Ser Pro Thr Thr Ser Leu Thr Leu Ser Tyr Lys Gly Gly Gly Gly
1               5                   10                  15

Ser Gly Gly Gly Gly Ser Gly Gly Gly Gly Ser Ser Tyr Pro Ser Asn
            20                  25                  30

Ala Leu Ser Leu His Lys Tyr
        35


<210> SEQ ID NO 169
<211> LENGTH: 39
<212> TYPE: PRT
<213> ORGANISM: Artificial Sequence
<220> FEATURE:
<223> OTHER INFORMATION: Synthetic Construct

<400> SEQUENCE: 169

His Ser Pro Thr Thr Ser Leu Thr Leu Ser Tyr Lys Gly Gly Gly Gly
1               5                   10                  15

Ser Gly Gly Gly Gly Ser Gly Gly Gly Gly Ser Thr Leu Gly Leu Arg
            20                  25                  30

Pro Val Pro Val Ala Thr Thr
        35


<210> SEQ ID NO 170
<211> LENGTH: 39
<212> TYPE: PRT
<213> ORGANISM: Artificial Sequence
<220> FEATURE:
<223> OTHER INFORMATION: Synthetic Construct

<400> SEQUENCE: 170

Ser Tyr Pro Ser Asn Ala Leu Ser Leu His Lys Tyr Gly Gly Gly Gly
1               5                   10                  15

Ser Gly Gly Gly Gly Ser Gly Gly Gly Gly Ser His Ser Pro Thr Thr
            20                  25                  30

Ser Leu Thr Leu Ser Tyr Lys
        35


<210> SEQ ID NO 171
<211> LENGTH: 39
<212> TYPE: PRT
<213> ORGANISM: Artificial Sequence
<220> FEATURE:
<223> OTHER INFORMATION: Synthetic Construct

<400> SEQUENCE: 171

Thr Leu Gly Leu Arg Pro Val Pro Val Ala Thr Thr Gly Gly Gly Gly
1               5                   10                  15

Ser Gly Gly Gly Gly Ser Gly Gly Gly Gly Ser His Ser Pro Thr Thr
            20                  25                  30

Ser Leu Thr Leu Ser Tyr Lys
        35
```

<210> SEQ ID NO 172
<211> LENGTH: 39
<212> TYPE: PRT
<213> ORGANISM: Artificial Sequence
<220> FEATURE:
<223> OTHER INFORMATION: Synthetic Construct

<400> SEQUENCE: 172

```
Ser Tyr Pro Ser Asn Ala Leu Ser Leu His Lys Tyr Gly Gly Gly Gly
1               5                   10                  15

Ser Gly Gly Gly Gly Ser Gly Gly Gly Gly Ser Thr Leu Gly Leu Arg
            20                  25                  30

Pro Val Pro Val Ala Thr Thr
        35
```

<210> SEQ ID NO 173
<211> LENGTH: 39
<212> TYPE: PRT
<213> ORGANISM: Artificial Sequence
<220> FEATURE:
<223> OTHER INFORMATION: Synthetic Construct

<400> SEQUENCE: 173

```
Thr Leu Gly Leu Arg Pro Val Pro Val Ala Thr Thr Gly Gly Gly Gly
1               5                   10                  15

Ser Gly Gly Gly Gly Ser Gly Gly Gly Gly Ser Ser Tyr Pro Ser Asn
            20                  25                  30

Ala Leu Ser Leu His Lys Tyr
        35
```

<210> SEQ ID NO 174
<211> LENGTH: 66
<212> TYPE: PRT
<213> ORGANISM: Artificial Sequence
<220> FEATURE:
<223> OTHER INFORMATION: Synthetic Construct

<400> SEQUENCE: 174

```
His Ser Pro Thr Thr Ser Leu Thr Leu Ser Tyr Lys Gly Gly Gly Gly
1               5                   10                  15

Ser Gly Gly Gly Gly Ser Gly Gly Gly Gly Ser His Ser Pro Thr Thr
            20                  25                  30

Ser Leu Thr Leu Ser Tyr Lys Gly Gly Gly Gly Ser Gly Gly Gly Gly
        35                  40                  45

Ser Gly Gly Gly Gly Ser His Ser Pro Thr Thr Ser Leu Thr Leu Ser
    50                  55                  60

Tyr Lys
65
```

<210> SEQ ID NO 175
<211> LENGTH: 66
<212> TYPE: PRT
<213> ORGANISM: Artificial Sequence
<220> FEATURE:
<223> OTHER INFORMATION: Synthetic Construct

<400> SEQUENCE: 175

```
Ser Tyr Pro Ser Asn Ala Leu Ser Leu His Lys Tyr Gly Gly Gly Gly
1               5                   10                  15

Ser Gly Gly Gly Gly Ser Gly Gly Gly Gly Ser Ser Tyr Pro Ser Asn
            20                  25                  30
```

```
Ala Leu Ser Leu His Lys Tyr Gly Gly Gly Gly Ser Gly Gly Gly Gly
        35                  40                  45

Ser Gly Gly Gly Gly Ser Ser Tyr Pro Ser Asn Ala Leu Ser Leu His
    50                  55                  60

Lys Tyr
65


<210> SEQ ID NO 176
<211> LENGTH: 66
<212> TYPE: PRT
<213> ORGANISM: Artificial Sequence
<220> FEATURE:
<223> OTHER INFORMATION: Synthetic Construct

<400> SEQUENCE: 176

Thr Leu Gly Leu Arg Pro Val Pro Val Ala Thr Thr Gly Gly Gly Gly
1               5                   10                  15

Ser Gly Gly Gly Gly Ser Gly Gly Gly Gly Ser Thr Leu Gly Leu Arg
            20                  25                  30

Pro Val Pro Val Ala Thr Thr Gly Gly Gly Gly Ser Gly Gly Gly Gly
        35                  40                  45

Ser Gly Gly Gly Gly Ser Thr Leu Gly Leu Arg Pro Val Pro Val Ala
    50                  55                  60

Thr Thr
65


<210> SEQ ID NO 177
<211> LENGTH: 66
<212> TYPE: PRT
<213> ORGANISM: Artificial Sequence
<220> FEATURE:
<223> OTHER INFORMATION: Synthetic Construct

<400> SEQUENCE: 177

His Ser Pro Thr Thr Ser Leu Thr Leu Ser Tyr Lys Gly Gly Gly Gly
1               5                   10                  15

Ser Gly Gly Gly Gly Ser Gly Gly Gly Gly Ser Ser Tyr Pro Ser Asn
            20                  25                  30

Ala Leu Ser Leu His Lys Tyr Gly Gly Gly Gly Ser Gly Gly Gly Gly
        35                  40                  45

Ser Gly Gly Gly Gly Ser Thr Leu Gly Leu Arg Pro Val Pro Val Ala
    50                  55                  60

Thr Thr
65


<210> SEQ ID NO 178
<211> LENGTH: 65
<212> TYPE: PRT
<213> ORGANISM: Artificial Sequence
<220> FEATURE:
<223> OTHER INFORMATION: Synthetic Construct

<400> SEQUENCE: 178

Ser Tyr Pro Ser Asn Ala Leu Ser Leu His Lys Tyr Gly Gly Gly Gly
1               5                   10                  15

Ser Gly Gly Gly Gly Ser Gly Gly Gly Gly Thr Leu Gly Leu Arg Pro
            20                  25                  30

Val Pro Val Ala Thr Thr Gly Gly Gly Gly Ser Gly Gly Gly Gly Ser
        35                  40                  45

Gly Gly Gly Gly Ser His Ser Pro Thr Thr Ser Leu Thr Leu Ser Tyr
```

```
    50                  55                  60

Lys
65


<210> SEQ ID NO 179
<211> LENGTH: 66
<212> TYPE: PRT
<213> ORGANISM: Artificial Sequence
<220> FEATURE:
<223> OTHER INFORMATION: Synthetic Construct

<400> SEQUENCE: 179

Thr Leu Gly Leu Arg Pro Val Pro Val Ala Thr Thr Gly Gly Gly Gly
1               5                   10                  15

Ser Gly Gly Gly Gly Ser Gly Gly Gly Gly Ser Ser Tyr Pro Ser Asn
            20                  25                  30

Ala Leu Ser Leu His Lys Tyr Gly Gly Gly Gly Ser Gly Gly Gly Gly
        35                  40                  45

Ser Gly Gly Gly Gly Ser His Ser Pro Thr Thr Ser Leu Thr Leu Ser
    50                  55                  60

Tyr Lys
65


<210> SEQ ID NO 180
<211> LENGTH: 66
<212> TYPE: PRT
<213> ORGANISM: Artificial Sequence
<220> FEATURE:
<223> OTHER INFORMATION: Synthetic Construct

<400> SEQUENCE: 180

His Ser Pro Thr Thr Ser Leu Thr Leu Ser Tyr Lys Gly Gly Gly Gly
1               5                   10                  15

Ser Gly Gly Gly Gly Ser Gly Gly Gly Gly Ser Thr Leu Gly Leu Arg
            20                  25                  30

Pro Val Pro Val Ala Thr Thr Gly Gly Gly Gly Ser Gly Gly Gly Gly
        35                  40                  45

Ser Gly Gly Gly Gly Ser Ser Tyr Pro Ser Asn Ala Leu Ser Leu His
    50                  55                  60

Lys Tyr
65
```